(12) United States Patent
Shuto

(10) Patent No.: US 12,537,056 B2
(45) Date of Patent: Jan. 27, 2026

(54) SEMICONDUCTOR CIRCUIT, DRIVING METHOD, AND ELECTRONIC APPARATUS

(71) Applicant: Sony Semiconductor Solutions Corporation, Kanagawa (JP)

(72) Inventor: Yusuke Shuto, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 93 days.

(21) Appl. No.: 18/694,111

(22) PCT Filed: Sep. 16, 2022

(86) PCT No.: PCT/JP2022/034805
§ 371 (c)(1),
(2) Date: Mar. 21, 2024

(87) PCT Pub. No.: WO2023/084916
PCT Pub. Date: May 19, 2023

(65) Prior Publication Data
US 2025/0140314 A1    May 1, 2025

(30) Foreign Application Priority Data

Nov. 12, 2021  (JP) ................................. 2021-185013

(51) Int. Cl.
  *G11C 14/00*    (2006.01)
  *G11C 11/412*    (2006.01)
  *G11C 11/419*    (2006.01)
  *H10B 10/00*    (2023.01)

(52) U.S. Cl.
CPC ........ *G11C 14/0072* (2013.01); *G11C 11/412* (2013.01); *G11C 11/419* (2013.01); *H10B 10/12* (2023.02)

(58) Field of Classification Search
None
See application file for complete search history.

(56) References Cited

U.S. PATENT DOCUMENTS 9,443,564 B2 * 9/2016 Ishizu ................ G11C 14/0054
2022/0084583 A1 * 3/2022 Sugahara ............... H03K 3/356

FOREIGN PATENT DOCUMENTS

| JP | 2019160374 A | 9/2019 |
| JP | 2019194931 A | 11/2019 |
| WO | 2018130929 A1 | 7/2018 |

OTHER PUBLICATIONS

International Search Report (PCT/ISA/210), International Application No. PCT/JP2022/034805, dated Nov. 22, 2022.

* cited by examiner

*Primary Examiner* — Kretelia Graham
(74) *Attorney, Agent, or Firm* — Michael Best & Friedrich LLP

(57) ABSTRACT

A semiconductor circuit according to the present disclosure includes: first and second inverters coupled to first and second power supply nodes, a first control line, a first storage circuit, first and second power supply switches, first and second bit lines, a first word line, first and second transistors each having a gate coupled to the first word line, and a driving section that is configured to perform a first driving operation and a second driving operation. In the first driving operation, in a period in which the first and second power supply switches are turned on, the first word line is set active, and signals having logic levels different from each other are applied to the respective first and second bit lines. In the second driving operation, in a period in which the first and second power supply switches are turned off, the first word line is set active, and a first alternating-current signal and a second alternating-current signal are respectively applied to the first and second bit lines. The first alternating-current signal and the second alternating-current signal are signals in phase with each other.

20 Claims, 78 Drawing Sheets

[ FIG. 1 ]
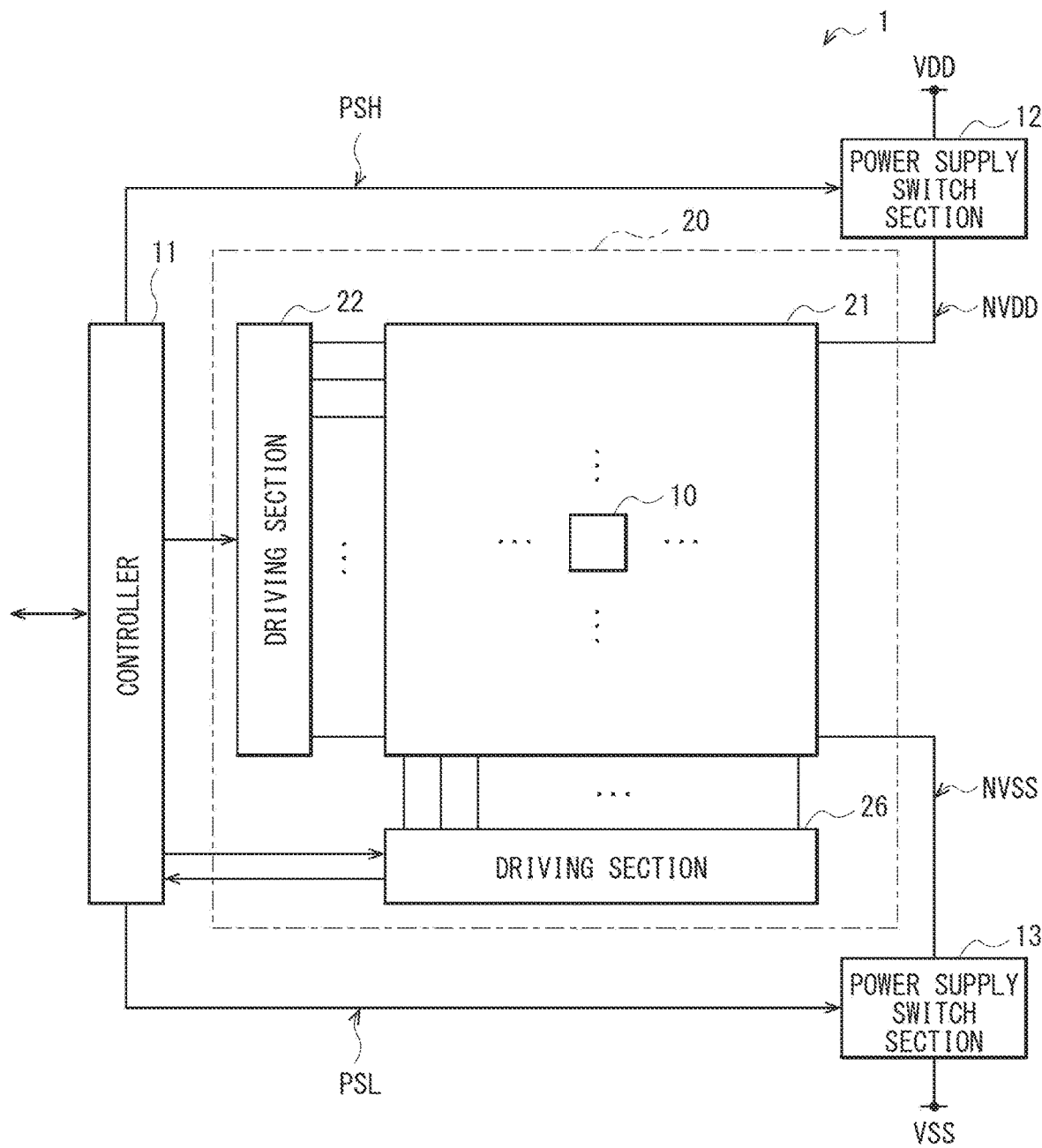

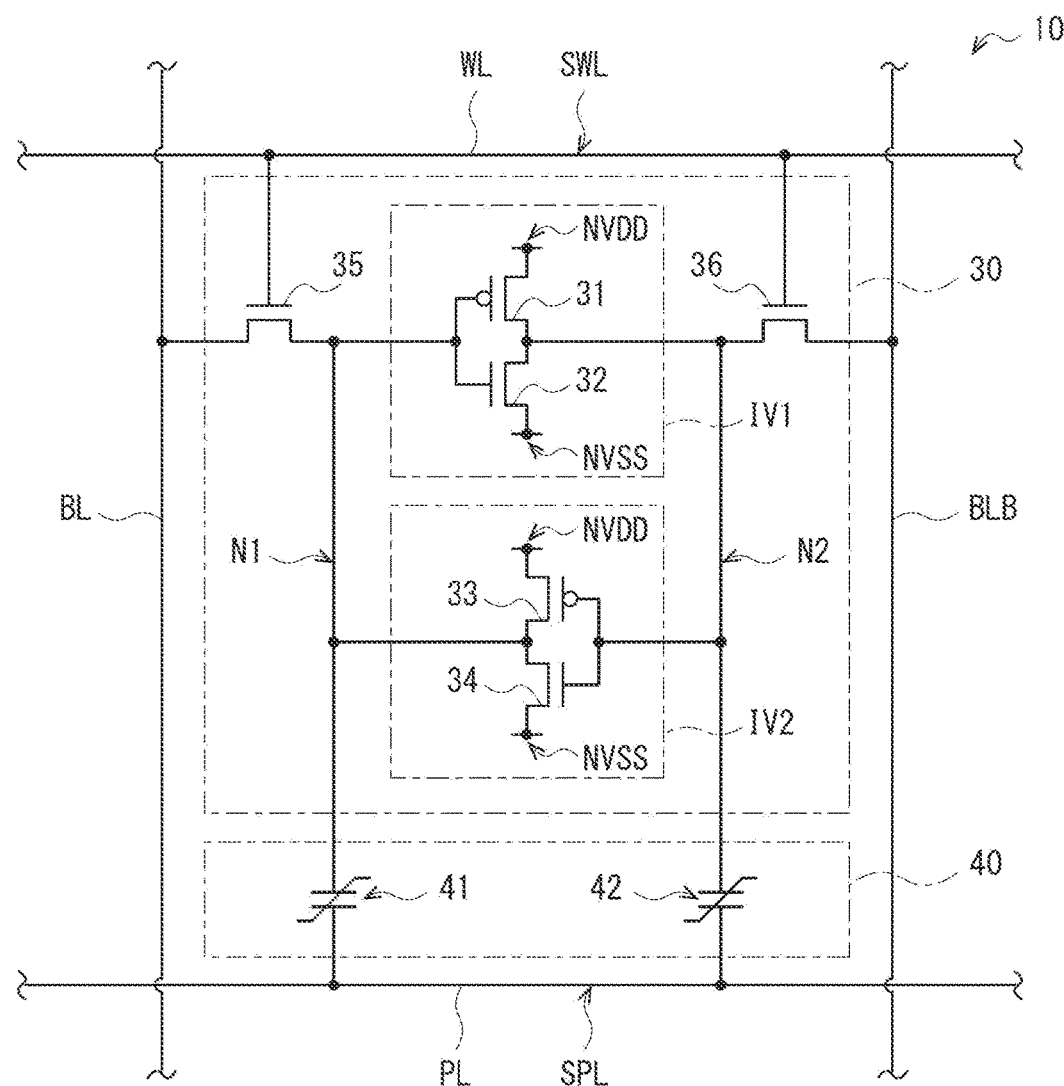
[FIG. 2]

[ FIG. 3 ]
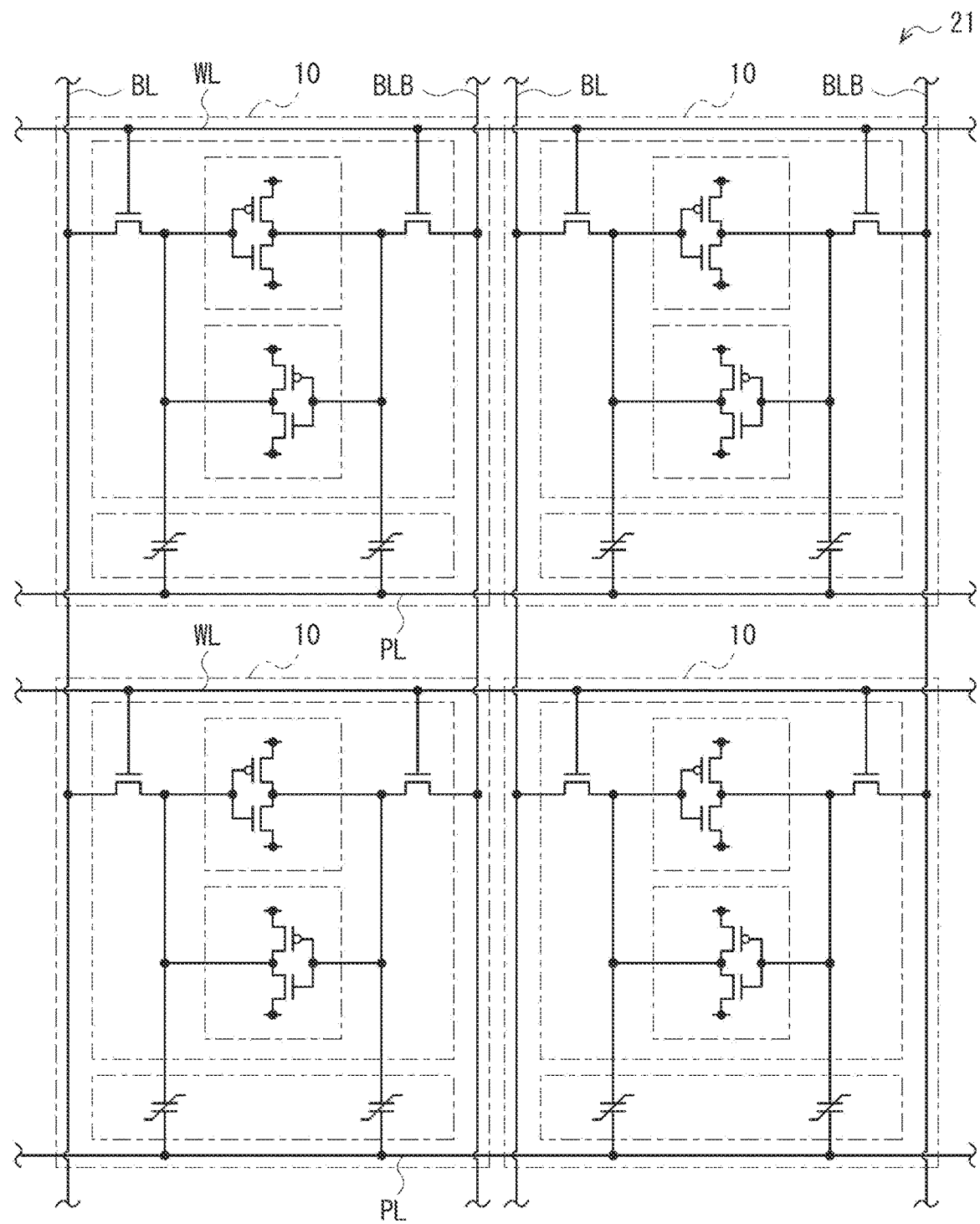

[FIG. 4]
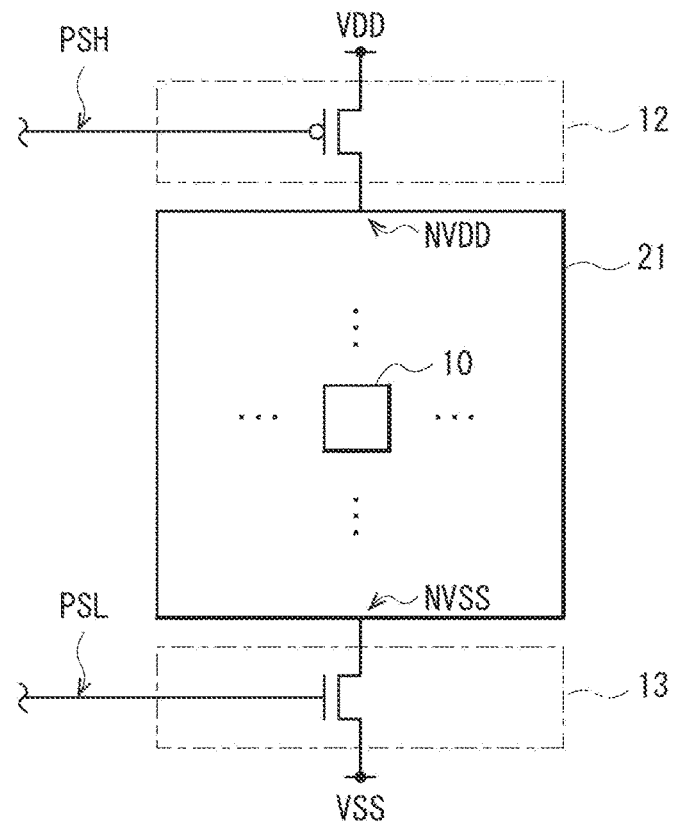
[FIG. 5]
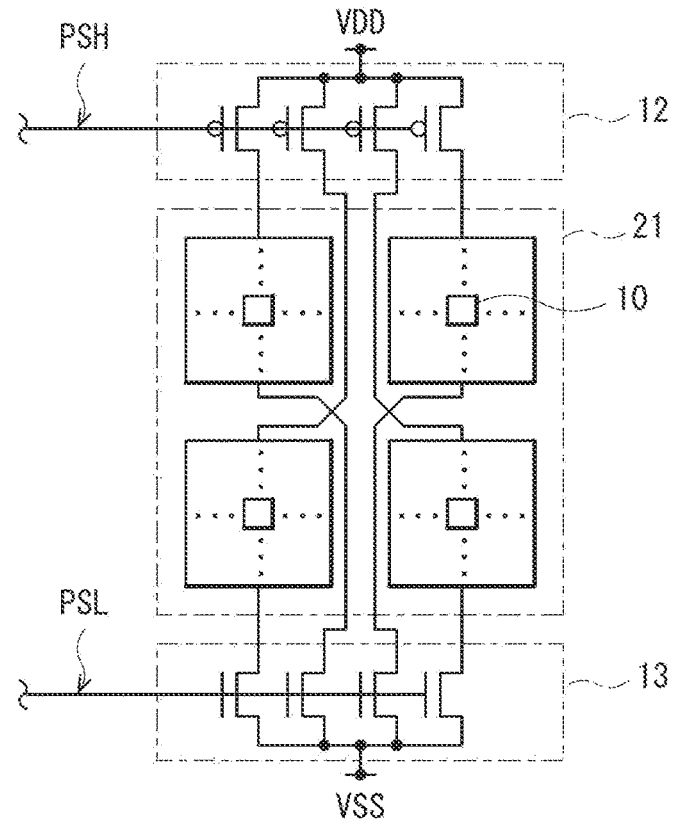

[FIG. 6]
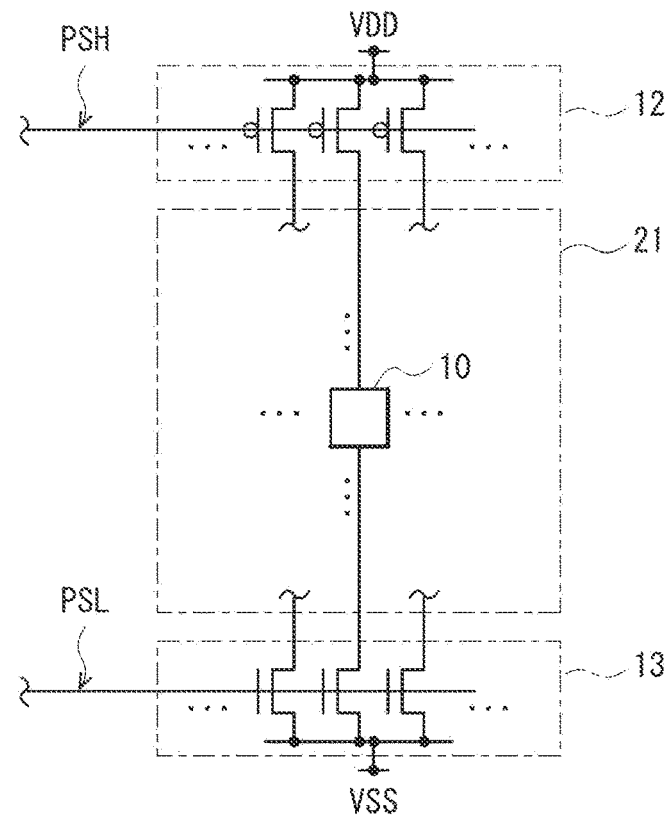
[FIG. 7]
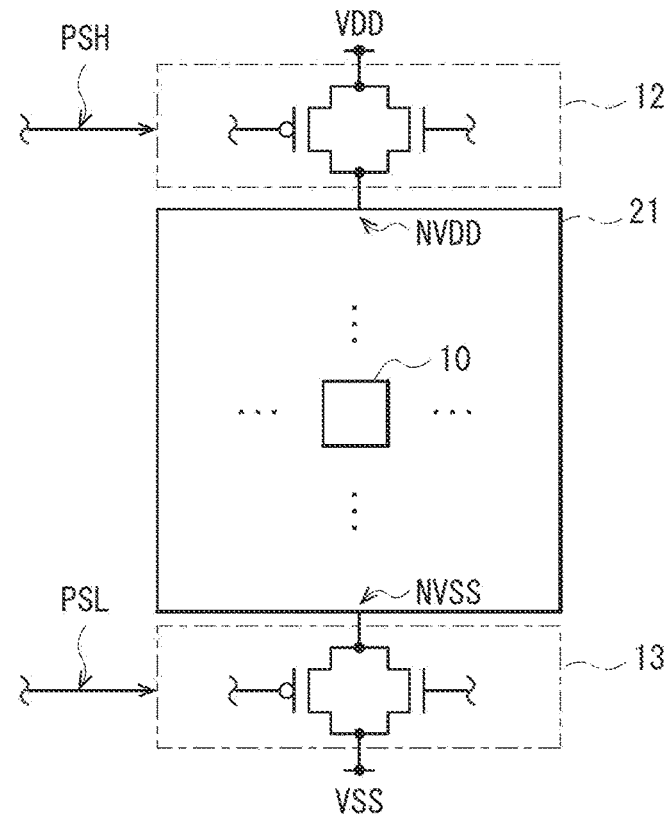

[FIG. 8]
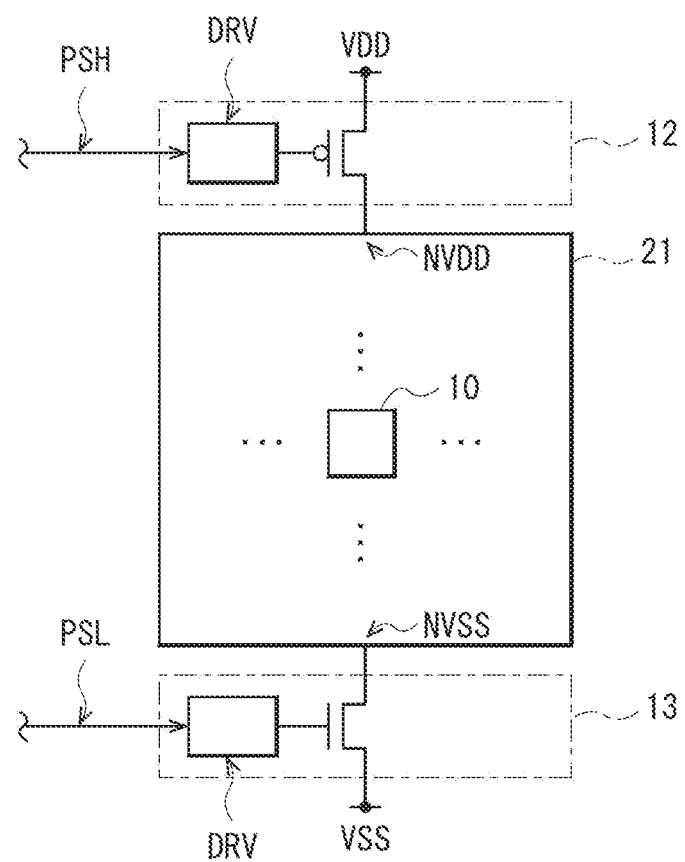

[FIG. 9]
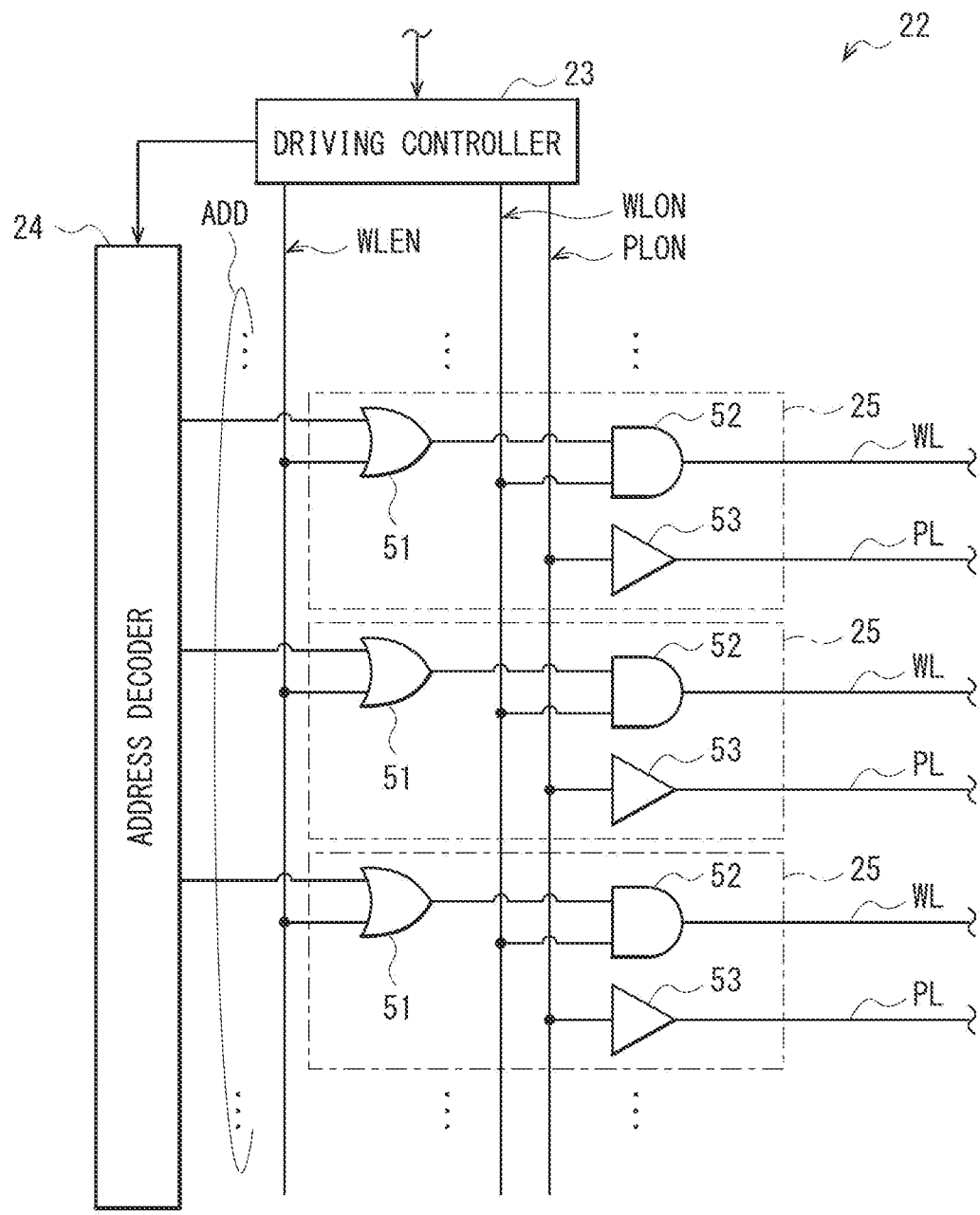

[ FIG. 10 ]
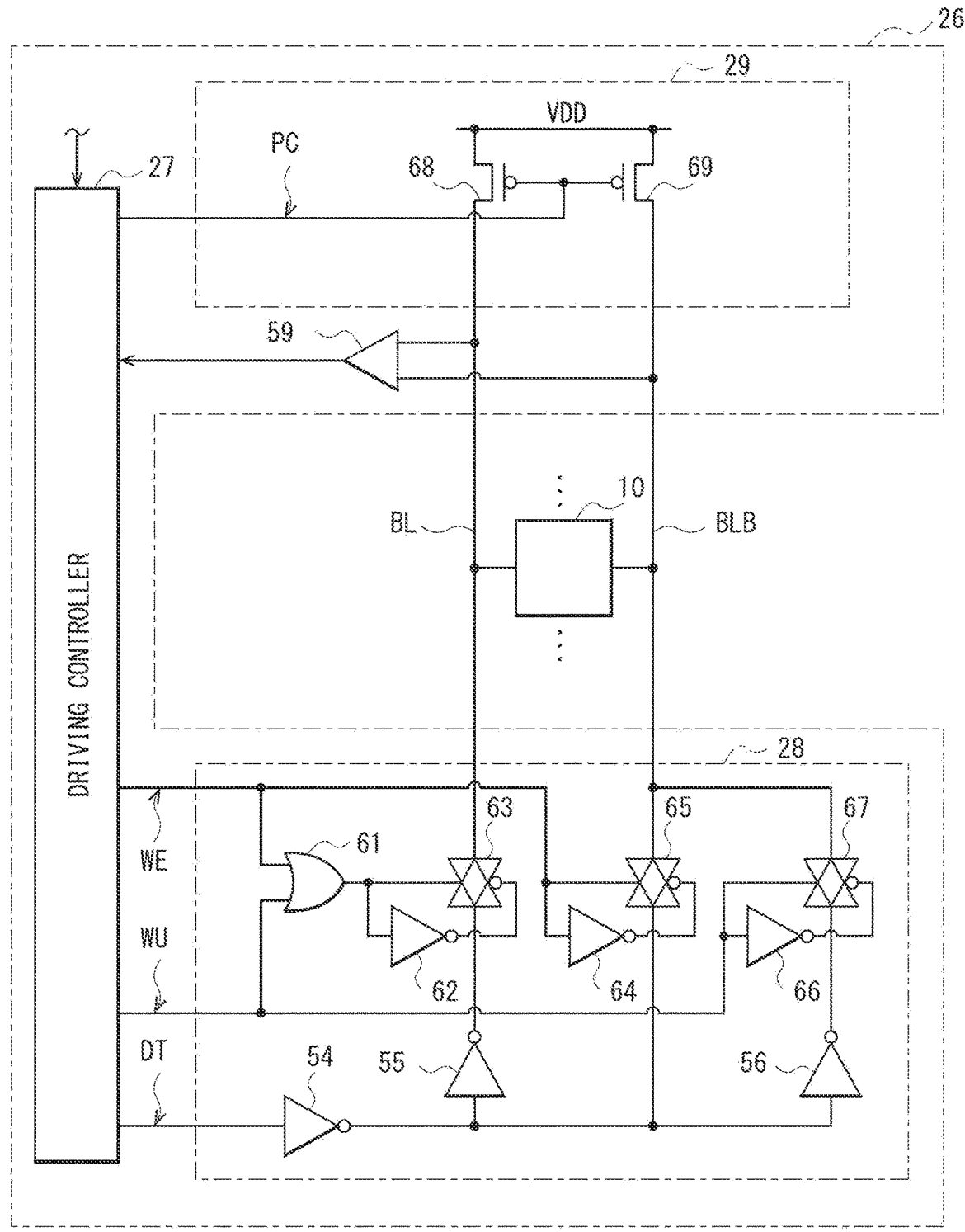

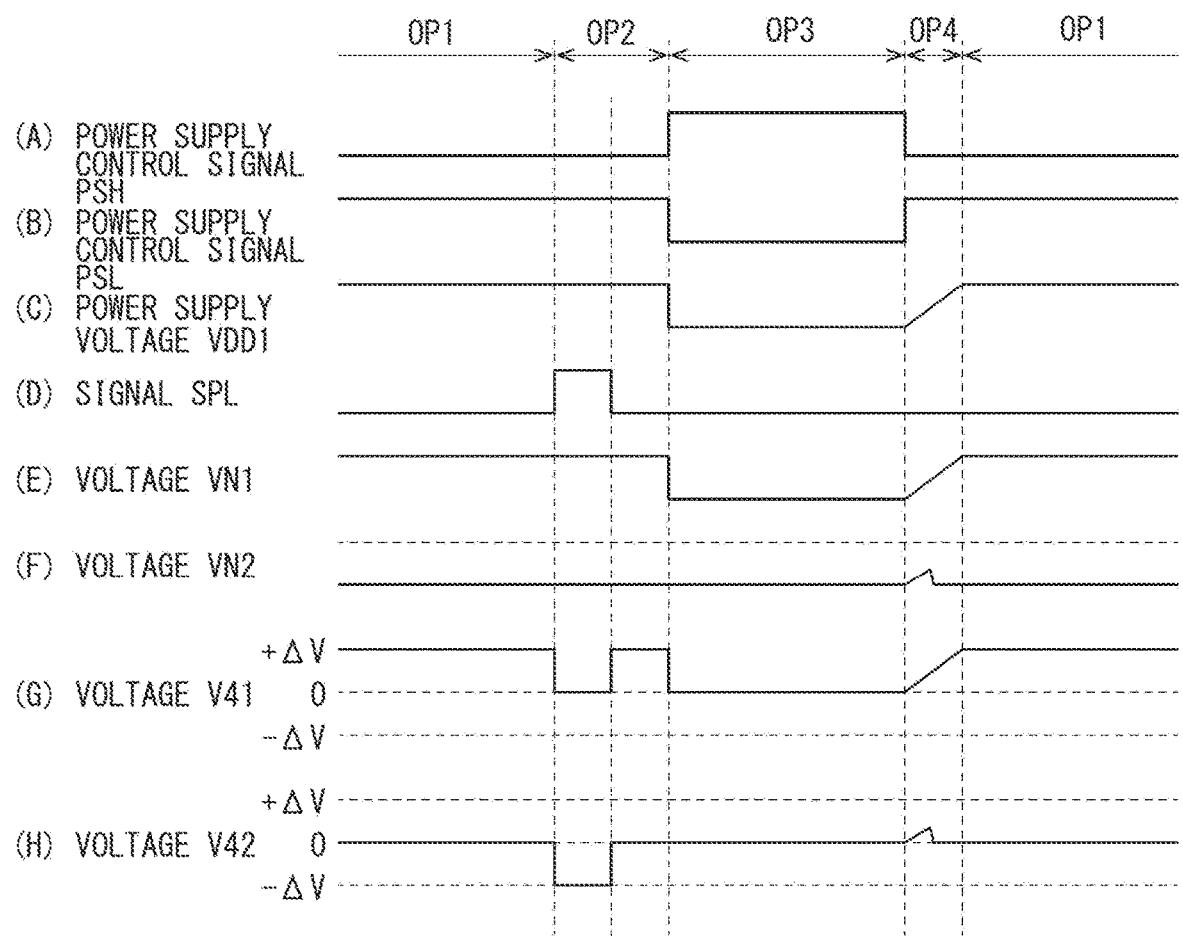

[ FIG. 12A ]
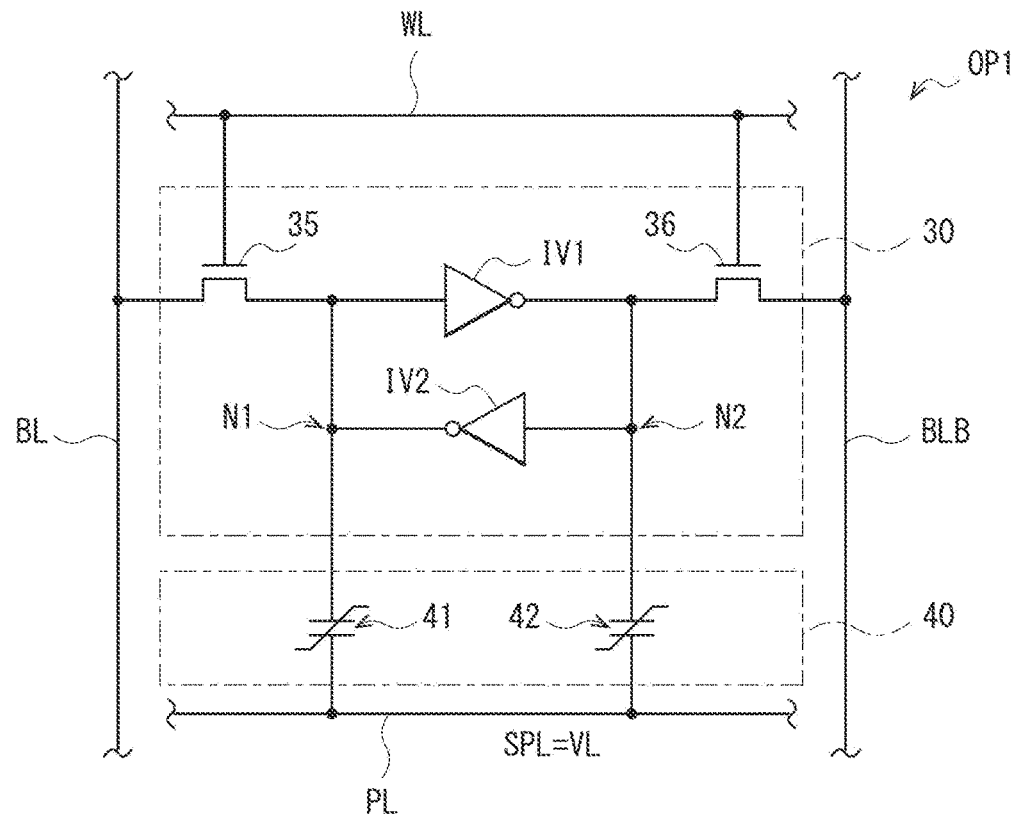
[ FIG. 12B ]
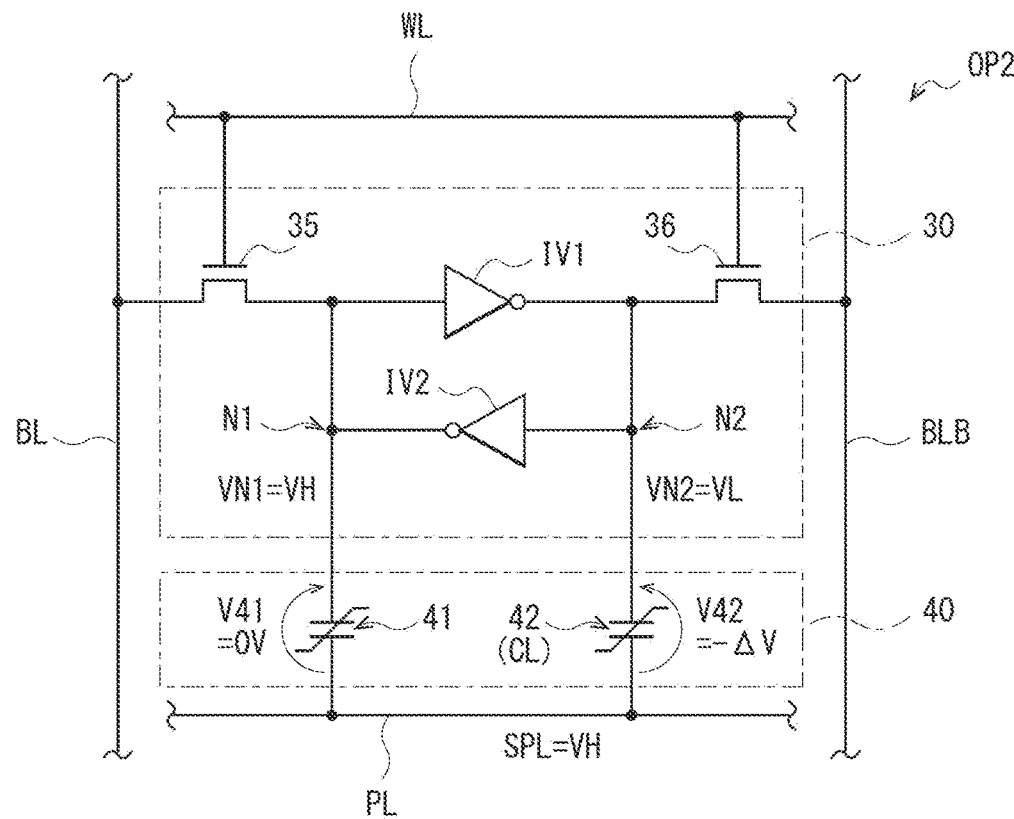

[FIG. 12C]
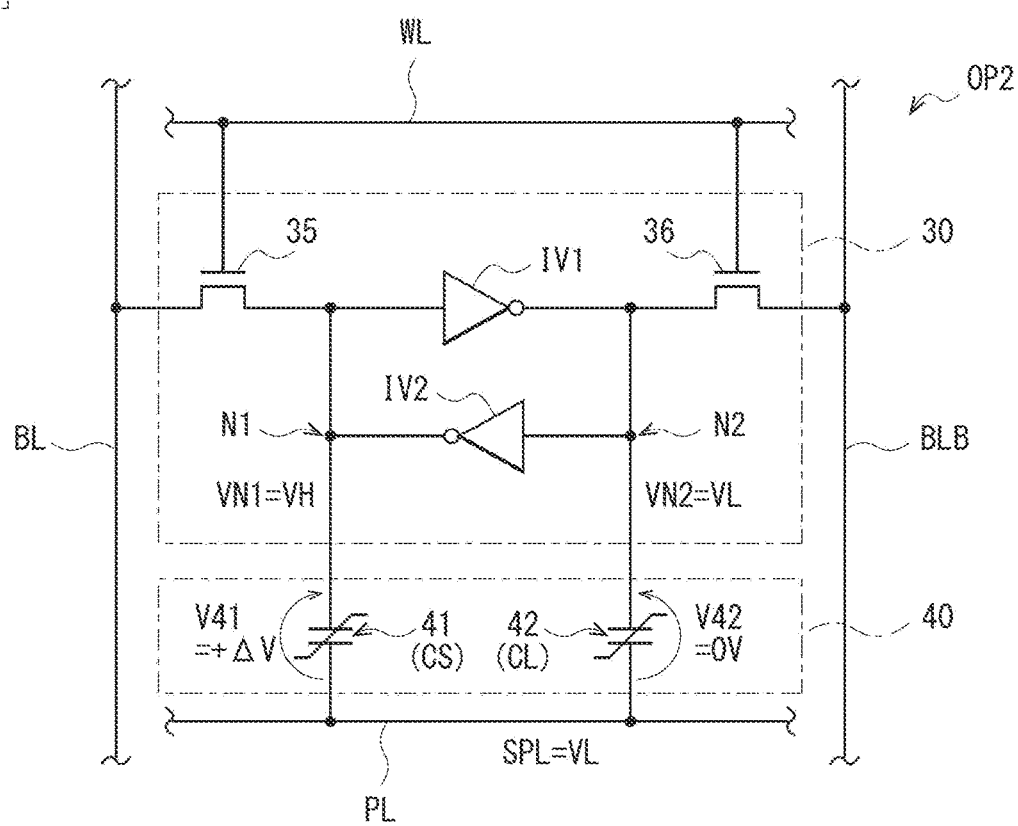
[FIG. 12D]
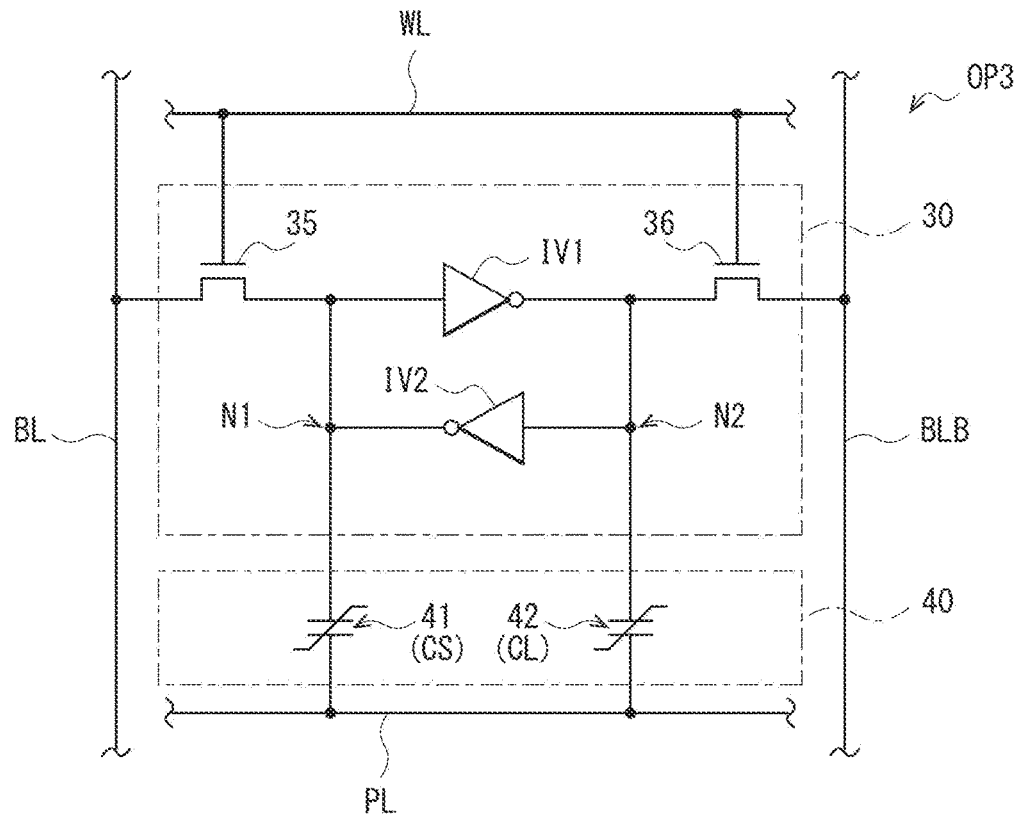

[ FIG. 12E ]
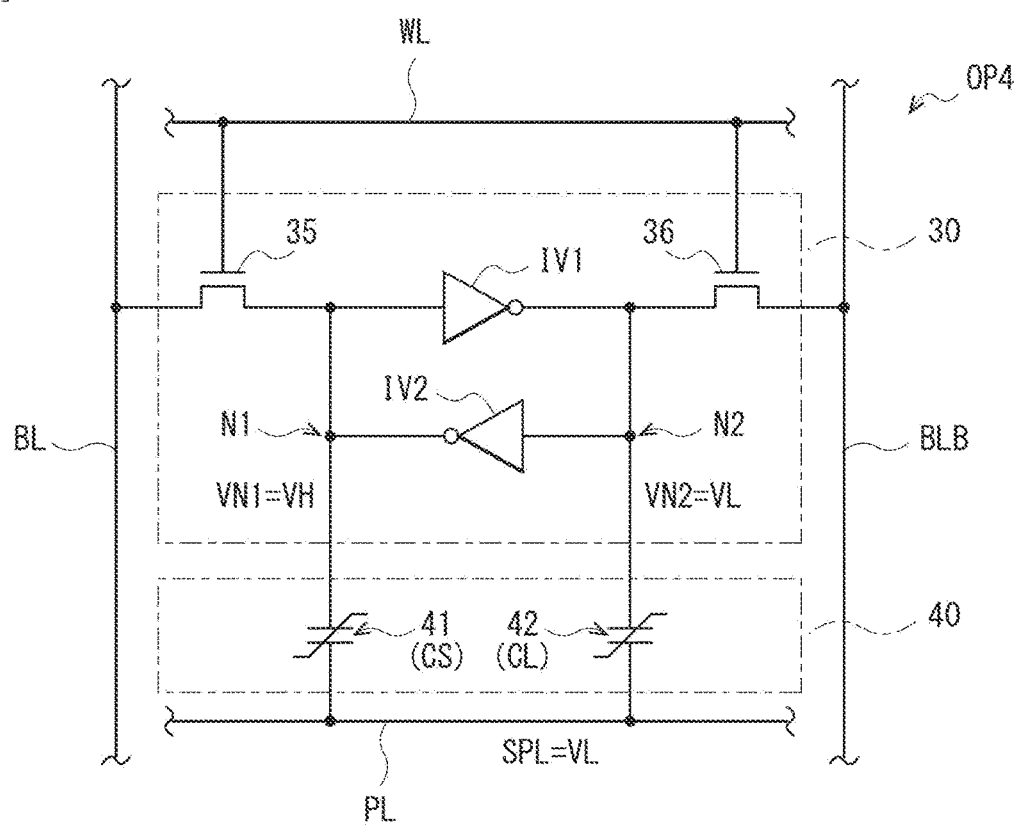

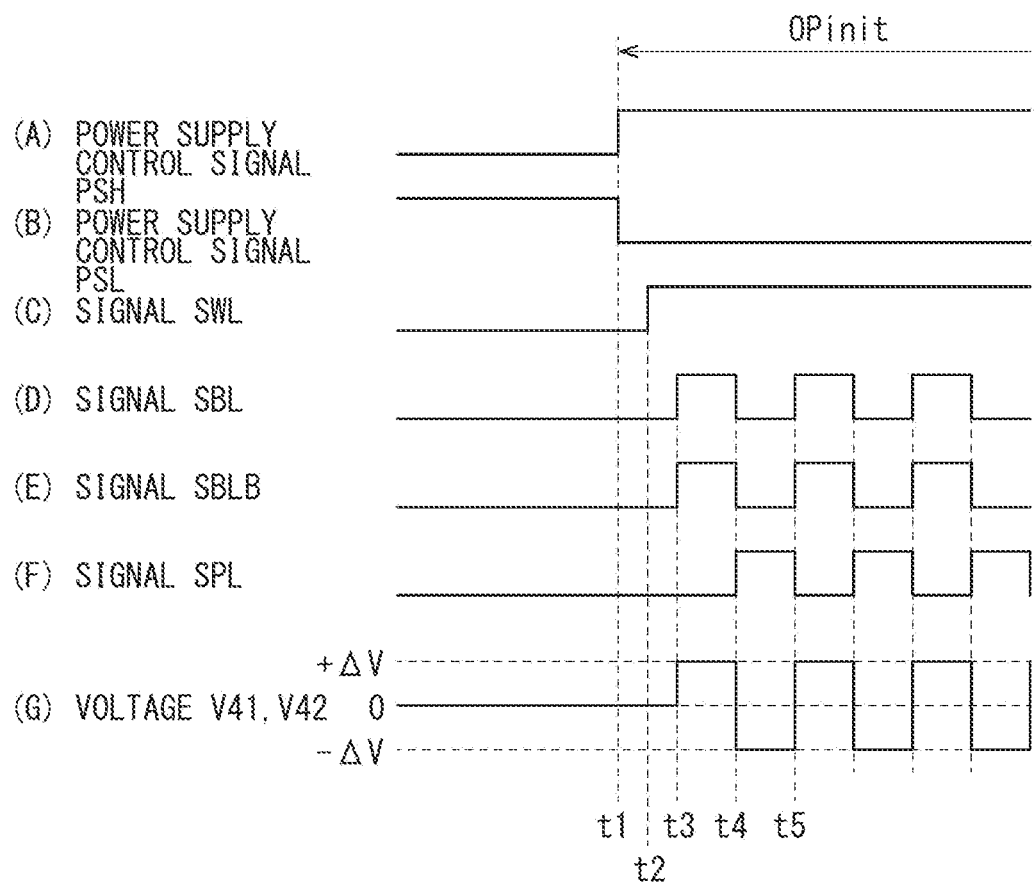

[ FIG. 14A ]
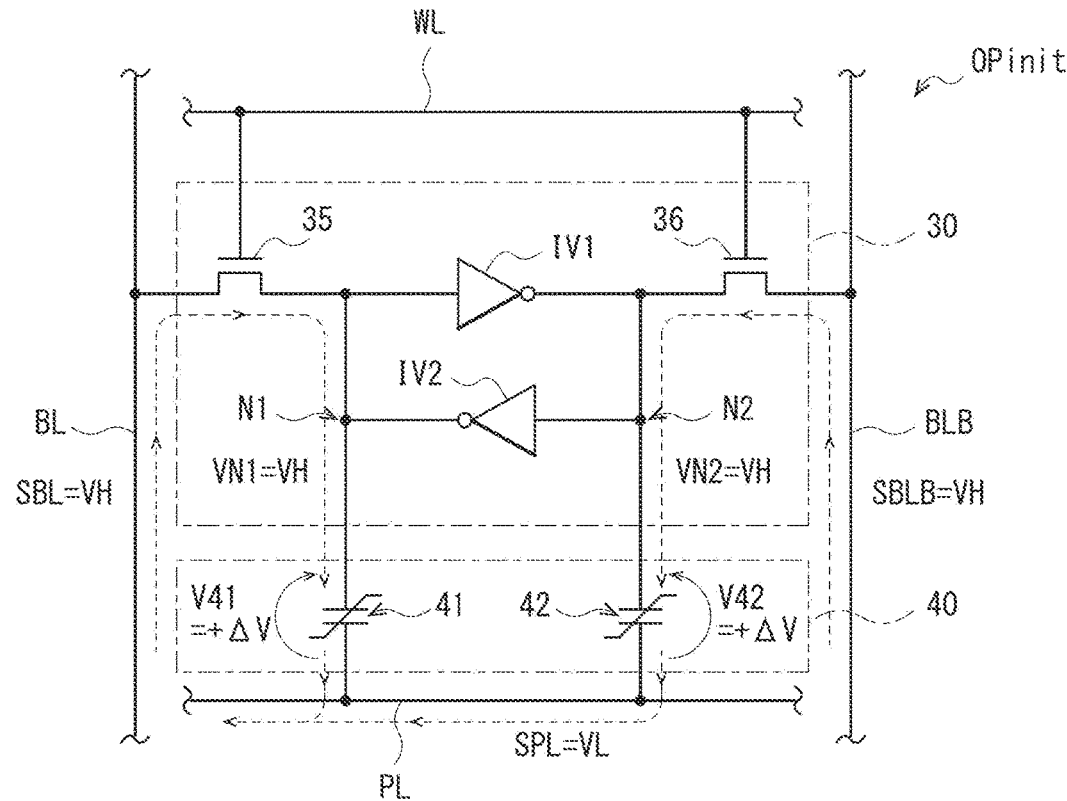
[ FIG. 14B ]
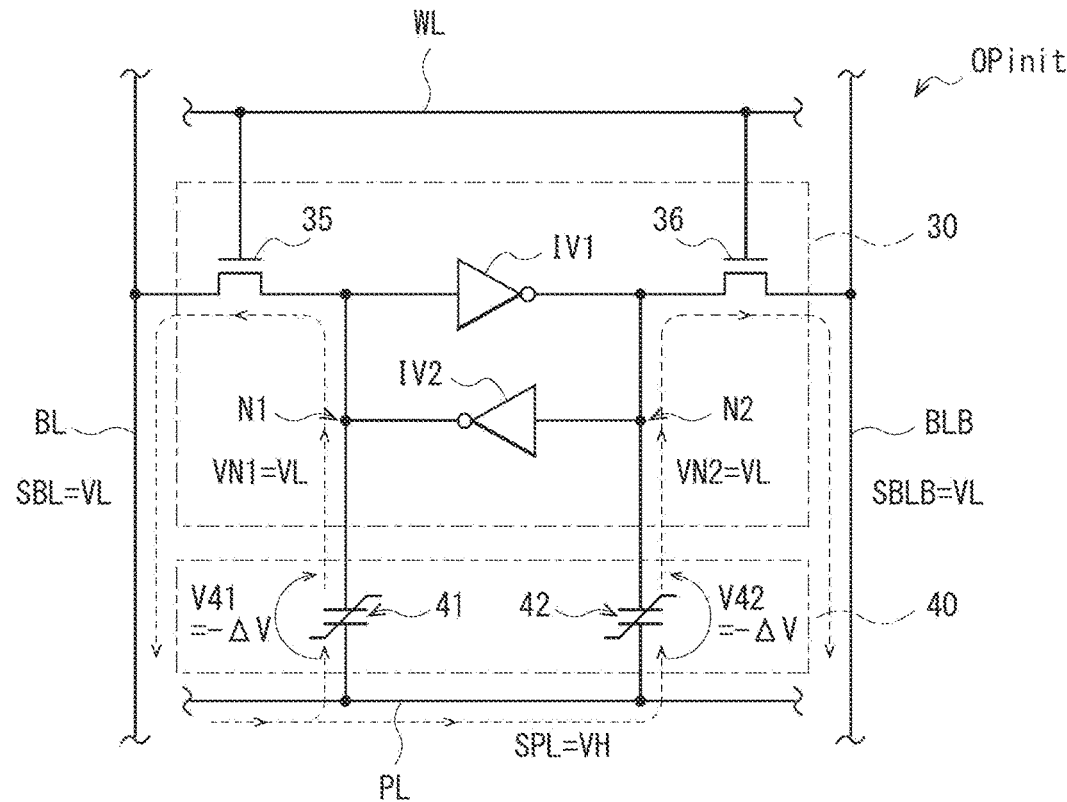

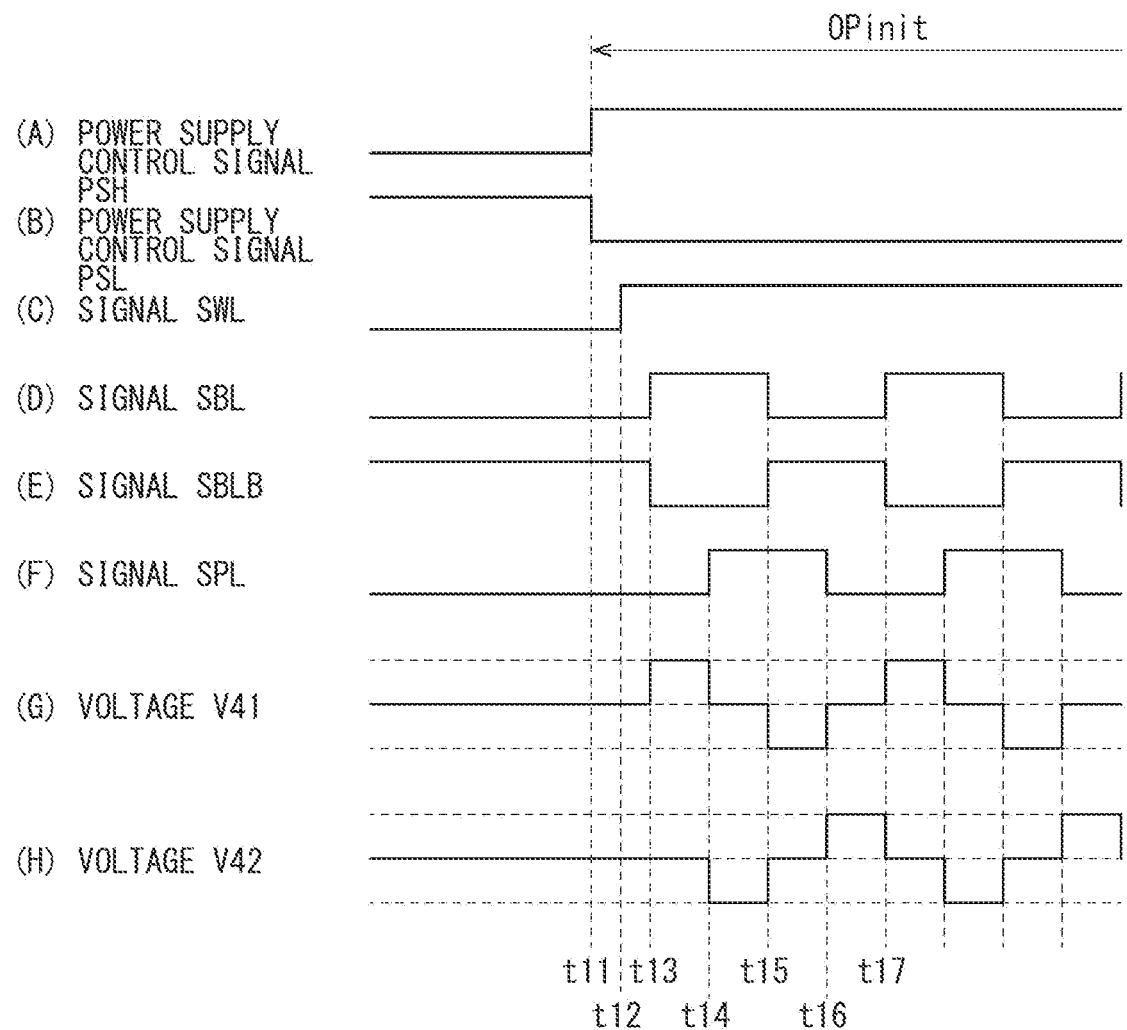

[ FIG. 16A ]
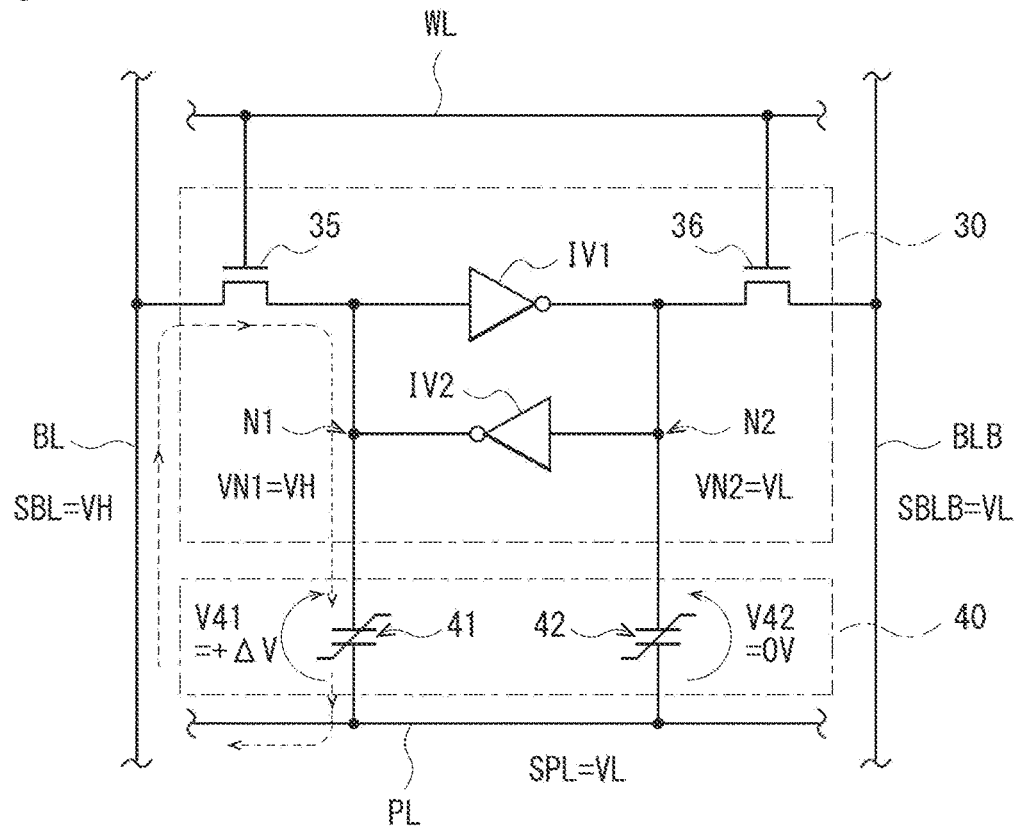
[ FIG. 16B ]
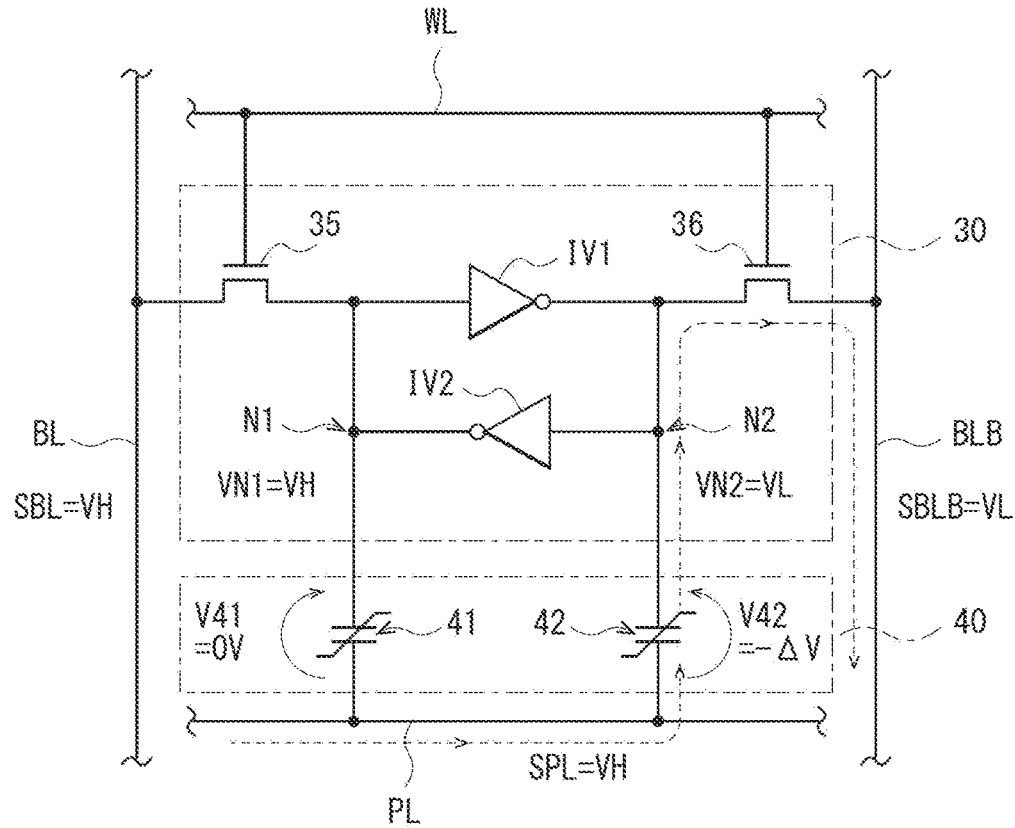

[ FIG. 16C ]
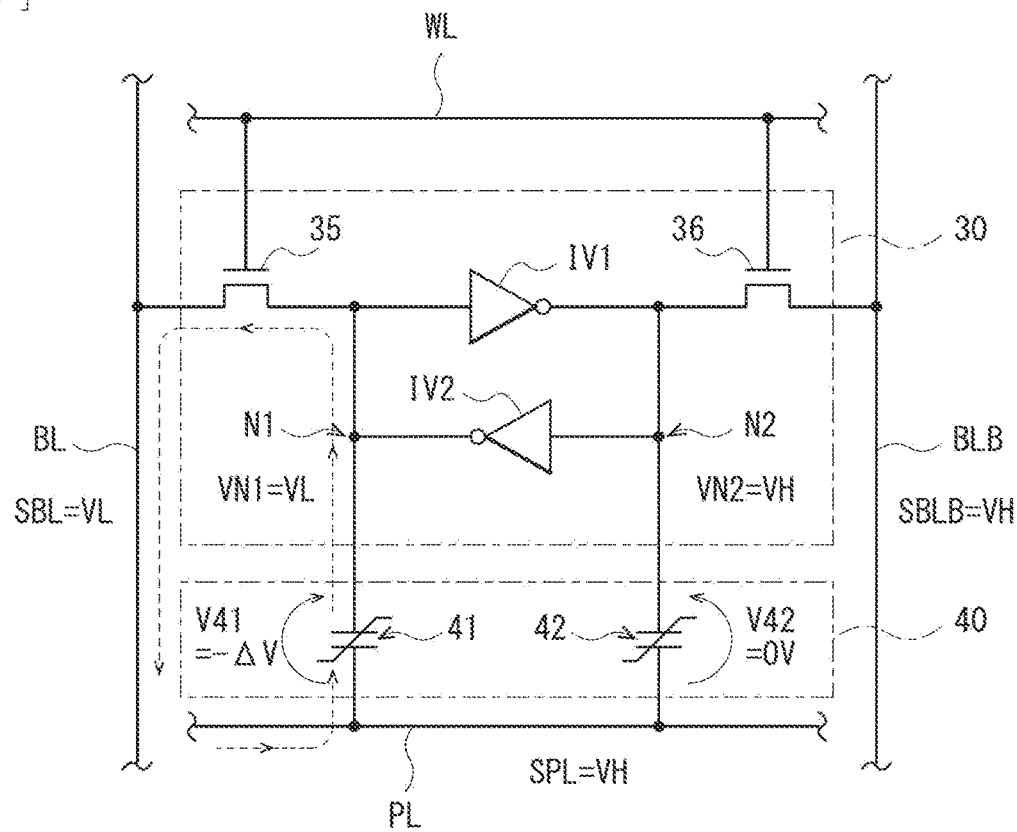
[ FIG. 16D ]
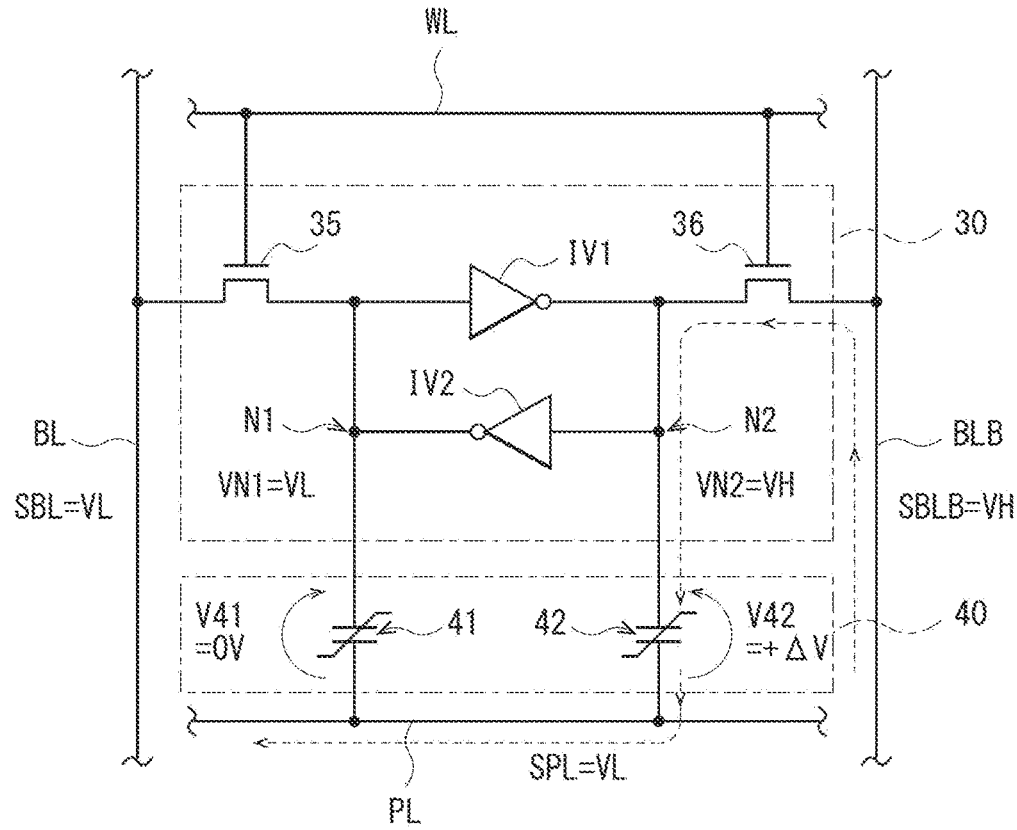

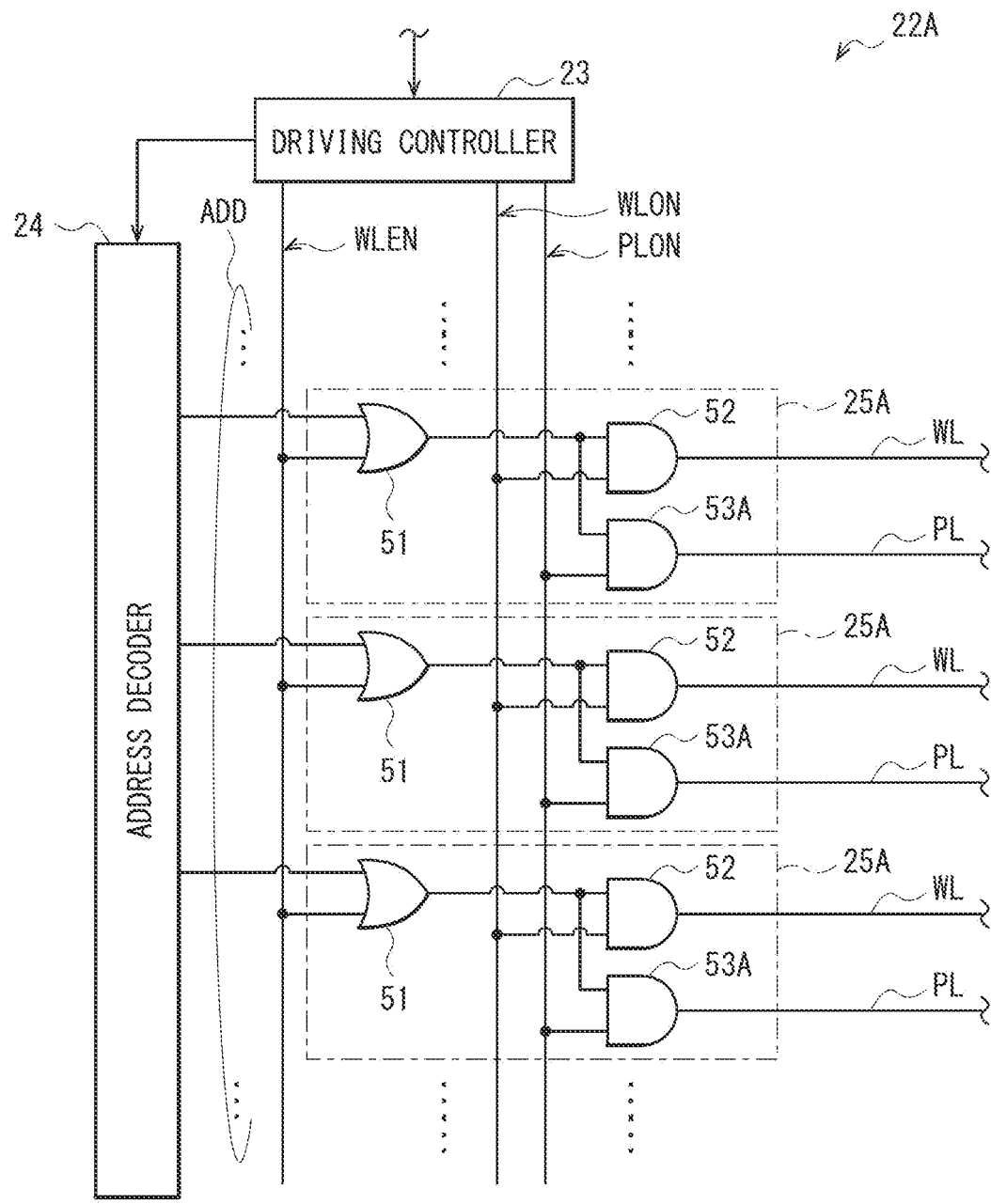
[ FIG. 17 ]

[FIG. 18]
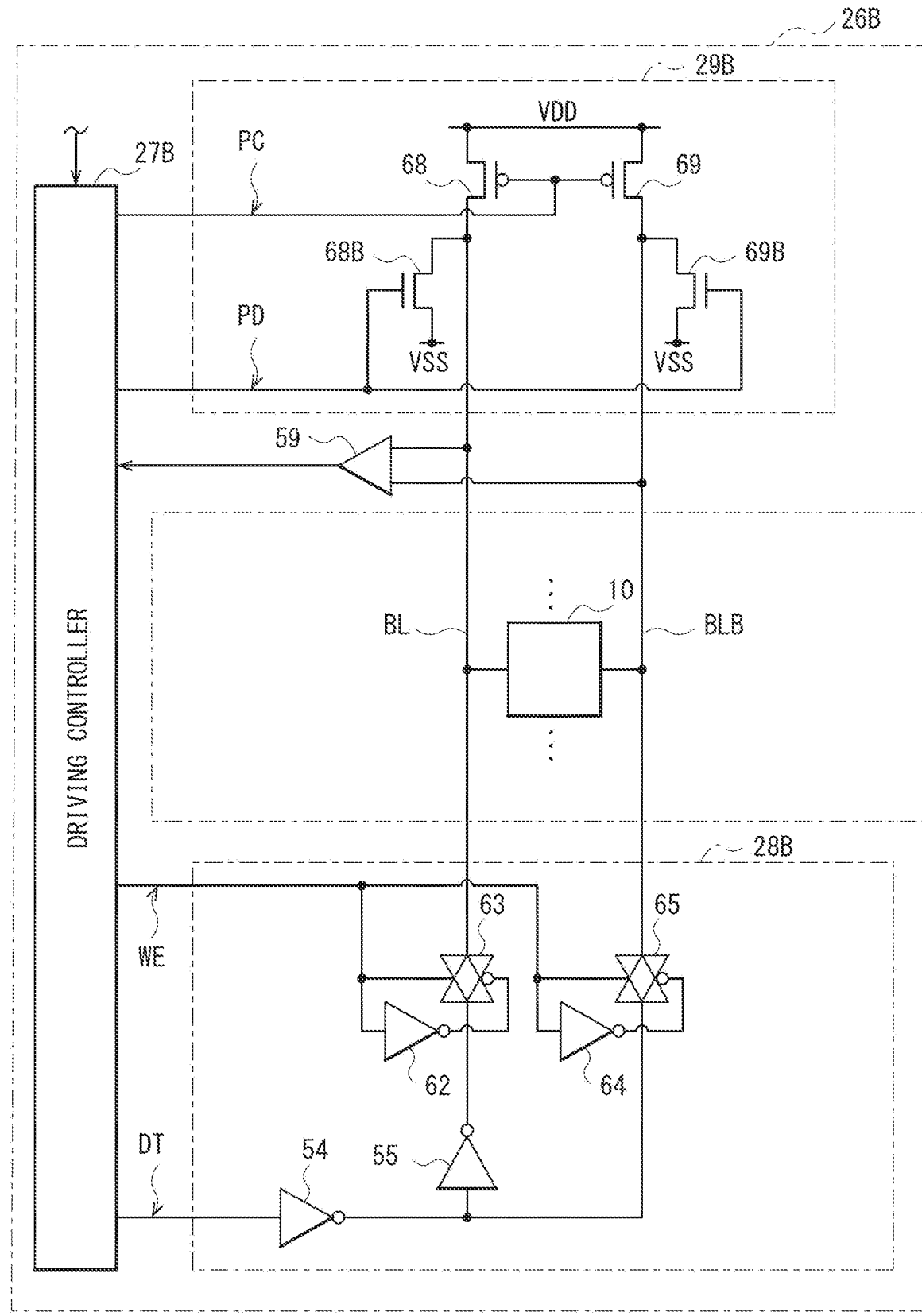

[ FIG. 19 ]
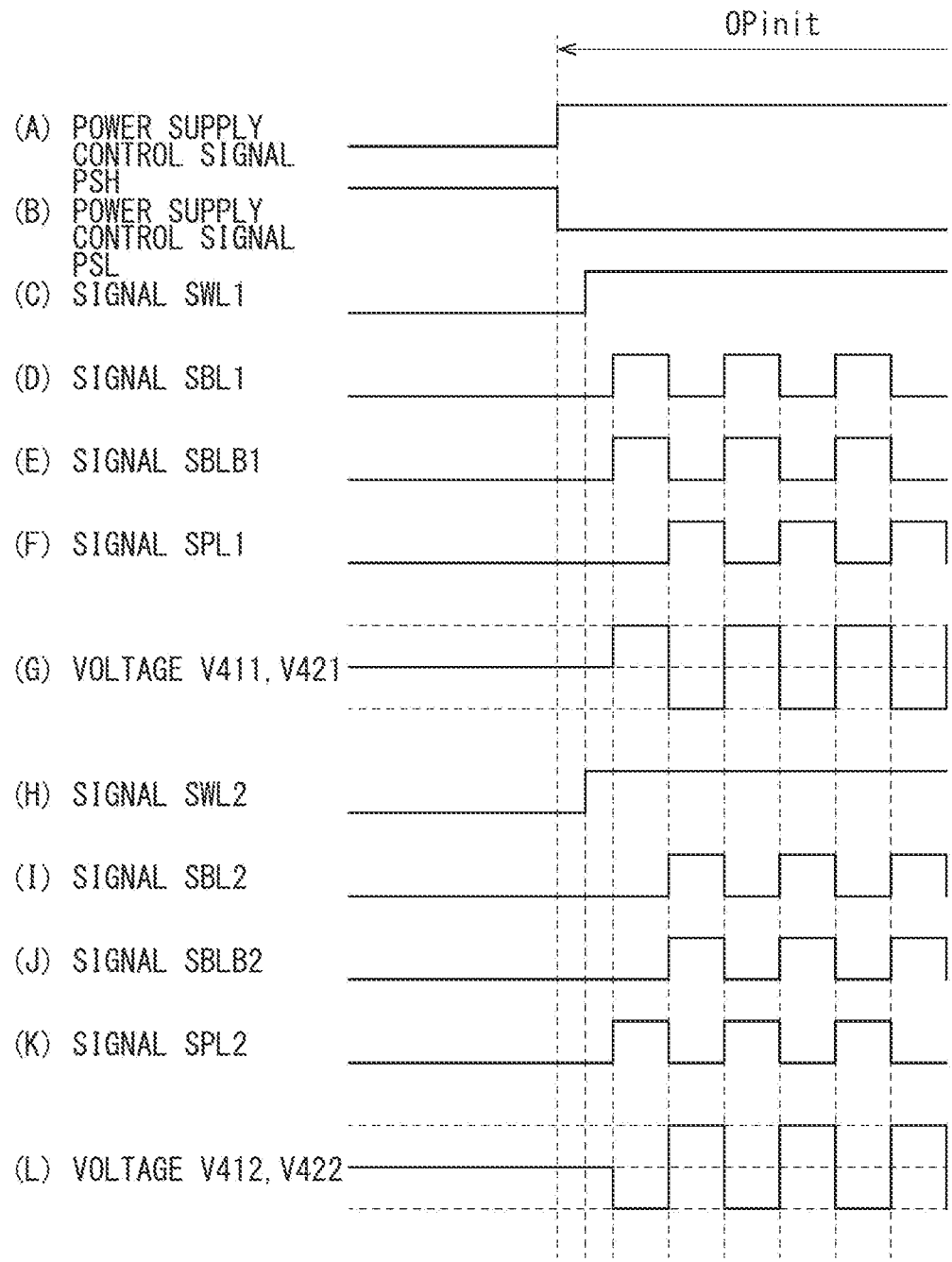

[FIG. 20]
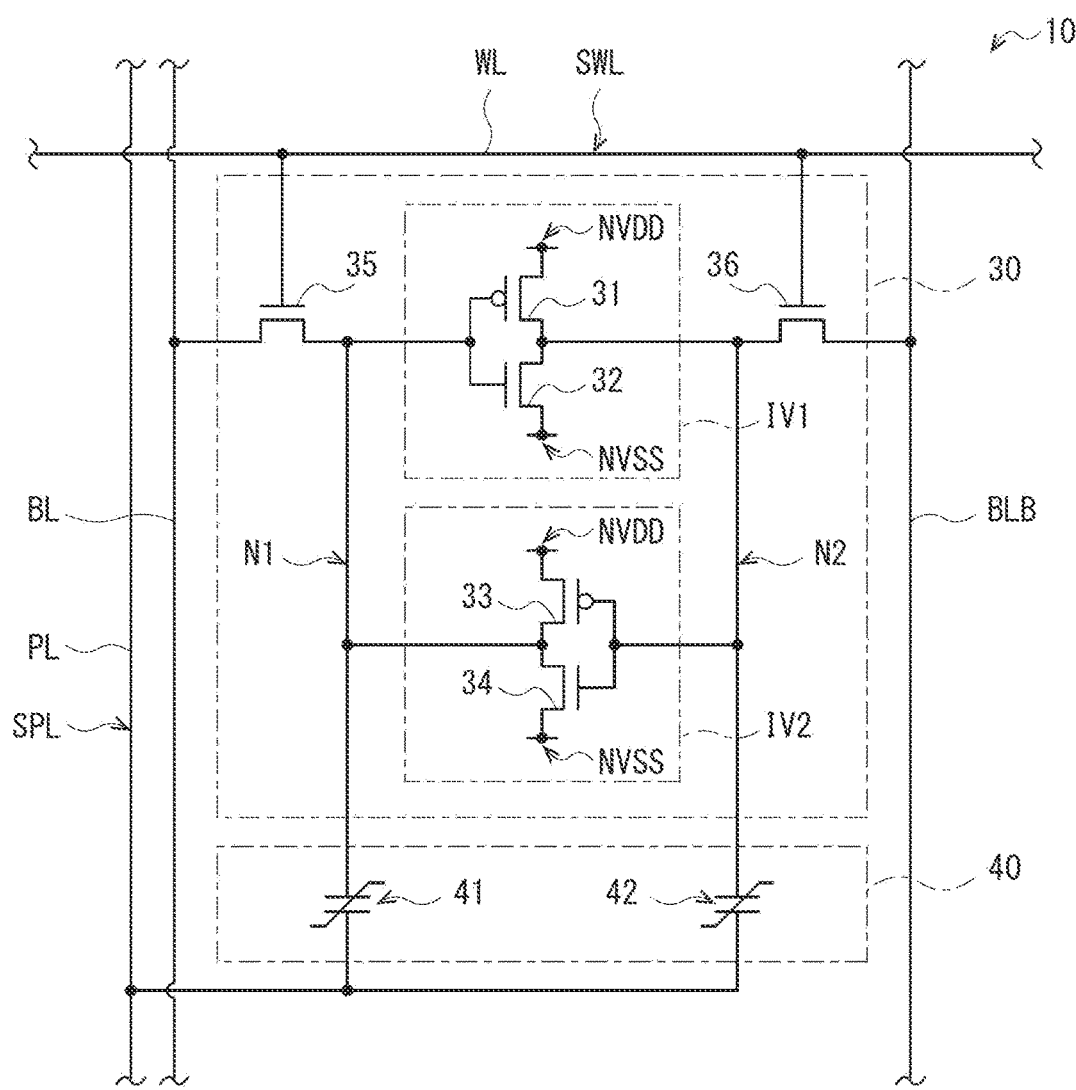

[FIG. 21]
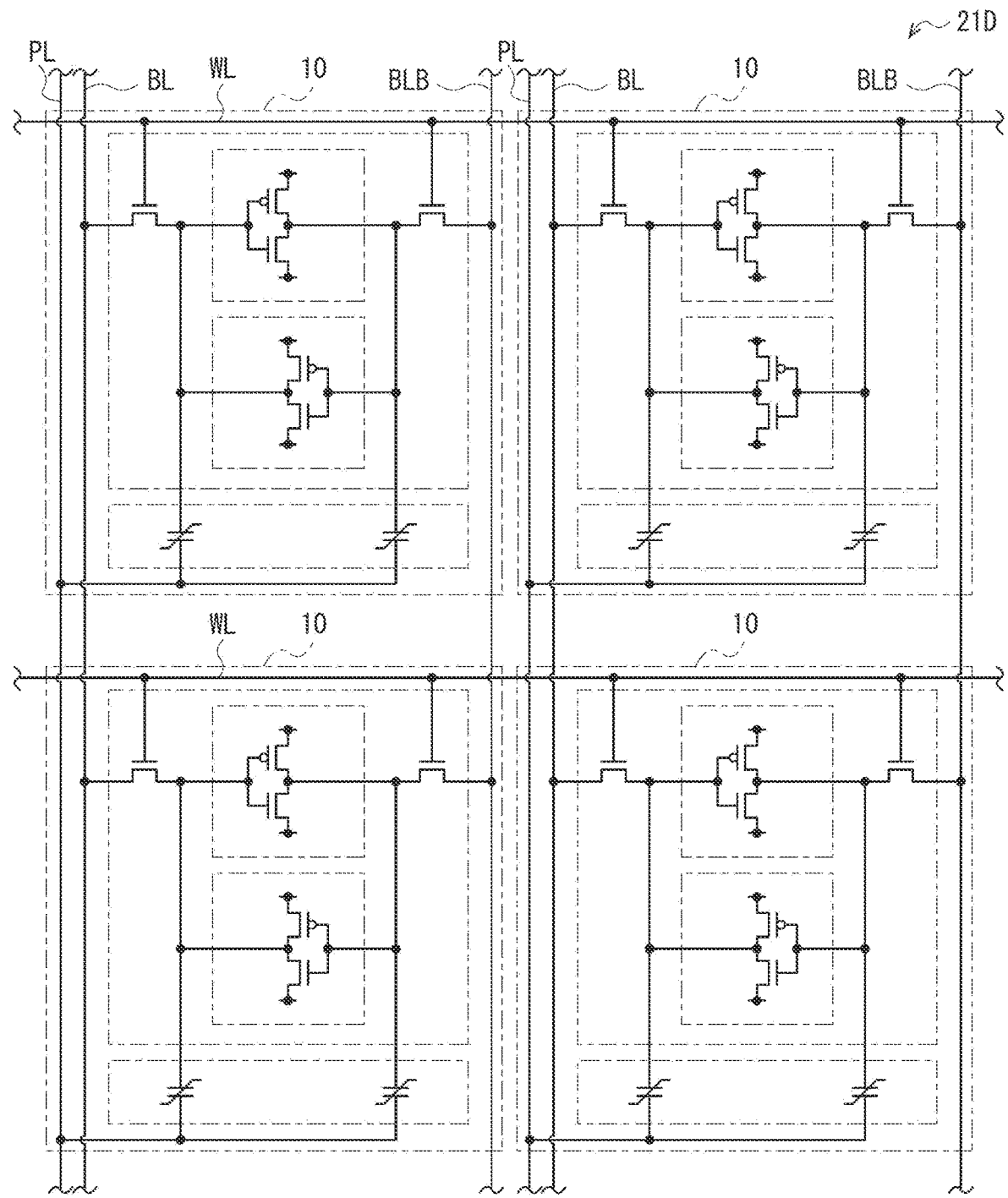

[ FIG. 22 ]
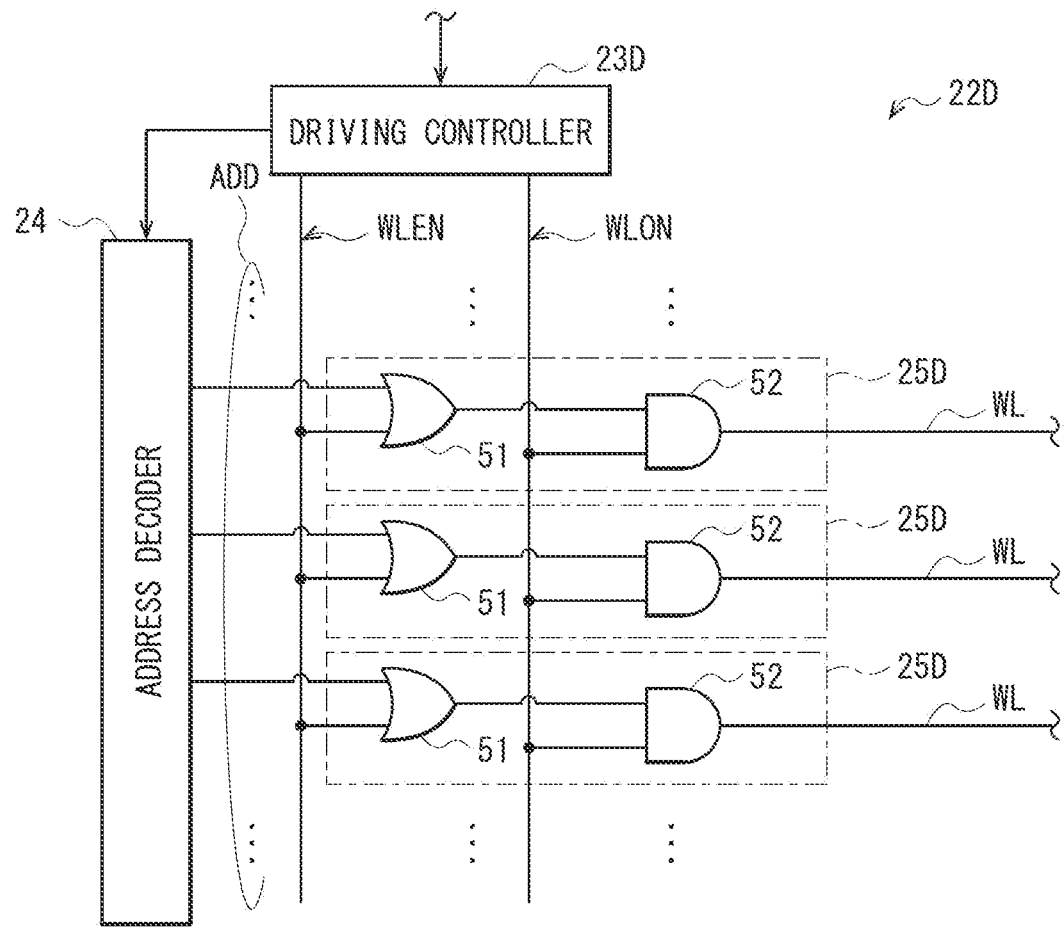
[ FIG. 23 ]
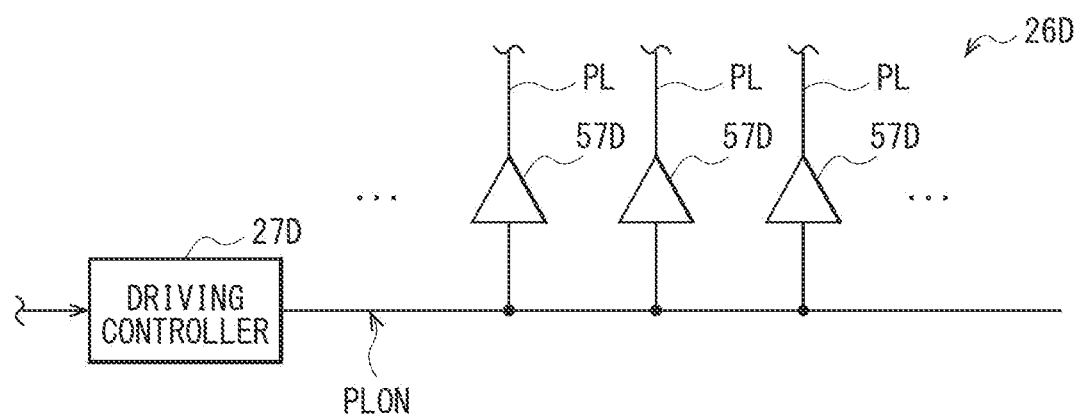

[ FIG. 24 ]
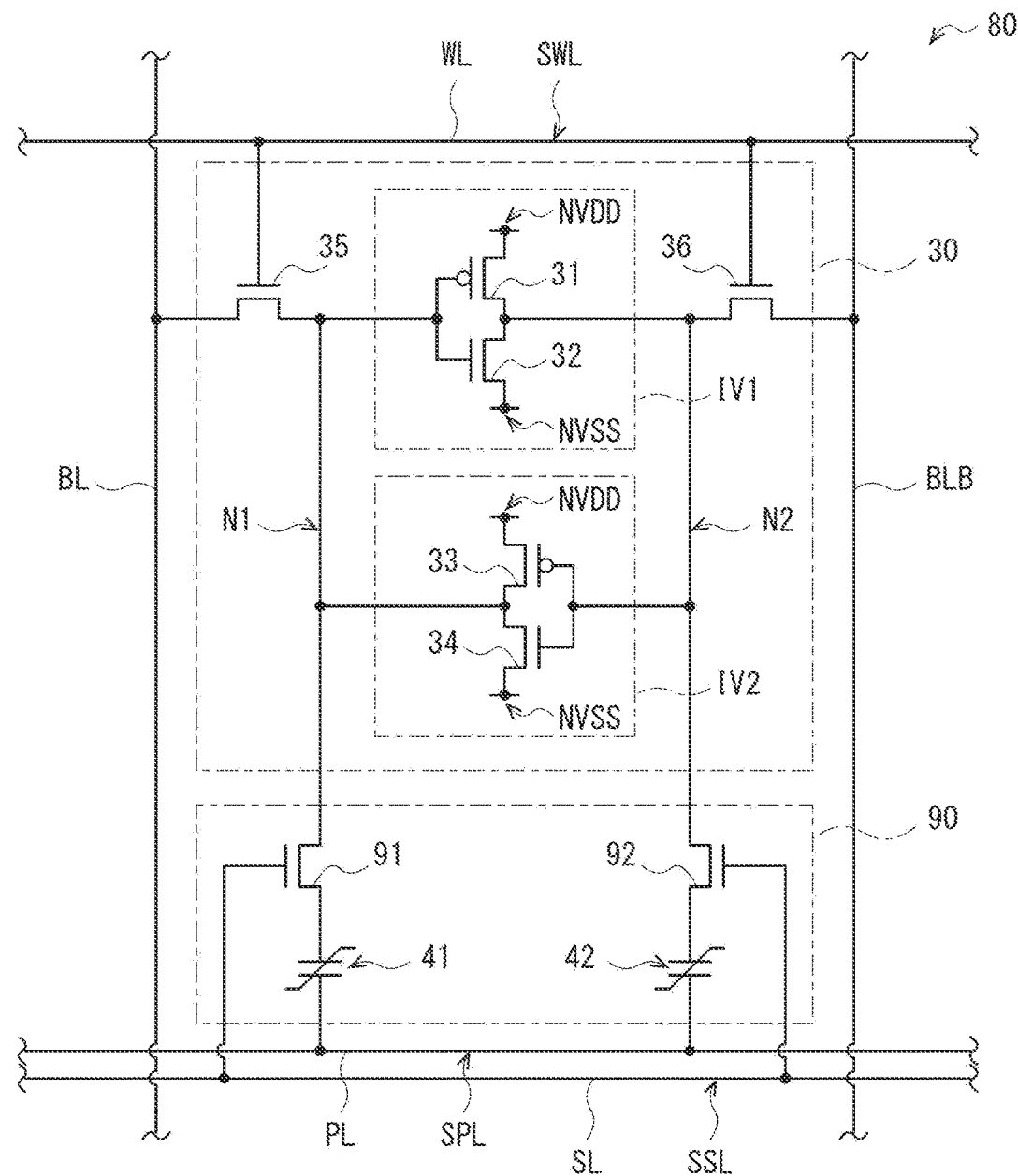

[FIG. 25]
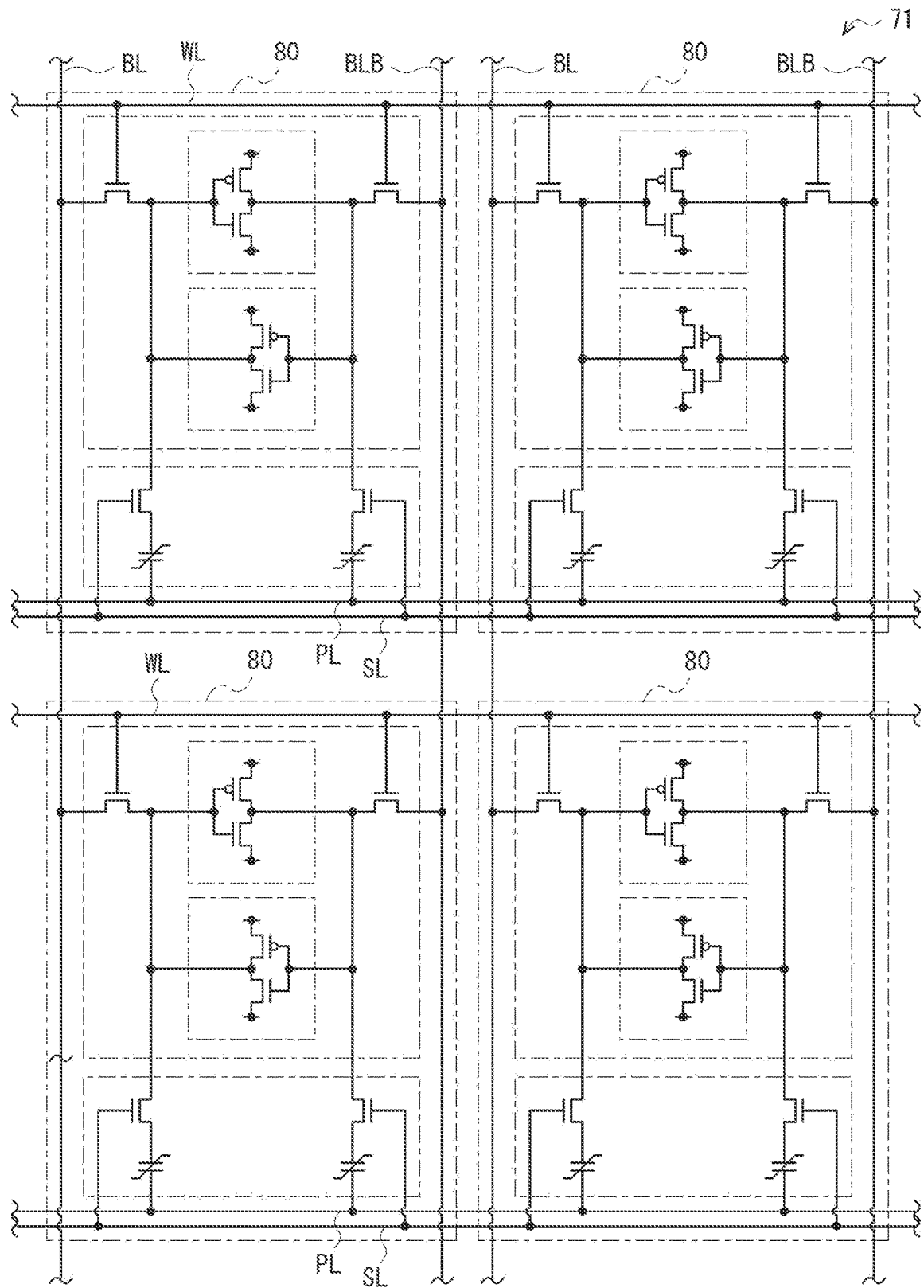

[FIG. 26]
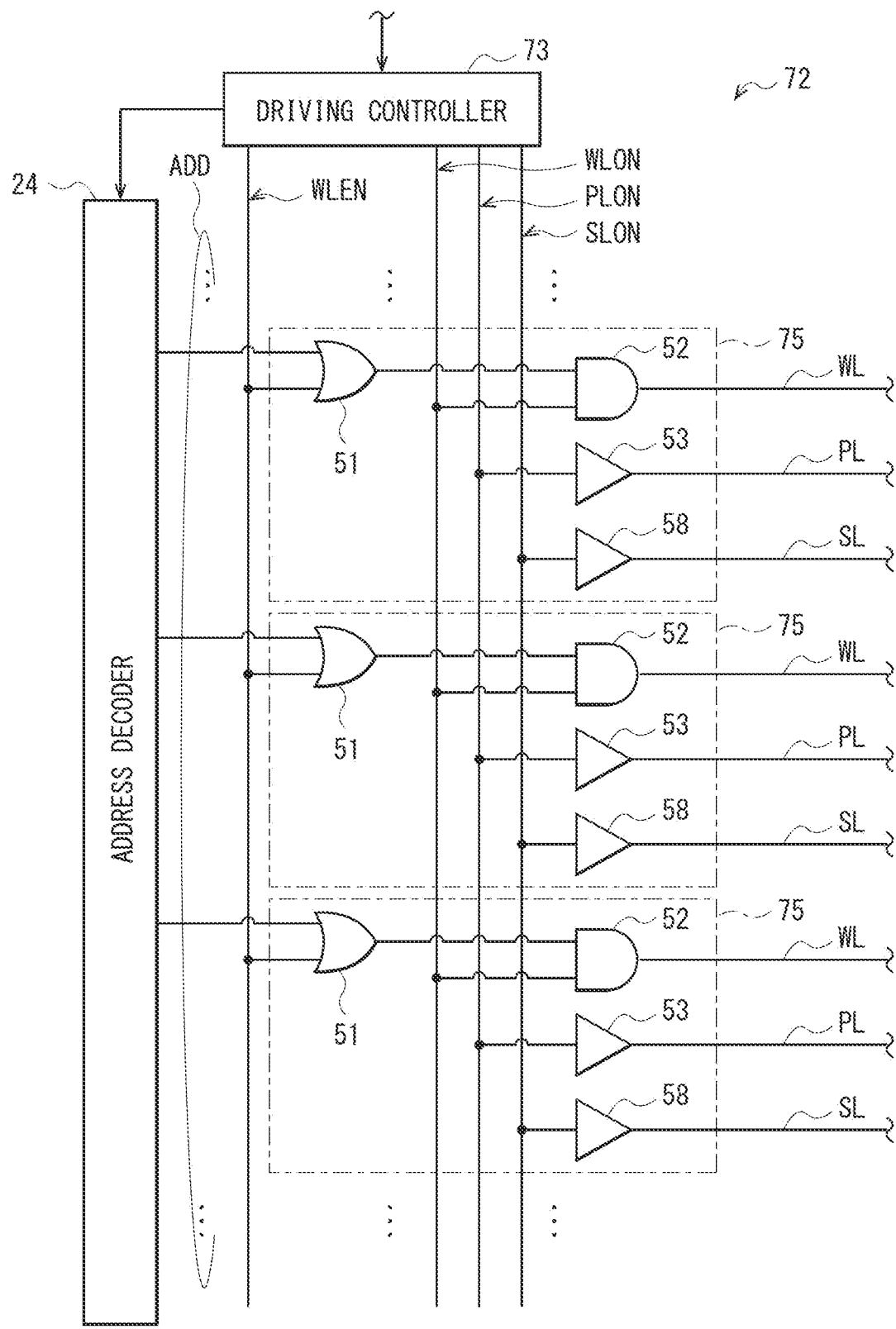

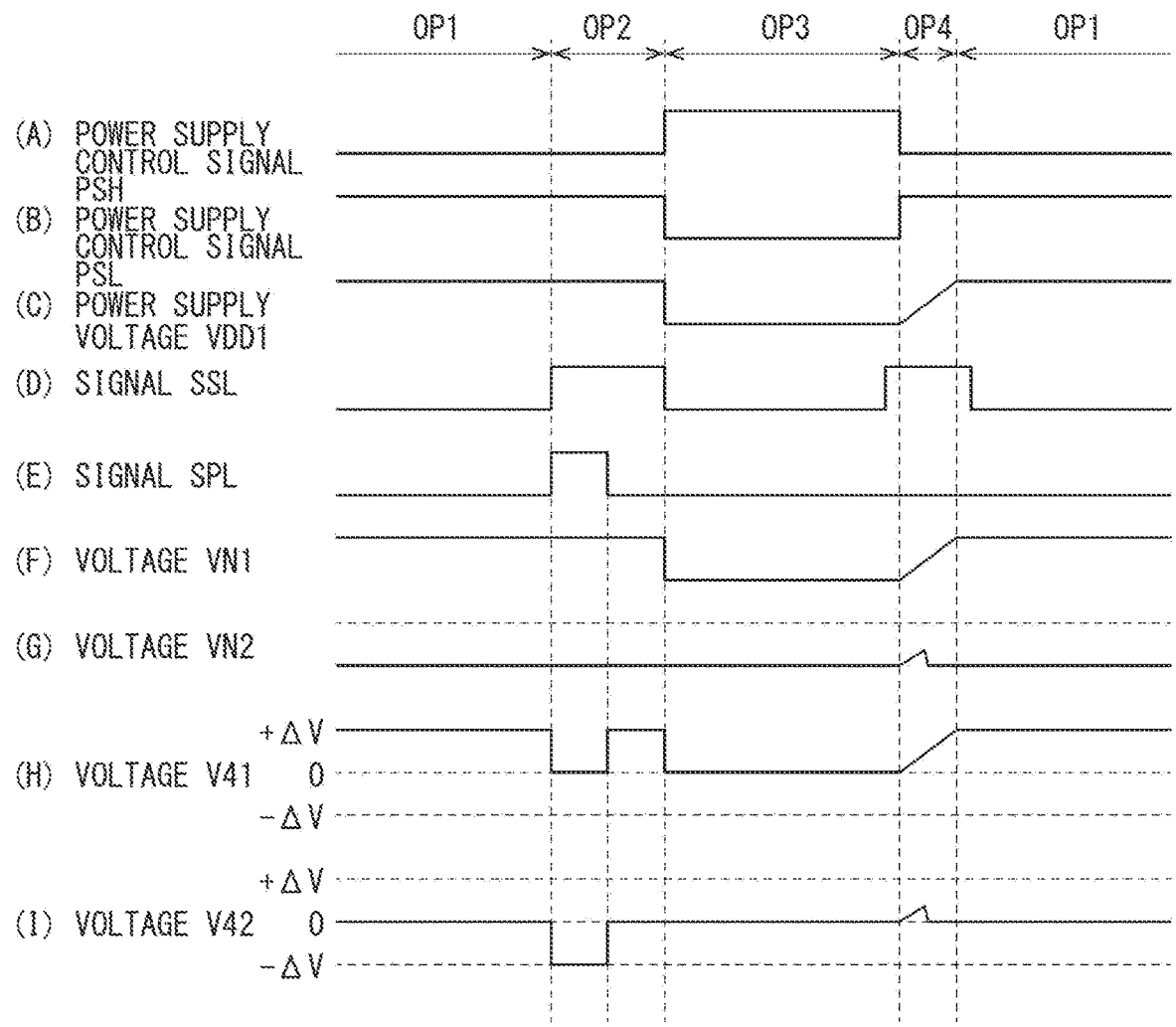
[FIG. 27]

[FIG. 28]
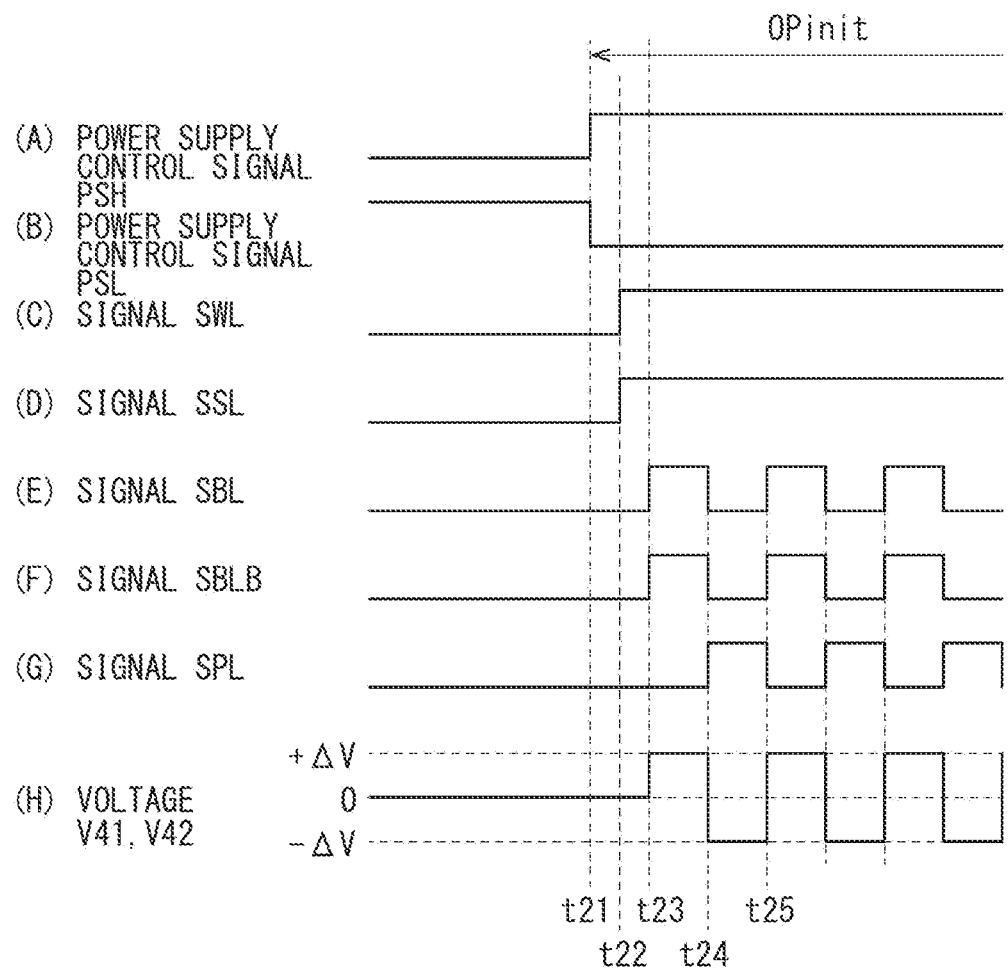

[FIG. 29]
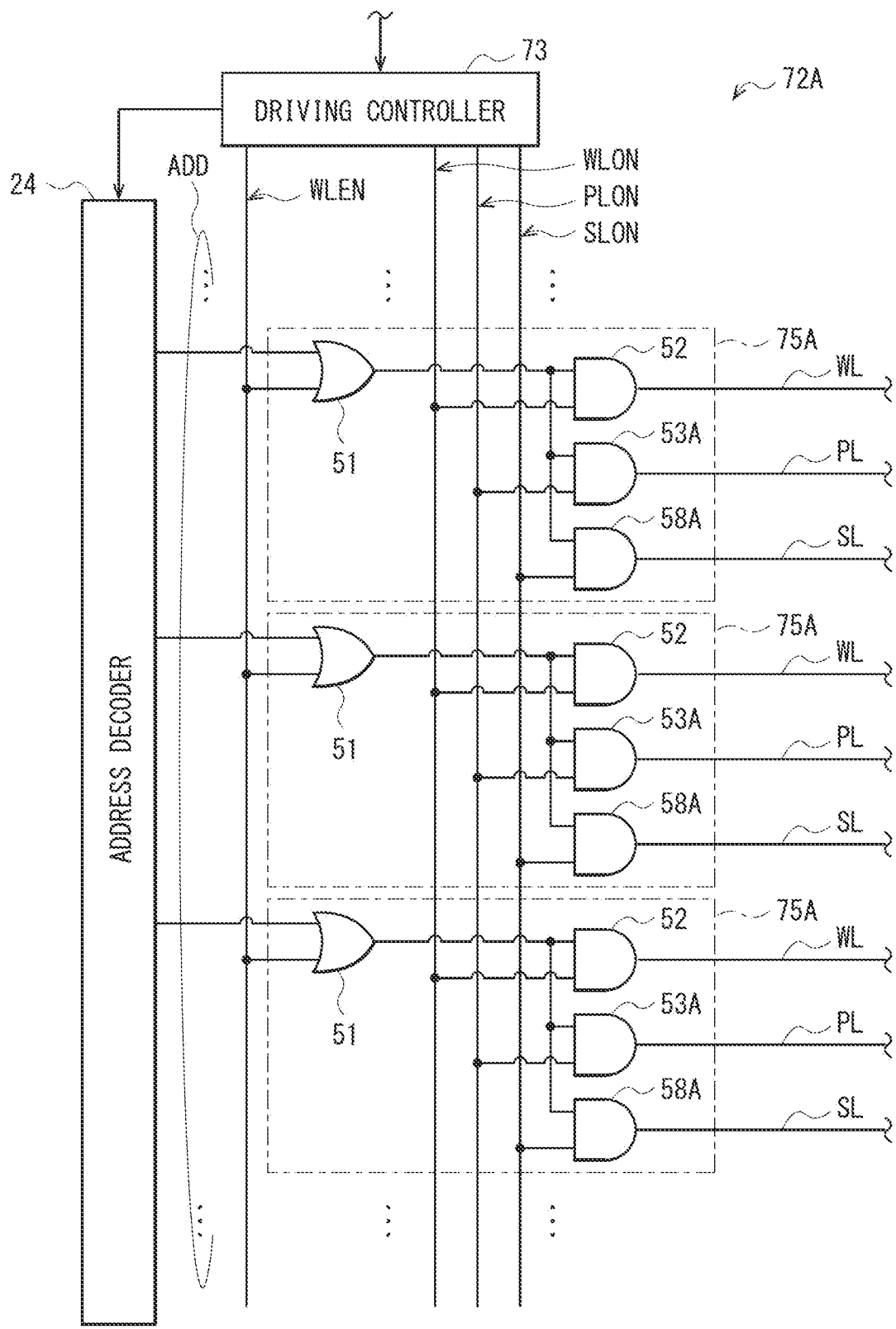

[ FIG. 30 ]
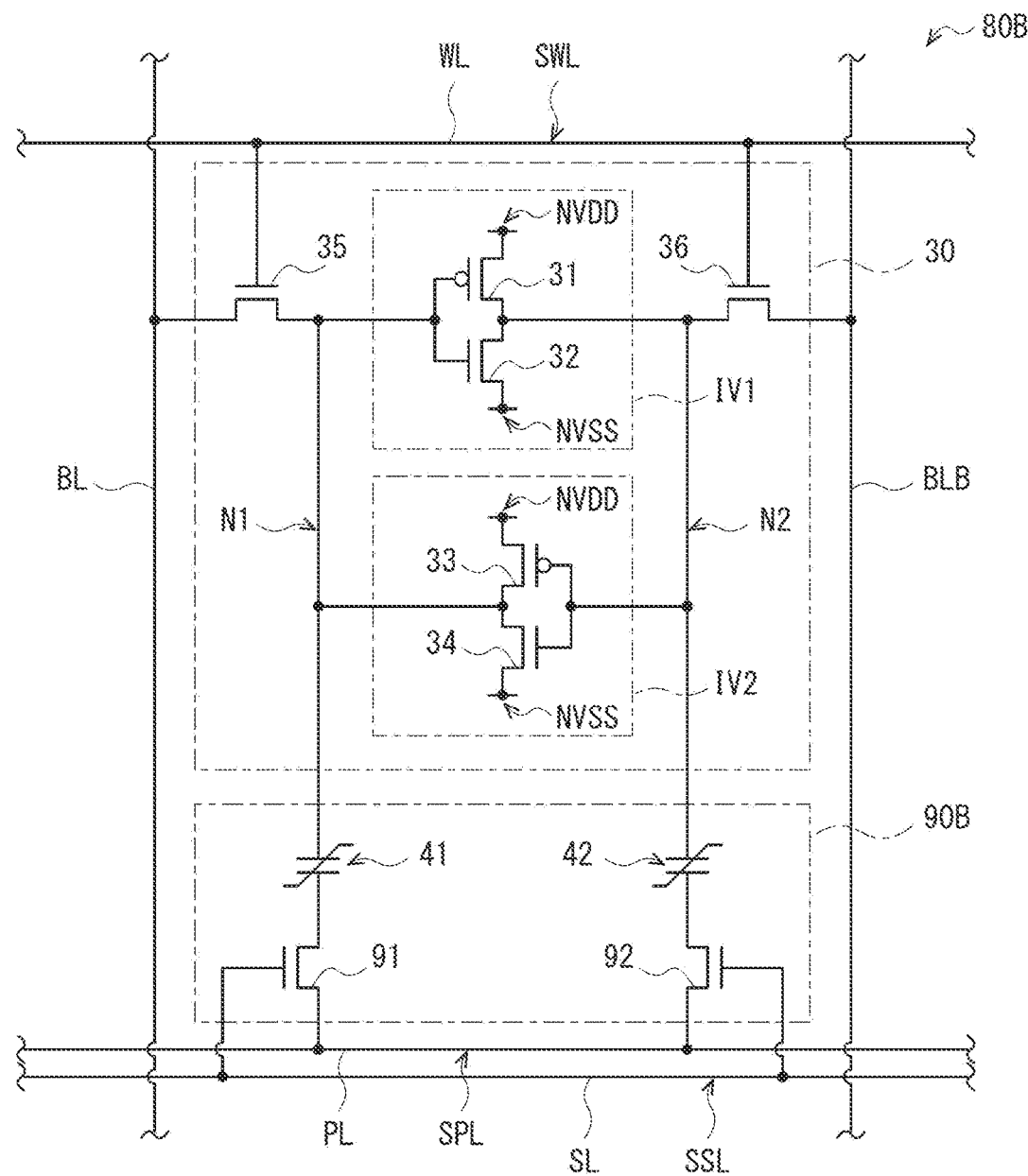

[FIG.31]
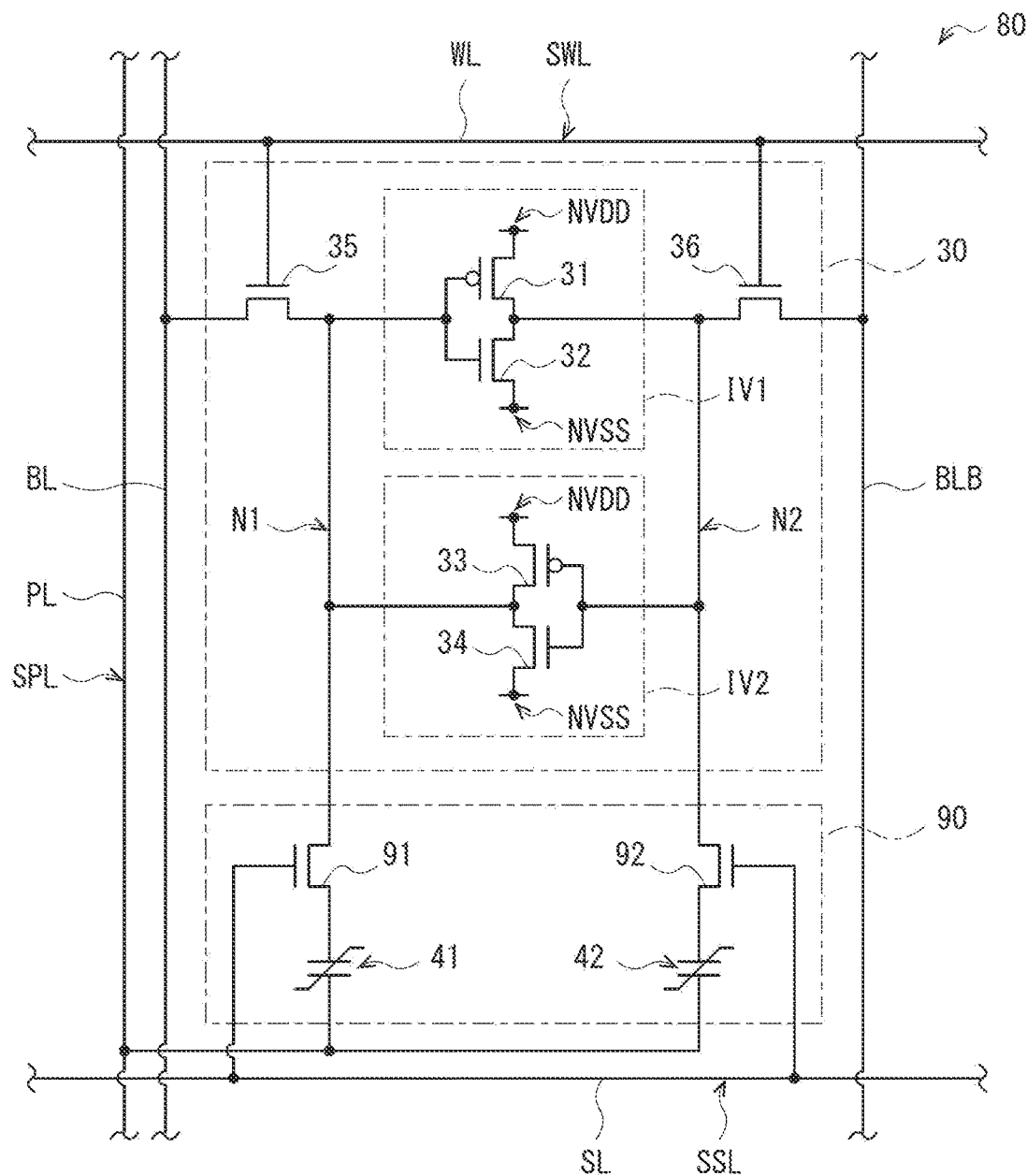

[FIG. 32]
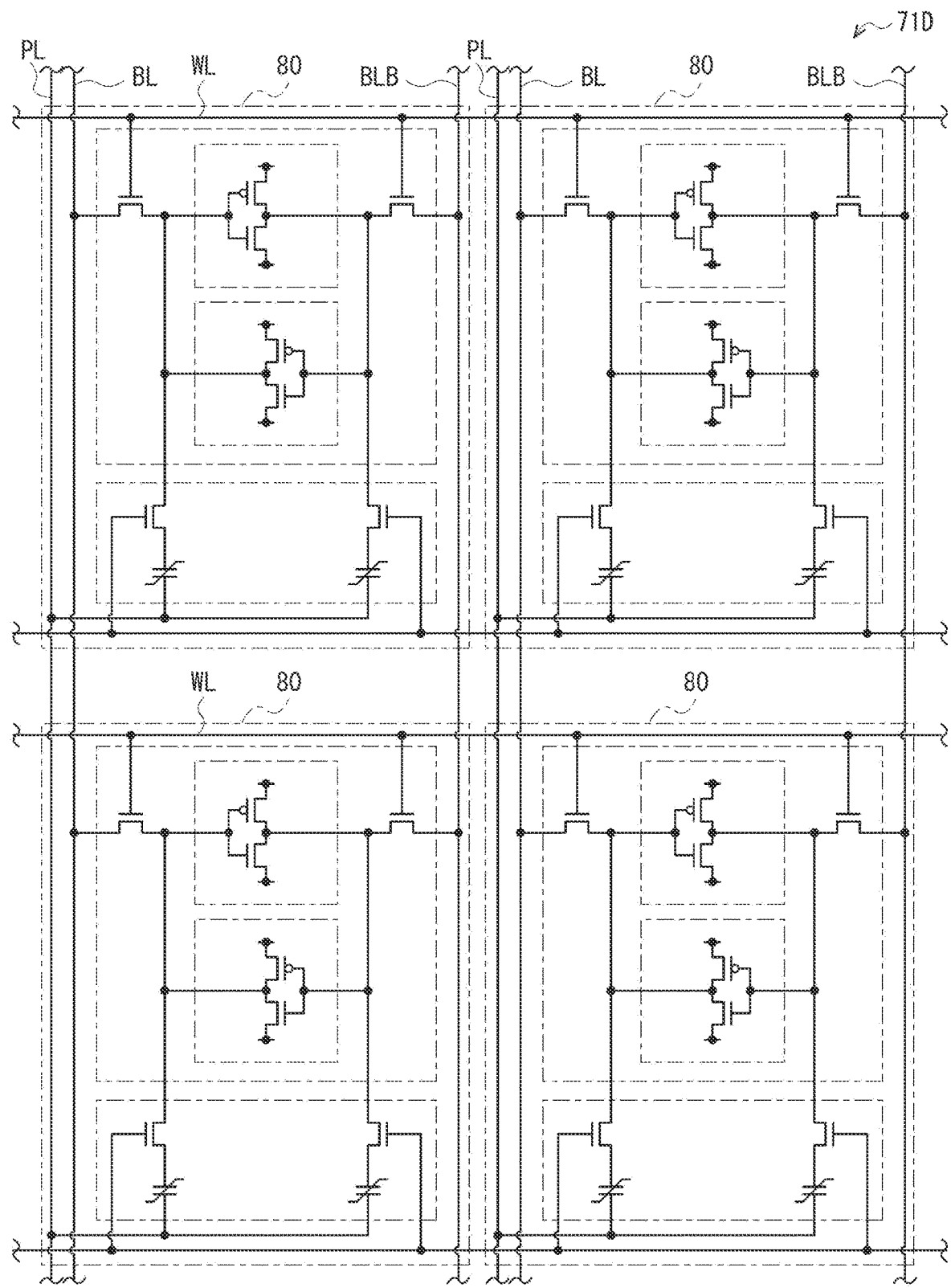

[FIG.33]
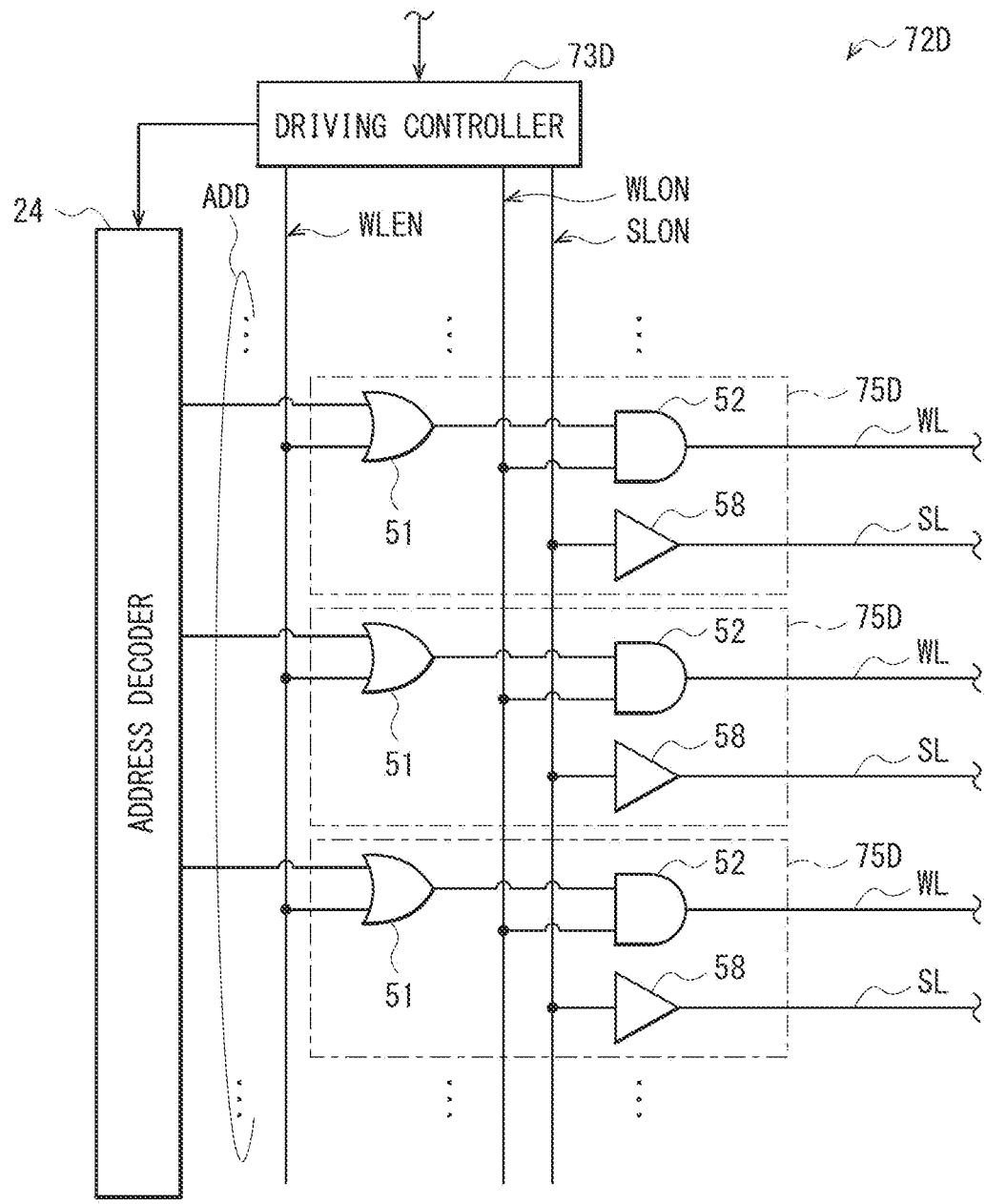

[FIG. 34]
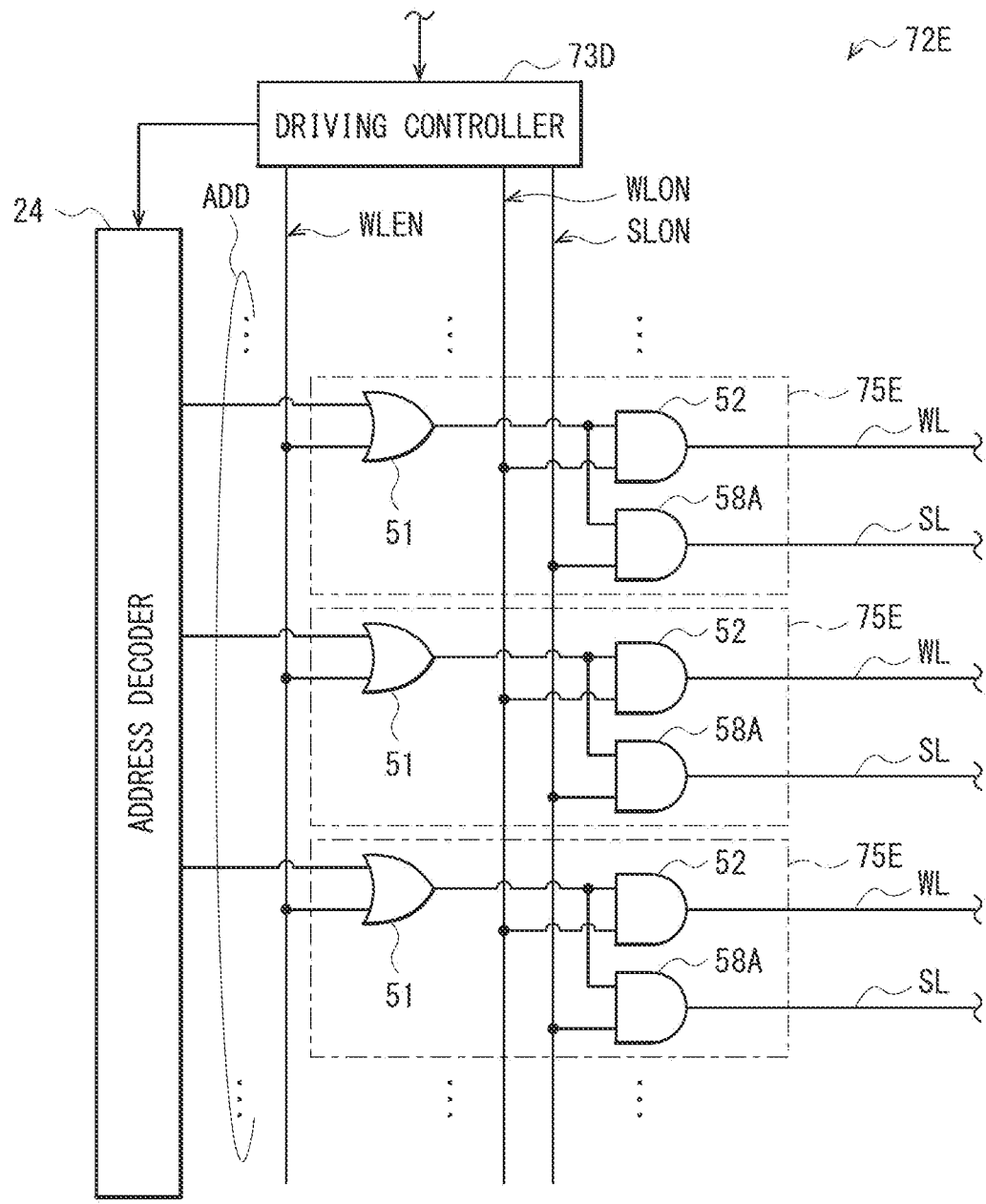

[FIG. 35]
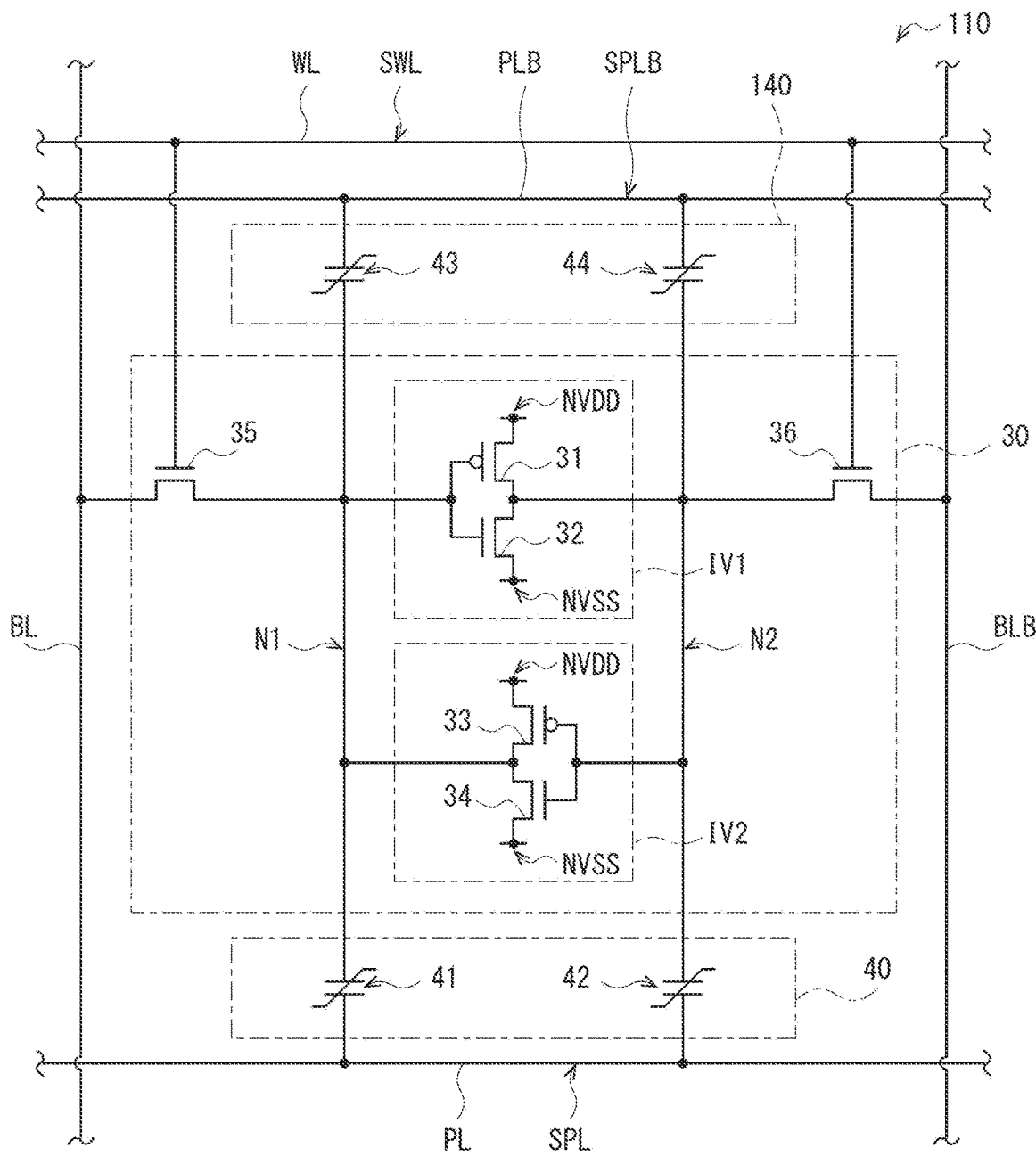

[FIG. 36]
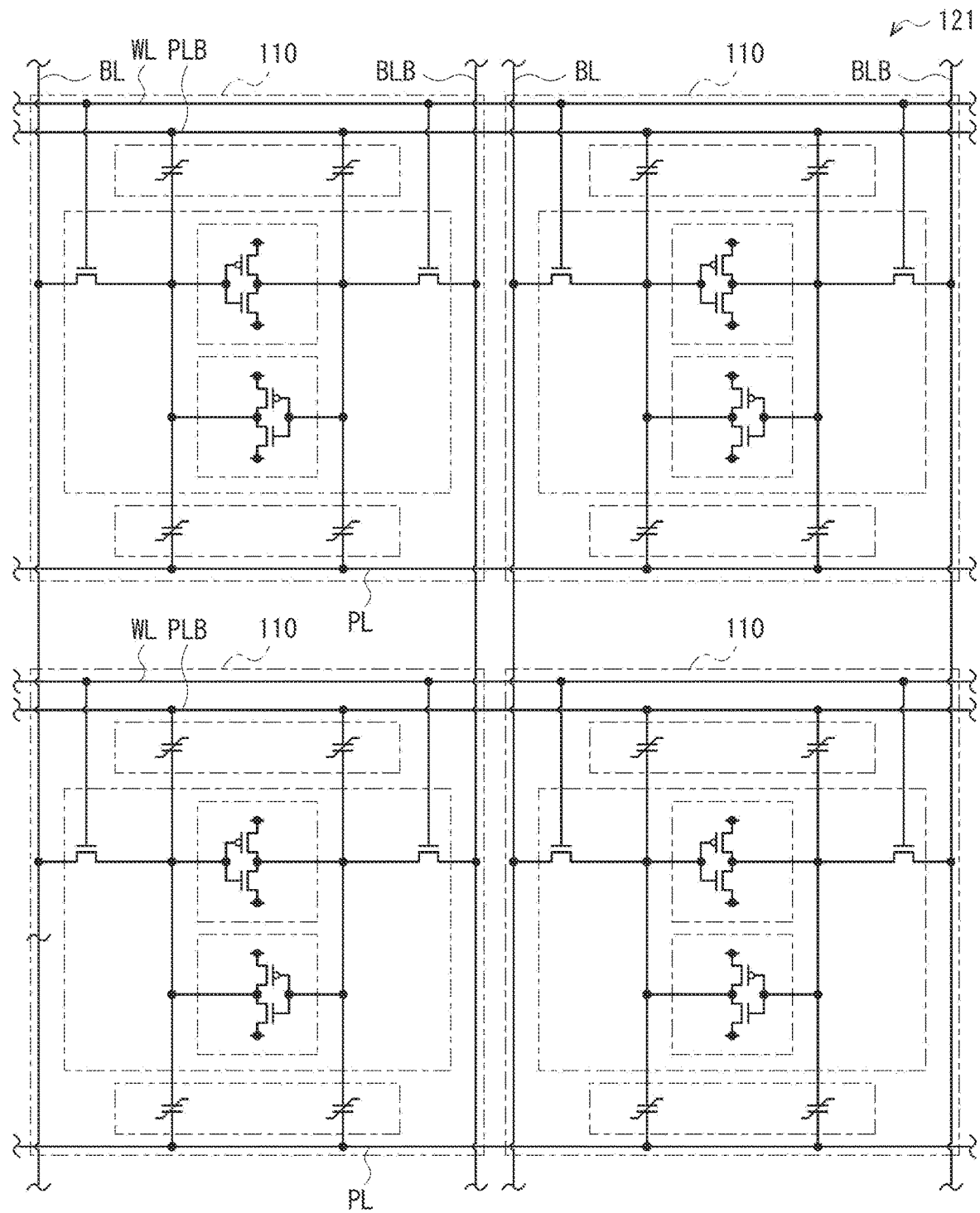

[ FIG. 37 ]
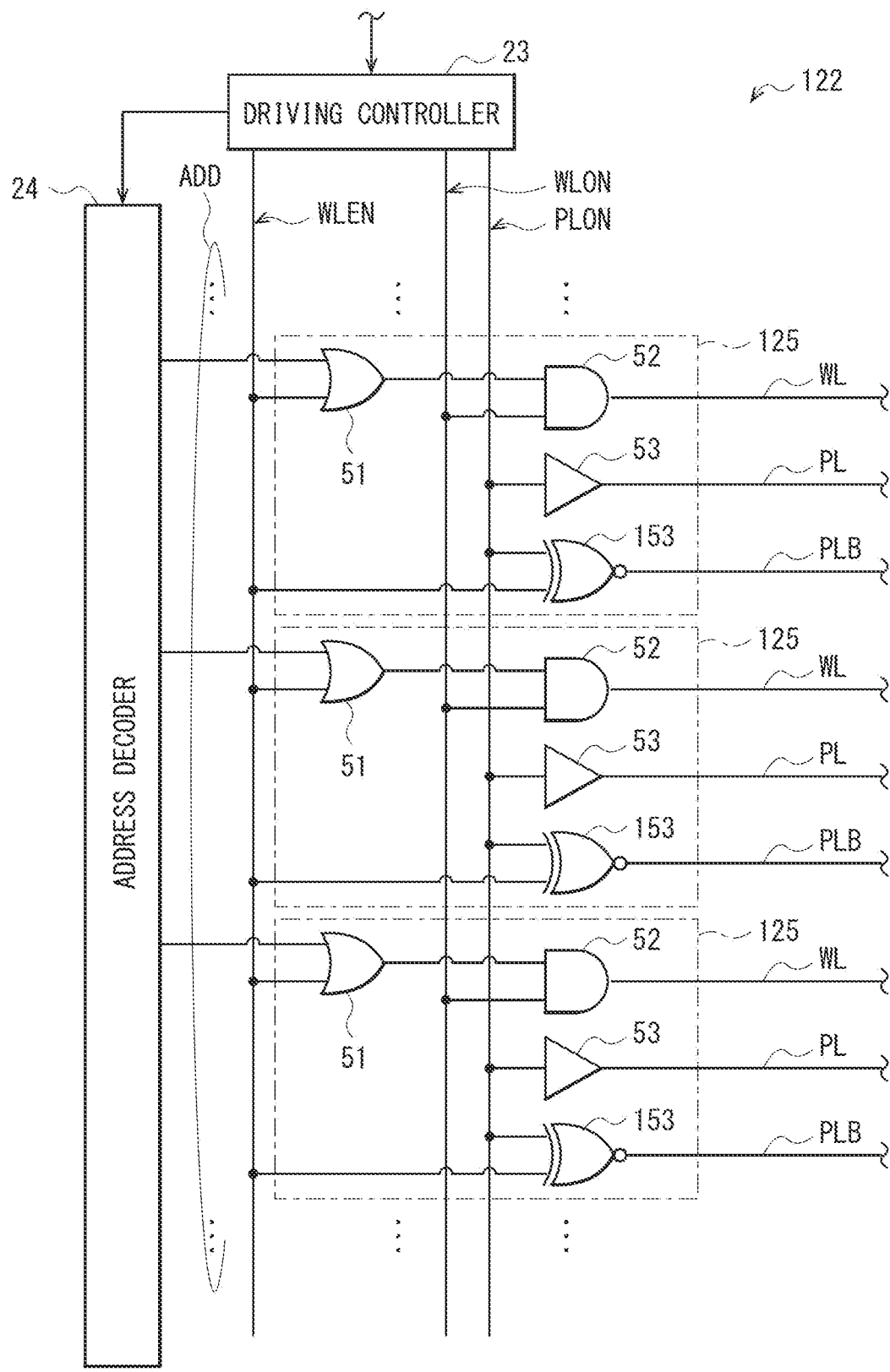

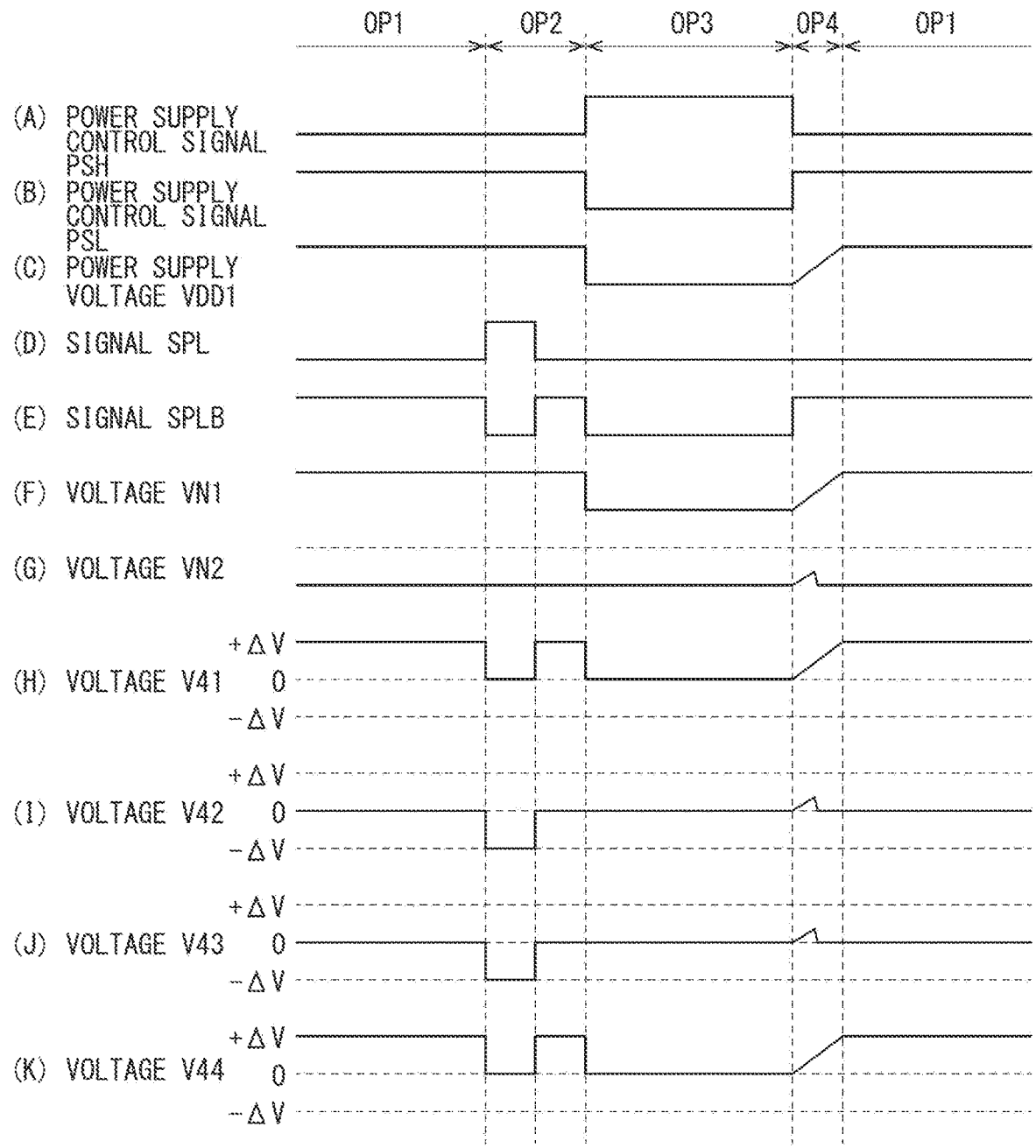
[FIG. 38]

[FIG. 39A]
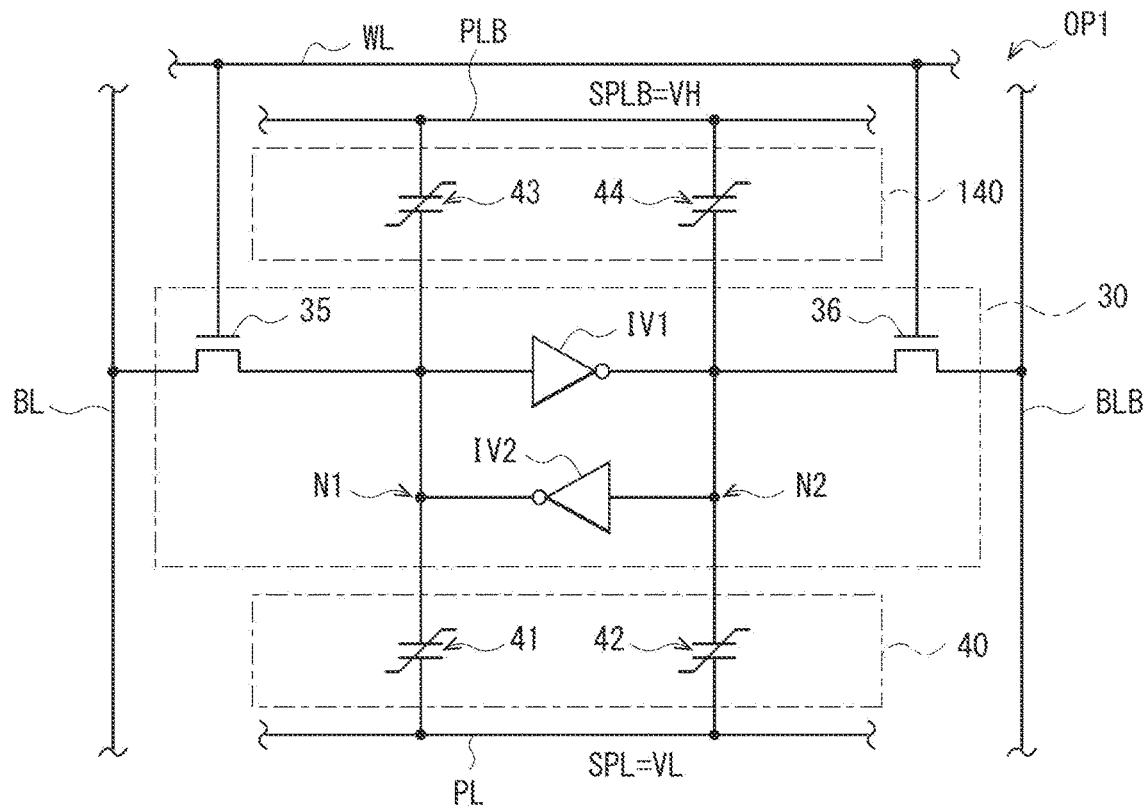
[FIG. 39B]
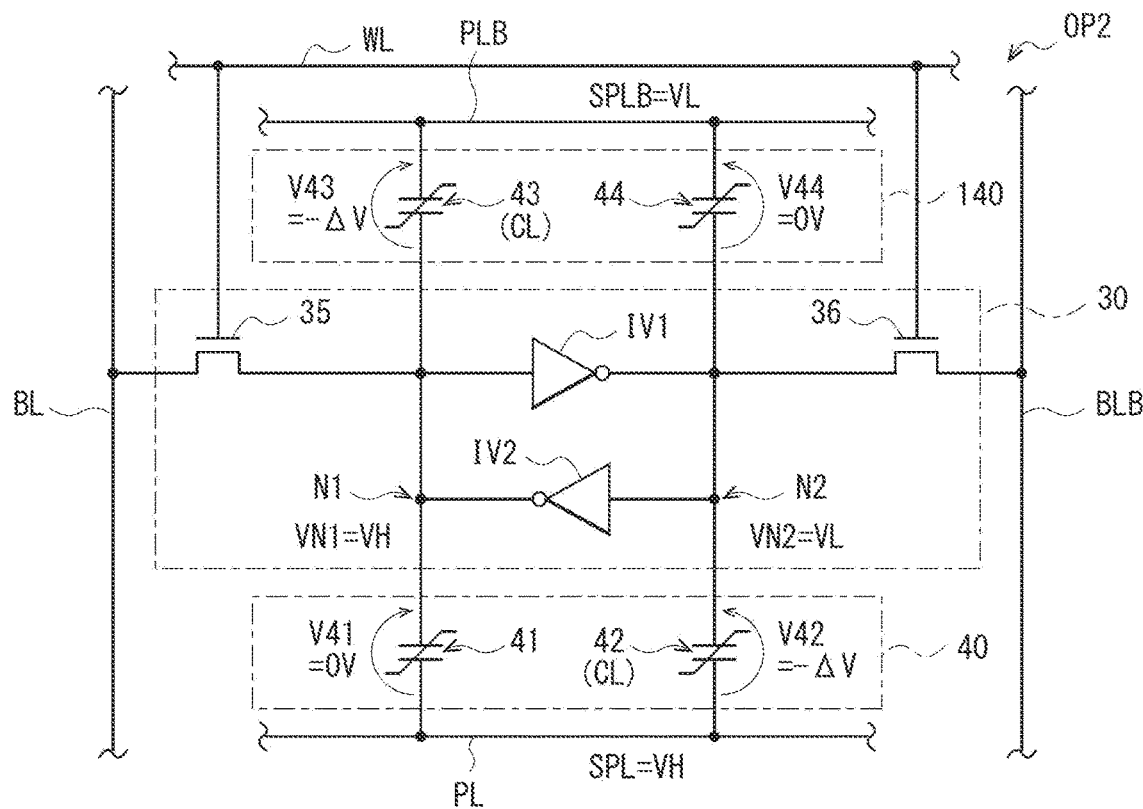

[FIG. 39C]
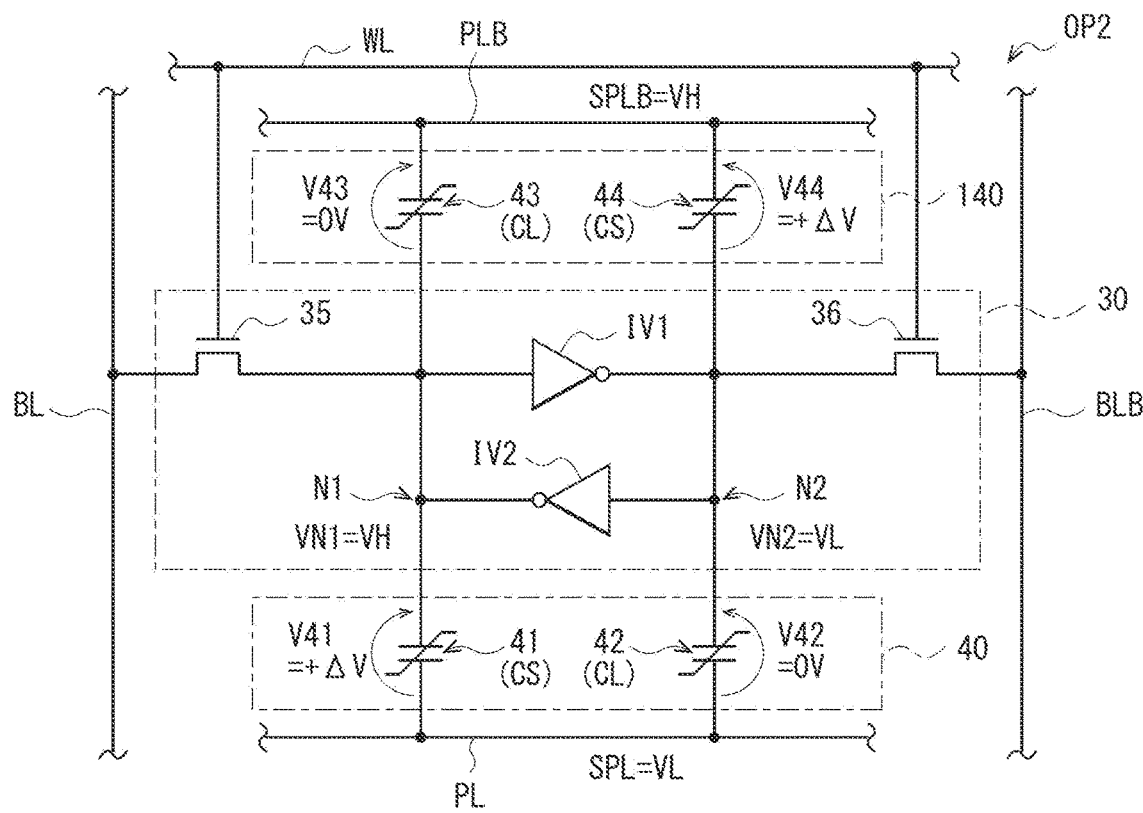
[FIG. 39D]
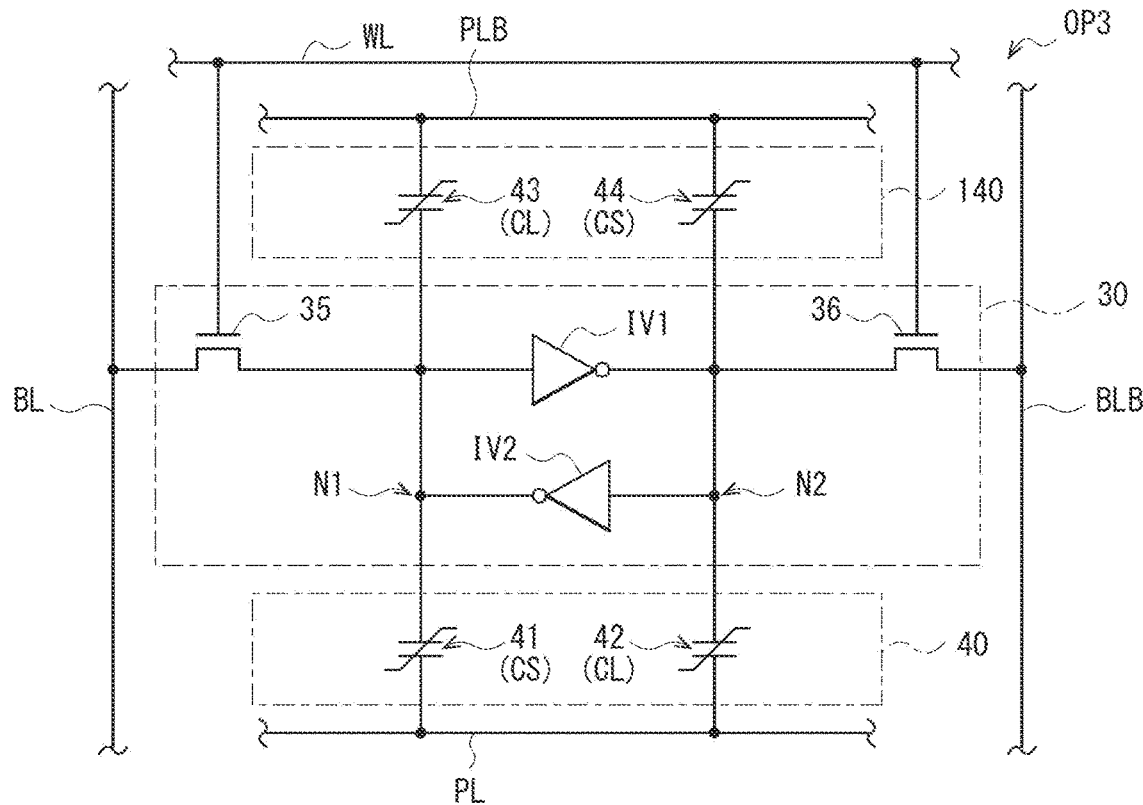

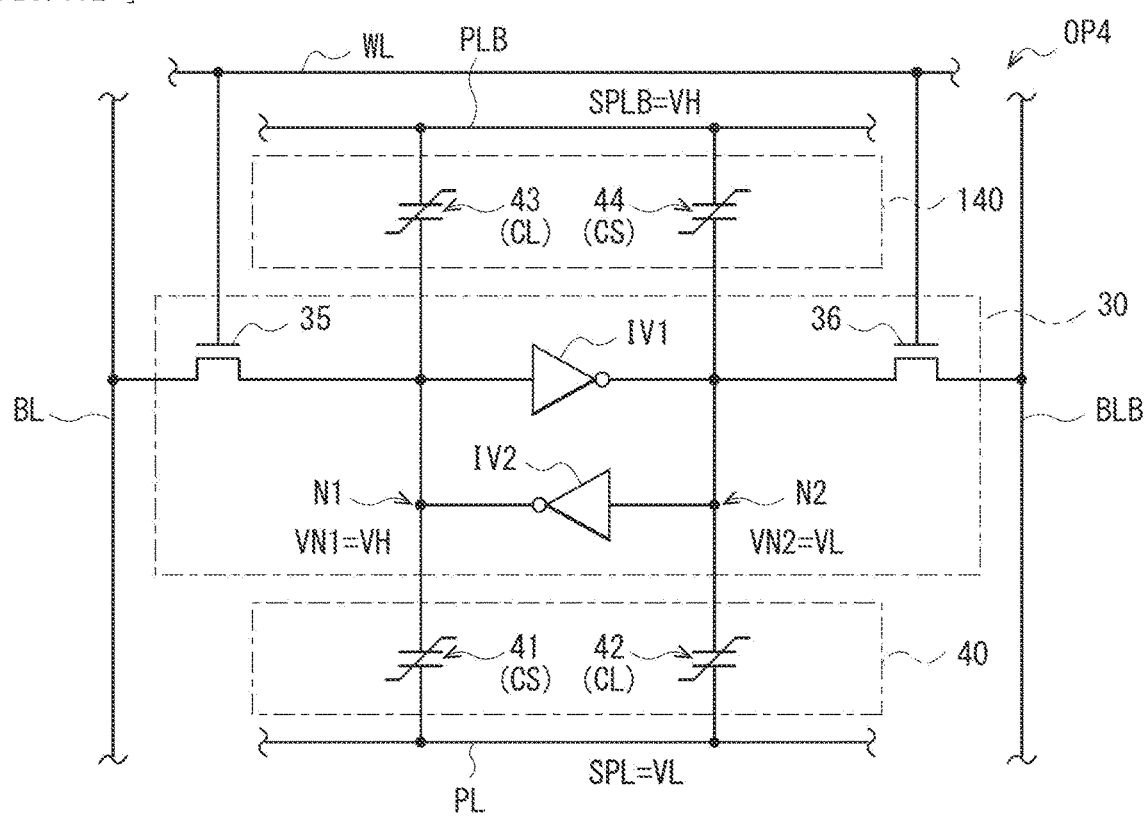
[FIG. 39E]

[ FIG. 40 ]
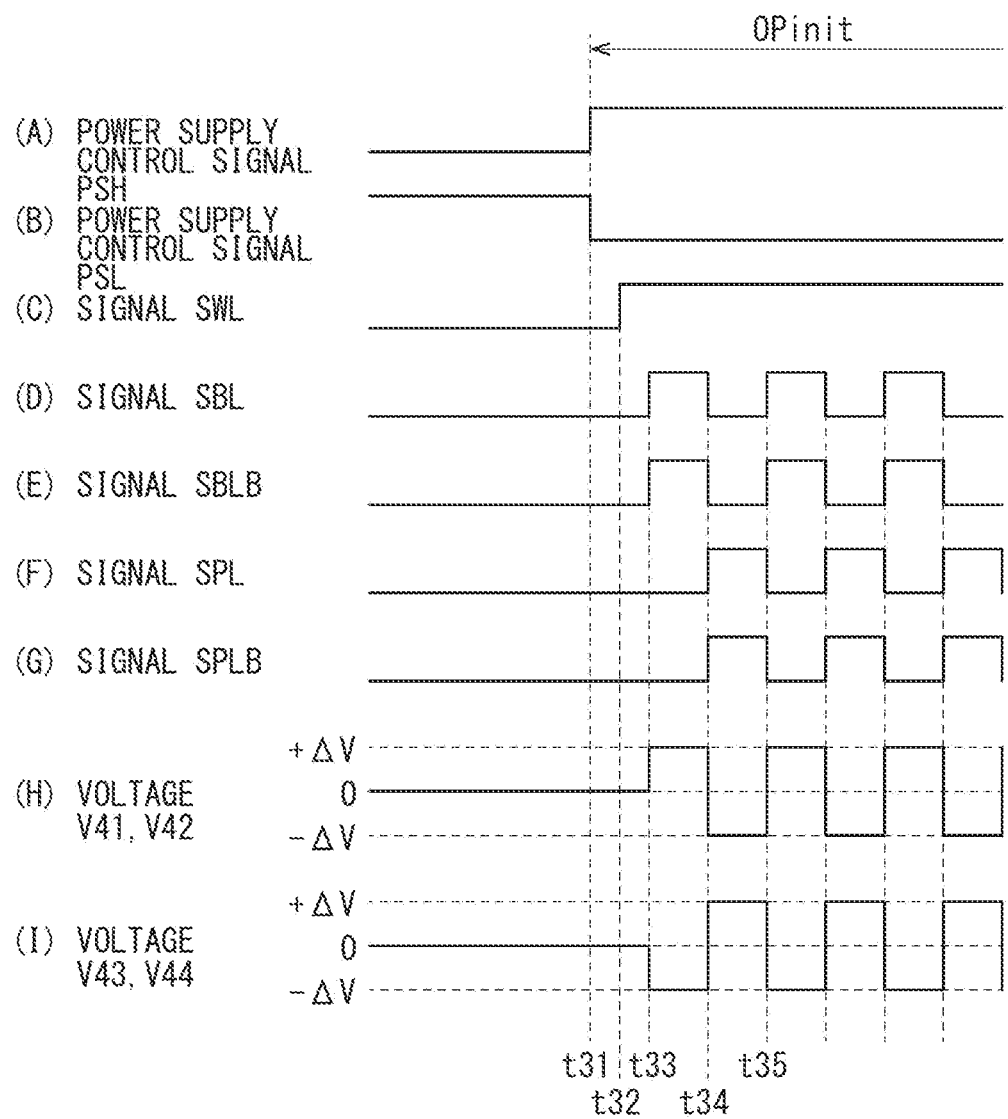

[FIG. 41A]
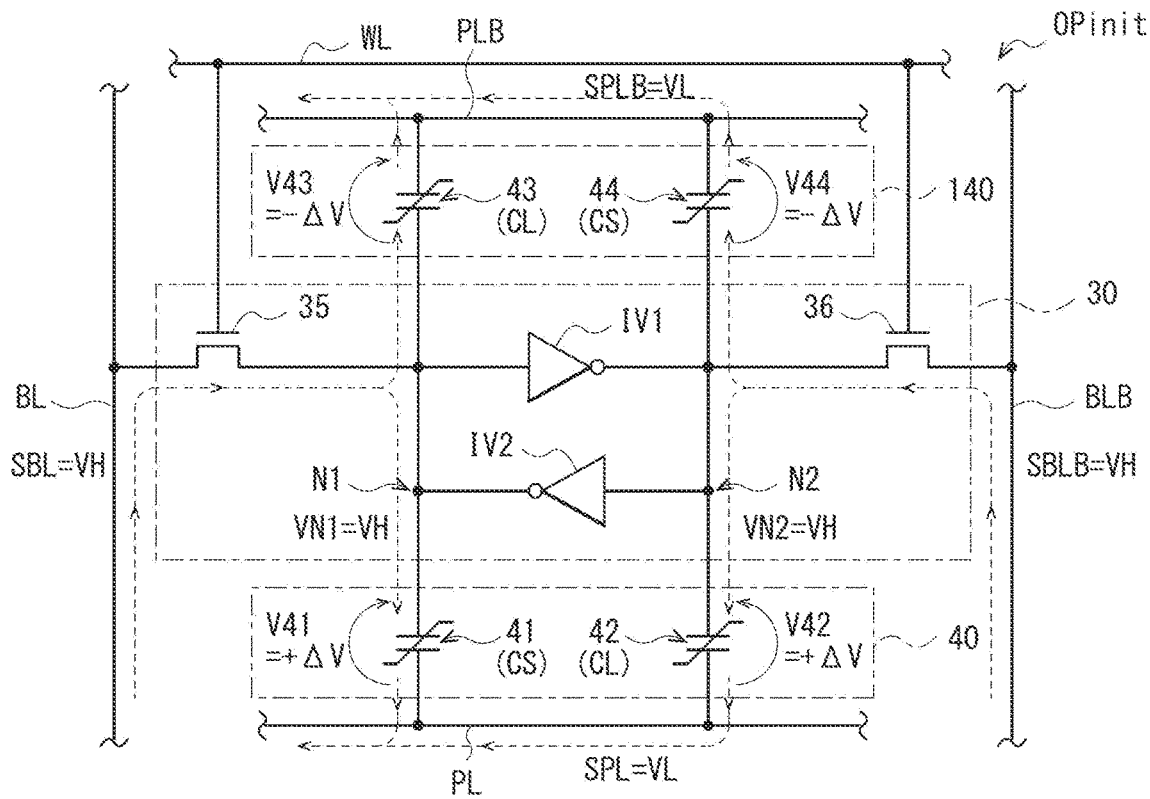
[FIG. 41B]
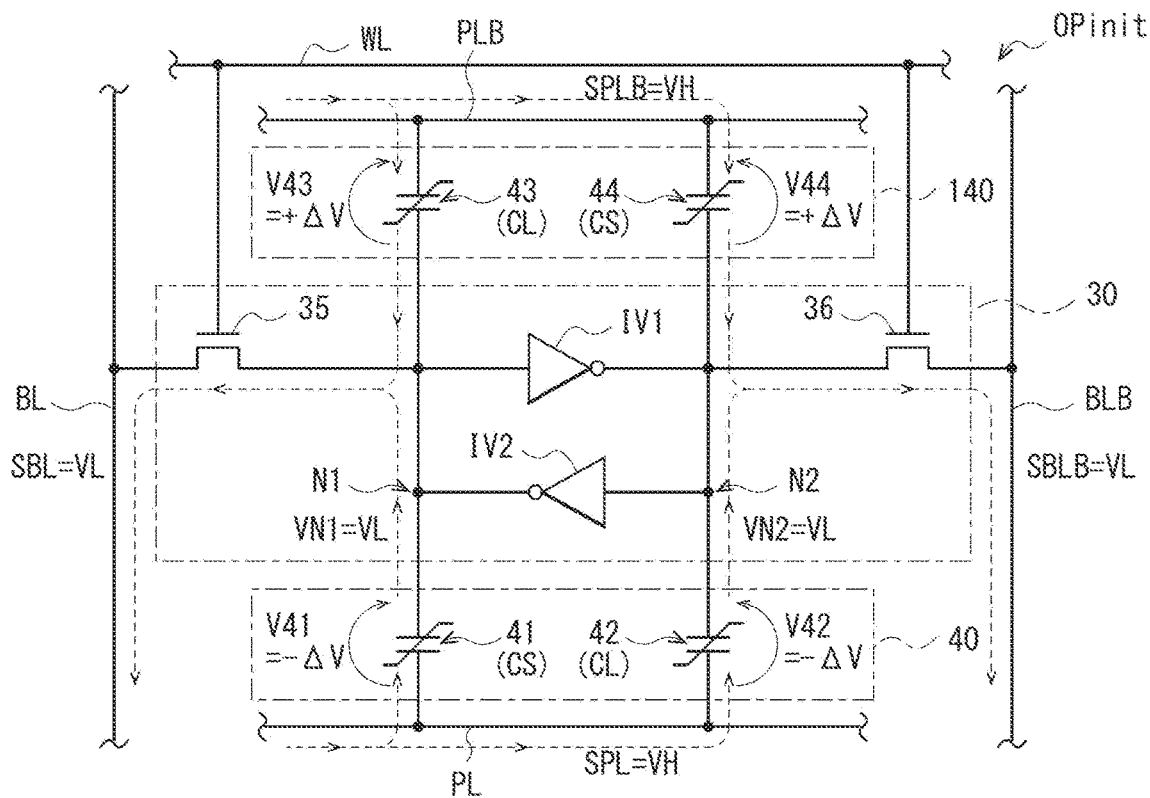

[FIG. 42]
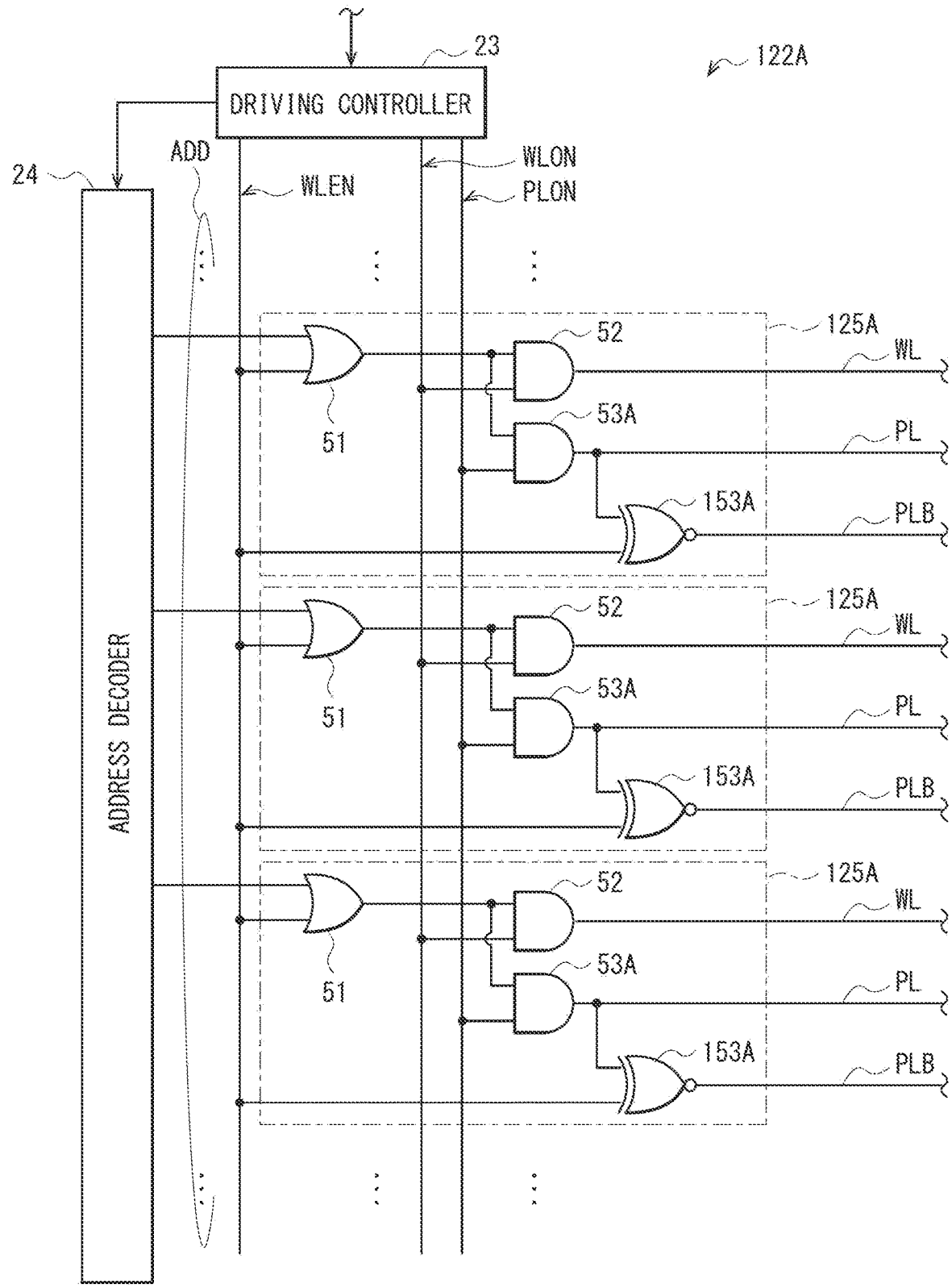

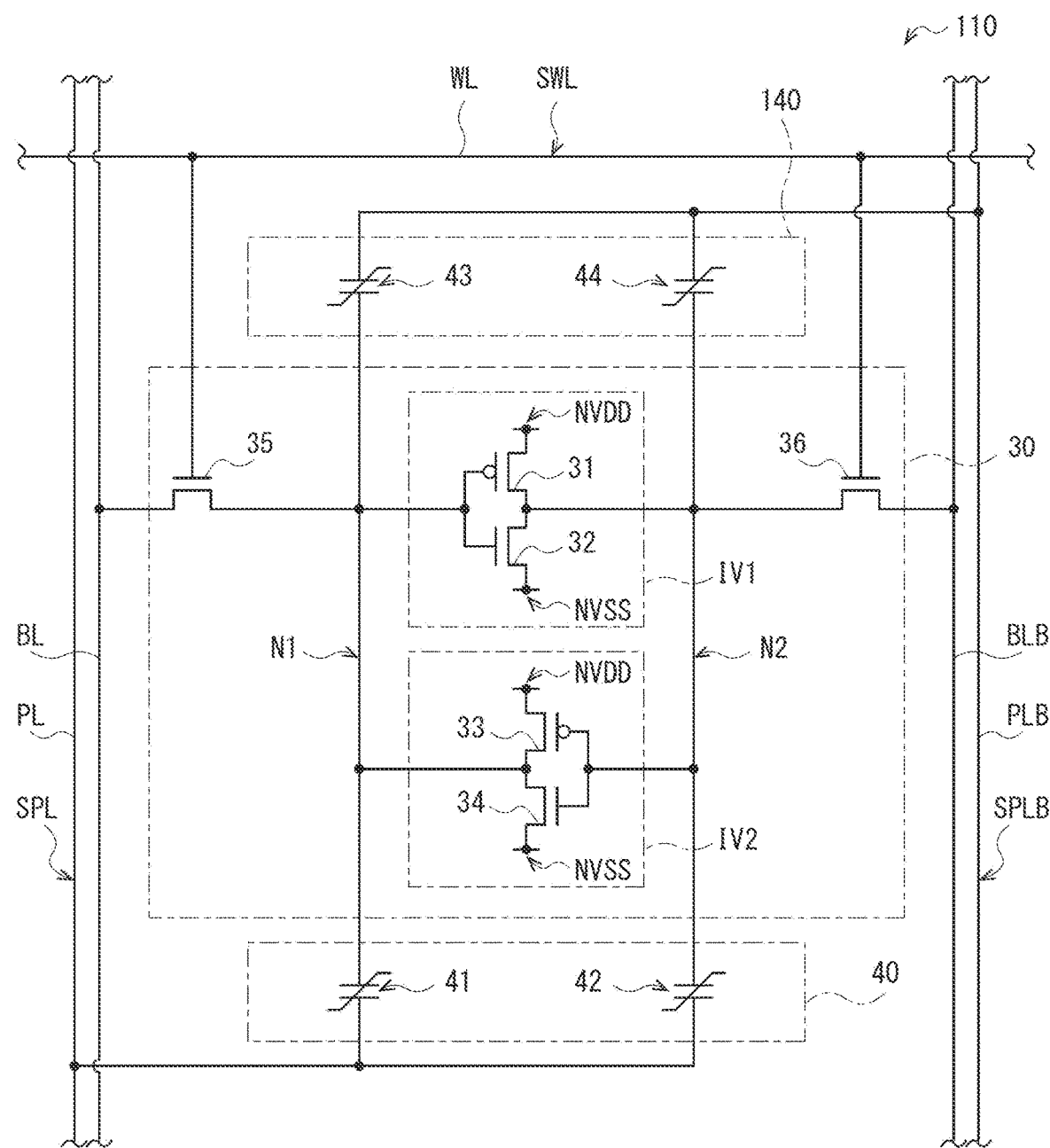
[FIG. 43]

[FIG. 44]
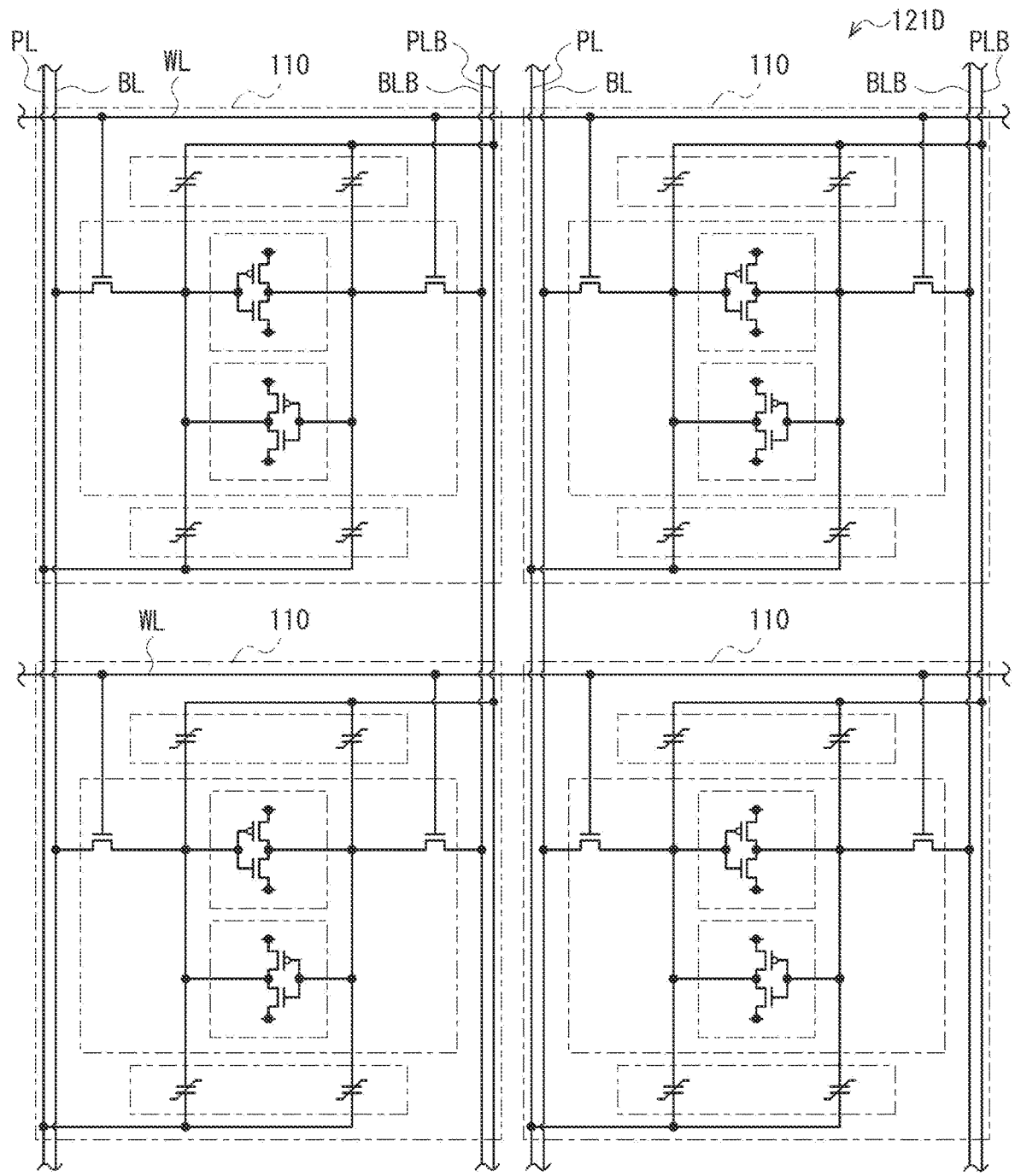

[FIG. 45]
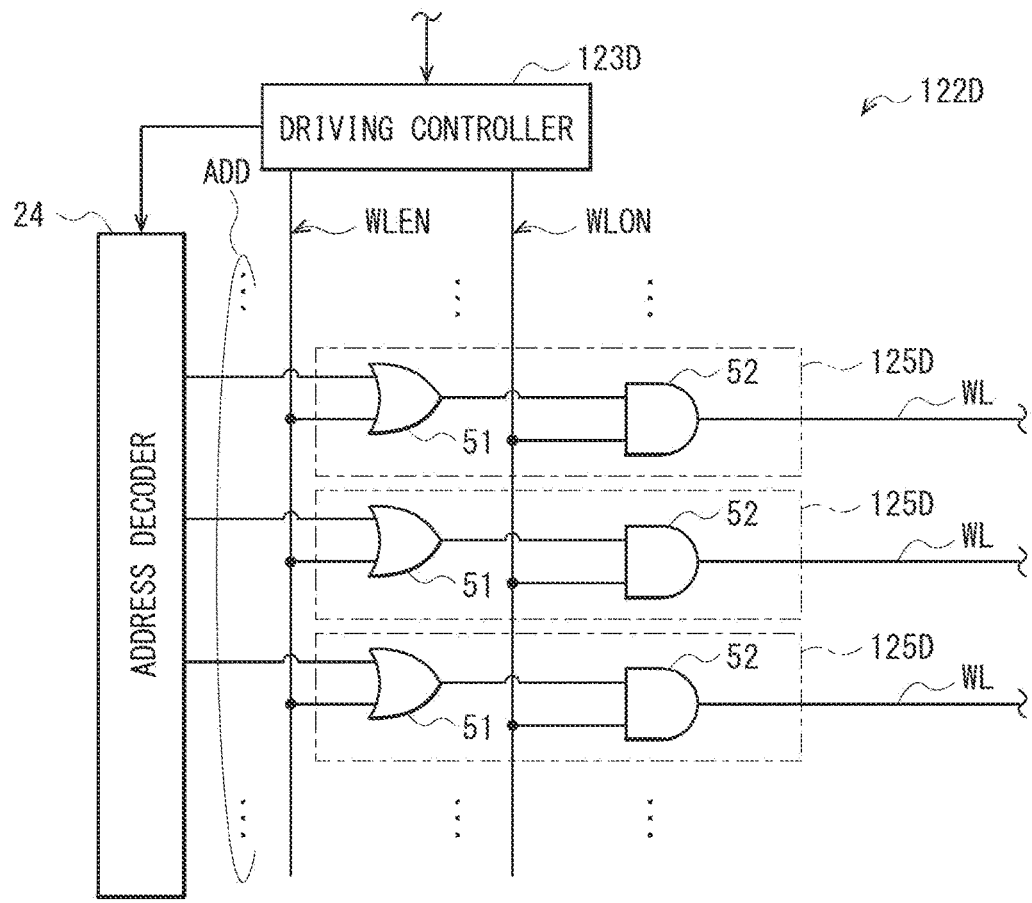
[FIG. 46]
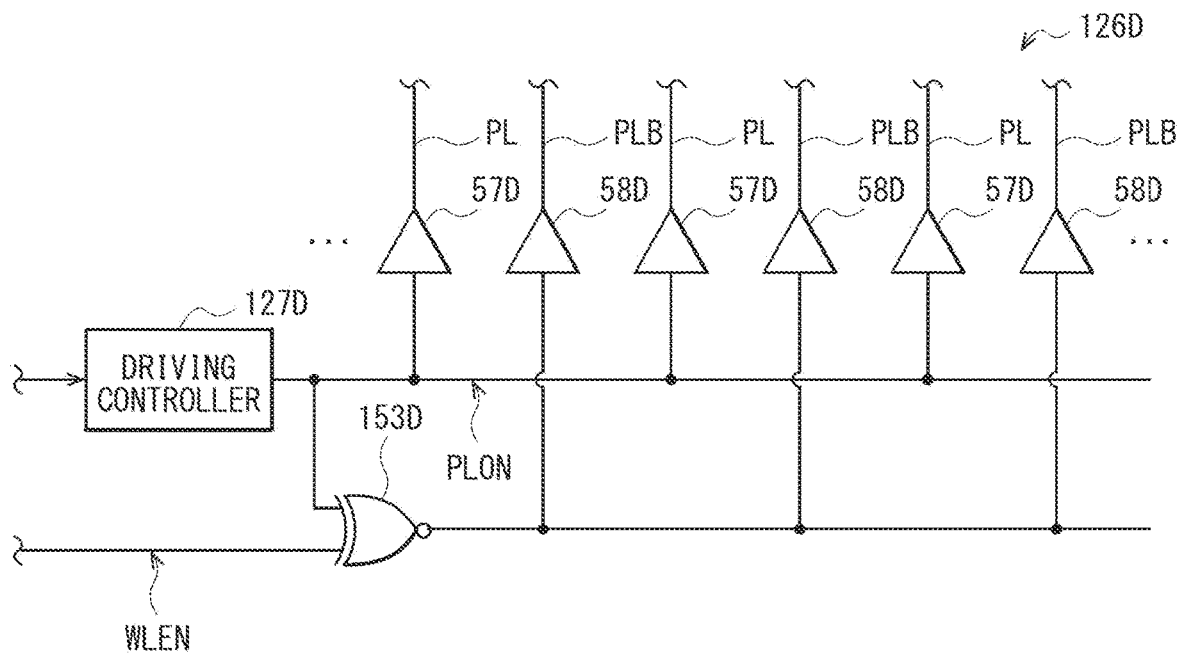

[FIG. 47]
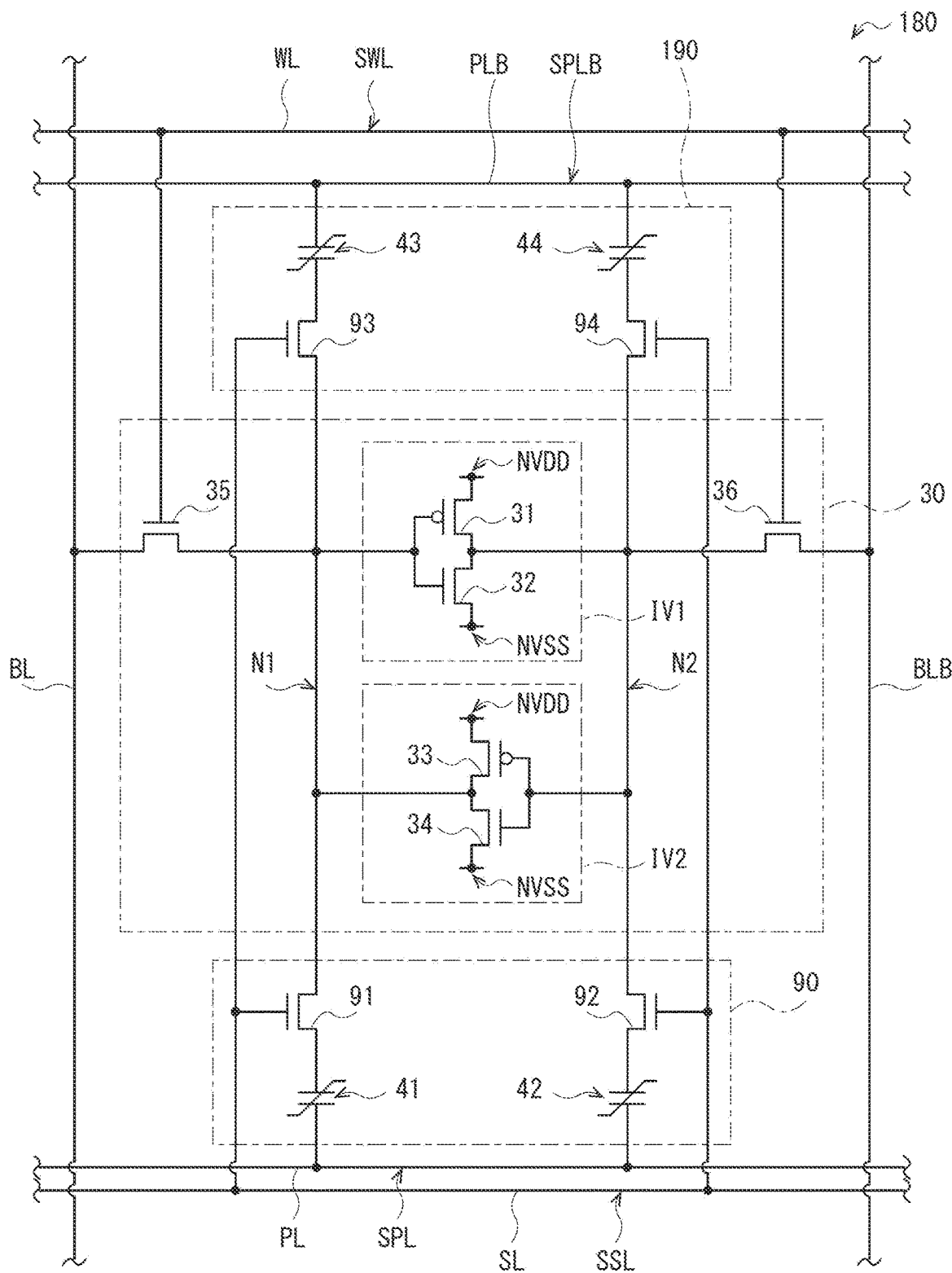

[FIG. 48]
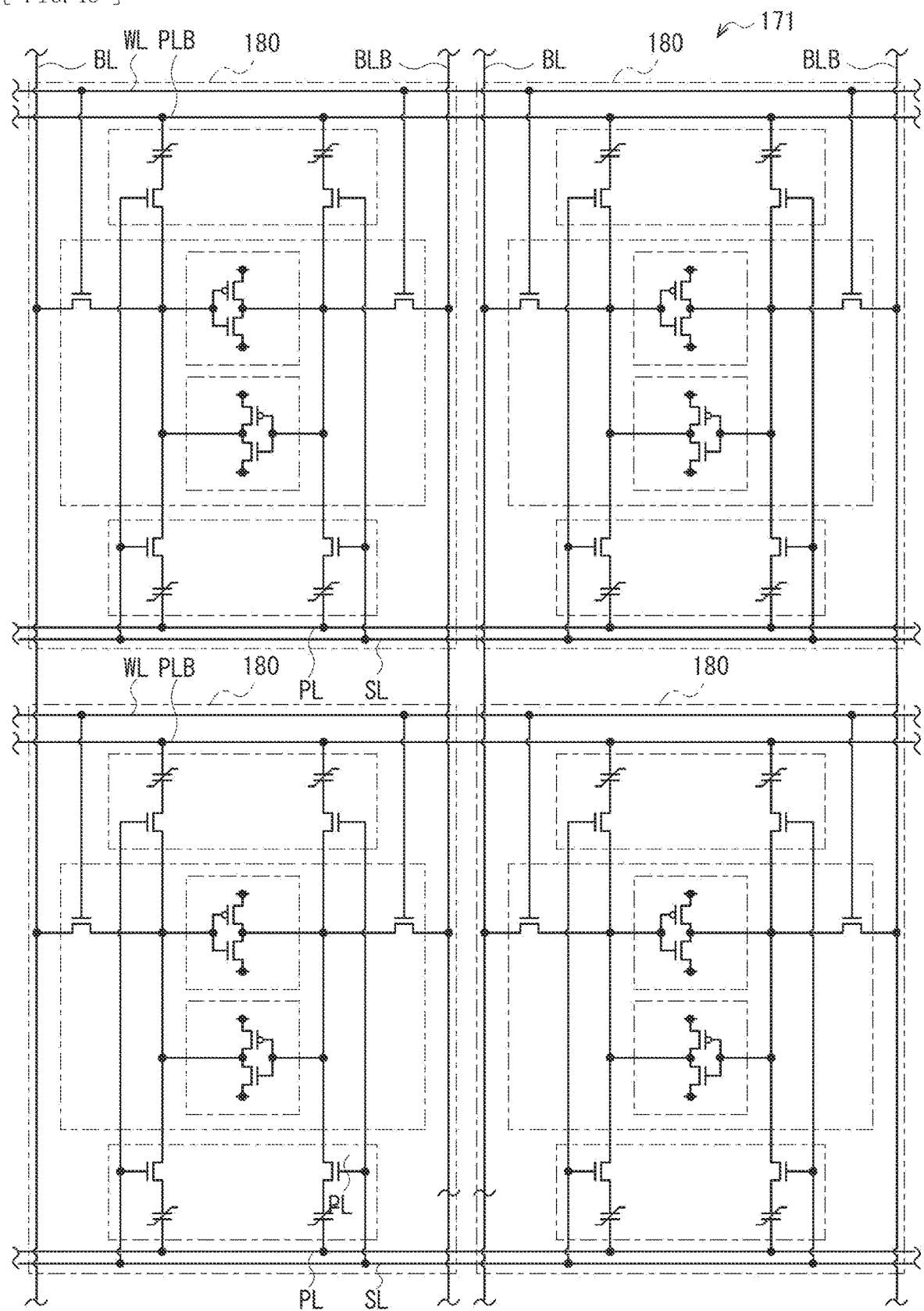

[FIG. 49]
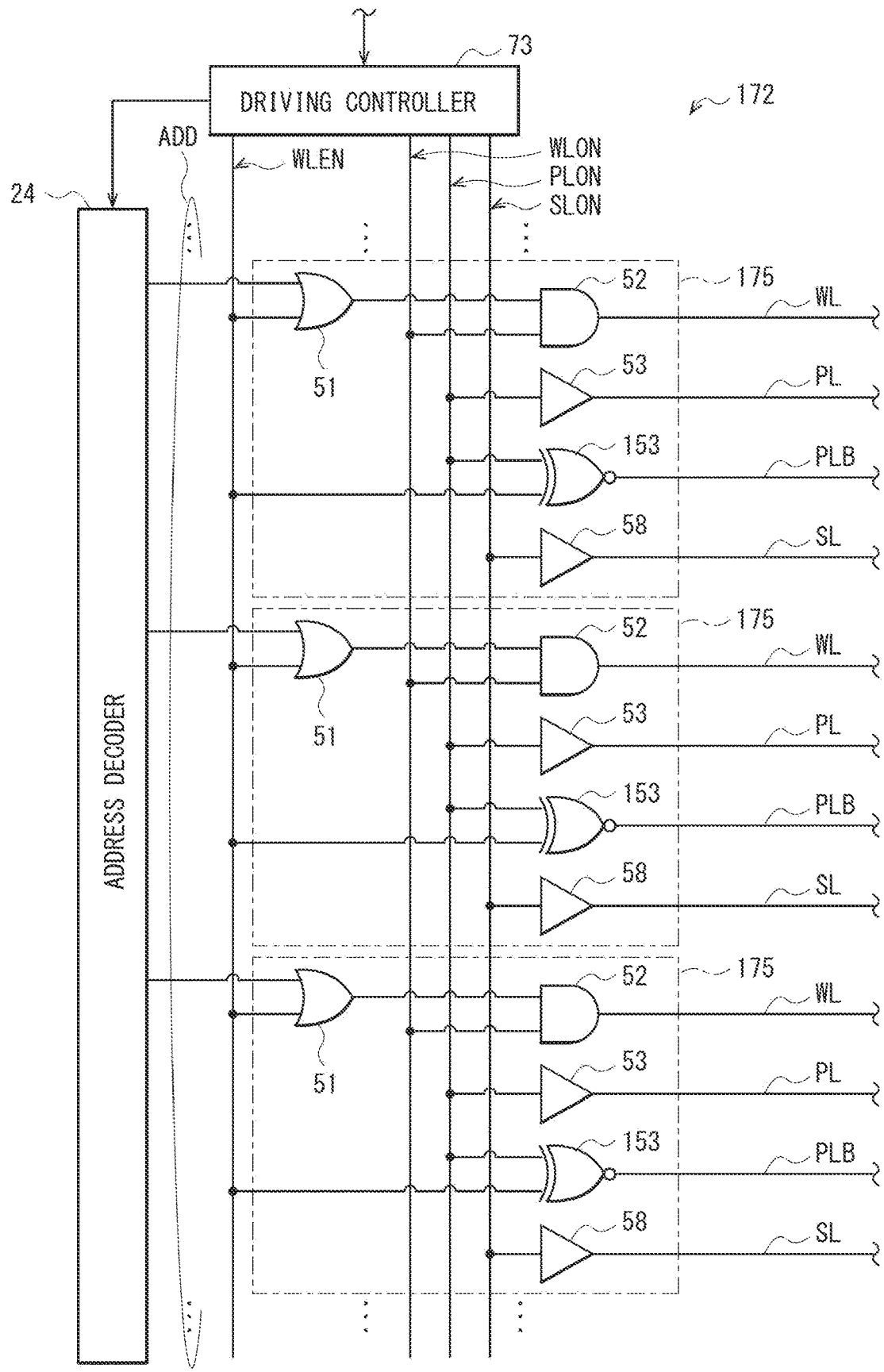

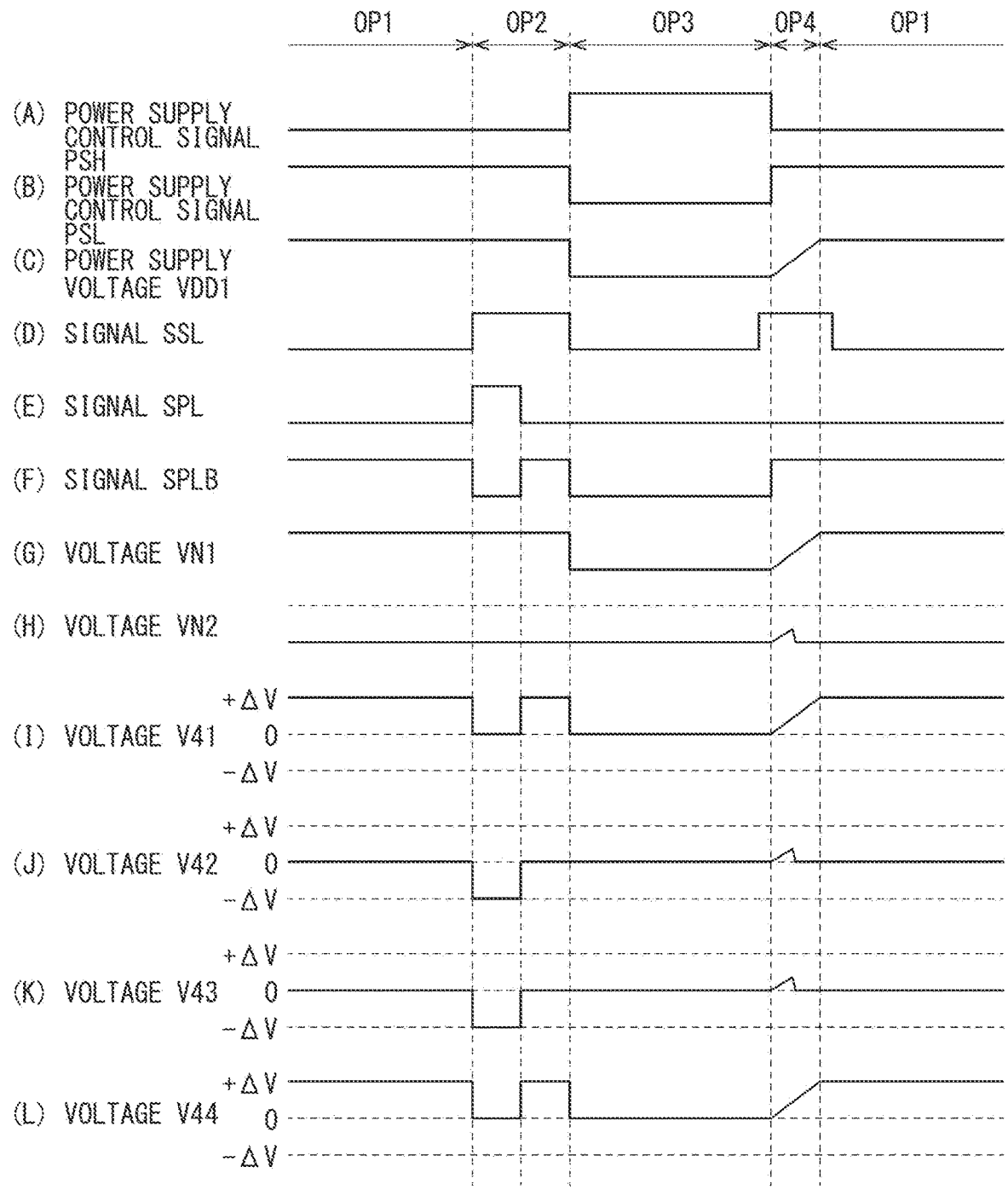
[FIG. 50]

[FIG. 51]
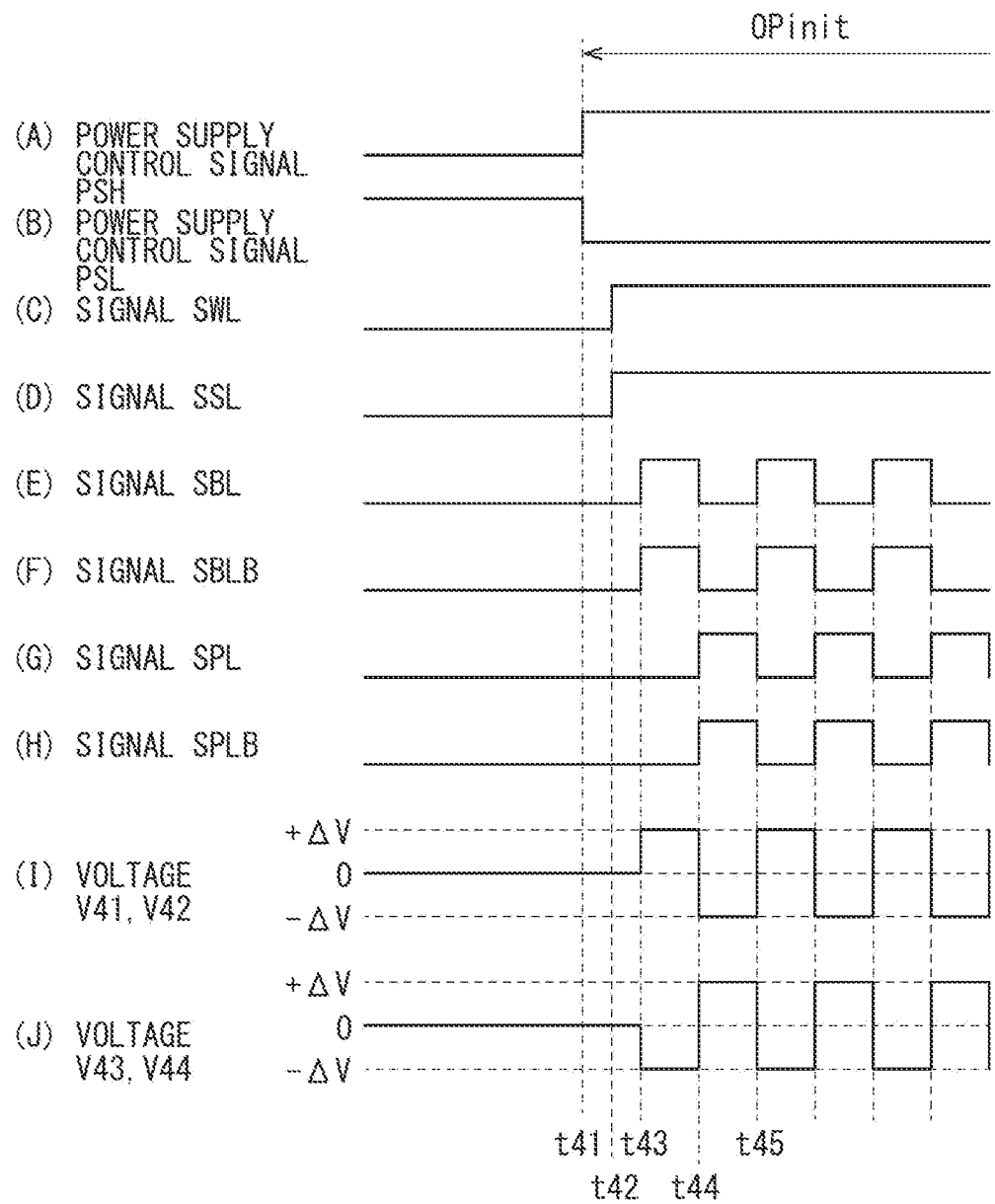

[FIG. 52]
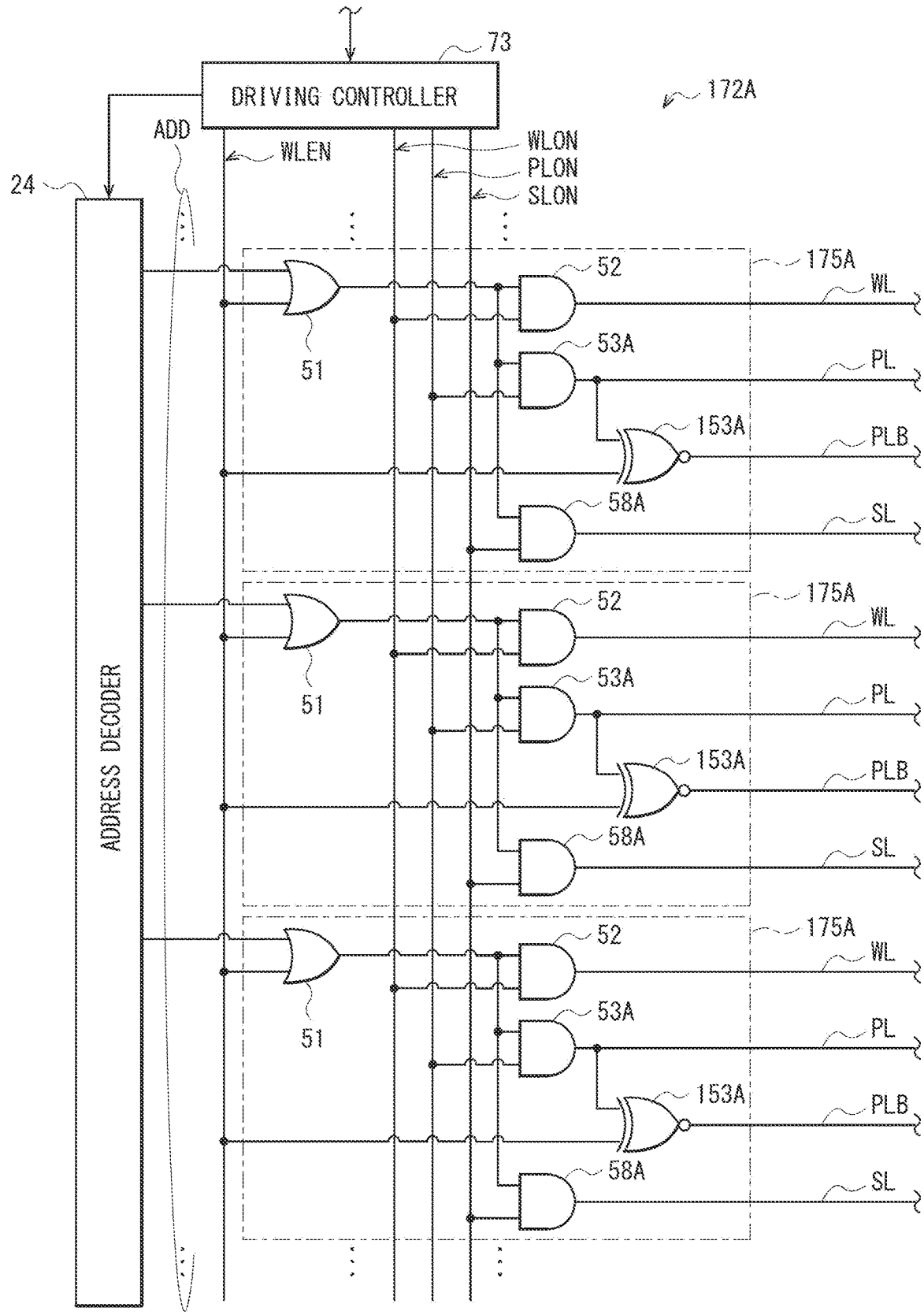

[FIG. 53]
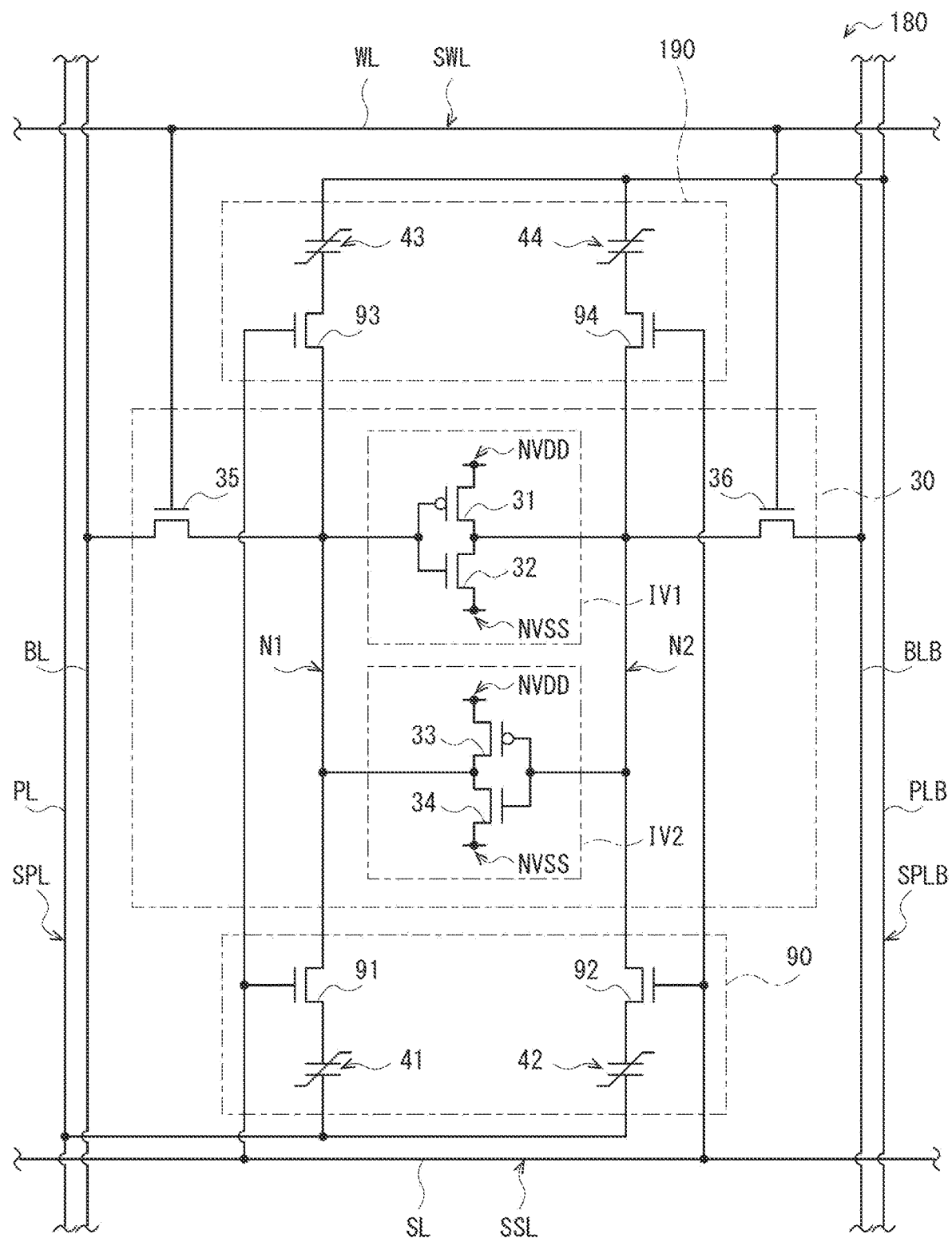

[FIG. 54]
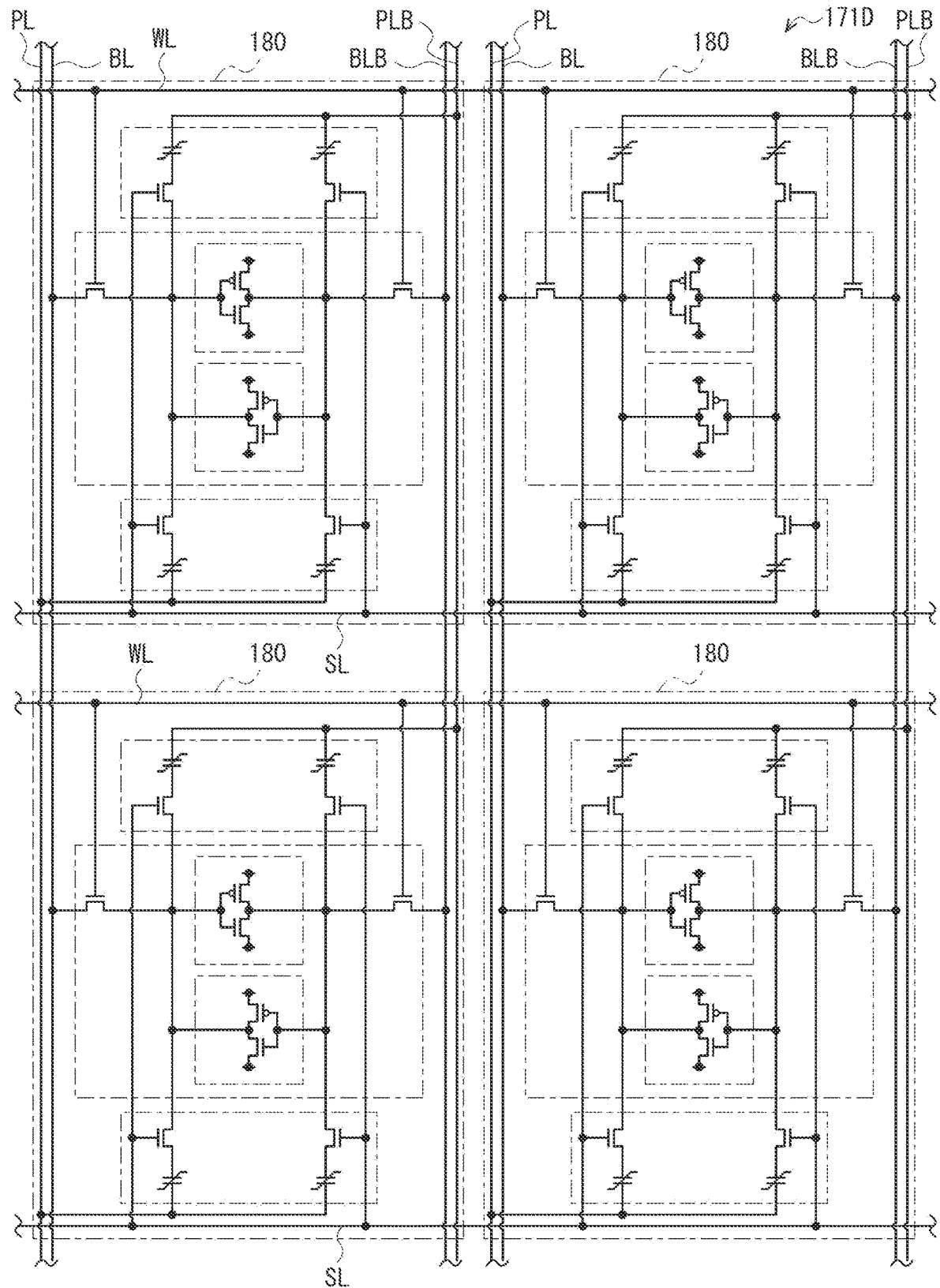

[FIG. 55]
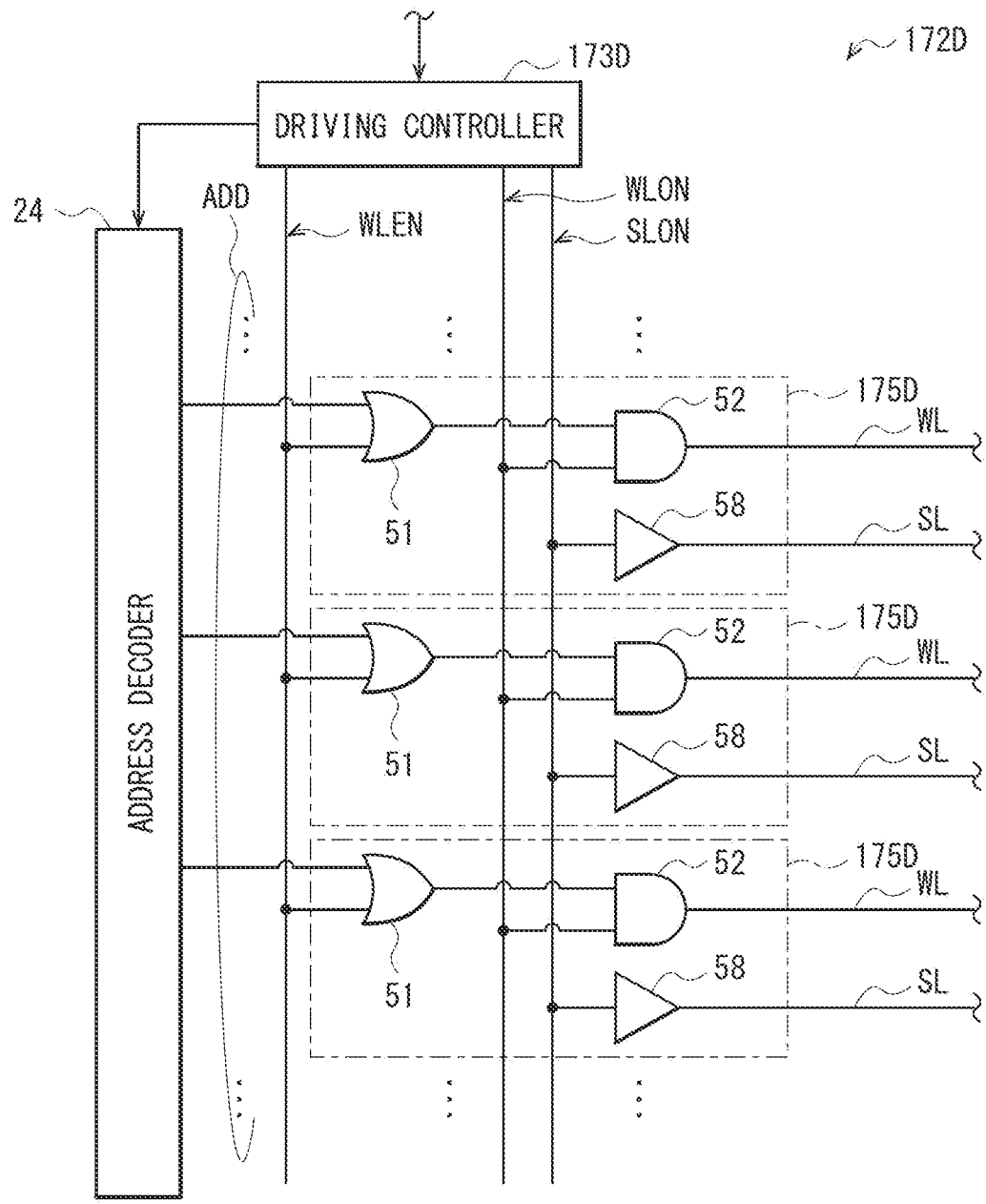

[FIG. 56]
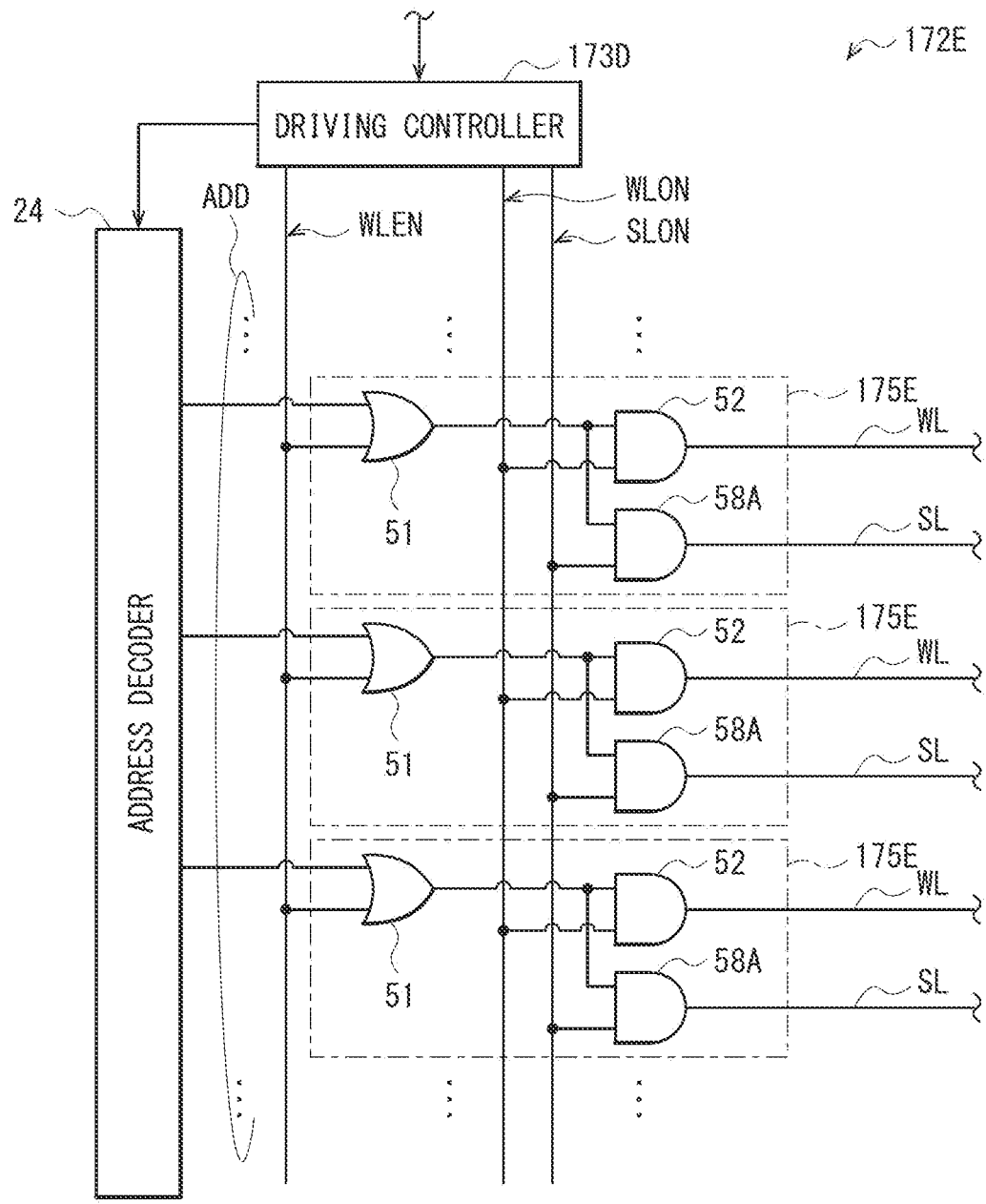

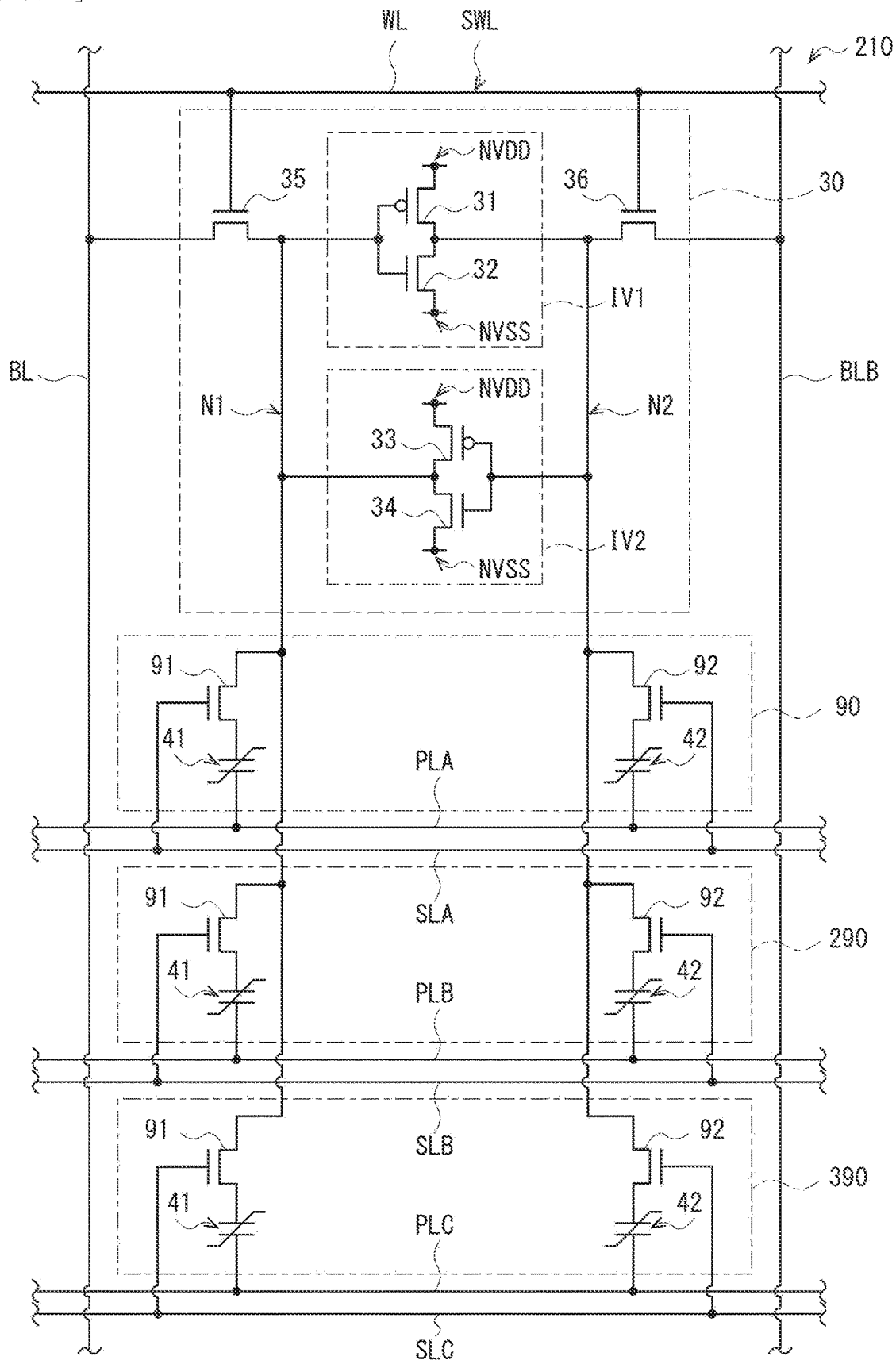
[FIG. 57]

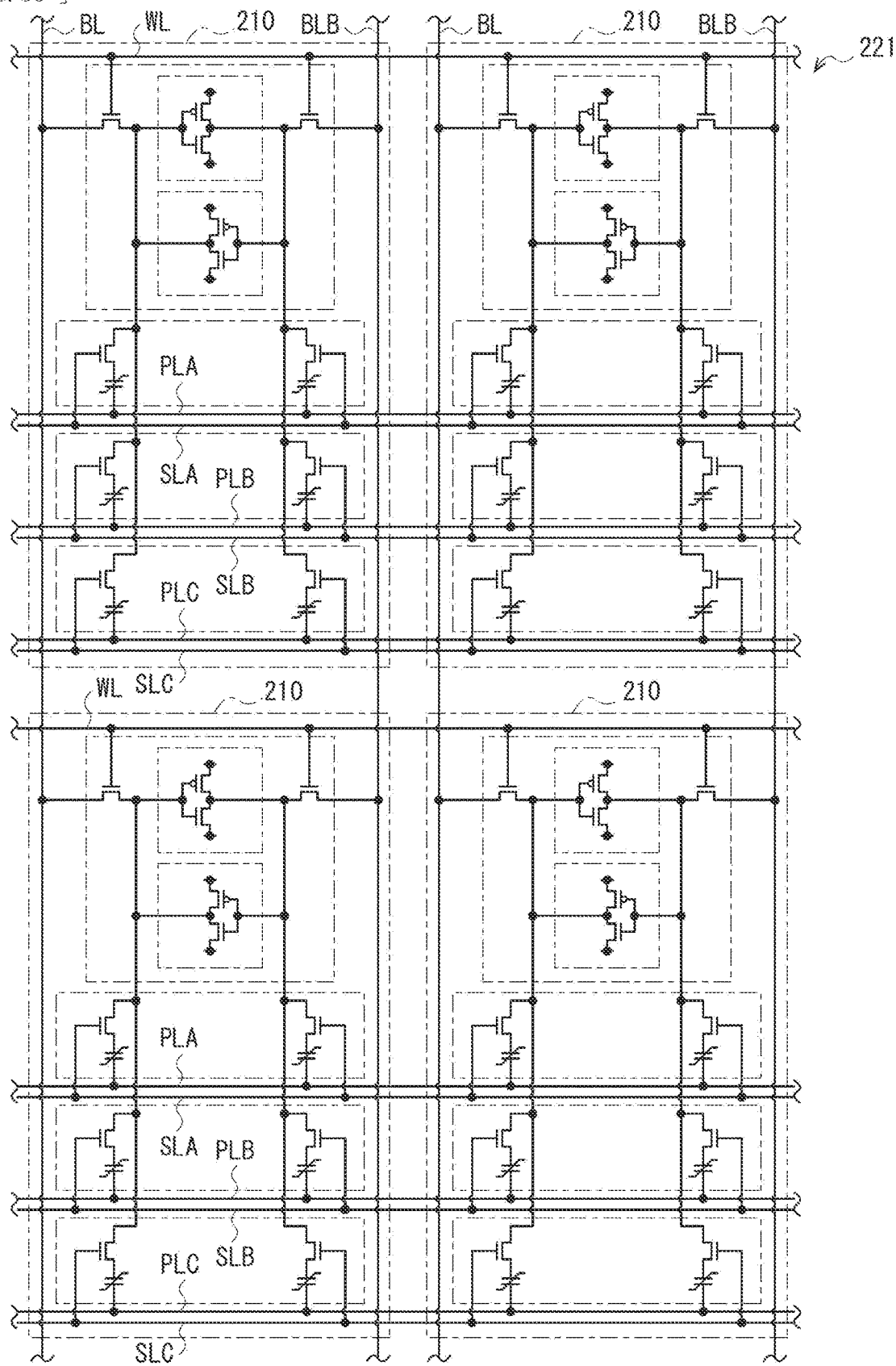
[FIG.58]

[ FIG. 59 ]
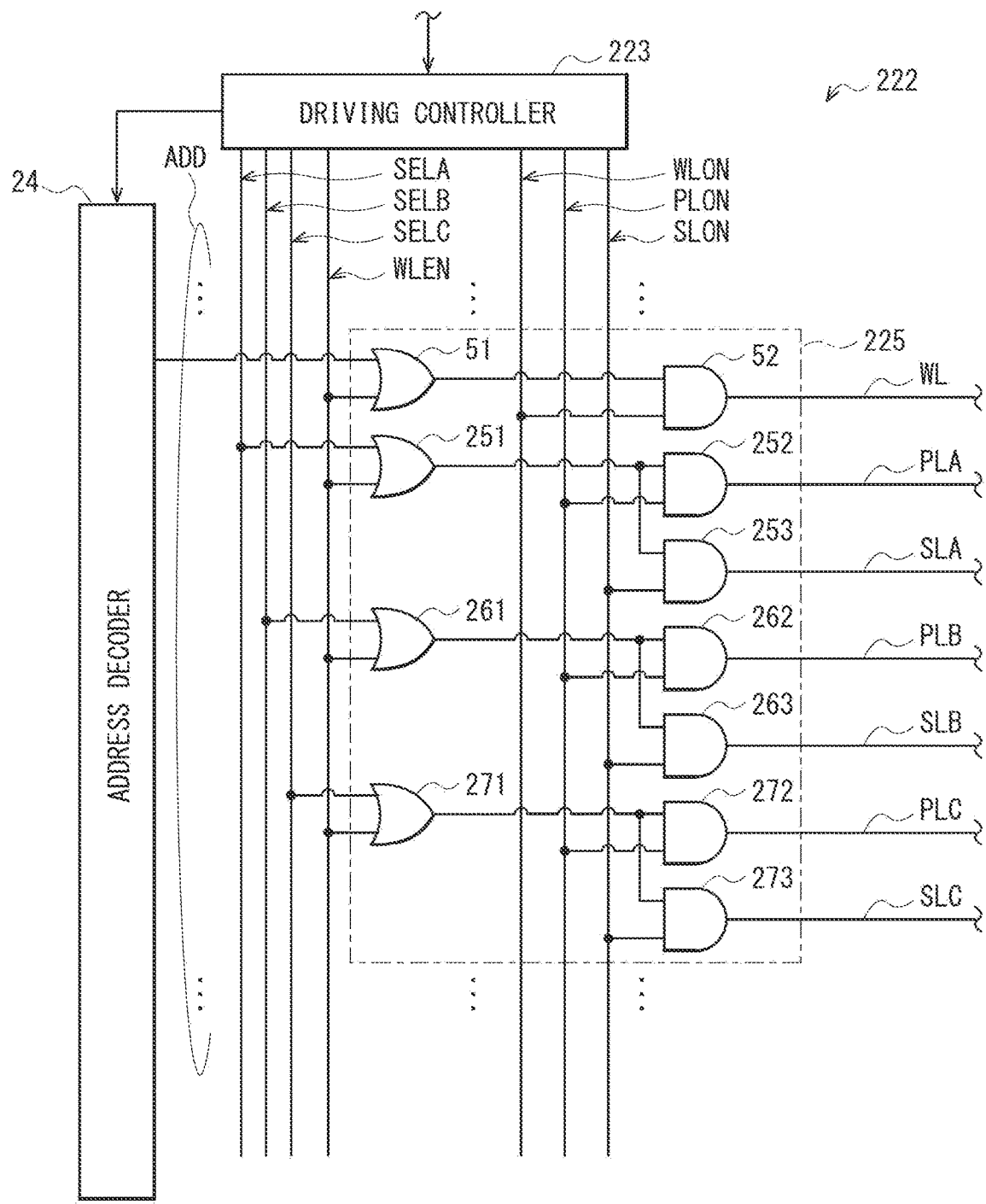

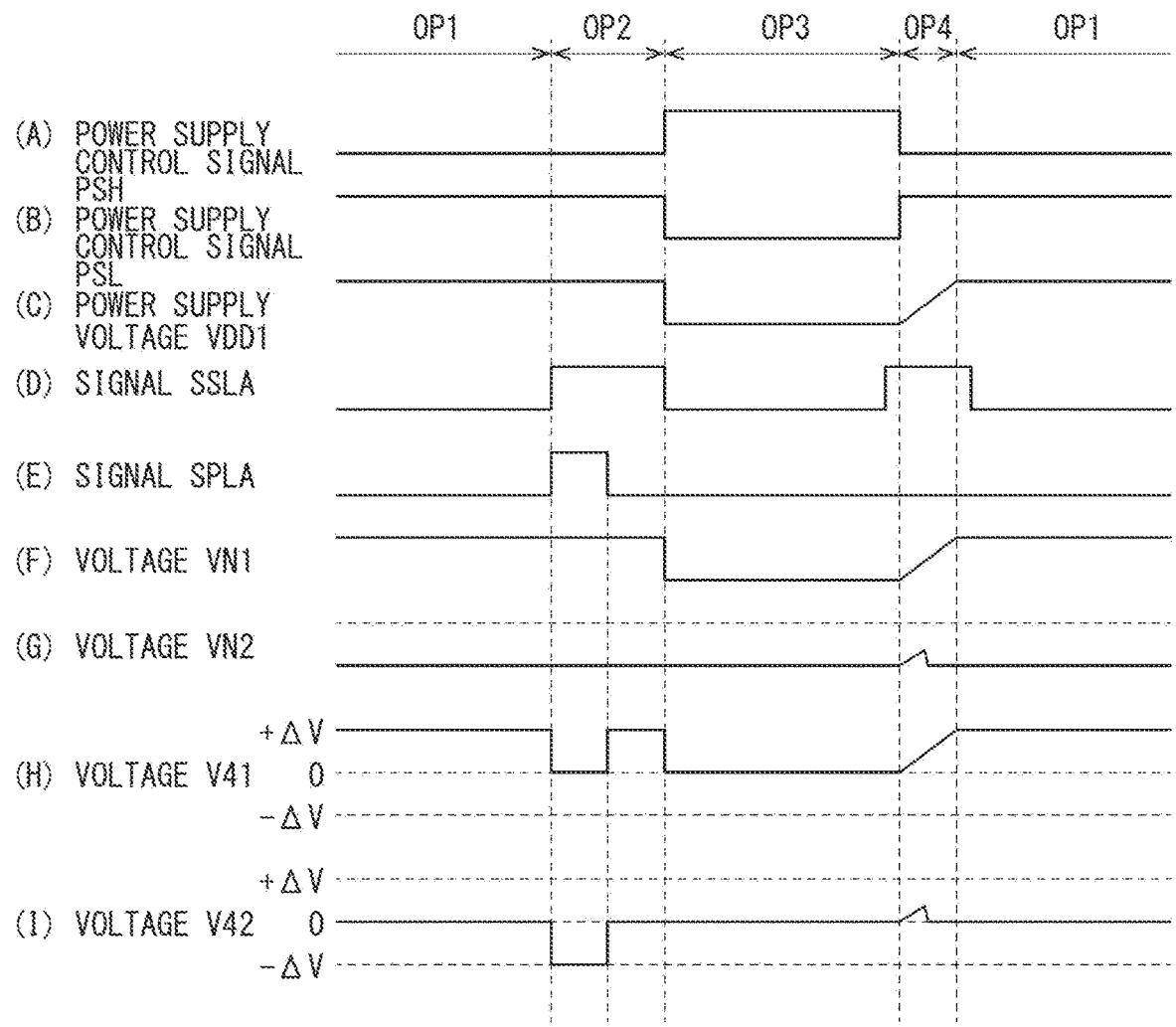
[FIG. 60]

[ FIG. 61 ]
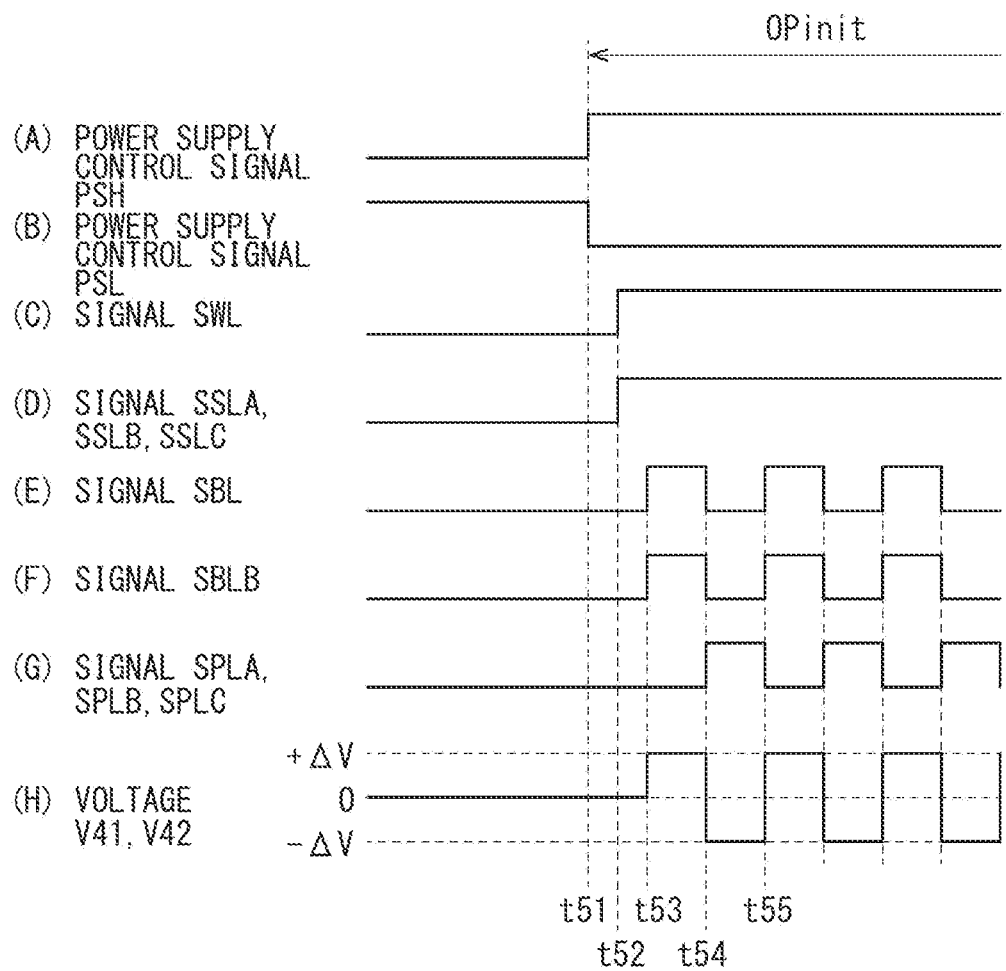

[FIG. 62]
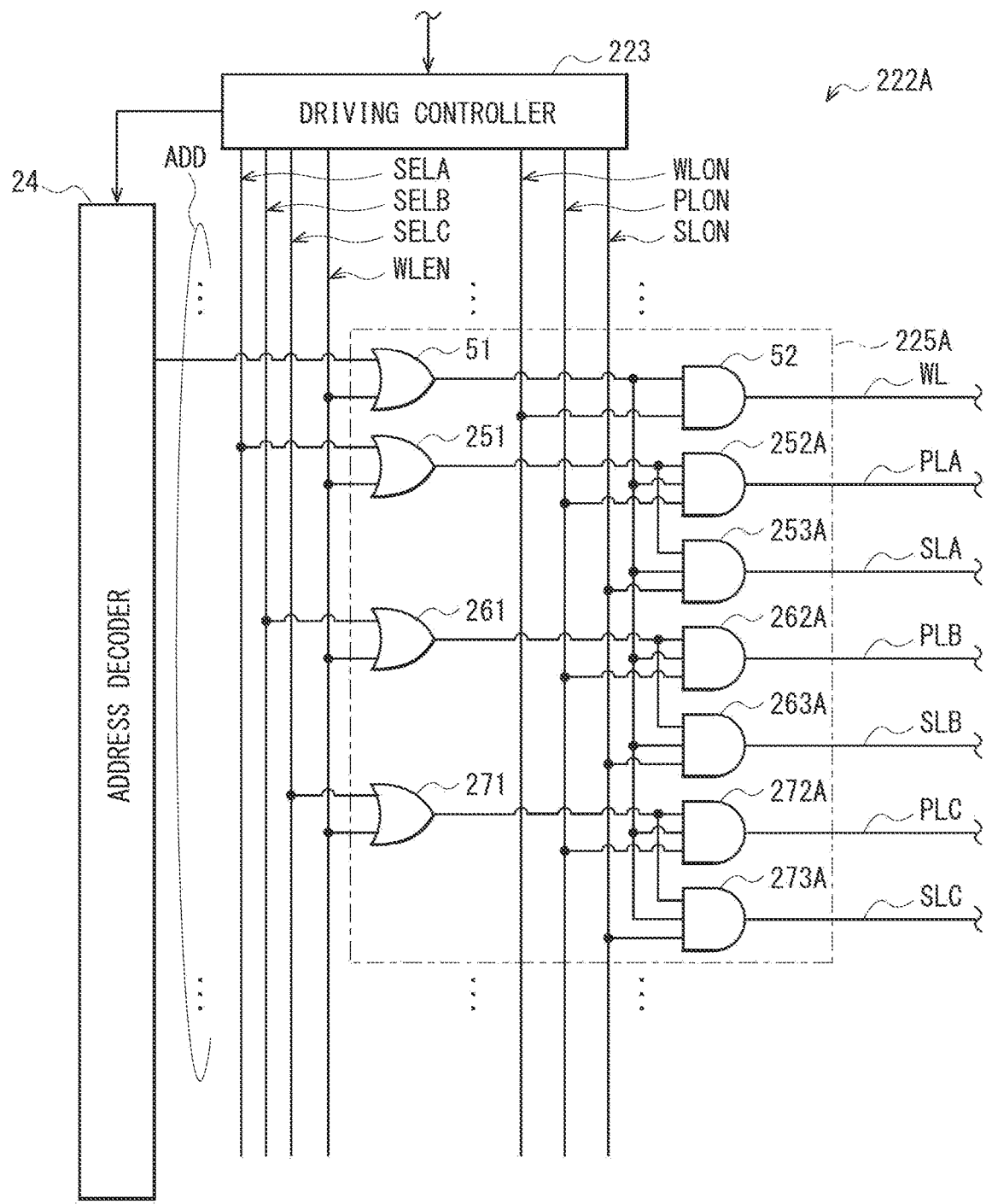

[FIG. 63]
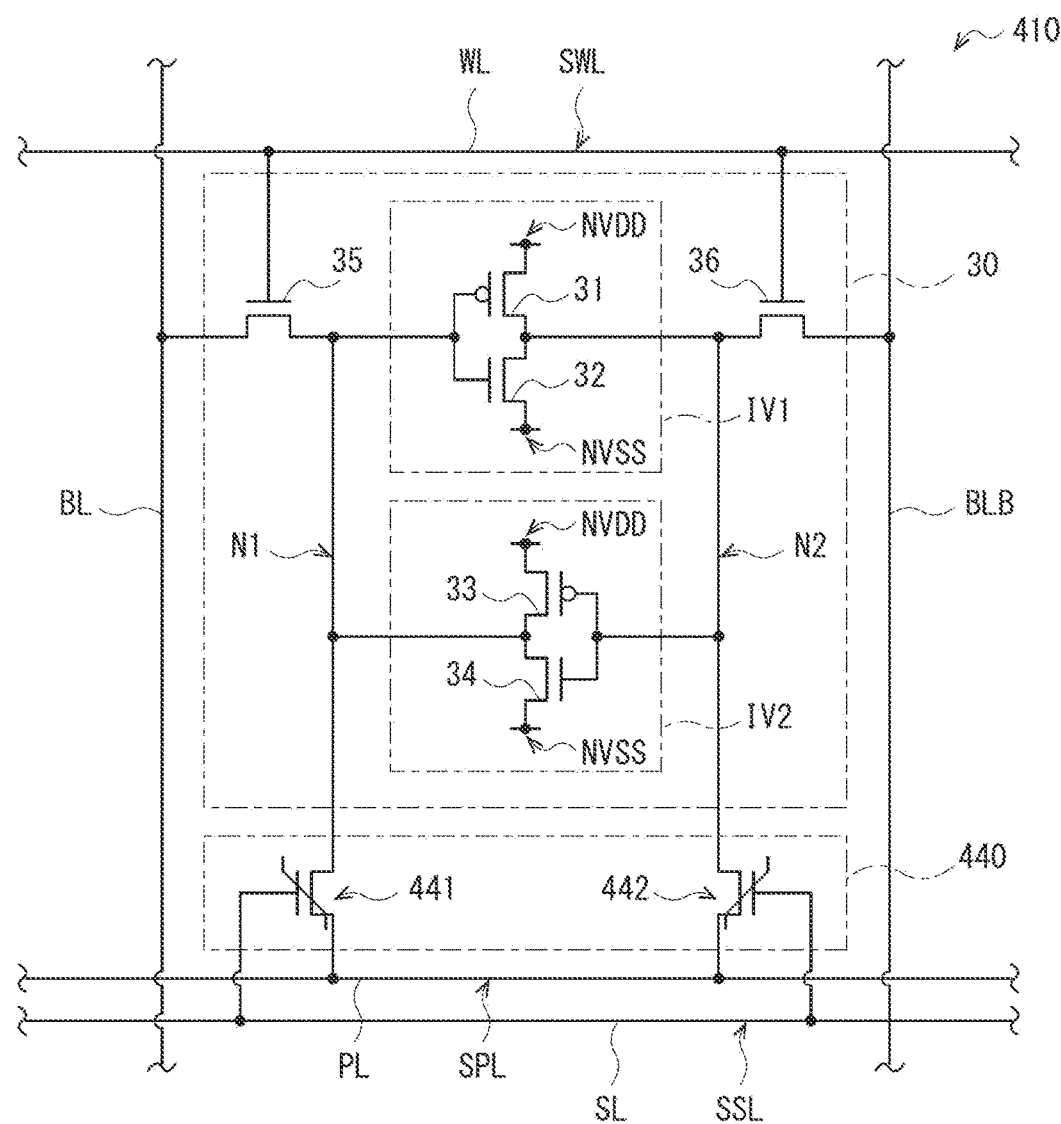

[FIG. 64]
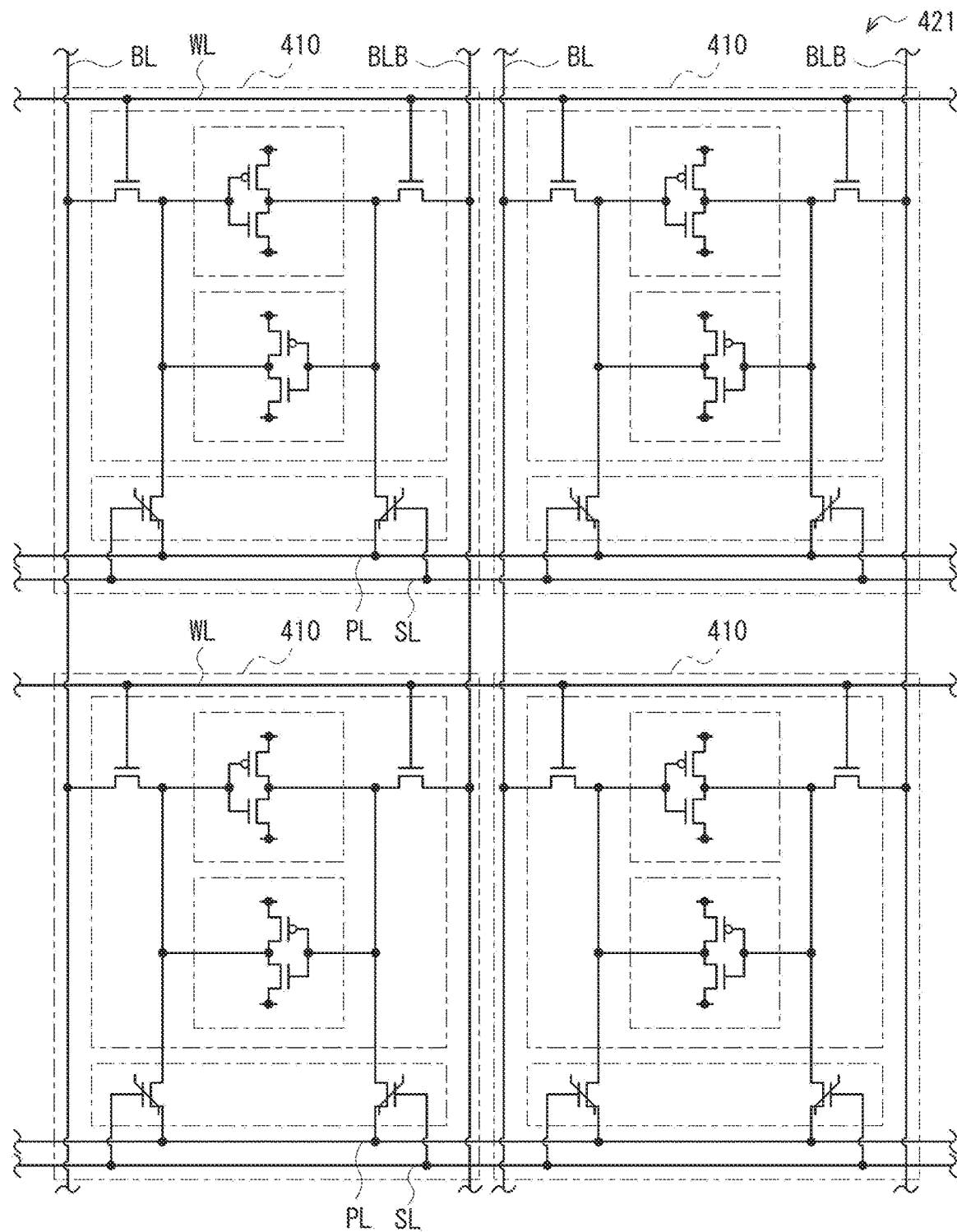

[FIG. 65]
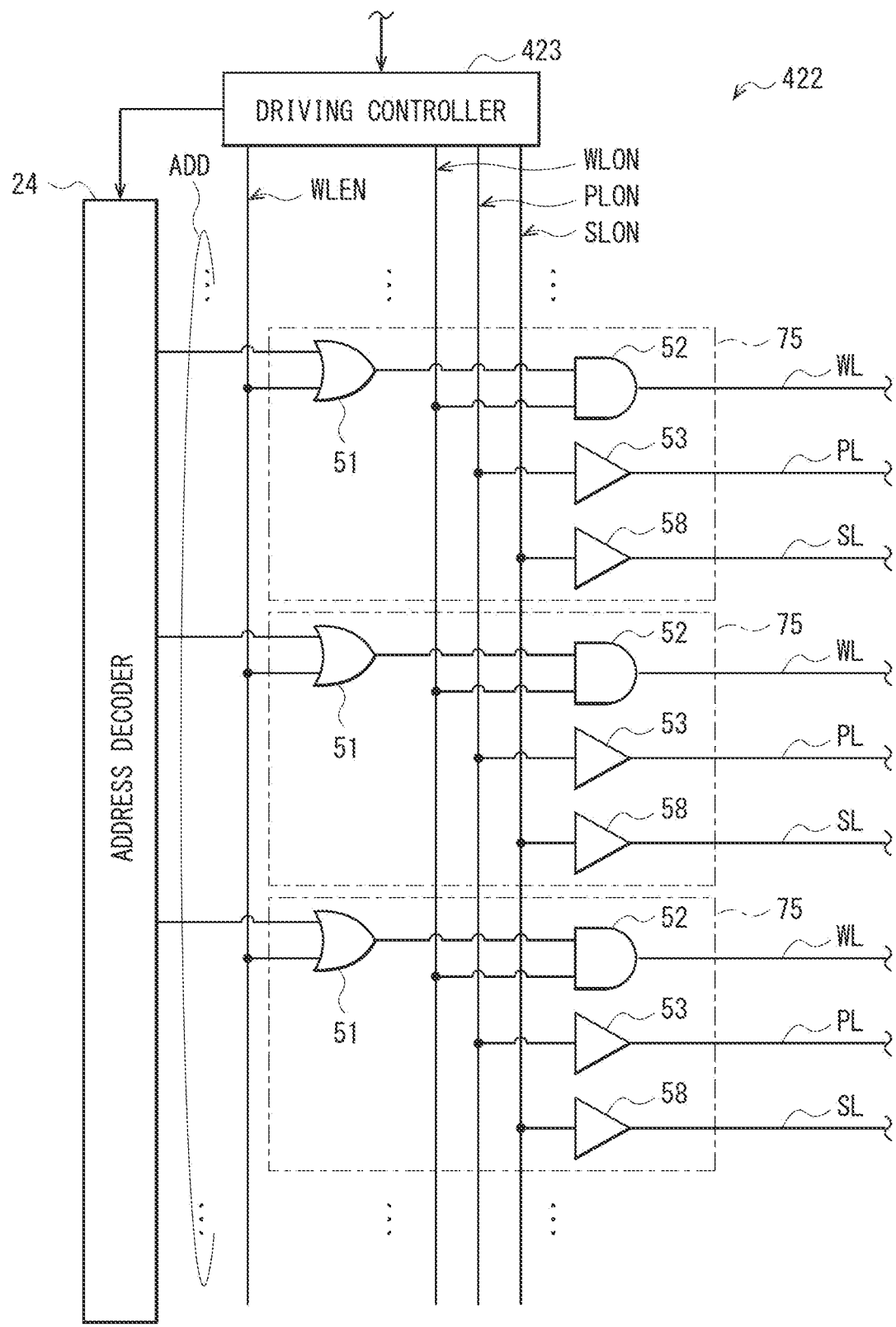

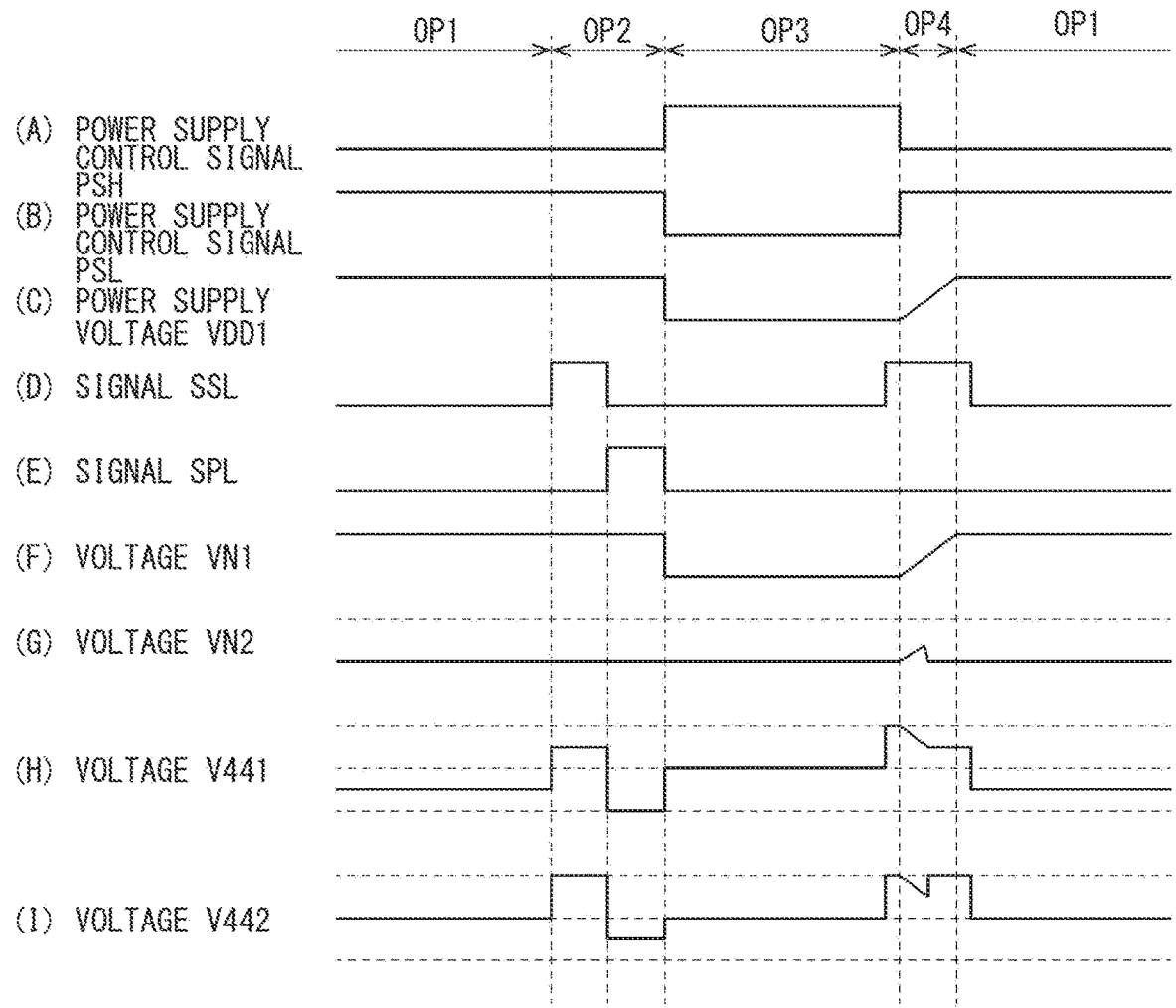
[FIG.66]

[ FIG. 67A ]
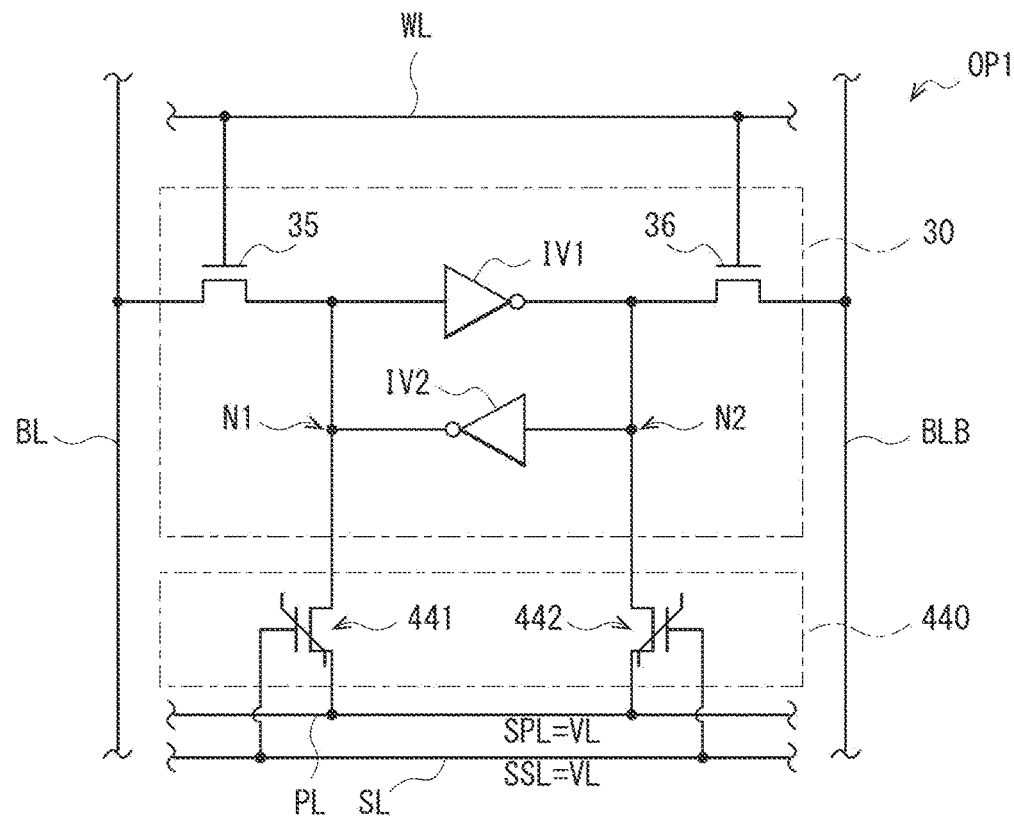
[ FIG. 67B ]
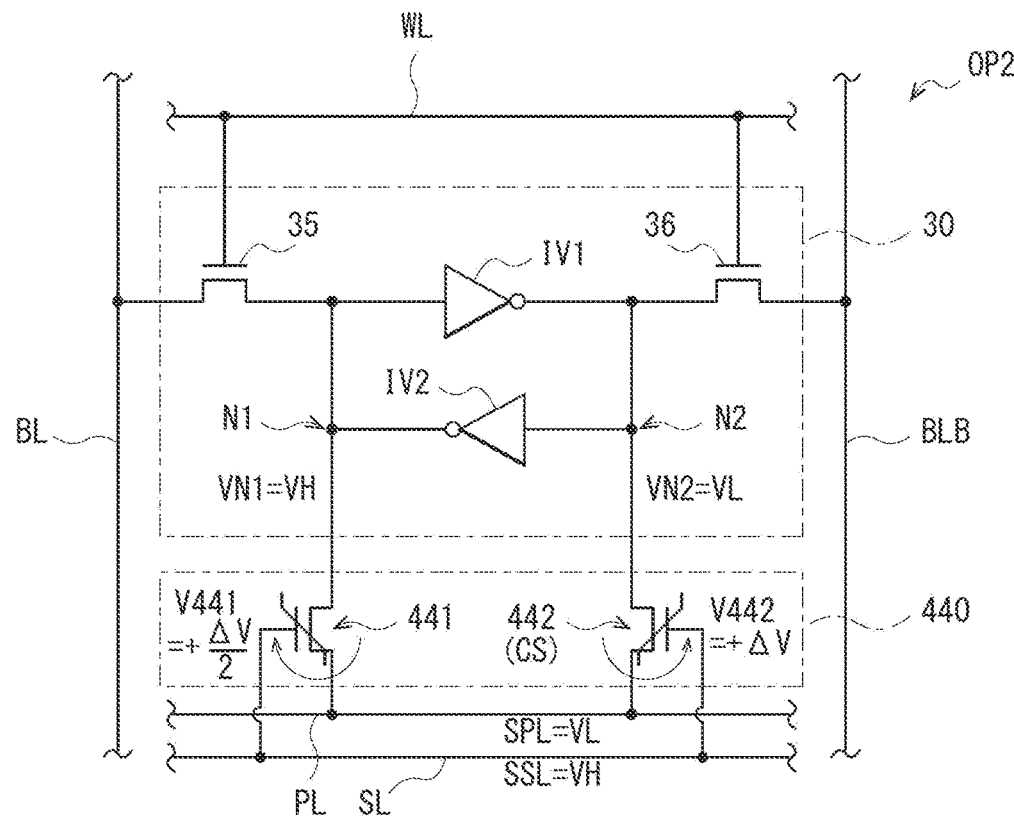

[FIG. 67C]
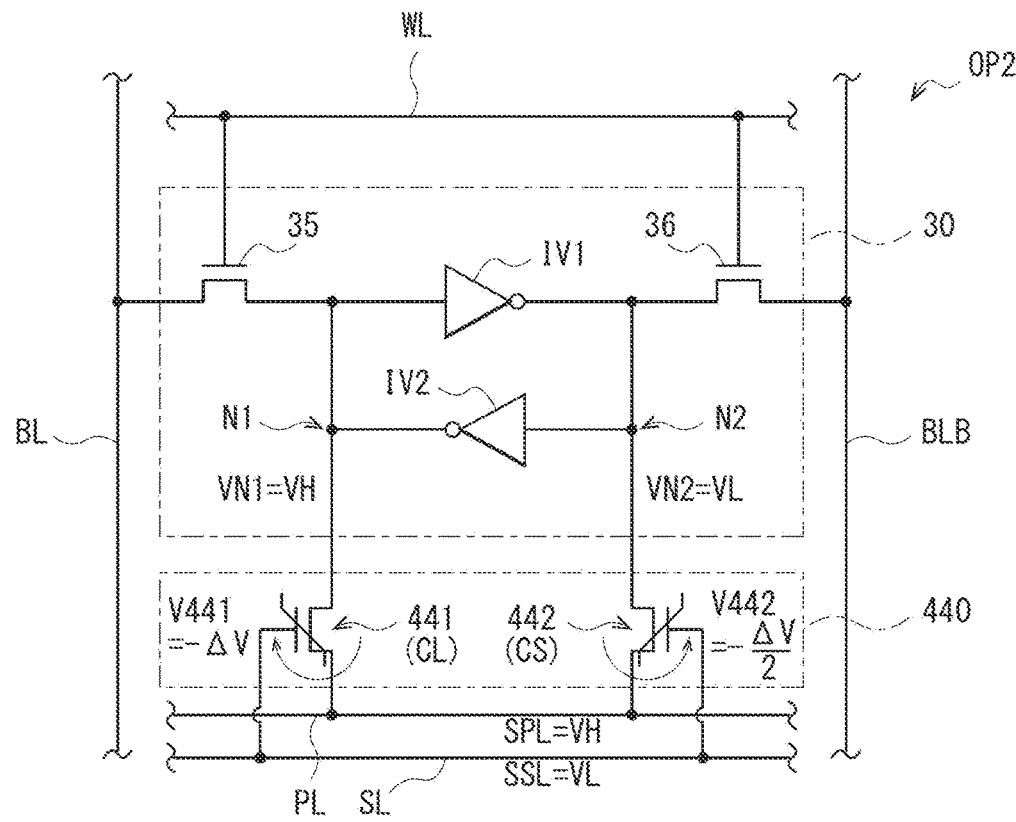
[FIG. 67D]
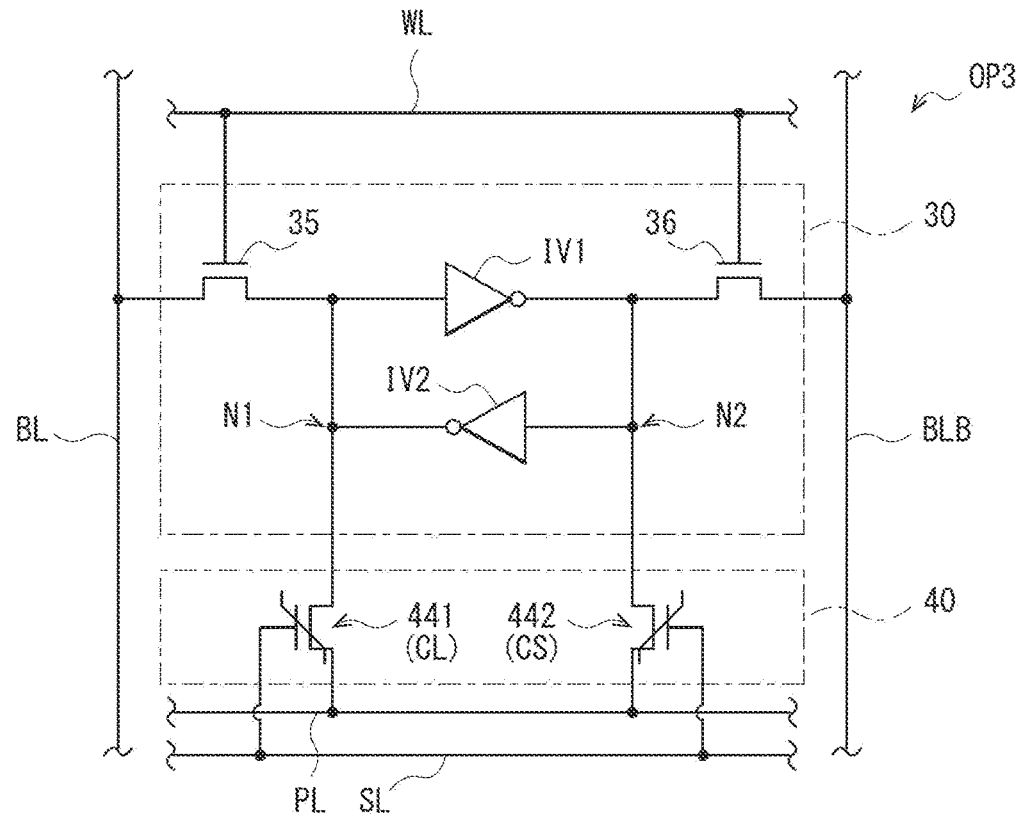

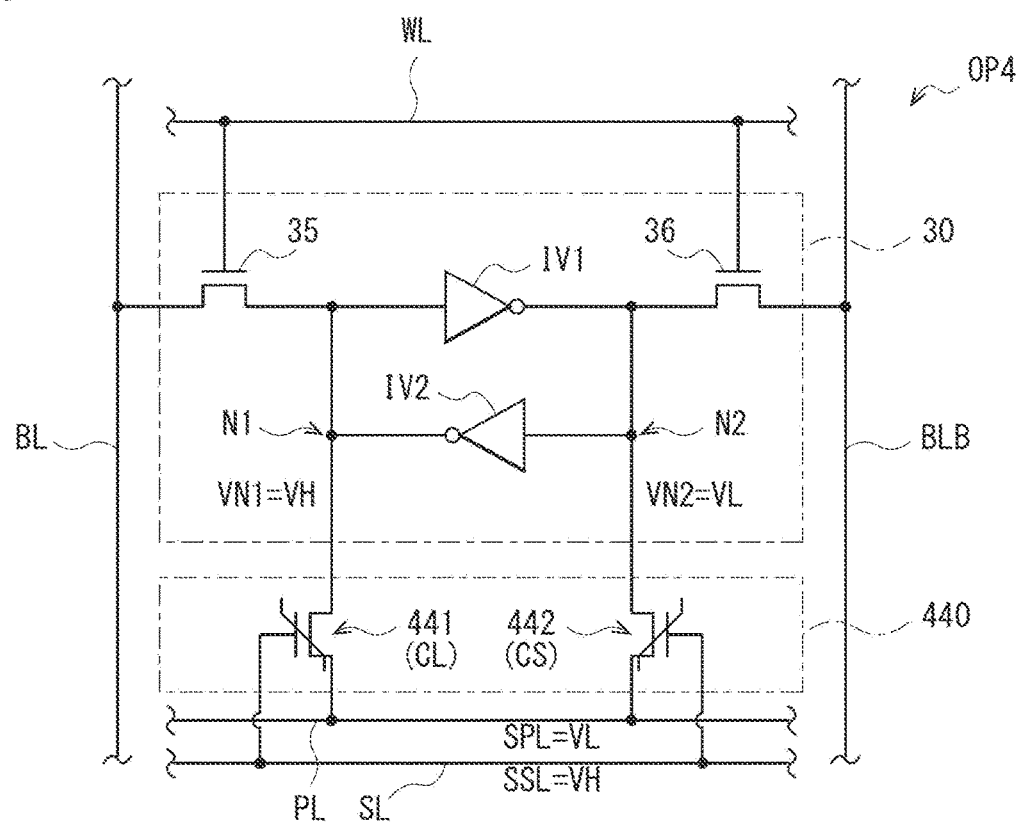
[ FIG. 67E ]

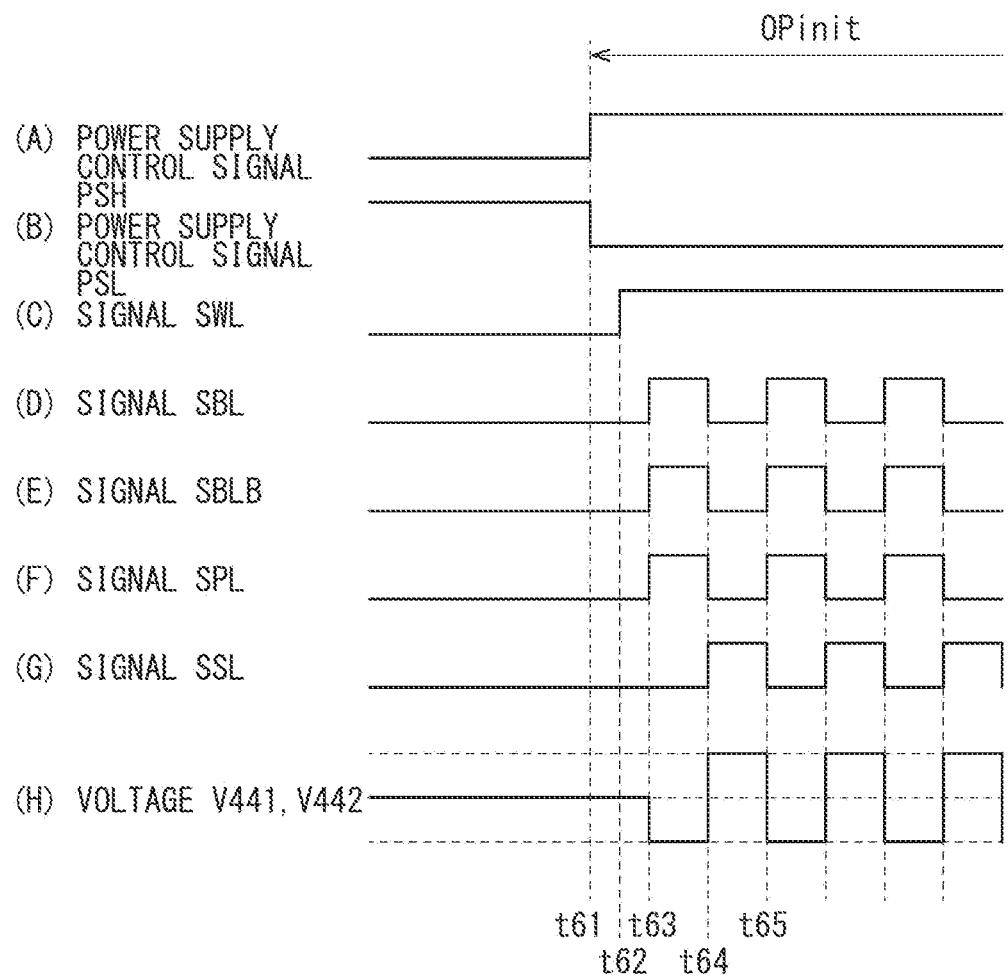
[FIG. 68]

[FIG. 69A]
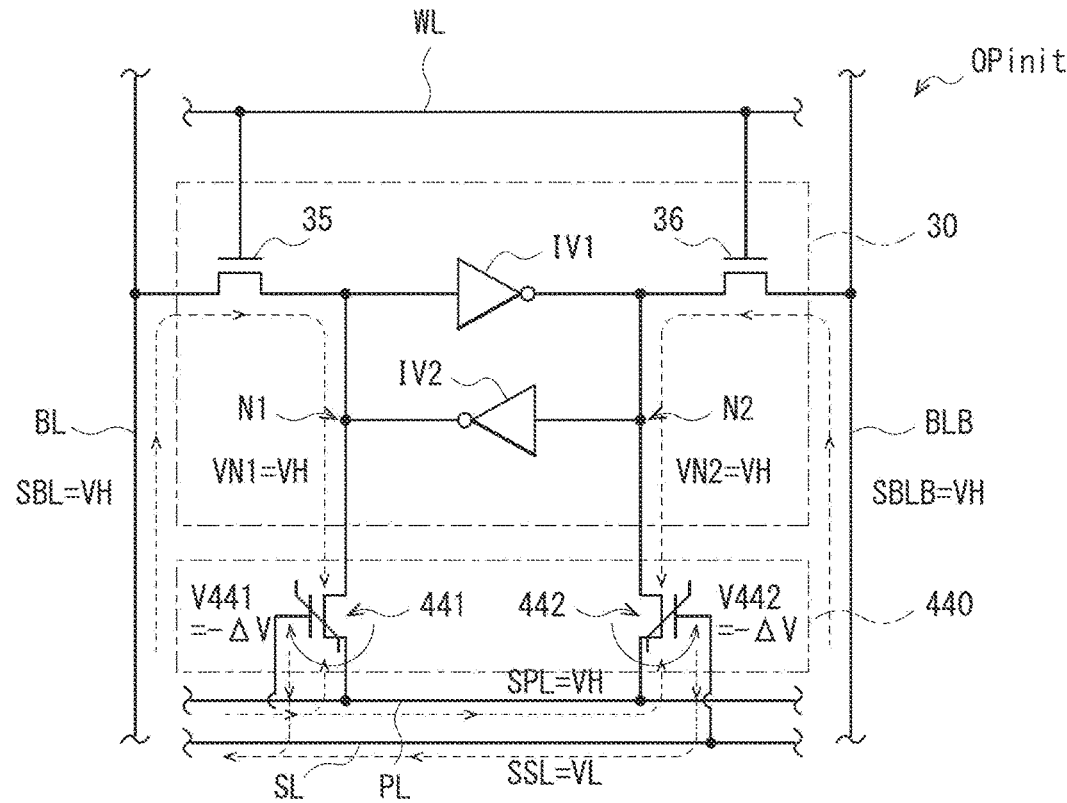
[FIG. 69B]
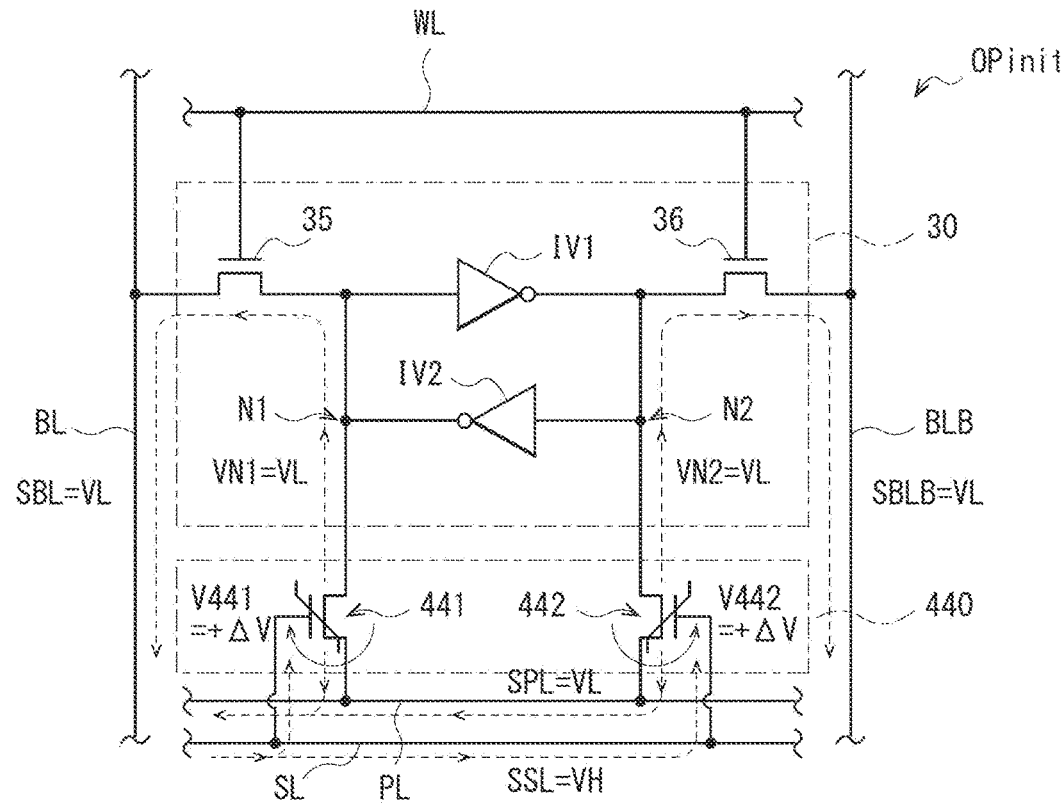

[FIG. 70]
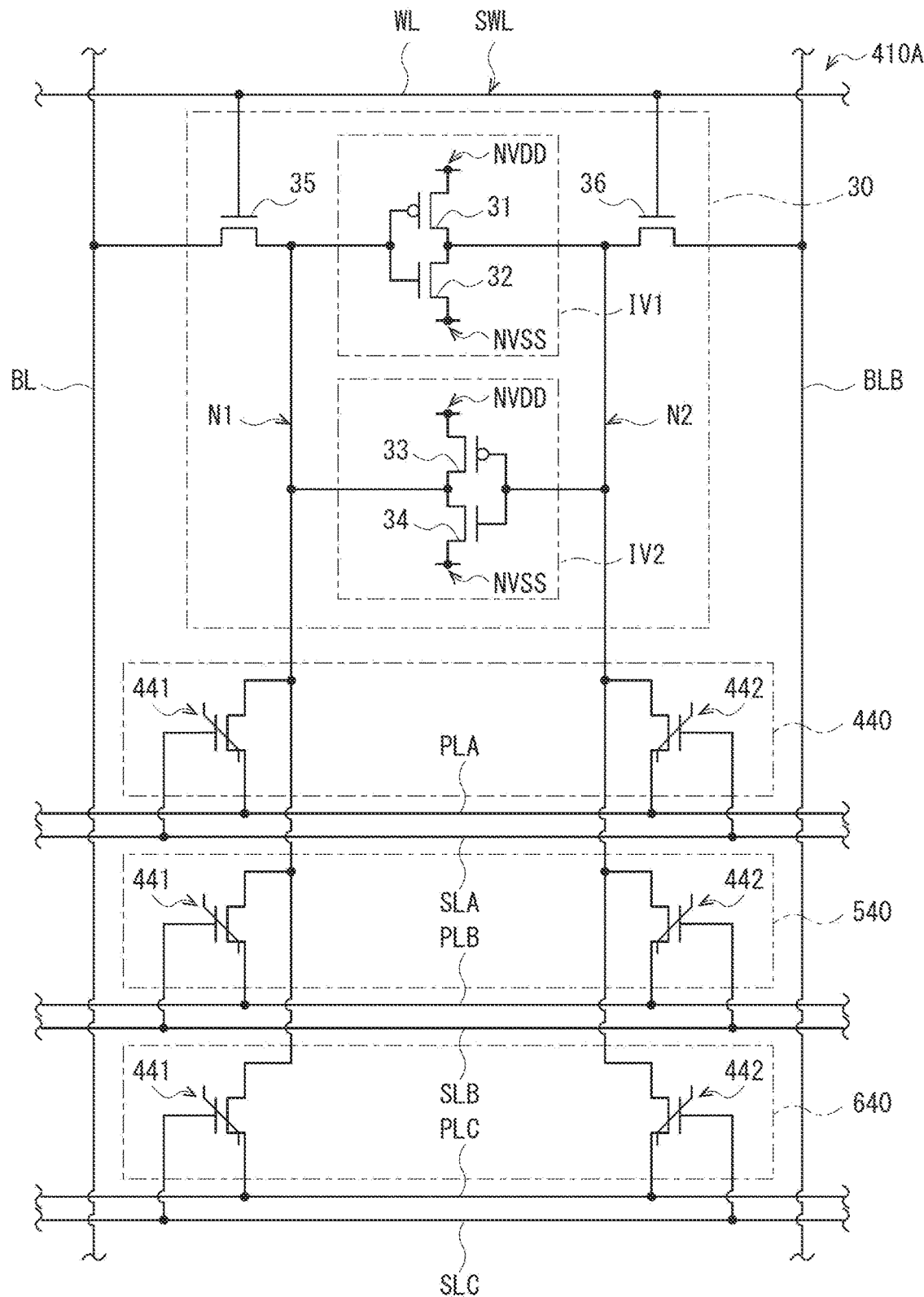

[ FIG. 71 ]
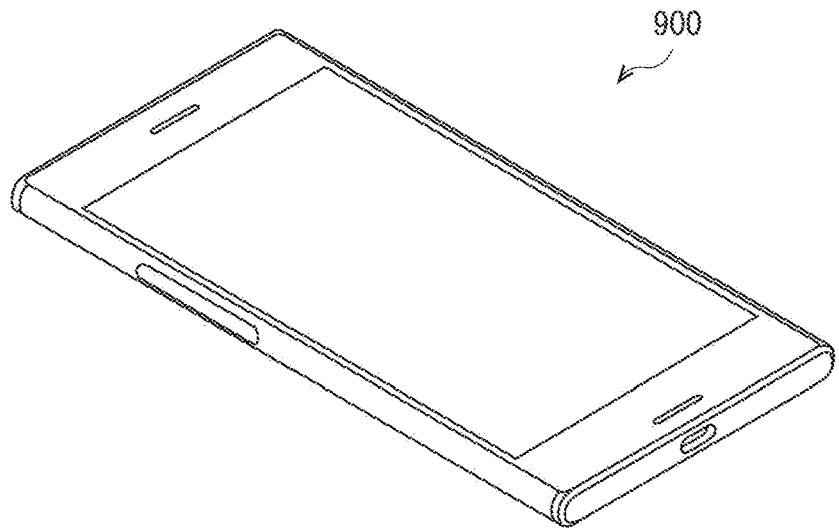
[ FIG. 72 ]
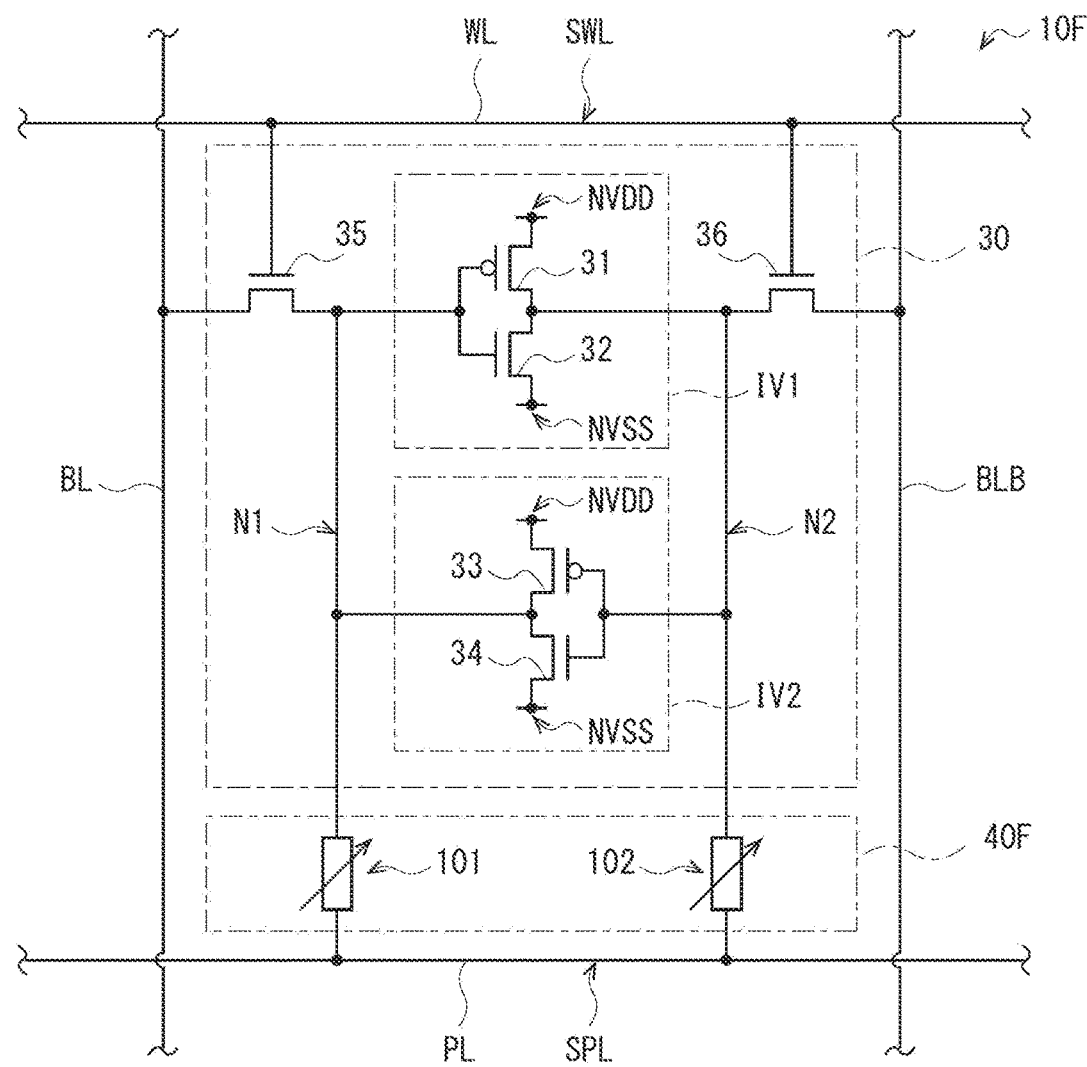

[ FIG. 73 ]
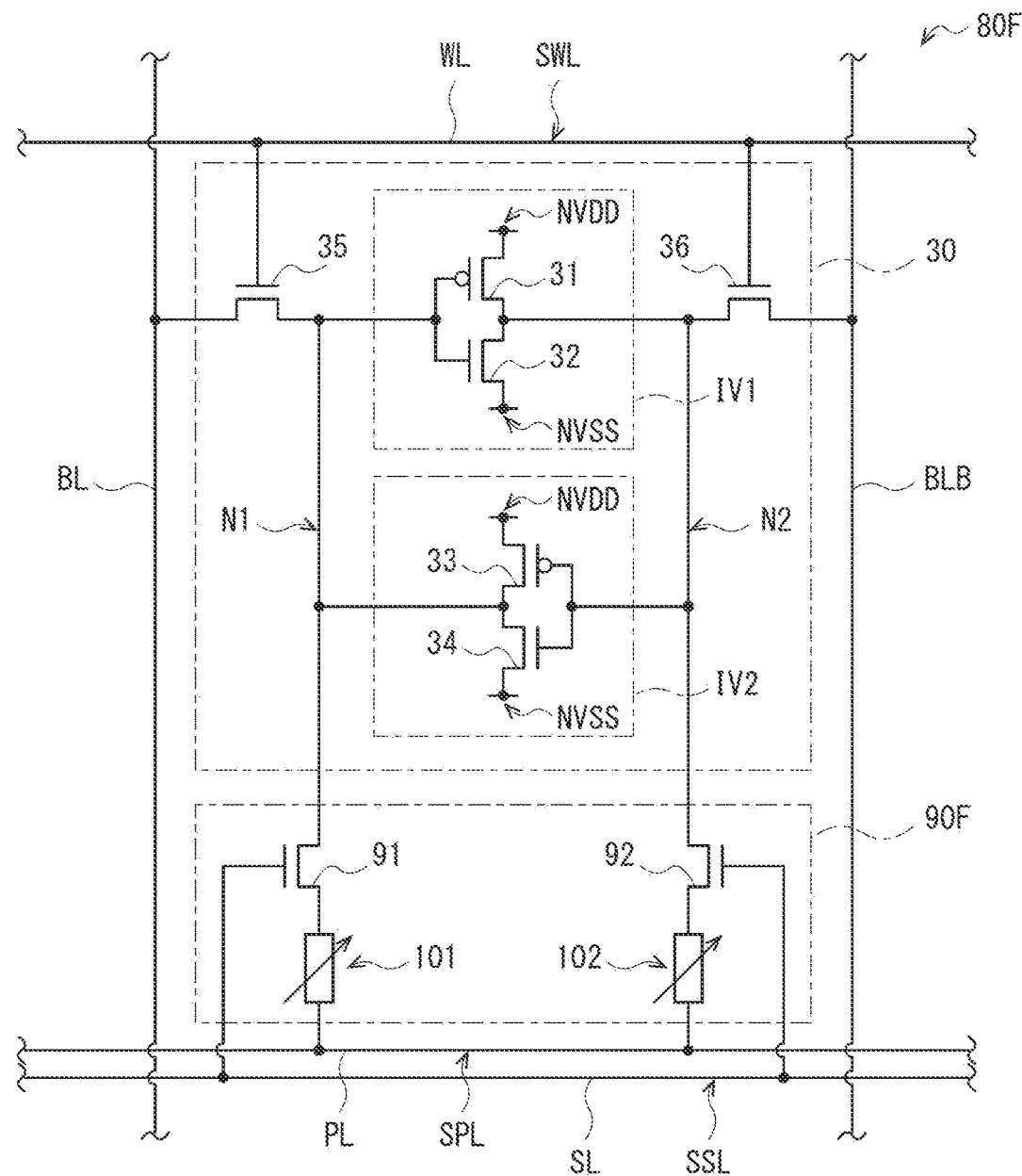

[FIG. 74]
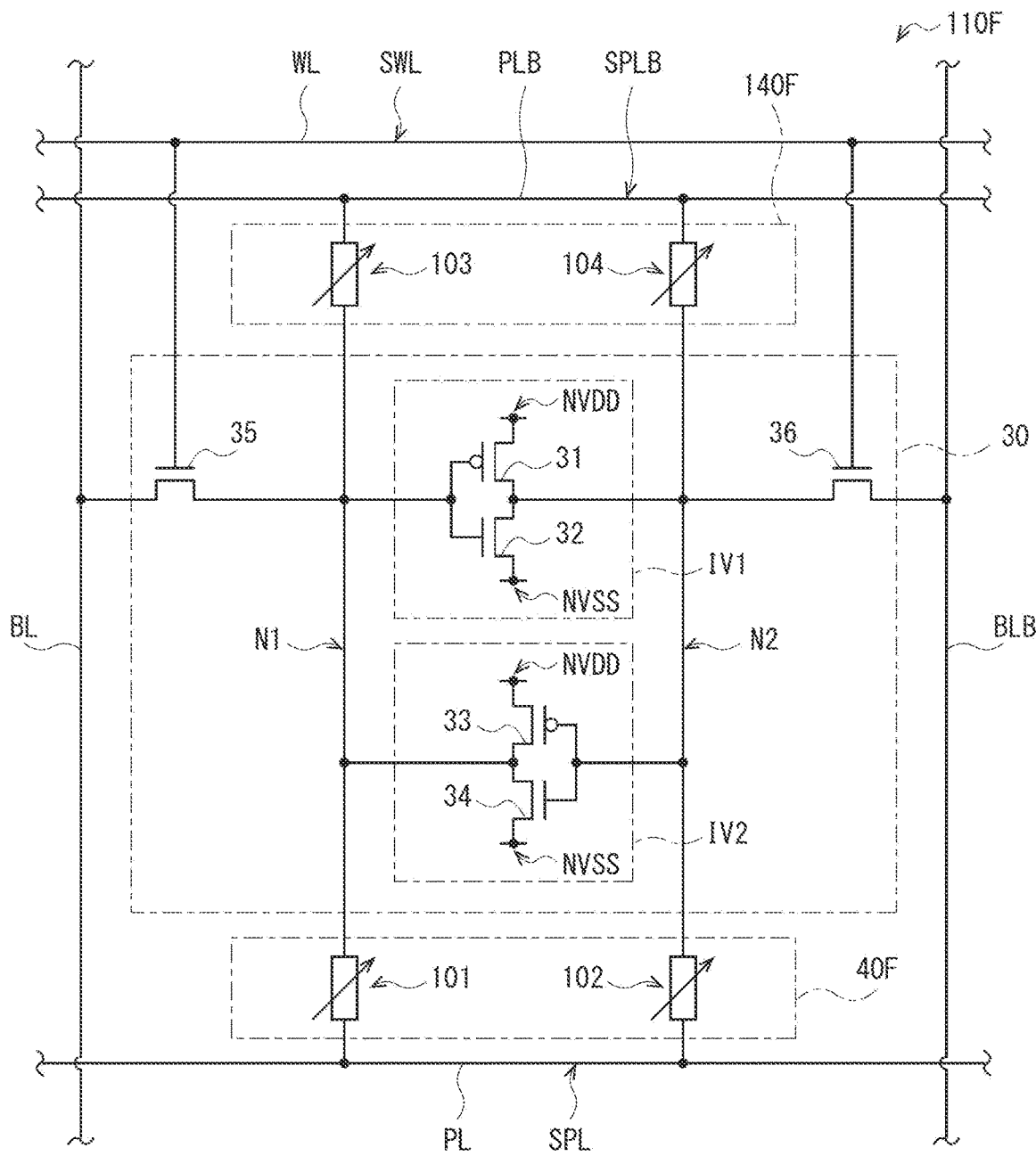

[FIG. 75]
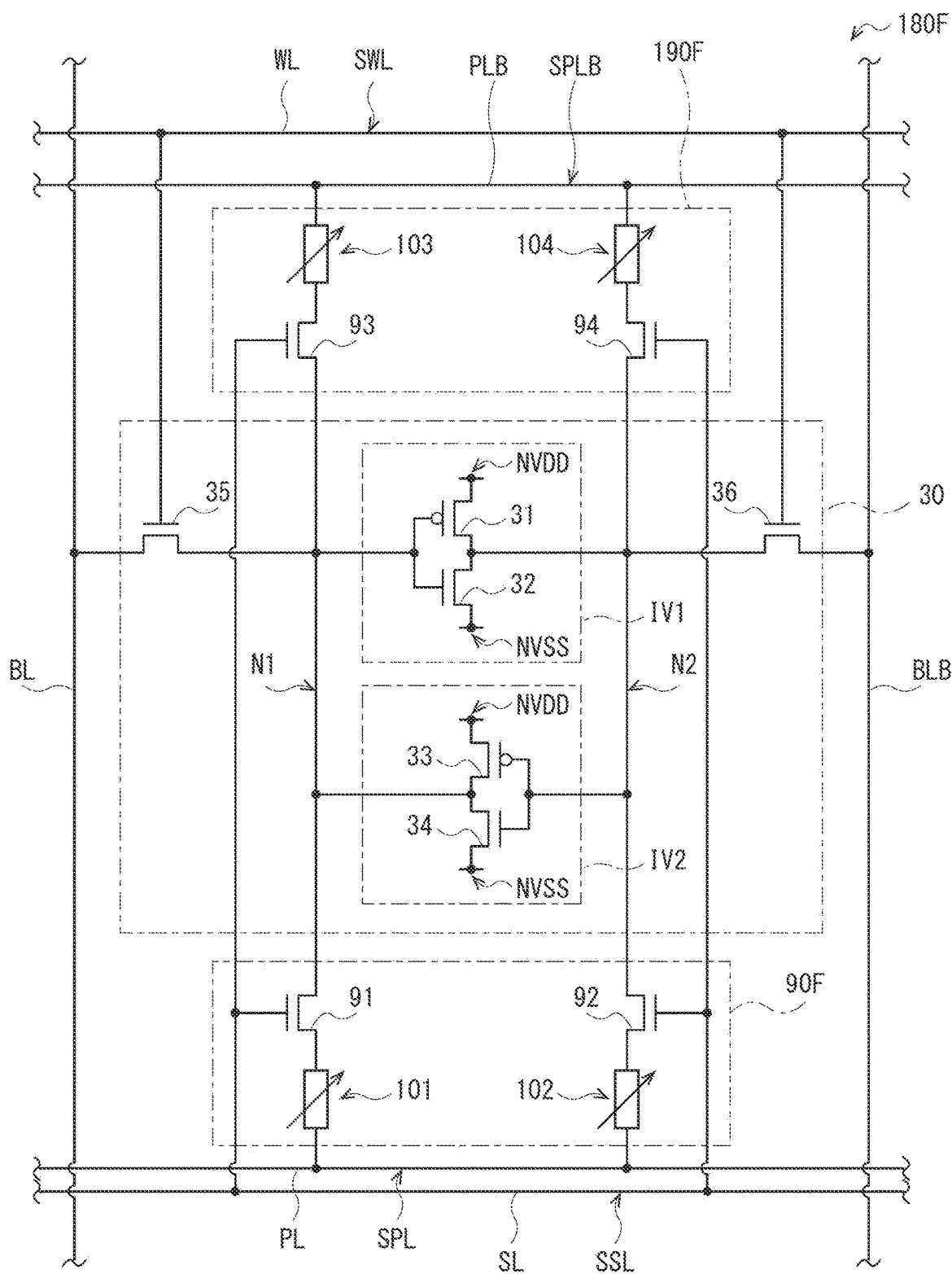

[FIG. 76]
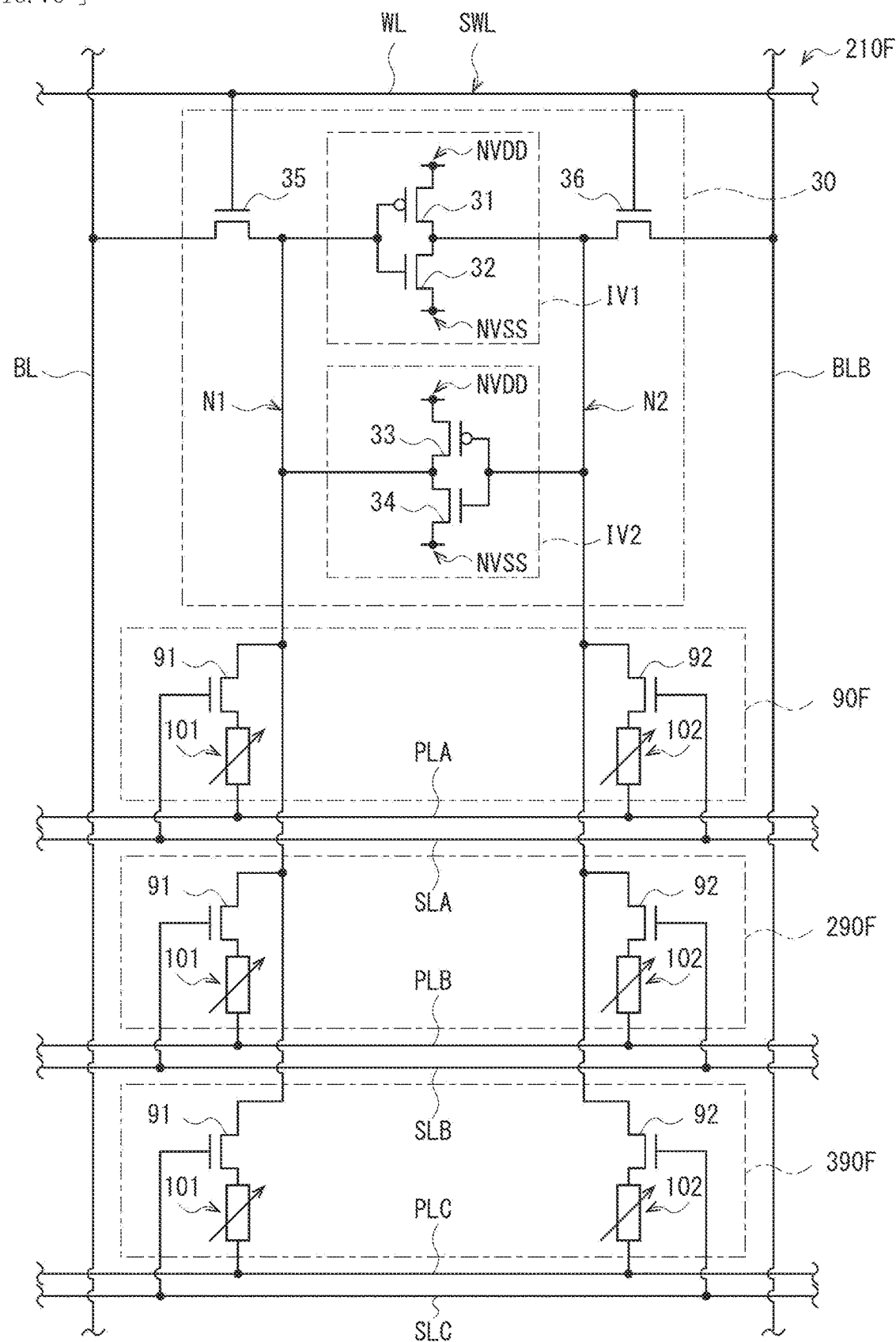

SEMICONDUCTOR CIRCUIT, DRIVING METHOD, AND ELECTRONIC APPARATUS

TECHNICAL FIELD

The present disclosure relates to a semiconductor circuit that is configured to store data, a driving method to be used in such a semiconductor circuit, and an electronic apparatus including such a semiconductor circuit.

BACKGROUND ART

Semiconductor circuits frequently use, for example, a technique for reducing power consumption by selectively stopping power supply to some of circuits. The technique is what is called power gating. A circuit to which power supply has been stopped in such a manner is desired to restore an operation state before stopping power supply, immediately after resuming the power supply. One method of achieving a restoring operation in such a short time is to incorporate a nonvolatile storage element in the circuit. For example, PTL 1 discloses a circuit including a combination of an SRAM (Static Random Access Memory) that is a volatile memory, and a nonvolatile storage element using a ferroelectric capacitor.

CITATION LIST

Patent Literature

PTL 1: Japanese Unexamined Patent Application Publication No. 2019-194931

SUMMARY OF THE INVENTION

Incidentally, for example, in a storage element using a ferroelectric capacitor or a ferroelectric transistor, for example, an initialization operation is performed in which an alternating-current signal is applied to the storage element before shipment. Ferroelectric characteristics of the storage element are improved by the initialization operation, which makes it possible for the storage element to stably store data. In particular, the initialization operation to be performed for the first time after manufacturing is also called a wakeup operation. This initialization operation is desired to be performed in a shorter time.

It is desirable to provide a semiconductor circuit, a driving method, and an electronic apparatus that make it possible to perform an initialization operation in a short time.

A semiconductor circuit according to an embodiment of the present disclosure includes a first inverter, a second inverter, a first control line, a first storage circuit, a first power supply switch, a second power supply switch, a first bit line and a second bit line, a first word line, a first transistor, a second transistor, and a driving section. The first inverter is coupled to a first power supply node and a second power supply node, is configured to generate an inverted voltage of a voltage at a first node, and is configured to apply the inverted voltage to a second node. The second inverter is coupled to the first power supply node and the second power supply node, is configured to generate an inverted voltage of a voltage at the second node, and is configured to apply the inverted voltage to the first node. The first storage circuit includes a first storage element provided on a first path coupling the first node and the first control line, and a second storage element provided on a second path coupling the second node and the first control line. The first power supply switch is configured to supply a first power supply voltage to the first power supply node by being turned on. The second power supply switch is configured to supply a second power supply voltage to the second power supply node by being turned on. The first transistor has a gate coupled to the first word line, and is configured to couple the first bit line and the first node by being turned on. The second transistor has a gate coupled to the first word line, and is configured to couple the second bit line and the second node by being turned on. The driving section is configured to perform a first driving operation and a second driving operation. In the first driving operation, in a period in which the first power supply switch and the second power supply switch are turned on, the first word line is set active, and signals having logic levels different from each other are applied to the respective first bit line and second bit line. In the second driving operation, in a period in which the first power supply switch and the second power supply switch are turned off, the first word line is set active, and a first alternating-current signal and a second alternating-current signal are respectively applied to the first bit line and the second bit line. The first alternating-current signal and the second alternating-current signal are signals in phase with each other.

A driving method according to an embodiment of the present disclosure includes: performing a first driving operation on a semiconductor circuit, the semiconductor circuit including a first inverter, a second inverter, a first control line, a first storage circuit, a first power supply switch, a second power supply switch, a first bit line and a second bit line, a first word line, a first transistor, and a second transistor, the first inverter that is coupled to a first power supply node and a second power supply node, is configured to generate an inverted voltage of a voltage at a first node, and is configured to apply the inverted voltage to a second node, the second inverter that is coupled to the first power supply node and the second power supply node, is configured to generate an inverted voltage of a voltage at the second node, and is configured to apply the inverted voltage to the first node, the first storage circuit including a first storage element provided on a first path coupling the first node and the first control line, and a second storage element provided on a second path coupling the second node and the first control line, the first power supply switch that is configured to supply a first power supply voltage to the first power supply node by being turned on, the second power supply switch that is configured to supply a second power supply voltage to the second power supply node by being turned on, the first transistor that has a gate coupled to the first word line, and is configured to couple the first bit line and the first node by being turned on, the second transistor that has a gate coupled to the first word line, and is configured to couple the second bit line and the second node by being turned on, the first driving operation in which, in a period in which the first power supply switch and the second power supply switch are turned on, the first word line is set active, and signals having logic levels different from each other are applied to the respective first bit line and second bit line; and performing a second driving operation in which, in a period in which the first power supply switch and the second power supply switch are turned off, the first word line is set active, and a first alternating-current signal and a second alternating-current signal are respectively applied to the first bit line and the second bit line, and the first alternating-current signal and the second alternating-current signal being signals in phase with each other.

An electronic apparatus according to an embodiment of the present disclosure includes the semiconductor circuit described above.

The semiconductor circuit, the driving method, and the electronic apparatus according to the embodiments of the present disclosure, the first inverter generates the inverted voltage of the voltage at the first node, and applies the inverted voltage to the second node. The second inverter generates the inverted voltage of the voltage at the second node, and applies the inverted voltage to the first node. The first inverter and the second inverter are coupled to the first power supply node and the second power supply node. The first power supply voltage is supplied to the first power supply node by turning on the first power supply switch, and the second power supply voltage is supplied to the second power supply node by turning on the second power supply switch. The first storage element is provided on the first path coupling the first node and the first control line, and the second storage element is provided on the second path coupling the second node and the first control line. The first bit line and the first node are coupled by turning on the first transistor, and the second bit line and the second node are coupled by turning on the second transistor. The first driving operation is performed in which, in the period in which the first power supply switch and the second power supply switch are turned on, the first word line is set active, and the signals having logic levels different from each other are applied to the respective first bit line and second bit line. In addition, the second driving operation is performed in which, in the period in which the first power supply switch and the second power supply switch are turned off, the first word line is set active, and the first alternating-current signal and the second alternating-current signal are respectively applied to the first bit line and the second bit line. The first alternating-current signal and the second alternating-current signal are signals in phase with each other.

BRIEF DESCRIPTION OF DRAWINGS

FIG. 1 is a block diagram illustrating a configuration example of a semiconductor circuit according to an embodiment of the present disclosure.

FIG. 2 is a circuit diagram illustrating a configuration example of a memory cell according to a first embodiment.

FIG. 3 is a circuit diagram illustrating a configuration example of a memory cell array including the memory cell illustrated in FIG. 2.

FIG. 4 is an explanatory diagram illustrating a coupling example between the memory cell array and power supply switch sections that are illustrated in FIG. 1.

FIG. 5 is an explanatory diagram illustrating another coupling example between the memory cell array and the power supply switch sections that are illustrated in FIG. 1.

FIG. 6 is an explanatory diagram illustrating another coupling example between the memory cell array and the power supply switch sections that are illustrated in FIG. 1.

FIG. 7 is a circuit diagram illustrating a configuration example of the power supply switch sections illustrated in FIG. 1.

FIG. 8 is a circuit diagram illustrating another configuration example of the power supply switch sections illustrated in FIG. 1.

FIG. 9 is a circuit diagram illustrating a configuration example of a driving section according to the first embodiment.

FIG. 10 is a circuit diagram illustrating a configuration example of the driving section according to the first embodiment.

FIG. 11 is a timing waveform diagram illustrating an operation example of a semiconductor circuit according to the first embodiment.

FIG. 12A is a circuit diagram illustrating an operation example of the memory cell illustrated in FIG. 2.

FIG. 12B is another circuit diagram illustrating an operation example of the memory cell illustrated in FIG. 2.

FIG. 12C is another circuit diagram illustrating an operation example of the memory cell illustrated in FIG. 2.

FIG. 12D is another circuit diagram illustrating an operation example of the memory cell illustrated in FIG. 2.

FIG. 12E is another circuit diagram illustrating an operation example of the memory cell illustrated in FIG. 2.

FIG. 13 is a timing waveform diagram illustrating an example of an initialization operation in the semiconductor circuit according to the first embodiment.

FIG. 14A is another circuit diagram illustrating an operation example of the memory cell illustrated in FIG. 2.

FIG. 14B is another circuit diagram illustrating an operation example of the memory cell illustrated in FIG. 2.

FIG. 15 is a timing waveform diagram illustrating an example of an initialization operation in a semiconductor circuit according to a comparative example.

FIG. 16A is another circuit diagram illustrating an operation example of a memory cell according to the comparative example.

FIG. 16B is another circuit diagram illustrating an operation example of the memory cell according to the comparative example.

FIG. 16C is another circuit diagram illustrating an operation example of the memory cell according to the comparative example.

FIG. 16D is another circuit diagram illustrating an operation example of the memory cell according to the comparative example.

FIG. 17 is a circuit diagram illustrating a configuration example of a driving section according to a modification example of the first embodiment.

FIG. 18 is a circuit diagram illustrating a configuration example of a driving section according to another modification example of the first embodiment.

FIG. 19 is a timing waveform diagram illustrating an example of an initialization operation in a semiconductor circuit according to another modification example of the first embodiment.

FIG. 20 is a circuit diagram illustrating a configuration example of a memory cell according to a modification example of the first embodiment.

FIG. 21 is a circuit diagram illustrating a configuration example of a memory cell array including the memory cell illustrated in FIG. 20.

FIG. 22 is a circuit diagram illustrating a configuration example of a driving section according to another modification example of the first embodiment.

FIG. 23 is a circuit diagram illustrating a configuration example of a driving section according to another modification example of the first embodiment.

FIG. 24 is a circuit diagram illustrating a configuration example of a memory cell according to a second embodiment.

FIG. 25 is a circuit diagram illustrating a configuration example of a memory cell array including the memory cell illustrated in FIG. 24.

FIG. 26 is a circuit diagram illustrating a configuration example of a driving section according to the second embodiment.

FIG. 27 is a timing waveform diagram illustrating an operation example of a semiconductor circuit according to the second embodiment.

FIG. 28 is a timing waveform diagram illustrating an example of an initialization operation in the semiconductor circuit according to the second embodiment.

FIG. 29 is a circuit diagram illustrating a configuration example of a driving section according to a modification example of the second embodiment.

FIG. 30 is a circuit diagram illustrating a configuration example of a memory cell according to another modification example of the second embodiment.

FIG. 31 is a circuit diagram illustrating a configuration example of a memory cell according to another modification example of the second embodiment.

FIG. 32 is a circuit diagram illustrating a configuration example of a memory cell array including the memory cell illustrated in FIG. 31.

FIG. 33 is a circuit diagram illustrating a configuration example of a driving section according to another modification example of the second embodiment.

FIG. 34 is a circuit diagram illustrating a configuration example of a driving section according to another modification example of the second embodiment.

FIG. 35 is a circuit diagram illustrating a configuration example of a memory cell according to a third embodiment.

FIG. 36 is a circuit diagram illustrating a configuration example of a memory cell array including the memory cell illustrated in FIG. 35.

FIG. 37 is a circuit diagram illustrating a configuration example of a driving section according to the third embodiment.

FIG. 38 is a timing waveform diagram illustrating an operation example of a semiconductor circuit according to the third embodiment.

FIG. 39A is a circuit diagram illustrating an operation example of the memory cell illustrated in FIG. 35.

FIG. 39B is another circuit diagram illustrating an operation example of the memory cell illustrated in FIG. 35.

FIG. 39C is another circuit diagram illustrating an operation example of the memory cell illustrated in FIG. 35.

FIG. 39D is another circuit diagram illustrating an operation example of the memory cell illustrated in FIG. 35.

FIG. 39E is another circuit diagram illustrating an operation example of the memory cell illustrated in FIG. 35.

FIG. 40 is a timing waveform diagram illustrating an example of an initialization operation in the semiconductor circuit according to the third embodiment.

FIG. 41A is another circuit diagram illustrating an operation example of the memory cell illustrated in FIG. 35.

FIG. 41B is another circuit diagram illustrating an operation example of the memory cell illustrated in FIG. 35.

FIG. 42 is a circuit diagram illustrating a configuration example of a driving section according to a modification example of the third embodiment.

FIG. 43 is a circuit diagram illustrating a configuration example of a memory cell according to another modification example of the third embodiment.

FIG. 44 is a circuit diagram illustrating a configuration example of a memory cell array including the memory cell illustrated in FIG. 43.

FIG. 45 is a circuit diagram illustrating a configuration example of a driving section according to another modification example of the third embodiment.

FIG. 46 is a circuit diagram illustrating a configuration example of a driving section according to another modification example of the third embodiment.

FIG. 47 is a circuit diagram illustrating a configuration example of a memory cell according to a fourth embodiment.

FIG. 48 is a circuit diagram illustrating a configuration example of a memory cell array including the memory cell illustrated in FIG. 47.

FIG. 49 is a circuit diagram illustrating a configuration example of a driving section according to the fourth embodiment.

FIG. 50 is a timing waveform diagram illustrating an operation example of a semiconductor circuit according to the fourth embodiment.

FIG. 51 is a timing waveform diagram illustrating an example of an initialization operation in the semiconductor circuit according to the fourth embodiment.

FIG. 52 is a circuit diagram illustrating a configuration example of a driving section according to a modification example of the fourth embodiment.

FIG. 53 is a circuit diagram illustrating a configuration example of a memory cell according to another modification example of the fourth embodiment.

FIG. 54 is a circuit diagram illustrating a configuration example of a memory cell array including the memory cell illustrated in FIG. 53.

FIG. 55 is a circuit diagram illustrating a configuration example of a driving section according to another modification example of the fourth embodiment.

FIG. 56 is a circuit diagram illustrating a configuration example of a driving section according to another modification example of the fourth embodiment.

FIG. 57 is a circuit diagram illustrating a configuration example of a memory cell according to a fifth embodiment.

FIG. 58 is a circuit diagram illustrating a configuration example of a memory cell array including the memory cell illustrated in FIG. 57.

FIG. 59 is a circuit diagram illustrating a configuration example of a driving section according to the fifth embodiment.

FIG. 60 is a timing waveform diagram illustrating an operation example of a semiconductor circuit according to the fifth embodiment.

FIG. 61 is a timing waveform diagram illustrating an example of an initialization operation in the semiconductor circuit according to the fifth embodiment.

FIG. 62 is a circuit diagram illustrating a configuration example of a driving section according to a modification example of the fifth embodiment.

FIG. 63 is a circuit diagram illustrating a configuration example of a memory cell according to a sixth embodiment.

FIG. 64 is a circuit diagram illustrating a configuration example of a memory cell array including the memory cell illustrated in FIG. 63.

FIG. 65 is a circuit diagram illustrating a configuration example of a driving section according to the sixth embodiment.

FIG. 66 is a timing waveform diagram illustrating an operation example of a semiconductor circuit according to the sixth embodiment.

FIG. 67A is a circuit diagram illustrating an operation example of the memory cell illustrated in FIG. 63.

FIG. 67B is another circuit diagram illustrating an operation example of the memory cell illustrated in FIG. 63.

FIG. 67C is another circuit diagram illustrating an operation example of the memory cell illustrated in FIG. 63.

FIG. 67D is another circuit diagram illustrating an operation example of the memory cell illustrated in FIG. 63.

FIG. 67E is another circuit diagram illustrating an operation example of the memory cell illustrated in FIG. 63.

FIG. 68 is a timing waveform diagram illustrating an example of an initialization operation in the semiconductor circuit according to the sixth embodiment.

FIG. 69A is another circuit diagram illustrating an operation example of the memory cell illustrated in FIG. 63.

FIG. 69B is another circuit diagram illustrating an operation example of the memory cell illustrated in FIG. 63.

FIG. 70 is a circuit diagram illustrating a configuration example of a memory cell according to a modification example of the sixth embodiment.

FIG. 71 is a perspective view of an appearance configuration of a smartphone to which the embodiment is applied.

FIG. 72 is a circuit diagram illustrating a configuration example of a memory cell according to a modification example.

FIG. 73 is a circuit diagram illustrating a configuration example of a memory cell according to another modification example.

FIG. 74 is a circuit diagram illustrating a configuration example of a memory cell according to another modification example.

FIG. 75 is a circuit diagram illustrating a configuration example of a memory cell according to another modification example.

FIG. 76 is a circuit diagram illustrating a configuration example of a memory cell according to another modification example.

MODES FOR CARRYING OUT THE INVENTION

Some embodiments of the present disclosure are described below in detail with reference to the drawings. It is to be noted that description is given in the following order.
1. First Embodiment
2. Second Embodiment
3. Third Embodiment
4. Fourth Embodiment
5. Fifth Embodiment
6. Sixth Embodiment
7. Application Examples

1. First Embodiment

[Configuration Example]

FIG. 1 illustrates a configuration example of a semiconductor circuit (a semiconductor circuit 1) according to an embodiment. The semiconductor circuit 1 is a circuit that stores data. The semiconductor circuit 1 includes a controller 11, a memory circuit 20, and power supply switch sections 12 and 13. The memory circuit 20 includes a memory cell array 21 and driving sections 22 and 26.

The controller 11 is configured to control an operation of the memory circuit 20. Specifically, the controller 11 writes data to the memory circuit 20 on the basis of a write command and write data that are supplied from outside, and read data from the memory circuit 20 on the basis of a read command supplied from outside. In addition, the controller 11 has a function of controlling supply of power supply voltages VDD and VSS to the memory cell array 21 by supplying a power supply control signal PSH to the power supply switch section 12 and supplying a power supply control signal PSL to the power supply switch section 13.

The memory cell array 21 includes a plurality of memory cells 10 arranged in a matrix.

FIG. 2 illustrates a configuration example of the memory cell 10. FIG. 3 illustrates a configuration example of the memory cell array 21. The memory cell array 21 includes a plurality of word lines WL, a plurality of bit lines BL, a plurality of bit lines BLB, and a plurality of control lines PL. The word lines WL extend in a horizontal direction in FIGS. 2 and 3. Each of the word lines WL has one end coupled to the driving section 22, and the driving section 22 applies a signal SWL to the word line WL. The bit lines BL extend in a vertical direction in FIGS. 2 and 3. Each of the bit lines BL has one end coupled to the driving section 26. The bit lines BLB extend in the vertical direction in FIGS. 2 and 3. Each of the bit lines BLB has one end coupled to the driving section 26. The control lines PL extend in the horizontal direction in FIGS. 2 and 3. Each of the control lines PL has one end coupled to the driving section 22, and the driving section 22 applies a signal SPL to the control line PL.

The memory cell 10 includes an SRAM circuit 30 and a storage circuit 40.

The SRAM circuit 30 is a volatile storage circuit, and is configured to store data for one bit by positive feedback. The SRAM circuit 30 includes transistors 31 to 36. The transistors 31 and 33 are P-type MOS transistors, and the transistors 32, 34, 35, and 36 are N-type MOS transistors.

The transistor 31 has a gate coupled to a node N1, a source coupled to a power supply node NVDD, and a drain coupled to a node N2. The transistor 32 has a gate coupled to the node N1, a source coupled to a power supply node NVSS, and a drain coupled to the node N2. The transistors 31 and 32 configure an inverter IV1. The inverter IV1 inverts a voltage VN1 at the node N1, and outputs a result of such inversion to the node N2. The transistor 33 has a gate coupled to the node N2, a source coupled to the power supply node NVDD, and a drain coupled to the node N1. The transistor 34 has a gate coupled to the node N2, a source coupled to the power supply node NVSS, and a drain coupled to the node N1. The transistors 33 and 34 configure an inverter IV2. The inverter IV2 inverts a voltage VN2 at the node N2, and outputs a result of such inversion to the node N1. The transistor 35 has a gate coupled to the word line WL, a source coupled to the bit line BL, and a drain coupled to the node N1. The transistor 36 has a gate coupled to the word line WL, a source coupled to the bit line BLB, and a drain coupled to the node N2.

With this configuration, an input terminal of the inverter IV1 and an output terminal of the inverter IV2 are coupled to each other through the node N1, and an input terminal of the inverter IV2 and an output terminal of the inverter IV1 are coupled to each other through the node N2. Accordingly, the SRAM circuit 30 stores data for one bit by positive feedback. Thereafter, the transistors 35 and 36 are turned on, thereby causing data to be written to the SRAM circuit 30 or read from the SRAM circuit 30 through the bit lines BL and BLB.

The storage circuit 40 includes storage elements 41 and 42. The storage elements 41 and 42 are nonvolatile storage elements, and are each configured with use of a ferroelectric capacitor in this example. Each of the storage elements 41 and 42 is configured to store information by using reversible change in capacitance state in accordance with polarity of a voltage difference between both ends The storage element 41 has one end coupled to the node N1, and another end coupled to the control line PL. The storage element 42 has one end coupled to the node N2, and another end coupled to the control line PL.

Each of the storage elements 41 and 42 is configured to set the capacitance state to a large capacitance state CH or a small capacitance state CL. The large capacitance state CL is a state in which a capacitance value between both ends is large, and the small capacitance state CS is a state in which the capacitance value between both ends is small. Specifically, for example, the storage element 41 sets the capacitance state to the small capacitance state CS in a case where a voltage at a terminal coupled to the node N1 is higher than a voltage at a terminal coupled to the control line PL by a predetermined amount or more, and sets the capacitance state to the large capacitance state CL in a case where the voltage at the terminal coupled to the node N1 is lower than the voltage at the terminal coupled to the control line PL by a predetermined amount or more. Likewise, for example, the storage element 42 sets the capacitance state to the small capacitance state CS in a case where a voltage at a terminal coupled to the node N2 is higher than a voltage at a terminal coupled to the control line PL by a predetermined amount or more, and sets the capacitance state to the large capacitance state CL in a case where the voltage at the terminal coupled to the node N2 is lower than the voltage at the terminal coupled to the control line PL by a predetermined amount or more.

The memory cell 10 includes the storage circuit 40 in addition to the SRAM circuit 30 in such a manner. Thus, for example, in a case where the power supply switch sections 12 and 13 (FIG. 1) are turned off to perform a standby operation, the semiconductor circuit 1 performs a store operation immediately before the standby operation, which makes it possible to store, in the storage circuit 40 that is a nonvolatile memory, data stored in the SRAM circuit 30 that is a volatile memory. Thereafter, the semiconductor circuit 1 performs a restore operation immediately after the standby operation, which makes it possible to store, in the SRAM circuit 30, the data stored in the storage circuit 40. Thus, in the semiconductor circuit 1, it is possible to restore the state of each memory cell 10 to a state before stopping power supply, in a short time after restarting power supply.

The storage elements 41 and 42 have insufficient ferroelectric characteristics immediately after manufacturing, and have difficulty in stably storing data. Accordingly, the semiconductor circuit 1 performs, for example, an initialization operation in which an alternating-current signals are applied to the storage elements 41 and 42 before shipment, which makes it possible to improve the ferroelectric characteristics of the storage elements 41 and 42, and makes it possible for the storage elements 41 and 42 to stably store data. It is to be noted that the semiconductor circuit 1 may perform the initialization operation not only before shipment but also, for example, on a regular basis after the shipment. Even in this case, it is possible for the storage elements 41 and 42 to stably store data. The semiconductor circuit 1 also has a function of performing such an initialization operation.

The power supply switch section 12 is configured to turn on or off supply of a power supply voltage VDD to the power supply node NVDD on the basis of the power supply control signal PSH. The power supply switch section 13 is configured to turn on or off supply of a power supply voltage VSS to the power supply node NVSS on the basis of the power supply control signal PSL.

FIG. 4 illustrates a configuration example of the power supply switch sections 12 and 13. The power supply switch section 12 includes a P-type MOS transistor. This transistor has a gate to be supplied with the power supply control signal PSH, a source to be supplied with the power supply voltage VDD, and a drain coupled to the node NVDD. The power supply switch section 13 includes an N-type MOS transistor. This transistor has a gate to be supplied with the power supply control signal PSL, a source to be supplied with the power supply voltage VSS, and a drain coupled to the node NVSS.

With this configuration, in the semiconductor circuit 1, in a case of operating the memory cell array 21, the power supply switch sections 12 and 13 are turned on to supply the power supply voltages VDD and VSS to the memory cell array 21. In addition, in the semiconductor circuit 1, in a case of not operating the memory cell array 21, the power supply switch sections 12 and 13 are turned off to stop supply of the power supply voltages VDD and VSS to the memory cell array 21. In the semiconductor circuit 1, it is possible to reduce power consumption by what is called power gating.

In an example in FIG. 4, power supply control is performed collectively on the entirety of the memory cell array 21, but this is not limitative. For example, as illustrated in FIGS. 5 and 6, power supply control may be performed on a portion of the memory cell array 21. In an example illustrated in FIG. 5, the memory cell array 21 is divided into four blocks in this example. Furthermore, the power supply switch section 12 includes four transistors each coupled to a corresponding one of the four blocks, and the power supply switch section 13 includes four transistors each coupled to a corresponding one of the four blocks. This makes it possible for the semiconductor circuit 1 to perform power supply control on each of the four blocks of the memory cell array 21 as a unit. Alternatively, in an example illustrated in FIG. 6, the power supply switch section 12 includes a plurality of transistors each coupled to a corresponding one of the plurality of memory cells 10 in the memory cell array 21, and the power supply switch section 13 includes a plurality of transistors each coupled to a corresponding one of the plurality of memory cells 10. This makes it possible for the semiconductor circuit 1 to perform power supply control on each of the plurality of memory cells 10 as a unit. Accordingly, in the examples illustrated in FIGS. 5 and 6, it is possible to perform finer power supply control.

In addition, in the example in FIG. 4, the power supply switch section 12 includes a P-type MOS transistor, and the power supply switch section 13 includes an N-type MOS transistor, but this is not limitative. Instead of this, for example, as illustrated in FIG. 7, the power supply switch section 12 may include a transfer gate including a P-type MOS transistor and an N-type MOS transistor, and the power supply switch section 13 may include a transfer gate including a P-type MOS transistor and an N-type MOS transistor. In addition, for example, as illustrated in FIG. 8, a drive circuit DRV may be provided that drives transistors in the power supply switch sections 12 and 13. The drive circuit DRV may adjust, for example, a delay time or adjust a slew rate.

The driving section 22 (FIG. 1) is configured to apply the signal SWL to the word lines WL and apply the signal SPL to the control lines PL on the basis of a control signal supplied from the controller 11.

FIG. 9 illustrates a configuration example of the driving section 22. The driving section 22 includes a driving controller 23, an address decoder 24, and a plurality of drive circuits 25.

The driving controller 23 is configured to control an operation of the driving section 22 on the basis of an instruction from the controller 11. Specifically, the driving controller 23 controls an operation of the address decoder 24, and controls operations of the plurality of drive circuits 25 with use of control signals WLEN, WLON, and PLON.

The address decoder 24 is configured to generate an address decode signal ADD by decoding an address to which data is to be written or an address from which data is to be read, on the basis of an instruction from the driving controller 23. The address decode signal ADD is a signal of a plurality of bits, and each of the plurality of bits corresponds to a corresponding one of the plurality of word lines WL in the memory cell array 21.

The plurality of drive circuits 25 is provided corresponding to the plurality of bits included in the address decode signal ADD, and is configured to drive the plurality of word lines WL and the plurality of control lines PL in the memory cell array 21. The drive circuits 25 each include a logical OR (OR) circuit 51, a logical AND (AND) circuit 52, and a buffer 53. The OR circuit 51 is configured to find OR of the control signal WLEN and a signal of a corresponding bit of the plurality of bits included in the address decode signal ADD. The AND circuit 52 is configured to find AND of an output signal of the OR circuit 51 and the control signal WLON, and drive the word line WL on the basis of the AND. The buffer 53 is configured to drive the control line PL on the basis of the control signal PLON.

With this configuration, for example, in a case of writing data to the memory cell array 21 or reading data from the memory cell array 21, the driving controller 23 changes the control signal WLEN to a low level, changes the control signal WLON to a high level, and changes the control signal PLON to the low level. Thereafter, the address decoder 24 generates the address decode signal ADD. This causes the driving section 22 to apply the signal SWL that is at the high level to one word line WL corresponding to the address decode signal ADD of the plurality of word lines WL, and apply the signal SWL that is at the low level to the plurality of word lines WL other than the one word line WL. In addition, the driving section 22 applies the signal SPL that is at the low level to all the control lines PL.

In addition, for example, in a case of storing data in the storage elements 41 and 42 or reading data from the storage elements 41 and 42, the driving controller 23 changes the control signal WLEN to the low level, changes the control signal WLON to the low level, and generates the control signal PLON. This causes the driving section 22 to apply the signal SWL that is at the low level to all the word lines WL and apply the signal SPL corresponding to the control signal PLON to all the control lines PL.

In addition, for example, in a case of performing the initialization operation on the storage elements 41 and 42 in the plurality of memory cells 10, the driving controller 23 changes the control signal WLEN to the high level, changes the control signal WLON to the high level, and changes the control signal PLON between the high level and the low level. This causes the driving section 22 to apply the signal SWL that is at the high level to all the word lines WL, and apply an alternating-current signal corresponding to the control signal PLON as the signal SPL to all the control lines PL.

The driving section 26 is configured to write data to the memory cell array 21 or read data from the memory cell array 21 through the bit lines BL and BLB on the basis of a control signal supplied from the controller 11.

FIG. 10 illustrates a configuration example of the driving section 26. FIG. 10 illustrates a circuit portion related to one pair of the bit lines BL and BLB in the driving section 26. The driving section 26 includes a driving controller 27, a writing circuit 28, a precharge circuit 29, and a sense amplifier 59.

The driving controller 27 is configured to control an operation of the driving section 26 on the basis of an instruction from the controller 11. Specifically, the driving controller 27 controls an operation of the writing circuit 28 with use of control signals WE and WU and a data signal DT, controls an operation of the precharge circuit 29 with use of a control signal PC, and receives a detection result of the sense amplifier 59.

The writing circuit 28 is configured to drive the bit lines BL and BLB on the basis of data to be written. The writing circuit 28 includes inverters 54 to 56, an OR circuit 61, an inverter 62, a transfer gate 63, an inverter 64, a transfer gate 65, an inverter 66, and a transfer gate 67.

The inverter 54 is configured to generate an inverted signal of the data signal DT representing the data to be written. The inverter 55 is configured to generate an inverted signal of an output signal of the inverter 54. The inverter 56 is configured to generate an inverted signal of the output signal of the inverter 54. The OR circuit 61 is configured to generate OR of the control signal WE and the control signal WU. The inverter 62 is configured to generate an inverted signal of an output signal of the OR circuit 61. The transfer gate 63 is configured to apply an output signal of the inverter 55 to the bit line BL on the basis of the output signal of the OR circuit 61 and an output signal of the inverter 62. The inverter 64 is configured to generate an inverted signal of the control signal WE. The transfer gate 65 is configured to apply the output signal of the inverter 54 to the bit line BLB on the basis of the control signal WE and an output signal of the inverter 64. The inverter 66 is configured to generate an inverted signal of the control signal WU. The transfer gate 67 is configured to apply an output signal of the inverter 56 to the bit line BLB on the basis of the control signal WU and an output signal of the inverter 66.

With this configuration, for example, in a case of writing data, the driving controller 27 changes the control signal WE to the high level, changes the control signal WU to the low level, and generates the data signal DT representing data to be written. This turns on the transfer gates 63 and 65, and the writing circuit 28 applies the data signal DT to the bit lines BL and applies the inverted signal of the data signal DT to the bit lines BLB.

In addition, for example, in a case of performing the initialization operation on the storage elements 41 and 42 in the plurality of memory cells 10, the driving controller 27 changes the control signal WE to the low level, changes the control signal WU to the high level, and changes the data signal DT between the high level and the low level. This turns on the transfer gates 63 and 67, and the writing circuit 28 applies alternating-current signals corresponding to the data signal DT to the bit lines BL and the bit lines BLB. In this case, a signal on the bit lines BL and a signal on the bit lines BLB are signals in phase with each other.

The precharge circuit 29 is configured to perform precharging on the bit lines BL and BLB. The precharge circuit 29 includes transistors 68 and 69. The transistors 68 and 69 are P-type MOS transistors. The transistor 68 has a gate to be supplied with the control signal PC, a source to be supplied with the power supply voltage VDD, and a drain coupled to the bit line BL. The transistor 69 has a gate to be supplied with the control signal PC, a source to be supplied with the power supply voltage VDD, and a drain coupled to the bit line BLB.

The sense amplifier 59 is configured to read data from the memory cell 10 on the basis of a voltage at the bit line BL and a voltage at the bit line BLB and supply a read result to the driving controller 27.

Here, the inverter IV1 corresponds to a specific example of a "first inverter" in the present disclosure. The inverter IV2 corresponds to a specific example of a "second inverter" in the present disclosure. The control line PL corresponds to a specific example of a "first control line" in the present disclosure. The storage circuit 40 corresponds to a specific example of a "first storage circuit" in the present disclosure. The storage element 41 corresponds to a specific example of a "first storage element" in the present disclosure. The storage element 42 corresponds to a specific example of a "second storage element" in the present disclosure. The power supply switch section 12 corresponds to a specific example of a "first power supply switch" in the present disclosure. The power supply switch section 13 corresponds to a specific example of a "second power supply switch" in the present disclosure. The transistor 35 corresponds to a specific example of a "first transistor" in the present disclosure. The transistor 36 corresponds to a specific example of a "second transistor" in the present disclosure. The driving sections 22 and 26 correspond to specific examples of a "driving section" in the present disclosure. The transfer gate 63 corresponds to a specific example of a "first switch" in the present disclosure. The transfer gate 65 corresponds to a specific example of a "second switch" in the present disclosure. The transfer gate 67 corresponds to a specific example of a "third switch" in the present disclosure.

[Operation and Workings]

Next, description is given of an operation and workings of the semiconductor circuit 1 according to the present embodiment.

(Overview of Overall Operation)

First, an overview of an overall operation of the semiconductor circuit 1 is described with reference to FIGS. 1 to 3. The controller 11 controls the operation of the memory circuit 20. Specifically, the controller 11 writes data to the memory circuit 20 on the basis of a write command and write data that are supplied from outside, and reads data from the memory circuit 20 on the basis of a read command supplied from outside. In addition, the controller 11 controls supply of power supply voltages VDD and VSS to the memory cell array 21 by supplying the power supply control signal PSH to the power supply switch section 12 and supplying the power supply control signal PSL to the power supply switch section 13. The power supply switch section 12 turns on or off supply of the power supply voltage VDD to the power supply node NVDD on the basis of the power supply control signal PSH. The power supply switch section 13 turns on or off supply of the power supply voltage VSS to the power supply node NVSS on the basis of the power supply control signal PSL. The power supply switch sections 12 and 13 are turned on, which causes the power supply voltage VDD and the power supply voltage VSS to be supplied to the memory cell array 21. The driving section 22 of the memory circuit 20 applies the signal SWL to the word lines WL and applies the signal SPL to the control lines PL on the basis of a control signal supplied from the controller 11. The driving section 26 writes data to the memory cell array 21 through the bit lines BL and BLB on the basis of a control signal and data that are supplied from the controller 11. In addition, the driving section 26 reads data from the memory cell array 21 through the bit lines BL and BLB and supplies the read data to the controller 11 on the basis of a control signal supplied from the controller 11.

(Detailed Operation)

The semiconductor circuit 1 causes data to be stored in the SRAM circuit 30 that is a volatile memory in a normal operation OP1. For example, in a case where the power supply switch sections 12 and 13 are turned off to perform a standby operation OP3, the semiconductor circuit 1 performs a store operation OP2 immediately before the standby operation OP3, which causes the data stored in the SRAM circuit 30 that is a volatile memory to be stored in the storage circuit 40 that is a nonvolatile memory. Thereafter, the semiconductor circuit 1 performs a restore operation OP4 immediately after the standby operation OP3, which causes the data stored in the storage circuit 40 to be stored in the SRAM circuit 30. This operation is described in detail below.

FIG. 11 illustrates an operation example of the memory cell 10 of interest in the semiconductor circuit 1, where (A) indicates a waveform of the power supply control signal PSH, (B) indicates a waveform of the power supply control signal PSL, (C) indicates a waveform of a voltage (a power supply voltage VDD1) at the power supply node NVDD, (D) indicates a waveform of the signal SPL, (E) indicates a waveform of a voltage (the voltage VN1) at the node N1, (F) indicates a waveform of a voltage (the voltage VN2) at the node N2, (G) indicates a waveform of a voltage (a voltage V41) at one end viewed from another end in the storage element 41, and (H) indicates a waveform of a voltage (a voltage V42) at one end viewed from another end in the storage element 42. FIGS. 12A to 12E each illustrate an operation state of the memory cell 10. FIG. 12A illustrates a state in the normal operation OP1. FIGS. 12B and 12C each illustrate a state in the store operation OP2. FIG. 12D illustrates a state in the standby operation OP3. FIG. 12E illustrates a state in the restore operation OP4. FIGS. 12A to 12E illustrate the inverters IV1 and IV2 with use of symbols.

(Normal Operation OP1)

The semiconductor circuit 1 performs the normal operation OP1 to thereby write data to the SRAM circuit 30 that is a volatile memory or read data from the SRAM circuit 30.

In the normal operation OP1, the controller 11 changes the power supply control signal PSH to the low level, and changes the power supply control signal PSL to the high level ((A) and (B) of FIG. 11). This turns on the power supply switch sections 12 and 13 (FIG. 1) to supply the power supply voltage VDD as the power supply voltage VDD1 to the memory cell array 21 ((C) of FIG. 11), and supply the power supply voltage VSS to the memory cell array 21. Thereafter, the driving section 22 changes the signal SPL to the low level (a low level voltage VL) ((D) of FIG. 11 and FIG. 12A).

In the normal operation OP1, the semiconductor circuit 1 writes data to the SRAM circuit 30 of the memory cell 10 or reads data from the SRAM circuit 30. Specifically, in a case of writing data to the SRAM circuit 30, first, the writing circuit 28 of the driving section 26 applies, to the bit lines BL and BLB, signals that have voltage levels inverted from each other and correspond to data to be written. In addition, the driving section 22 changes the signal SWL to the high level to thereby turn on the transistors 35 and 36 of the SRAM circuit 30. This causes data corresponding to voltages on the bit lines BL and BLB to be written to the SRAM circuit 30. In addition, in a case of reading data from the SRAM circuit 30, the precharge circuit 29 of the driving section 26 precharges each of the bit lines BL and BLB to a high level voltage in this example, and thereafter, the driving section 22 changes the signal SWL to the high level to thereby turn on the transistors 35 and 36. This causes the voltage on one of the bit lines BL and BLB to change in accordance with data stored in the SRAM circuit 30. Thereafter, the sense amplifier 59 of the driving section 26 detects a difference between the voltages on the bit lines BL and BLB to thereby read the data stored in the SRAM circuit 30.

(Store Operation OP2)

Next, description is given of the store operation OP2. The semiconductor circuit 1 performs the store operation OP2 before the standby operation OP3 to store, in the storage circuit 40, the data stored in the SRAM circuit 30.

In the store operation OP2, the memory cell 10 causes the data stored in the SRAM circuit 30 to be stored in the storage circuit 40 with use of two steps. First, the driving section 22 changes the signal SPL to the high level in a first step, and changes the signal SPL to the low level in a second step ((D) of FIG. 11). This causes the capacitance states of the storage elements 41 and 42 of the storage circuit 40 to be set in accordance with the data stored in the SRAM circuit 30.

Specifically, in the first step, as illustrated in FIG. 12B, the driving section 22 changes the signal SPL to the high level (a high level voltage VH). This causes a voltage difference between both ends of one of the storage elements 41 and 42. In this example, the voltage VN1 at the node N1 is the high level voltage VH, and the voltage VN2 at the node N2 is the low level voltage VL. Accordingly, in the memory cell 10, the voltage V42 at the one end viewed from the other end of the storage element 42 becomes "−ΔV". Here, "ΔV" is a difference (VH−VL) between the voltage VH and the voltage VL. Thus, the capacitance state of the storage element 42 changes to the large capacitance state CL. In contrast, the voltage V41 at the one end viewed from the other end of the storage element 41 is 0 V; therefore, the capacitance state of the storage element 41 does not change.

Next, in the second step, as illustrated in FIG. 12C, the driving section 22 changes the signal SPL to the low level (the low level voltage VL). This causes a voltage difference between both ends of the other one of the storage elements 41 and 42. In this example, in the memory cell 10, the voltage V41 at the one end viewed from the other end of the storage element 41 becomes "+ΔV". Thus, the capacitance state of the storage element 41 changes to the small capacitance state CS. In contrast, the voltage V42 at the one end viewed from the other end of the storage element 42 is 0 V; therefore, the capacitance state of the storage element 42 does not change, and maintains the large capacitance state CL.

It is to be noted that in this example, as illustrated in FIG. 11, the signal SPL is changed to the high level in the first step, and the signal SPL is changed to the low level in the second step, but this is not limitative. Instead of this, for example, the signal SPL may be changed to the low level in the first step, and the signal SPL may be changed to the high level in the second step.

Thus, in the memory cell 10, each of the capacitance states of the storage elements 41 and 42 is set in accordance with the data stored in the SRAM circuit 30.

(Standby Operation OP3)

Thereafter, the semiconductor circuit 1 performs the standby operation OP3 after the store operation OP2 by turning off the power supply switch sections 12 and 13.

In the standby operation OP3, the controller 11 changes the power supply control signal PSH to the high level, and changes the power supply control signal PSL to the low level ((A) and (B) of FIG. 11). This turns off the power supply switch sections 12 and 13 to stop supply of the power supply voltages VDD and VSS to the memory cell array 21 ((C) of FIG. 11). At this time, as illustrated in FIG. 12D, the capacitance states of the storage elements 41 and 42 are maintained.

(Restore Operation OP4)

Next, description is given of the restore operation OP4. In a case of performing the normal operation OP1 after the standby operation OP3, the semiconductor circuit 1 performs the restore operation OP4 to store, in the SRAM circuit 30, data stored in the storage elements 41 and 42.

In the restore operation OP4, the controller 11 changes the power supply control signal PSH to the low level, and changes the power supply control signal PSL to the high level ((A) and (B) of FIG. 11). This turns on the power supply switch sections 12 and 13 to supply the power supply voltage VDD as the power supply voltage VDD1 to the memory cell array 21 ((C) of FIG. 11), and supply the power supply voltage VSS to the memory cell array 21. Thereafter, the driving section 22 changes the signal SPL to the low level (the low level voltage VL) ((D) of FIG. 11 and FIG. 12E).

As illustrated in FIG. 12E, the node N1 is coupled to the control line PL through the storage element 41, and the node N2 is coupled to the control line PL through the storage element 42. The capacitance states of the storage elements 41 and 42 are different from each other; therefore, a voltage state in the SRAM circuit 30 is determined in accordance with the capacitance states of the storage elements 41 and 42. In this example, the capacitance state of the storage element 41 is the small capacitance state CS, and the capacitance state of the storage element 42 is the large capacitance state CL. Accordingly, in a case where the inverter IV2 drives the storage element 41 and the inverter IV1 drives the storage element 42, the voltage at the node N1 coupled to the storage element 41 having a small capacitance value easily becomes high, and the voltage at the node N2 coupled to the storage element 42 having a large capacitance value does not easily become high. As a result, the voltage VN1 at the node N1 becomes the high level voltage VH, and the voltage VN2 at the node N2 becomes the low level voltage VL. Thus, in the memory cell 10, the SRAM circuit 30 stores data in accordance with data stored in the storage elements 41 and 42.

Thereafter, the semiconductor circuit 1 performs the normal operation OP1 (FIG. 12A). After this, the semiconductor circuit 1 repeats the store operation OP2, the standby operation OP3, the restore operation OP4, and the normal operation OP1 in this order from then on.

In such a manner, the semiconductor circuit 1 performs the store operation OP2 immediately before the standby operation OP3, which causes data stored in the SRAM circuit 30 that is a volatile memory to be stored in the storage elements 41 and 42 of the storage circuit 40 that is a nonvolatile memory. Thereafter, the semiconductor circuit 1 performs the restore operation OP4 immediately after the standby operation OP3, which causes the data stored in the storage elements 41 and 42 to be stored in the SRAM circuit 30. Thus, in the semiconductor circuit 1, it is possible to restore the state of each memory cell 10 to the state before stopping power supply, in a short time after restarting power supply.

(About Initialization Operation)

The semiconductor circuit 1 performs, for example, the initialization operation in which alternating-current signal are applied to the storage elements 41 and 42 before shipment, which makes it possible to improve the ferroelectric characteristics of the storage elements 41 and 42, and makes it possible for the storage elements 41 and 42 to stably store data. Such an initialization operation is described in detail below.

FIG. 13 illustrates an example of the initialization operation on the memory cell 10 of interest in the semiconductor circuit 1, where (A) indicates the waveform of the power supply control signal PSH, (B) indicates the waveform of the power supply control signal PSL, (C) indicates a waveform of the signal SWL, (D) indicates a waveform of a signal SBL on the bit line BL, (E) indicates a waveform of a signal SBLB on the bit line BLB, (F) indicates the waveform of the signal SPL, and (G) indicates waveforms of voltages V41 and V42 on the storage elements 41 and 42.

The semiconductor circuit 1 starts an initialization operation OPinit at a timing t1. First, at the timing t1, the controller 11 changes the power supply control signal PSH to the high level, and changes the power supply control signal PSL to the low level ((A) of FIG. 13, and (B) of FIG. 13). This turns off the power supply switch sections 12 and 13 to stop supply of the power supply voltages VDD and VSS to the memory cell array 21.

Next, at a timing t2, the driving section 22 changes the signal SWL on all the word lines WL from the low level to the high level ((C) of FIG. 13). Specifically, in FIG. 9, the driving controller 23 changes the control signal WLEN to the high level, and changes the control signal WLON to the high level. Accordingly, the driving section 22 applies the signal SWL that is at the high level to all the word lines WL to set all the word lines WL active.

Next, in a period from a timing t3, the driving section 26 changes the signals SBL and SBLB on all the bit lines BL and BLB between the high level and the low level. Specifically, in FIG. 10, the driving controller 27 changes the control signal WE to the low level, changes the control signal WU to the high level, and changes the data signal DT between the high level and the low level. Accordingly, the transfer gates 63 and 67 are turned on, and the writing circuit 28 applies alternating-current signals corresponding to the data signal DT to the bit lines BL and the bit lines BLB. It is possible for the driving section 26 to apply the alternating-current signals to, for example, all the bit lines BL and all the bit lines BLB. In this example, the driving section 26 changes the signals SBL and SBLB from the low level to the high level at the timing t3, and changes the signals SBL and SBLB from the high level to the low level at a timing t4.

In addition, in a period from the timing t3, the driving section 22 changes the signal SPL on all the control lines PL between the high level and the low level. Specifically, in FIG. 9, the driving controller 23 changes the control signal PLON between the high level and the low level. This causes the driving section 22 to apply, as the signal SPL, an alternating-current signal corresponding to the control signal PLON to all the control lines PL. In this example, the driving section 22 changes the signal SPL from the low level to the high level at the timing t4, and changes the signal SPL from the high level to the low level at a timing 15.

FIG. 14A illustrates the operation state of the memory cell 10 in a period from the timing t3 to the timing t4, and FIG. 14B illustrates the operation state of the memory cell 10 in a period from the timing t4 to the timing t5. In the period from the timing t3 to the timing t4, as illustrated in FIG. 14A, the signals SBL and SBLB are at the high level (the high level voltage VH), and the signal SPL is at the low level (the low level voltage VL). Accordingly, the voltages V41 and V42 on the storage elements 41 and 42 become "+ΔV". In the period from the timing t4 to the timing t5, as illustrated in FIG. 14B, the signals SBL and SBLB are at the low level, and the signal SPL is at the high level. Accordingly, the voltages V41 and V42 on the storage elements 41 and 42 become "−ΔV". Thus, in the initialization operation OPinit, in each of two steps in a period from the timing t3 to the timing t5, both the voltages V41 and V42 on the storage elements 41 and 42 become "+V" or "−V".

In the initialization operation OPinit, the operation in the period from the timing t3 to the timing t5 is repeated, for example, about hundreds to thousands of times. In each of the memory cells 10, the alternating-current signals are applied to the storage elements 41 and 42 in such a manner. This consequently makes it possible to improve the ferroelectric characteristics of the storage elements 41 and 42.

As described above, in the semiconductor circuit 1, in the initialization operation OPinit, the power supply switch sections 12 and 13 are turned off. Thereafter, the driving section 26 applies the signals SBL and SBLB to the bit lines BL and BLB, and the driving section 22 applies the signal SPL that is an alternating-current signal to the control lines PL. The signal SBL and SBLB are alternating-current signals in phase with each other. This makes it possible for the semiconductor circuit 1 to perform the initialization operation in a short time, as compared with the following comparative example.

Comparative Example

Next, description is given of workings of the semiconductor circuit 1 according to the present embodiment in comparison with the comparative example. In a semiconductor circuit 1R according to the comparative example, as with the case of writing data to the memory cell array 21 or reading data from the memory cell array 21, the driving section 26 is configured to apply alternating-current signals in opposite phase to each other to the bit lines BL and BLB in the initialization operation OPinit.

FIG. 15 illustrates an example of the initialization operation on the memory cell 10 of interest in the semiconductor circuit 1R, where (A) indicates the waveform of the power supply control signal PSH, (B) indicates the waveform of the power supply control signal PSL, (C) indicates the waveform of the signal SWL, (D) indicates the waveform of the signal SBL on the bit line BL, (E) indicates the waveform of the signal SBLB on the bit line BLB, (F) indicates the waveform of the signal SPL, and (G) indicates the waveforms of the voltages V41 and V42 on the storage elements 41 and 42.

At a timing t11, the controller 11 of the semiconductor circuit 1R changes the power supply control signal PSH to the high level, and changes the power supply control signal PSL to the low level ((A) and (B) of FIG. 15). This turns off the power supply switch sections 12 and 13 to stop supply of the power supply voltages VDD and VSS to the memory cell array 21. Next, at a timing t12, the driving section 22 changes the signal SWL from the low level to the high level ((C) of FIG. 15).

Next, in a period from a timing t13, the driving section 26 changes the signals SBL and SBLB between the high level and the low level. In this example, the driving section 26 changes the signal SBL from the low level to the high level and changes the signal SBLB from the high level to the low level at the timing t13, and changes the signal SBL from the high level to the low level and changes the signal SBLB from the low level to the high level at a timing t15.

In addition, in the period from the timing t13, the driving section 22 changes the signal SPL between the high level and the low level. In this example, the driving section 22 changes the signal SPL from the low level to the high level at a timing t14, and changes the signal SPL from the high level to the low level at a timing t16.

FIG. 16A illustrates the operation state of the memory cell 10 in a period from the timing t13 to the timing t14. FIG. 16B illustrates the operation state of the memory cell 10 in a period from the timing t14 to the timing t15. FIG. 16C illustrates the operation state of the memory cell 10 in a period from the timing t15 to the timing t16. FIG. 16D illustrates the operation state of the memory cell 10 in a period from the timing t16 to a timing t17. In the period from the timing t13 to the timing t14, as illustrated in FIG. 16A, the signal SBL is at the high level, the signal SBLB is at the low level, and the signal SPL is at the low level. Accordingly, the voltage V41 on the storage element 41 becomes "+ΔV", and the voltage V42 on the storage element 42 becomes 0 V. In the period from the timing t14 to the timing t15, as illustrated in FIG. 16B, the signal SBL is at the high level, the signal SBLB is at the low level, and the signal SPL is at the high level. Accordingly, the voltage V41 on the storage element 41 becomes 0 V, and the voltage V42 on the storage element 42 becomes "−ΔV". In the period from the timing t15 to the timing t16, as illustrated in FIG. 16C, the signal SBL is at the low level, the signal SBLB is at the high level, and the signal SPL is at the high level. Accordingly, the voltage V41 on the storage element 41 becomes "−ΔV", and the voltage V42 on the storage element 42 becomes 0 V. In the period from the timing t16 to the timing t17, as illustrated in FIG. 16D, the signal SBL is at the low level, the signal SBLB is at the high level, and the signal SPL is at the low level. Accordingly, the voltage V41 on the storage element 41 becomes 0 V, and the voltage V42 on the storage element 42 becomes "+ΔV". In the initialization operation OPinit, in each of four steps in a period from the timing t13 to the timing t17, only one of the voltages V41 and V42 on the storage elements 41 and 42 becomes "+V" or "−V". In the initialization operation OPinit according to the comparative example, an operation including such four steps is repeated; therefore, it take time for the initialization operation OPinit.

In contrast, in the initialization operation OPinit according to the present embodiment, an operation including two steps is repeated as illustrated in FIGS. 13, 14A, and 14B, which makes it possible to shorten time for the initialization operation OPinit.

As described above, the semiconductor circuit 1 includes a first inverter (the inverter IV1) and a second inverter (the inverter IV2) that are coupled to a first power supply node (the power supply node NVDD) and a second power supply node (the power supply node NVSS), a first power supply switch (the power supply switch section 12) that is configured to supply a first power supply voltage (the power supply voltage VDD) to the first power supply node (the power supply node NVDD) by being turned on, a second power supply switch (the power supply switch section 13) that is configured to supply a second power supply voltage (the power supply voltage VSS) to the second power supply node (the power supply node NVSS) by being turned on, and driving sections 22 and 26. The driving sections 22 and 26 perform a first driving operation and a second driving operation. In the first driving operation, in a period in which the first power supply switch (the power supply switch section 12) and the second power supply switch (the power supply switch section 13) are turned on, the word line is turned on, and signals having logic levels different from each other are applied to respective first bit line (bit line BL) and second bit line (bit line BLB). In the second driving operation, in a period in which the first power supply switch (the power supply switch section 12) and the second power supply switch (the power supply switch section 13) are turned off, the word line WL is set active, and a first alternating-current signal and a second alternating-current signal are respectively applied to the first bit line (the bit line BL) and the second bit line (the bit line BLB). The first alternating-current signal and the second alternating-current signal are signals in phase with each other. In addition, in this example, a controller (the controller 11 and the driving sections 22 and 26) further applies a third alternating-current signal to a first control line (the control line PL) in the second driving operation. The third alternating-current signal is a signal in opposite phase to the first alternating-current signal and the second alternating-current signal. Accordingly, in the semiconductor circuit 1, power supply to the inverters IV1 and IV2 is stopped in the initialization operation OPinit, which makes it possible for the driving section 26 to set the voltages at the nodes N1 and N2 through the bit lines BL and BLB. Thereafter, the driving section 26 applies the alternating-current signals in phase with each other to the bit lines BL and BLB, which makes it possible to apply the alternating-current signals in phase with each other to two storage elements 41 and 42. Accordingly, in the semiconductor circuit 1, it is possible to simultaneously apply "+V" or "−V" to the two storage elements 41 and 42, which makes it possible to shorten time for the initialization operation OPinit.

In addition, in the semiconductor circuit 1, in the initialization operation OPinit, the plurality of word lines is set active, which makes it possible to simultaneously perform the initialization operation OPinit on the plurality of memory cells 10 coupled to the plurality of word lines WL. This makes it possible to shorten time for the initialization operation OPinit. In other words, if only one word line WL of the plurality of word lines WL can be set active as with a case of writing data, or the like, it is necessary to sequentially switch the word line WL to be set active of the plurality of word lines WL when performing the initialization operation OPinit on all the memory cells 10; therefore, it takes time for the initialization operation OPinit. In contrast, in the semiconductor circuit 1, in the initialization operation OPinit, the plurality of word lines WL is simultaneously set active, which makes it possible to simultaneously preform the initialization operation OPinit on the plurality of memory cells 10. This makes it possible to shorten time for the initialization operation OPinit.

[Effects]

As described above, in the present embodiment, there are provided the first inverter and the second inverter that are coupled to the first power supply node and the second power supply node, the first power supply switch that is configured to supply the first power supply voltage to the first power supply node by being turned on, the second power supply switch that is configured to supply the second power supply voltage to the second power supply node by being turned on, and the controller. The controller performs the first driving operation and the second driving operation. In the first driving operation, in the period in which the first power supply switch and the second power supply switch are turned on, the word lines are set active, and signals having logic levels different from each other are applied to the respective first bit line and second bit line. In the second driving operation, in the period in which the first power supply switch and the second power supply switch are turned off, the word lines are set active, and the first alternating-current signal and the second alternating-current signal that are signals in phase with each other are respectively applied to the first bit line and the second bit line. This makes it possible to shorten time for the initialization operation.

In the present embodiment, in the initialization operation, the plurality of word lines is set active, which makes it possible to shorten time for the initialization operation.

Modification Example 1-1

In the embodiment described above, as illustrated in FIG. 9, the driving section 22 applies the same signal SPL to all the control lines PL, but the embodiment is not limited thereto. Instead of this, for example, as with a driving section 22A illustrated in FIG. 17, the control lines PL may be selectively driven on the basis of the address decode signal ADD generated by the address decoder 24. The driving section 22A includes a plurality of drive circuits 25A. The drive circuits 25A each include an AND circuit 53A. The AND circuit 53A is configured to find AND of the control signal PLON and the output signal of the OR circuit 51 and drive the control line WL on the basis of the AND.

With this configuration, the semiconductor circuit according to the present modification example is configured to perform the store operation and the restore operation in row units. Specifically, the driving controller 23 changes the control signal WLEN to the low level, changes the control signal WLON to the low level, and generates the control signal PLON. Thereafter, the address decoder 24 generates the address decode signal ADD. This causes the driving section 22A to apply the signal SPL corresponding to the control signal PLON to one control line PL corresponding to the address decode signal ADD of the plurality of control lines PL, and apply the signal SPL that is at the low level to the plurality of control lines PL other than the one control line PL. This makes it possible for the semiconductor circuit according to the present modification example to perform the store operation and the restore operation in row units.

In addition, the semiconductor circuit according to the present modification example is configured to perform, for example, the initialization operation in row units. Specifically, the driving controller 23 changes the control signal WLEN to the low level, changes the control signal WLON to the high level, and changes the control signal PLON between the high level and the low level. Thereafter, the address decoder 24 generates the address decode signal ADD. This causes the driving section 22A to apply the signal SWL that is at the high level to one word line WL corresponding to the address decode signal ADD of the plurality of word lines WL, and apply the signal SWL that is at the low level to the plurality of word lines WL other than the one word line WL. In addition, the driving section 22A applies the signal SPL corresponding to the control signal PLON to one control line PL corresponding to the address decode signal ADD of the plurality of control lines PL, and applies the signal SPL that is at the low level to the plurality of control lines PL other than the one control line PL. This makes it possible for the semiconductor circuit according to the present modification example to perform the initialization operation in row units.

Modification Example 1-2

In the embodiment described above, as illustrated in FIG. 10, in a case of performing the initialization operation on the storage elements 41 and 42 in the plurality of memory cells 10, the writing circuit 28 of the driving section 26 applies the alternating-current signals to the bit lines BL and the bit lines BLB, but the embodiment is not limited thereto. Instead of this, as with a driving section 26B illustrated in FIG. 18, a precharge circuit may apply alternating-current signals to the bit lines BL and the bit lines BLB. The driving section 26B includes a driving controller 27B, a writing circuit 28B, and a precharge circuit 29B.

The driving controller 27B is configured to control an operation of the driving section 26 on the basis of an instruction from the controller 11. Specifically, the driving controller 27 controls an operation of the writing circuit 28B with use of the control signal WE and the data signal DT, controls an operation of the precharge circuit 29B with use of control signals PC and PD, and receives a detection result of the sense amplifier 59.

The writing circuit 28B includes the inverters 54 and 55, the inverter 62, the transfer gate 63, and the inverter 64. The writing circuit 28B is the writing circuit 28 according to the first embodiment described above from which the inverter 56, the OR circuit 61, the inverter 66, and the transfer gate 67 are omitted. The inverter 62 is configured to generate an inverted signal of the control signal WE. The transfer gate 63 is configured to apply an output signal of the inverter 55 to the bit line BL on the basis of the control signal WE and an output signal of the inverter 62.

The precharge circuit 29B is configured to perform precharging on the bit lines BL and BLB. The precharge circuit 29B includes transistors 68B and 69B. The transistors 68B and 69B are N-type MOS transistors. The transistor 68B has a gate to be supplied with the control signal PD, a source to be supplied with the power supply voltage VSS, and a drain coupled to the bit line BL. The transistor 69B has a gate to be supplied with the control signal PD, a source to be supplied with the power supply voltage VSS, and a drain coupled to the bit line BLB.

The transistor 68 corresponds to a specific example of a "fourth switch" in the present disclosure. The transistor 69 corresponds to a specific example of a "fifth switch" in the present disclosure. The transistor 68B corresponds to a specific example of a "sixth switch" in the present disclosure. The transistor 69B corresponds to a specific example of a "seventh switch" in the present disclosure.

With this configuration, for example, in a case of performing the initialization operation on the storage elements 41 and 42 in the plurality of memory cells 10, the driving controller 27B changes the control signals PC and PD between the high level and the low level. Accordingly, as with the writing circuit 28 according to the first embodiment described above, the precharge circuit 29B applies alternating-current signals that change between the high level and the low level to the bit line BL and the bit line BLB.

Modification Example 1-3

In the embodiment described above, as illustrated in FIG. 1, one memory circuit 20 is provided, but the embodiment is not limited thereto. Two or more memory circuits 20 may be provided. FIG. 19 illustrates an example of the initialization operation OPinit in a semiconductor circuit including two memory circuits 20, where (A) indicates the waveform of the power supply control signal PSH, (B) indicates the waveform of the power supply control signal PSL, (C) to (G) each indicate an operation waveform of one of the two memory circuits 20, and (H) to (L) each indicate an operation waveform of the other one of the two memory circuits 20. In (C) to (G) of FIG. 19, (C) indicates the waveform of the signal SWL (a signal SWL1), (D) indicates the waveform of the signal SBL (a signal SBL1) on the bit line BL, (E) indicates the waveform of the signal SBLB (a signal SBLB1) on the bit line BLB, (F) indicates the waveform of the signal SPL (a signal SPL1), and (G) indicates the waveforms of voltages V41 and V42 (voltages V411 and V421) on the storage elements 41 and 42. In (H) to (L) of FIG. 19, (H) indicates the waveform of the signal SWL (a signal SWL2), (I) indicates the waveform of the signal SBL (a signal SBL2) on the bit line BL, (J) indicates the waveform of the signal SBLB (a signal SBLB2) on the bit line BLB, and (K) indicates the waveform of the signal SPL (a signal SPL2), and (L) indicates the waveforms of voltages V41 and V42 (voltages V412 and V422) on the storage elements 41 and 42. In this example, the signals SBL1 and SBL2 on the two memory circuits 20 are in opposite phase to each other ((D) and (I) of FIG. 19), the signals SBLB on the two memory circuits 20 are in opposite phase to each other ((E) and (J) of FIG. 19), and the signals SPL1 and SPL2 on the two memory circuits 20 are in opposite phase to each other ((F) and (K) of FIG. 19). Thus, in the semiconductor circuit, the two memory circuits 20 operate with use of alternating-current signals in opposite phase to each other, which makes it possible to suppress, for example, a peak value of a power supply current, as compared with a case where the two memory circuits 20 operate with use of alternating-current signals in phase with each other.

Modification Example 1-4

In the embodiment described above, as illustrated in FIGS. 2 and 3, the plurality of control lines PL extending in the horizontal direction is provided, but the embodiment is not limited thereto. Instead of this, the plurality of control lines PL extending in the vertical direction may be provided. A semiconductor circuit according to the present modification example is described in detail below. As with the semiconductor circuit 1 (FIG. 1) according to the embodiment described above, the semiconductor circuit includes a memory cell array 21D, a driving section 22D, and a driving section 26D.

FIG. 20 illustrates a configuration example of the memory cell 10 in the memory cell array 21D. FIG. 21 illustrates a configuration example of the memory cell array 21D. In the memory cell array 21D, the word lines WL extend in the horizontal direction in FIGS. 20 and 21. Each of the word lines WL has one end coupled to the driving section 22D, and the driving section 22 applies the signal SWL to the word line WL. The control lines PL extend in the vertical direction in FIGS. 20 and 21. Each of the control lines PL has one end coupled to the driving section 26D, and the driving section 26D applies the signal SPL to the control line PL.

The driving section 22D is configured to apply the signal SWL to the word lines WL on the basis of a control signal supplied from the controller 11.

FIG. 22 illustrates a configuration example of the driving section 22D. The driving section 22D includes a driving controller 23D, the address decoder 24, and a plurality of drive circuits 25D.

The driving controller 23D is configured to control an operation of the driving section 22D on the basis of an instruction from the controller 11. Specifically, the driving controller 23D controls an operation of the address decoder 24, and controls operations of the plurality of drive circuits 25D with use of control signals WLEN and WLON.

The drive circuits 25D each include the OR circuit 51 and the AND circuit 52. The drive circuit 25D is the drive circuit 25 (FIG. 9) according to the first embodiment described above from which the buffer 53 is omitted.

The driving section 26D is configured to write data to the memory cell array 21 or read data from the memory cell array 21 through the bit lines BL and BLB on the basis of a control signal supplied from the controller 11. The driving section 26D also performs an operation for applying the signal SPL to the control lines PL on the basis of a control signal supplied from the controller 11.

FIG. 23 illustrates a circuit portion related to the control lines PL of the driving section 26D. The driving section 26D includes a driving controller 27D and a plurality of buffers 57D. As with the driving controller 27 (FIG. 10) according to the first embodiment described above, the driving controller 27D controls the operation of the writing circuit 28 with use of the control signals WE and WU and the data signal DT, controls the operation of the precharge circuit 29 with use of the control signal PC, and receives a detection result of the sense amplifier 59. The driving controller 27D also controls operations of the plurality of buffers 57D with use of the control signal PLON, as illustrated in FIG. 23. The plurality of buffers 57D drives the plurality of control lines PL in the memory cell array 21D on the basis of the control signal PLON.

Other Modification Examples

In addition, two or more of these modification examples may be combined.

2. Second Embodiment

Next, description is given of a semiconductor circuit 2 according to a second embodiment. In the present embodiment, transistors are provided in a storage circuit of each memory cell. It is to be noted that components substantially the same as those of the semiconductor circuit 1 according to the first embodiment described above are denoted by the same reference numerals, and description thereof is omitted as appropriate.

As with the semiconductor circuit 1 (FIG. 1) according to the first embodiment described above, the semiconductor circuit 2 includes a memory cell array 71, a driving section 72, and the driving section 26.

FIG. 24 illustrates a configuration example of a memory cell 80 in the memory cell array 71. FIG. 25 illustrates a configuration example of the memory cell array 71. The memory cell array 71 includes the plurality of word lines WL, the plurality of bit lines BL, the plurality of bit lines BLB, the plurality of control lines PL, and a plurality of control lines SL. The control lines SL extend in the horizontal direction in FIGS. 24 and 25. Each of the control lines SL has one end coupled to the driving section 72, and the driving section 72 applies a signal SSL to the control line PL.

The memory cell 80 includes the SRAM circuit 30 and a storage circuit 90. The storage circuit 90 includes transistors 91 and 92 and the storage elements 41 and 42. The transistors 91 and 92 are N-type MOS transistors. The transistor 91 has a gate coupled to the control line SL, a drain coupled to the node N1, and a source coupled to one end of the storage element 41. The transistor 92 has a gate coupled to the control line SL, a drain coupled to the node N2, and a source coupled to one end of the storage element 42.

The driving section 72 is configured to apply the signal SWL to the word lines WL, apply the signal SPL to the control lines PL, and apply the signal SSL to the control lines SL on the basis of a control signal supplied from the controller 11.

FIG. 26 illustrates a configuration example of the driving section 72. The driving section 72 includes a driving controller 73, the address decoder 24, and a plurality of drive circuits 75.

The driving controller 73 is configured to control an operation of the driving section 72 on the basis of an instruction from the controller 11. Specifically, the driving controller 73 controls an operation of the address decoder 24, and controls operations of the plurality of drive circuits 75 with use of the control signals WLEN, WLON, PLON, and SLON.

The plurality of drive circuits 75 each includes the OR circuit 51, the AND circuit 52, the buffer 53, and a buffer 58. The buffer 58 is configured to drive the control line SL on the basis of the control signal SLON.

With this configuration, for example, in a case of writing data to the memory cell array 71 or reading data from the memory cell array 71, the driving controller 73 changes the control signal WLEN to the low level, changes the control signal WLON to the high level, changes the control signal PLON to the low level, and changes the control signal SLON to the low level. Thereafter, the address decoder 24 generates the address decode signal ADD. This causes the driving section 72 to apply the signal SWL that is at the high level to one word line WL corresponding to the address decode signal ADD of the plurality of word lines WL, and apply the signal SWL that is at the low level to the plurality of word lines WL other than the one word line WL. In addition, the driving section 72 applies the signal SPL that is at the low level to all the control lines PL and applies the signal SSL that is at the low level to all the control lines SL.

In addition, for example, in a case of storing data in the storage elements 41 and 42 or reading data from the storage elements 41 and 42, the driving controller 73 changes the control signal WLEN to the low level, changes the control signal WLON to the low level, generates the control signal PLON, and changes the control signal SLON to the high level. This causes the driving section 72 to apply the signal SWL that is at the low level to all the word lines WL, apply the signal SPL corresponding to the control signal PLON to all the control lines PL, and apply the signal SSL that is at the high level to all the control lines SL.

In addition, for example, in a case of performing the initialization operation on the storage elements 41 and 42 in the plurality of memory cells 80, the driving controller 73 changes the control signal WLEN to the high level, changes the control signal WLON to the high level, changes the control signal SLON to the high level, and changes the control signal PLON between the high level and the low level. This causes the driving section 72 to apply the signal SWL that is at the high level to all the word lines WL, apply, as the signal SPL, an alternating-current signal corresponding to the control signal PLON to all the control lines PL, and apply the signal SSL that is at the high level to all the control lines SL.

Here, the storage circuit 90 corresponds to a specific example of a "first storage circuit" in the present disclosure. The transistor 91 corresponds to a specific example of a "third transistor" in the present disclosure. The transistor 92 corresponds to a specific example of a "fourth transistor" in the present disclosure.

FIG. 27 illustrates an operation example of the memory cell 80 of interest in the semiconductor circuit 2, where (A) indicates the waveform of the power supply control signal PSH, (B) indicates the waveform of the power supply control signal PSL, (C) indicates the waveform of the voltage (the power supply voltage VDD1) at the power supply node NVDD, (D) indicates a waveform of the signal SSL, (E) indicates the waveform of the signal SPL, (F) indicates the waveform of the voltage (the voltage VN1) at the node N1, (G) indicates the waveform of the voltage (the voltage VN2) at the node N2, (H) indicates the waveform of the voltage (the voltage V41) at one end viewed from another end in the storage element 41, and (I) indicates the waveform of the voltage (the voltage V42) at one end viewed from another end in the storage element 42.

(Normal Operation OP1)

In the normal operation OP1, the controller 11 changes the power supply control signal PSH to the low level, and changes the power supply control signal PSL to the high level ((A) and (B) of FIG. 27). This turns on the power supply switch sections 12 and 13 (FIG. 1) to supply the power supply voltage VDD as the power supply voltage VDD1 to the memory cell array 71 ((C) of FIG. 27), and supply the power supply voltage VSS to the memory cell array 71. Thereafter, the driving section 72 changes the signal SSL to the low level ((D) of FIG. 27). This turns off the transistors 91 and 92 (FIG. 24) to electrically separate the SRAM circuit 30 from the storage elements 41 and 42. In addition, the driving section 72 changes the signal SPL to the low level ((E) of FIG. 27).

In the normal operation OP1, the semiconductor circuit 2 writes data to the SRAM circuit 30 of the memory cell 80 or read data from the SRAM circuit 30. This operation is similar to that in the first embodiment described above.

(Store Operation OP2)

In the store operation OP2, the driving section 72 changes the signal SSL to the high level ((D) of FIG. 27). This turns on the transistors 91 and 92 (FIG. 24) to electrically couple the SRAM circuit 30 to the storage elements 41 and 42.

In the store operation OP2, the memory cell 80 causes the data stored in the SRAM circuit 30 to be stored in the storage circuit 90 with use of two steps. First, the driving section 72 changes the signal SPL to the high level in a first step, and changes the signal SPL to the low level in a second step ((E) of FIG. 27). This causes the capacitance states of the storage elements 41 and 42 of the storage circuit 90 to be set in accordance with the data stored in the SRAM circuit 30. This operation is similar to that in the first embodiment described above.

(Standby Operation OP3)

In the standby operation OP3, the controller 11 changes the power supply control signal PSH to the high level, and changes the power supply control signal PSL to the low level ((A) and (B) of FIG. 27). This turns off the power supply switch sections 12 and 13 to stop supply of the power supply voltages VDD and VSS to the memory cell array 71 ((C) of FIG. 27). At this time, the capacitance states of the storage elements 41 and 42 are maintained.

(Restore Operation OP4)

In the restore operation OP4, the driving section 72 changes the signal SSL to the high level ((D) of FIG. 27). This turns on the transistors 91 and 92 (FIG. 24) to electrically couple the SRAM circuit 30 to the storage elements 41 and 42.

Thereafter, the controller 11 changes the power supply control signal PSH to the low level, and changes the power supply control signal PSL to the high level ((A) and (B) of FIG. 27). This turns on the power supply switch sections 12 and 13 to supply the power supply voltage VDD as the power supply voltage VDD1 to the memory cell array 71

((C) of FIG. 27), and supply the power supply voltage VSS to the memory cell array 71. Thereafter, the driving section 72 changes the signal SPL to the low level ((E) of FIG. 27). Accordingly, the voltage state in the SRAM circuit 30 is determined in accordance with the capacitance states of the storage elements 41 and 42. This operation is similar to that in the first embodiment described above.

Thereafter, the driving section 72 changes the signal SSL to the low level ((D) of FIG. 27). This turns off the transistors 91 and 92 (FIG. 24) to electrically separate the SRAM circuit 30 from the storage elements 41 and 42.

(About Initialization Operation)

FIG. 28 illustrates an example of the initialization operation on the memory cell 80 of interest in the semiconductor circuit 2, where (A) indicates the waveform of the power supply control signal PSH, (B) indicates the waveform of the power supply control signal PSL, (C) indicates the waveform of the signal SWL, (D) indicates the waveform of the signal SSL, (E) indicates the waveform of the signal SBL on the bit line BL, (F) indicates the waveform of the signal SBLB on the bit line BLB, (G) indicates the waveform of the signal SPL, and (H) indicates the waveforms of voltages V41 and V42 on the storage elements 41 and 42.

First, at a timing t21, the controller 11 changes the power supply control signal PSH to the high level, and changes the power supply control signal PSL to the low level ((A) and (B) of FIG. 28). This turns off the power supply switch sections 12 and 13 to stop supply of the power supply voltages VDD and VSS to the memory cell array 71.

Next, at a timing t22, as with the first embodiment described above (FIG. 13), the driving section 72 changes the signal SWL on all the word lines WL from the low level to the high level ((C) of FIG. 28).

In addition, at the timing t22, the driving section 72 changes the signal SSL on all the control lines SL from the low level to the high level ((D) of FIG. 28). Specifically, in FIG. 26, the driving controller 73 changes the control signal SLON to the high level. This causes the driving section 72 to apply the signal SSL that is at the high level to all the control lines SL.

Next, in a period from a timing t23, as with the first embodiment described above (FIG. 13), the driving section 26 changes the signals SBL and SBLB on all the bit lines BL and BLB between the high level and the low level. In this example, the driving section 26 changes the signals SBL and SBLB from the low level to the high level at the timing t23, and changes the signals SBL and SBLB from the high level to the low level at a timing t24.

In addition, in the period from the timing t23, as with the first embodiment described above (FIG. 13), the driving section 72 changes the signal SPL on all the control lines PL between the high level and the low level. In this example, the driving section 72 changes the signal SPL from the low level to the high level at the timing t24, and changes the signal SPL from the high level to the low level at a timing t25.

Thus, in the initialization operation OPinit, as with the first embodiment described above (FIGS. 13, 14A, and 14B), for example, in each of two steps in a period from the timing t23 to the timing t25, both the voltages V41 and V42 on the storage elements 41 and 42 become "+V" or "−V"

In the initialization operation OPinit, the operation in the period from the timing t23 to the timing t25 is repeated, for example, about hundreds to thousands of times. In each of the memory cells 80, the alternating-current signals are applied to the storage elements 41 and 42 in such a manner. This consequently makes it possible to improve the ferroelectric characteristics of the storage elements 41 and 42.

In the semiconductor circuit 2, the transistors 91 and 92 are provided in the storage circuit 90 in such a manner. Accordingly, in the semiconductor circuit 2, for example, it is possible to electrically separate the SRAM circuit 30 from the storage elements 41 and 42 in the normal operation OP1. Thus, in the semiconductor circuit 2, it is possible to reduce power consumption and improve endurance, for example, in the normal operation OP1, as compared with a case where the SRAM circuit 30 is always coupled to storage elements 41 and 42.

As described above, in the present embodiment, transistors are provided in the storage circuit, which makes it possible to reduce power consumption and improve endurance. Other effects are similar to those in the first embodiment described above.

Modification Example 2-1

In the embodiment described above, as illustrated in FIG. 26, the driving section 72 applies the same signal SPL to all the control lines PL and applies the same signal SSL to all the control lines SL, but the embodiment is not limited thereto. Instead of this, for example, as with a driving section 72A illustrated in FIG. 29, the control lines PL may be selectively driven and the control lines SL may be selectively driven on the basis of the address decode signal ADD generated by the address decoder 24. The driving section 72A includes a plurality of drive circuits 75A. The drive circuits 75A each include AND circuits 53A and 58A. The AND circuit 53A is configured to find AND of the control signal PLON and the output signal of the OR circuit 51 and drive the control line WL on the basis of the AND. The AND circuit 58A is configured to find AND of the control signal SLON and the output signal of the OR circuit 51 and drive the control line SL on the basis of the AND.

With this configuration, the semiconductor circuit according to the present modification example is configured to perform the store operation and the restore operation in row units. Specifically, the driving controller 73 changes the control signal WLEN to the low level, changes the control signal WLON to the low level, generates the control signal PLON, and changes the control signal SLON to the high level. Thereafter, the address decoder 24 generates the address decode signal ADD. This causes the driving section 72A to apply the signal SPL corresponding to the control signal PLON to one control line PL corresponding to the address decode signal ADD of the plurality of control lines PL, and apply the signal SPL that is at the low level to the plurality of control lines PL other than the one control line PL. In addition, the driving section 72A applies the signal SSL that is at the high level to one control line SL corresponding to the address decode signal ADD of the plurality of control lines SL, and applies the signal SSL that is at the low level to the plurality of control lines SL other than the one control line SL. This makes it possible for the semiconductor circuit according to the present modification example to perform the store operation and the restore operation in row units.

In addition, the semiconductor circuit according to the present modification example is configured to perform, for example, the initialization operation in row units. Specifically, the driving controller 73 changes the control signal WLEN to the low level, changes the control signal WLON to the high level, changes the control signal PLON between the high level and the low level, and changes the control signal SLON to the high level. Thereafter, the address decoder 24 generates the address decode signal ADD. This causes the driving section 72A to apply the signal SWL that is at the high level to one word line WL corresponding to the address decode signal ADD of the plurality of word lines WL, and apply the signal SWL that is at the low level to the plurality of word lines WL other than the one word line WL. In addition, the driving section 72A applies the signal SPL corresponding to the control signal PLON to one control line PL corresponding to the address decode signal ADD of the plurality of control lines PL, and applies the signal SPL that is at the low level to the plurality of control lines PL other than the one control line PL. In addition, the driving section 72A applies the signal SSL that is at the high level to one control line SL corresponding to the address decode signal ADD of the plurality of control lines SL, and applies the signal SSL that is at the low level to the plurality of control lines SL other than the one control line SL. This makes it possible for the semiconductor circuit according to the present modification example to perform the initialization operation in row units.

Modification Example 2-2

In the embodiment described above, the transistor 91 is provided between the storage element 41 and the node N1, and the transistor 92 is provided between the storage element 42 and the node N2, but the embodiment is not limited thereto. Instead of this, for example, as with a memory cell 80B illustrated in FIG. 30, the storage element 41 and the transistor 91 may be replaced with each other, and the storage element 42 and the transistor 92 may be replaced with each other. The memory cell 80B includes a storage circuit 90B. In the storage circuit 90B, the storage element 41 has one end coupled to the node N1, and another end coupled to the drain of the transistor 91. The transistor 91 has the gate coupled to the control line SL, the drain coupled to the other end of the storage element 41, and the source coupled to the control line PL. The storage element 42 has one end coupled to the node N2, and another end coupled to the drain of the transistor 92. The transistor 92 has the gate coupled to the control line SL, the drain coupled to the other end of the storage element 42, and the source coupled to the control line PL.

Modification Example 2-3

In the embodiment described above, as illustrated in FIGS. 24 and 25, the plurality of control lines PL extending in the horizontal direction is provided, but the embodiment is not limited thereto. Instead of this, the plurality of control lines PL extending in the vertical direction may be provided. A semiconductor circuit according to the present modification example is described in detail below. As with the semiconductor circuit 1 (FIG. 1) according to the embodiment described above, the semiconductor circuit includes a memory cell array 71D, a driving section 72D, and a driving section 26D.

FIG. 31 illustrates a configuration example of the memory cell 80 in the memory cell array 71D. FIG. 32 illustrates a configuration example of the memory cell array 71D. In the memory cell array 71D, the word lines WL extend in the horizontal direction in FIGS. 31 and 32. Each of the word lines WL has one end coupled to the driving section 72D, and the driving section 72D applies the signal SWL to the word line WL. The control lines PL extend in the vertical direction in FIGS. 31 and 32. Each of the control lines PL has one end coupled to the driving section 26D, and the driving section 26D applies the signal SPL to the control line PL.

The driving section 72D is configured to apply the signal SWL to the word lines WL and apply the signal SSL to the control lines SL on the basis of a control signal supplied from the controller 11.

FIG. 33 illustrates a configuration example of the driving section 72D. The driving section 72D includes a driving controller 73D, the address decoder 24, and a plurality of drive circuits 75D.

The driving controller 73D is configured to control an operation of the driving section 72D on the basis of an instruction from the controller 11. Specifically, the driving controller 73D controls an operation of the address decoder 24, and controls operations of the plurality of drive circuits 75D with use of control signals WLEN, WLON, and SLON.

The drive circuits 75D each include the OR circuit 51, the AND circuit 52 and the buffer 58. The drive circuit 75D is the drive circuit 75 (FIG. 26) according to the second embodiment described above from which the buffer 53 is omitted.

It is possible for the driving section 26D to use a circuit configuration illustrated in FIG. 23.

It is to be noted that in this example, the driving section 72D is provided, but the embodiment is not limited thereto. For example, a driving section 72E illustrated in FIG. 34 may be provided. The driving section 72E includes a plurality of drive circuits 75E. The drive circuit 75E includes the AND circuit 58A. The AND circuit 58A is configured to find AND of the control signal SLON and the output signal of the OR circuit 51 and drive the control line SL on the basis of the AND. As with the driving section 72A described in the modification example 2-1 (FIG. 29), the driving section 72E is configured to selectively drive the control lines SL on the basis of the address decode signal ADD generated by the address decoder 24.

Other Modification Examples

For example, the technology of the embodiment described above may be combined with two or more of these modification examples. In addition, for example, the technology of the embodiment described above may be combined with one or more of the modification examples 1-2 and 1-3 of the first embodiment described above.

3. Third Embodiment

Next, description is given of a semiconductor circuit 3 according to a third embodiment. In the present embodiment, two storage circuits are provided in each memory cell. It is to be noted that components substantially the same as those of the semiconductor circuit 1 according to the first embodiment described above are denoted by the same reference numerals, and description thereof is omitted as appropriate.

As with the semiconductor circuit 1 (FIG. 1) according to the embodiment described above, the semiconductor circuit 3 includes a memory cell array 121, a driving section 122, and the driving section 26.

FIG. 35 illustrates a configuration example of a memory cell 110 in the memory cell array 121. FIG. 36 illustrates a configuration example of the memory cell array 121. The memory cell array 121 includes the plurality of word lines WL, the plurality of bit lines BL, the plurality of bit lines BLB, the plurality of control lines PL, and a plurality of control lines PLB. The control lines PLB extend in the horizontal direction in FIGS. 35 and 36. Each of the control lines PLB has one end coupled to the driving section 122, and the driving section 122 applies a signal SPLB to the control line PLB.

The memory cell 110 includes the SRAM circuit 30, the storage circuit 40, and a storage circuit 140. The storage circuit 140 includes storage elements 43 and 44. As with the storage elements 41 and 42, the storage elements 43 and 44 are nonvolatile storage elements, and are each configured with use of a ferroelectric capacitor in this example. The storage element 43 has one end coupled to the control line PLB, and another end coupled to the node N1. The storage element 44 has one end coupled to the control line PLB, and another end coupled to the node N2. For example, the storage element 43 sets the capacitance state to the small capacitance state CS in a case where a voltage at a terminal coupled to the control line PLB is higher than a voltage at a terminal coupled to the node N1 by a predetermined amount or more, and sets the capacitance state to the large capacitance state CL in a case where the voltage at the terminal coupled to the control line PLB is lower than the voltage at the terminal coupled to the node N1 by a predetermined amount or more. Likewise, for example, the storage element 44 sets the capacitance state to the small capacitance state CS in a case where a voltage at a terminal coupled to the control line PLB is higher than a voltage at a terminal coupled to the node N2 by a predetermined amount or more, and sets the capacitance state to the large capacitance state CL in a case where the voltage at the terminal coupled to the control line PLB is lower than the voltage at the terminal coupled to the node N2 by a predetermined amount or more.

The driving section 122 is configured to apply the signal SWL to the word lines WL, apply the signal SPL to the control lines PL, and apply the signal SPLB to the control lines PLB on the basis of a control signal supplied from the controller 11.

FIG. 37 illustrates a configuration example of the driving section 122. The driving section 122 includes the driving controller 23, the address decoder 24, and a plurality of drive circuits 125.

The driving controller 23 is configured to control an operation of the driving section 122 on the basis of an instruction from the controller 11. Specifically, the driving controller 23 controls an operation of the address decoder 24, and controls operations of the plurality of drive circuits 125 with use of control signals WLEN, WLON, and PLON.

The plurality of drive circuits 125 each includes the OR circuit 51, the AND circuit 52, the buffer 53, and an exclusive NOR (EXNOR) circuit 153. The EXNOR circuit 153 is configured to find EXNOR of the control signal PLON and the control signal WLEN and drive the control line PLB on the basis of the EXNOR.

With this configuration, for example, in a case of writing data to the memory cell array 121 or reading data from the memory cell array 121, the driving controller 23 changes the control signal WLEN to the low level, changes the control signal WLON to the high level, and changes the control signal PLON to the low level. Thereafter, the address decoder 24 generates the address decode signal ADD. This causes the driving section 122 to apply the signal SWL that is at the high level to one word line WL corresponding to the address decode signal ADD of the plurality of word lines WL, and apply the signal SWL that is at the low level to the plurality of word lines WL other than the one word line WL. In addition, the driving section 122 applies the signal SPL that is at the low level to all the control lines PL and applies the signal SPLB that is at the high level to all the control lines PLB.

In addition, for example, in a case of storing data in the storage elements 41 to 44 or reading data from the storage elements 41 to 44, the driving controller 23 changes the control signal WLEN to the low level, changes the control signal WLON to the low level, and generates the control signal PLON. This causes the driving section 122 to apply the signal SWL that is at the low level to all the word lines WL, apply the signal SPL corresponding to the control signal PLON to all the control lines PL, and apply the signal SPLB that is an inverted signal of the signal SPL to all the control lines PLB.

In addition, for example, in a case of performing the initialization operation on the storage elements 41 to 44 in the plurality of memory cells 110, the driving controller 23 changes the control signal WLEN to the high level, changes the control signal WLON to the high level, and changes the control signal PLON between the high level and the low level. This causes the driving section 122 to apply the signal SWL that is at the high level to all the word lines WL, apply, as the signal SPL, an alternating-current signal corresponding to the control signal PLON to all the control lines PL, and apply the signal SPLB that is the same as the signal SPL to all the control lines PLB.

Here, the control line PLB corresponds to a specific example of a "second control line" in the present disclosure. The storage circuit 140 corresponds to a specific example of a "second storage circuit" in the present disclosure. The storage element 43 corresponds to a specific example of a "third storage element" in the present disclosure. The storage element 44 corresponds to a specific example of a "fourth storage element" in the present disclosure.

FIG. 38 illustrates an operation example of the memory cell 110 of interest in the semiconductor circuit 3, where (A) indicates the waveform of the power supply control signal PSH, (B) indicates the waveform of the power supply control signal PSL, (C) indicates the waveform of the voltage (the power supply voltage VDD1) at the power supply node NVDD, (D) indicates the waveform of the signal SPL, (E) indicates a waveform of the signal SPLB, (F) indicates the waveform of the voltage (the voltage VN1) at the node N1, (G) indicates the waveform of the voltage (the voltage VN2) at the node N2, (H) indicates the waveform of the voltage (the voltage V41) at one end viewed from another end in the storage element 41, (I) indicates the waveform of the voltage (the voltage V42) at one end viewed from another end in the storage element 42, (J) indicates a waveform of a voltage (a voltage V43) at one end viewed from another end in the storage element 43, and (K) indicates a waveform of a voltage (a voltage V44) at one end viewed from another end in the storage element 44. FIGS. 39A to 39E each illustrate an operation state of the memory cell 110. FIG. 39A illustrates a state in the normal operation OP1. FIGS. 39B and 39C each illustrate a state in the store operation OP2. FIG. 39D illustrates a state in the standby operation OP3. FIG. 39E illustrates a state in the restore operation OP4.

(Normal Operation OP1)

In the normal operation OP1, the controller 11 changes the power supply control signal PSH to the low level, and changes the power supply control signal PSL to the high level ((A) and (B) of FIG. 38). This turns on the power supply switch sections 12 and 13 (FIG. 1) to supply the power supply voltage VDD as the power supply voltage VDD1 to the memory cell array 121 ((C) of FIG. 38), and supply the power supply voltage VSS to the memory cell array 121. Thereafter, the driving section 122 changes the signal SPL to the low level (the low level voltage VL) and changes the signal SPLB to the high level (the high level voltage VH) ((D) and (E) of FIG. 38 and FIG. 39A).

In the normal operation OP1, the semiconductor circuit 3 writes data to the SRAM circuit 30 of the memory cell 110 or reads data from the SRAM circuit 30. This operation is similar to that in the first embodiment described above.

(Store Operation OP2)

In the store operation OP2, the memory cell 110 causes the data stored in the SRAM circuit 30 to be stored in the storage circuits 40 and 140 with use of two steps. First, the driving section 122 changes the signal SPL to the high level and changes the signal SPLB to the low level in a first step, and changes the signal SPL to the low level and changes the signal SPLB to the high level in a second step ((D) and (E) of FIG. 38). This causes the capacitance states of the storage elements 41 to 44 of the storage circuit 40 and 140 to be set in accordance with the data stored in the SRAM circuit 30.

Specifically, in the first step, as illustrated in FIG. 39B, the driving section 122 changes the signal SPL to the high level (the high level voltage VH), and changes the signal SPLB to the low level (the low level voltage VL). This causes a voltage difference between both ends of one of the storage elements 41 and 42, and causes a voltage difference between both ends of one of the storage elements 43 and 44. In this example, the voltage VN1 at the node N1 is the high level voltage VH, and the voltage VN2 at the node N2 is the low level voltage VL. Accordingly, in the memory cell 110, the voltage V42 at the one end viewed from the other end of the storage element 42 becomes "−ΔV", and the voltage V43 at the one end viewed from the other end of the storage element 43 becomes "−ΔV". Thus, the capacitance states of the storage elements 42 and 43 change to the large capacitance state CL. In contrast, the voltage V41 at the one end viewed from the other end of the storage element 41 and the voltage V44 at the one end viewed from the other end of the storage element 44 are 0 V; therefore, the capacitance states of the storage elements 41 and 44 do not change.

Next, in the second step, as illustrated in FIG. 39C, the driving section 122 changes the signal SPL to the low level (the low level voltage VL), and changes the signal SPLB to the high level (the high level voltage VH). This causes a voltage difference between both ends of the other one of the storage elements 41 and 42, and causes a voltage difference between both ends of the other one of the storage elements 43 and 44. In this example, in the memory cell 110, the voltage V41 at the one end viewed from the other end of the storage element 41 becomes "+ΔV", and the voltage V44 at the one end viewed from the other end of the storage element 44 becomes "+ΔV". Thus, the capacitance states of the storage elements 41 and 44 change to the small capacitance state CS. In contrast, the voltage V42 at the one end viewed from the other end of the storage element 42 and the voltage V43 at the one end viewed from the other end of the storage element 43 are 0 V; therefore, the capacitance states of the storage elements 42 and 43 do not change, and maintains the large capacitance state CL.

Thus, in the memory cell 110, each of the capacitance states of the storage elements 41 to 44 is set in accordance with the data stored in the SRAM circuit 30.

(Standby Operation OP3)

In the standby operation OP3, the controller 11 changes the power supply control signal PSH to the high level, and changes the power supply control signal PSL to the low level ((A) and (B) of FIG. 38). This turns off the power supply switch sections 12 and 13 to stop supply of the power supply voltages VDD and VSS to the memory cell array 121 ((C) of FIG. 38). At this time, as illustrated in FIG. 39D, the capacitance states of the storage elements 41 to 44 are maintained.

(Restore Operation OP4)

In the restore operation OP4, the controller 11 changes the power supply control signal PSH to the low level, and changes the power supply control signal PSL to the high level ((A) and (B) of FIG. 38). This turns on the power supply switch sections 12 and 13 to supply the power supply voltage VDD as the power supply voltage VDD1 to the memory cell array 121 ((C) of FIG. 38), and supply the power supply voltage VSS to the memory cell array 121. Thereafter, the driving section 122 changes the signal SPL to the low level (the low level voltage VL) and changes the signal SPLB to the high level (the high level voltage VH) ((D) and (E) of FIG. 38 and FIG. 39E).

As illustrated in FIG. 39E, the node N1 is coupled to the control line PL through the storage element 41 and is coupled to the control line PLB through the storage element 43, and the node N2 is coupled to the control line PL through the storage element 42 and is coupled to the control line PLB through the storage element 44. The capacitance states of the storage elements 41 and 42 are different from each other, and the capacitance states of the storage elements 43 and 44 are different from each other; therefore, the voltage state in the SRAM circuit 30 is determined in accordance with the capacitance states of the storage elements 41 to 44. In this example, the capacitance states of the storage elements 41 and 44 are the small capacitance state CS, and the capacitance states of the storage elements 42 and 43 are the large capacitance state CL. Accordingly, in a case where the inverter IV2 drives the storage element 41 and the inverter IV1 drives the storage element 42, the voltage at the node N1 coupled to the storage elements 41 and 43 easily becomes high, and the voltage at the node N2 coupled to the storage elements 42 and 44 does not easily become high. As a result, the voltage VN1 at the node N1 becomes the high level voltage VH, and the voltage VN2 at the node N2 becomes the low level voltage VL. Thus, in the memory cell 110, the SRAM circuit 30 stores data in accordance with data stored in the storage elements 41 to 44.

(About Initialization Operation)

FIG. 40 illustrates an example of the initialization operation on the memory cell 110 of interest in the semiconductor circuit 3, where (A) indicates the waveform of the power supply control signal PSH, (B) indicates the waveform of the power supply control signal PSL, (C) indicates the waveform of the signal SWL, (D) indicates the waveform of the signal SBL on the bit line BL, (E) indicates the waveform of the signal SBLB on the bit line BLB, (F) indicates the waveform of the signal SPL, (G) indicates the waveform of the signal SPLB, (H) indicates waveforms of the voltages V41 and V42 on the storage elements 41 and 42, and (I) indicates waveforms of voltages V43 and V44 in the storage elements 43 and 44.

First, at a timing t31, the controller 11 changes the power supply control signal PSH to the high level, and changes the power supply control signal PSL to the low level ((A) and (B) of FIG. 40). This turns off the power supply switch sections 12 and 13 to stop supply of the power supply voltages VDD and VSS to the memory cell array 121.

Next, at a timing t32, the driving section 122 changes the signal SWL on all the word lines WL from the low level to the high level ((C) of FIG. 40). Specifically, in FIG. 37, the driving controller 23 changes the control signal WLEN to the high level, and changes the control signal WLON to the high level. Accordingly, the driving section 122 applies the signal SWL that is at the high level to all the word lines WL to set all the word lines WL active.

Next, in a period from a timing t33, the driving section 26 changes the signals SBL and SBLB on all the bit lines BL and BLB between the high level and the low level. Specifically, in FIG. 10, the driving controller 27 changes the control signal WE to the low level, changes the control signal WU to the high level, and changes the data signal DT between the high level and the low level. Accordingly, the transfer gates 63 and 67 are turned on, and the writing circuit 28 applies alternating-current signals corresponding to the data signal DT to the bit lines BL and the bit lines BLB. It is possible for the driving section 26 to apply the alternating-current signals to, for example, all the bit lines BL and all the bit lines BLB. In this example, the driving section 26 changes the signals SBL and SBLB from the low level to the high level at the timing t33, and changes the signals SBL and SBLB from the high level to the low level at a timing t34.

In addition, in a period from the timing t33, the driving section 122 changes the signal SPL on all the control lines PL and the signal SPLB on all the control lines PLB between the high level and the low level. Specifically, in FIG. 37, the driving controller 23 changes the control signal PLON between the high level and the low level. This causes the driving section 122 to apply, as the signal SPL, an alternating-current signal corresponding to the control signal PLON to all the control lines PL. In addition, the control signal WLEN is at the high level, which causes the driving section 122 to apply, as the signal SPLB, an alternating-current signal corresponding to the control signal PLON to all the control lines PLB. The signal SPL and the signal SPLB are in phase with each other. In this example, the driving section 122 changes the signals SPL and SPLB from the low level to the high level at a timing t34, and changes the signals SPL and SPLB from the high level to the low level at a timing t35.

FIG. 41A illustrates an operation state of the memory cell 110 in a period from the timing t33 to the timing t34, and FIG. 41B illustrates an operation state of the memory cell 110 in a period from the timing t34 to the timing t35. In the period from the timing t33 to the timing t34, as illustrated in FIG. 41A, the signals SBL and SBLB are at the high level (the high level voltage VH), and the signals SPL and SPLB are at the low level (the low level voltage VL). Accordingly, the voltages V41 and V42 on the storage elements 41 and 42 become "+ΔV", and the voltages V43 and V44 on the storage elements 43 and 44 become "−ΔV". In the period from the timing t34 to the timing t35, as illustrated in FIG. 41B, the signals SBL and SBLB are at the low level, and the signals SPL and SPLB are at the high level. Accordingly, the voltages V41 and V42 on the storage elements 41 and 42 become "−ΔV", and the voltages V43 and V44 on the storage elements 43 and 44 become "+ΔV". Thus, in the initialization operation OPinit, in each of two steps in a period from the timing t33 to the timing t35, all the voltages V41 to V44 on the storage elements 41 to 44 become "+V" or "−V".

In the initialization operation OPinit, the operation in the period from the timing t33 to the timing t35 is repeated, for example, about hundreds to thousands of times. In each of the memory cells 110, the alternating-current signals are applied to the storage elements 41 to 44 in such a manner. This consequently makes it possible to improve the ferroelectric characteristics of the storage elements 41 to 44.

In the semiconductor circuit 3, two storage circuits 40 and 140 are provided in each memory cell 110 in such a manner. Accordingly, for example, in the normal operation OP1, the capacitance states of the storage elements 41 and 43 coupled to the node N1 become different from each other, and the capacitance states of the storage elements 42 and 44 coupled to the node N2 become different from each other. Thus, a load capacitance value at the node N1 is substantially constant irrespective of the voltage VN1 at the node N1. Likewise, a load capacitance value at the node N2 is substantially constant irrespective of the voltage VN2 at the node N2. As a result, in the semiconductor circuit 3, for example, it is possible to reduce an influence that the storage elements 41 to 44 exert on the operation of the SRAM circuit 30 in the normal operation OP1, which makes it possible to achieve a stable operation.

As described above, in the semiconductor circuit 2, two storage circuits 40 and 140 are provided in each memory cell 110, which makes it possible to achieve a stable operation.

Modification Example 3-1

In the embodiment described above, as illustrated in FIG. 37, the driving section 122 applies the same signal SPL to all the control lines PL and applies the same signal SPLB to all the control lines PLB, but the embodiment is not limited thereto. Instead of this, for example, as with a driving section 122A illustrated in FIG. 42, the control lines PL may be selectively driven and the control lines PLB may be selectively driven on the basis of the address decode signal ADD generated by the address decoder 24. The driving section 122A includes a plurality of drive circuits 125A. The drive circuits 125A each include the AND circuit 53A and an EXNOR circuit 153A. The AND circuit 53A is configured to find AND of the control signal PLON and the output signal of the OR circuit 51 and drive the control line PL on the basis of the AND. The EXNOR circuit 153A is configured to find EXNOR of an output signal of the AND circuit 53A and the control signal WLEN and drive the control line PLB on the basis of the EXNOR.

With this configuration, the semiconductor circuit according to the present modification example is configured to perform the store operation and the restore operation in row units. Specifically, the driving controller 23 changes the control signal WLEN to the low level, changes the control signal WLON to the low level, and generates the control signal PLON. Thereafter, the address decoder 24 generates the address decode signal ADD. This causes the driving section 122A to apply the signal SPL corresponding to the control signal PLON to one control line PL corresponding to the address decode signal ADD of the plurality of control lines PL, and apply the signal SPL that is at the low level to the plurality of control lines PL other than the one control line PL. In addition, the driving section 122A applies, as the signal SPLB, inverted signals of the signals SPL on corresponding control lines PL to all the control lines PLB. This makes it possible for the semiconductor circuit according to the present modification example to perform the store operation and the restore operation in row units.

Modification Example 3-2

In the embodiment described above, as illustrated in FIGS. 35 and 36, the plurality of control lines PL and the plurality of control lines PLB extending in the horizontal direction are provided, but the embodiment is not limited thereto. Instead of this, the plurality of control lines PL and the plurality of control lines PLB extending in the vertical direction may be provided. A semiconductor circuit according to the present modification example is described in detail below. As with the semiconductor circuit 1 (FIG. 1) according to the embodiment described above, the semiconductor circuit includes a memory cell array 121D, a driving section 122D, and a driving section 126D.

FIG. 43 illustrates a configuration example of the memory cell 110 in the memory cell array 121D. FIG. 44 illustrates a configuration example of the memory cell array 121D. In the memory cell array 121D, the word lines WL extend in the horizontal direction in FIGS. 43 and 44. Each of the word lines WL has one end coupled to the driving section 122D, and the driving section 122D applies the signal SWL to the word line WL. The control lines PL extend in the vertical direction in FIGS. 43 and 44. Each of the control lines PL has one end coupled to the driving section 126D, and the driving section 126D applies the signal SPL to the control line PL. The control lines PLB extend in the vertical direction in FIGS. 43 and 44. Each of the control lines PLB has one end coupled to the driving section 126D, and the driving section 126D applies the signal SPLB to the control line PLB.

The driving section 122D is configured to apply the signal SWL to the word lines WL on the basis of a control signal supplied from the controller 11.

FIG. 45 illustrates a configuration example of the driving section 122D. The driving section 122D includes a driving controller 123D, the address decoder 24, and a plurality of drive circuits 125D.

The driving controller 123D is configured to control an operation of the driving section 122D on the basis of an instruction from the controller 11. Specifically, the driving controller 123D controls an operation of the address decoder 24, and controls operations of the plurality of drive circuits 125D with use of control signals WLEN and WLON. In addition, the driving controller 123D supplies this control signal to the driving section 126D.

The drive circuit 125D includes the OR circuit 51 and the AND circuit 52. The drive circuit 125D is the drive circuit 125 (FIG. 37) according to the third embodiment described above from which the buffer 53 and the EXNOR circuit 153 are omitted.

The driving section 126D is configured to write data to the memory cell array 21 or read data from the memory cell array 121 through the bit lines BL and BLB on the basis of a control signal supplied from the controller 11. The driving section 126D also performs an operation for applying the signal SPL to the control lines PL and applying the signal SPLB to the control lines PLB on the basis of a control signal supplied from the controller 11 and the control signal WLEN supplied from the driving section 122D.

FIG. 46 illustrates a circuit portion related to the control lines PL and PLB of the driving section 126D. The driving section 126D includes a driving controller 127D, an EXNOR circuit 153D, the plurality of buffers 57D, and a plurality of buffers 58D. As with the driving controller 27 (FIG. 10) according to the first embodiment described above, the driving controller 127D controls an operation of the writing circuit 28 with use of the control signals WE and WU and the data signal DT, controls an operation of the precharge circuit 29 with use of the control signal PC, and receives a detection result of the sense amplifier 59. In addition, the driving controller 127D controls operations of the plurality of buffers 57D with use of the control signal PLON, as illustrated in FIG. 46. The EXNOR circuit 153D is configured to find EXNOR of the control signal PLON and the control signal WLEN supplied from the driving controller 123D (FIG. 45). The plurality of buffers 57D drives the plurality of control lines PL in the memory cell array 121D on the basis of the control signal PLON. The plurality of buffers 58D drives the plurality of control lines PLB in the memory cell array 121D on the basis of an output signal of the EXNOR circuit 153D.

Other Modification Examples

For example, the technology of the embodiment described above may be combined with two or more of these modification examples. In addition, for example, the technology of the embodiment described above may be combined with one or more of the modification examples 1-2 and 1-3 of the first embodiment described above.

4. Fourth Embodiment

Next, description is given of a semiconductor circuit 4 according to a fourth embodiment. In the present embodiment, two storage circuits are provided in each memory cell, and transistors are provided in these storage circuits. It is to be noted that components substantially the same as those of the semiconductor circuit 3 according to the third embodiment described above are denoted by the same reference numerals, and description thereof is omitted as appropriate.

As with the semiconductor circuit 1 (FIG. 1) according to the first embodiment described above, the semiconductor circuit 4 includes a memory cell array 171, a driving section 172, and the driving section 26.

FIG. 47 illustrates a configuration example of a memory cell 180 in the memory cell array 171. FIG. 48 illustrates a configuration example of the memory cell array 171. The memory cell array 171 includes the plurality of word lines WL, the plurality of bit lines BL, the plurality of bit lines BLB, the plurality of control lines PL, the plurality of control lines PLB, and the plurality of control lines SL. The control lines PLB extend in the horizontal direction in FIGS. 47 and 48. Each of the control lines PLB has one end coupled to the driving section 172, and the driving section 172 applies the signal SPLB to the control line PLB. The control lines SL extend in the horizontal direction in FIGS. 47 and 48. Each of the control lines SL has one end coupled to the driving section 172, and the driving section 172 applies the signal SSL to the control line SL.

The memory cell 180 includes the SRAM circuit 30, the storage circuit 90, and a storage circuit 190. The storage circuit 190 includes transistors 93 and 94 and the storage elements 43 and 44. The transistors 93 and 94 are N-type MOS transistors. The transistor 93 has a gate coupled to the control line SL, a drain coupled to the node N1, and a source coupled to the storage element 43. The transistor 94 has a gate coupled to the control line SL, a drain coupled to the node N2, and a source coupled to the storage element 44. The storage element 43 has one end coupled to the control line PLB, and another end coupled to the source of the transistor 93. The storage element 44 has one end coupled to the control line PLB, and another end coupled to the source of the transistor 94. For example, the storage element 43 sets the capacitance state to the small capacitance state CS in a case where a voltage at a terminal coupled to the control line PLB is higher than a voltage at a terminal coupled to the source of the transistor 93, and sets the capacitance state to the large capacitance state CL in a case where the voltage at the terminal coupled to the control line PLB is lower than the voltage at the terminal coupled to the source of the transistor 93. Likewise, for example, the storage element 44 sets the capacitance state to the small capacitance state CS in a case where a voltage at a terminal coupled to the control line PLB is higher than a voltage at a terminal coupled to the source of the transistor 94, and sets the capacitance state to the large capacitance state CL in a case where the voltage at the terminal coupled to the control line PLB is lower than the voltage at the terminal coupled to the source of the transistor 94.

The driving section 172 is configured to apply the signal SWL to the word lines WL, apply the signal SPL to the control lines PL, apply the signal SPLB to the control lines PLB, and apply the signal SSL to the control lines SL on the basis of a control signal supplied from the controller 11.

FIG. 49 illustrates a configuration example of the driving section 172. The driving section 172 includes the driving controller 73, the address decoder 24, and a plurality of drive circuits 175.

The driving controller 73 is configured to control an operation of the driving section 172 on the basis of an instruction from the controller 11. Specifically, the driving controller 73 controls an operation of the address decoder 24, and controls operations of the plurality of drive circuits 175 with use of the control signals WLEN, WLON, PLON, and SLON.

The plurality of drive circuits 175 each includes the OR circuit 51, the AND circuit 52, the buffer 53, the EXNOR circuit 153, and the buffer 58. The EXNOR circuit 153 is configured to find EXNOR of the control signal PLON and the control signal WLEN and drive the control line PLB on the basis of the EXNOR. The buffer 58 is configured to drive the control line SL on the basis of the control signal SLON.

With this configuration, for example, in a case of writing data to the memory cell array 171 or reading data from the memory cell array 171, the driving controller 73 changes the control signal WLEN to the low level, changes the control signal WLON to the high level, changes the control signal PLON to the low level, and changes the control signal SLON to the low level. Thereafter, the address decoder 24 generates the address decode signal ADD. This causes the driving section 172 to apply the signal SWL that is at the high level to one word line WL corresponding to the address decode signal ADD of the plurality of word lines WL, and apply the signal SWL that is at the low level to the plurality of word lines WL other than the one word line WL. In addition, the driving section 172 applies the signal SPL that is at the low level to all the control lines PL, applies the signal SPLB that is at the high level to all the control lines PLB, and applies the signal SSL that is at the low level to all the control lines SL.

In addition, for example, in a case of storing data in the storage elements 41 to 44 or reading data from the storage elements 41 to 44, the driving controller 73 changes the control signal WLEN to the low level, changes the control signal WLON to the low level, generates the control signal PLON, and changes the control signal SLON to the high level. This causes the driving section 172 to apply the signal SWL that is at the low level to all the word lines WL, apply the signal SPL corresponding to the control signal PLON to all the control lines PL, apply the signal SPLB that is an inverted signal of the signal SPL to all the control lines PLB, and apply the signal SSL that is at the high level to all the control lines SL.

In addition, for example, in a case of performing the initialization operation on the storage elements 41 to 44 in the plurality of memory cells 180, the driving controller 73 changes the control signal WLEN to the high level, changes the control signal WLON to the high level, changes the control signal PLON between the high level and the low level, and changes the control signal SLON to the high level. This causes the driving section 172 to apply the signal SWL that is at the high level to all the word lines WL, apply, as the signal SPL, an alternating-current signal corresponding to the control signal PLON to all the control lines PL, apply the signal SPLB that is the same as the signal SPL to all the control lines PLB, and apply the signal SSL that is at the high level to all the control lines SL.

Here, the storage circuit 190 corresponds to a specific example of a "second storage circuit" in the present disclosure. The transistor 93 corresponds to a specific example of a "fifth transistor" in the present disclosure. The transistor 94 corresponds to a specific example of a "sixth transistor" in the present disclosure.

FIG. 50 illustrates an operation example of the memory cell 180 of interest in the semiconductor circuit 4, where (A) indicates the waveform of the power supply control signal PSH, (B) indicates the waveform of the power supply control signal PSL, (C) indicates the waveform of the voltage (the power supply voltage VDD1) at the power supply node NVDD, (D) indicates the waveform of the signal SSL, (E) indicates the waveform of the signal SPL, (F) indicates the waveform of the signal SPLB, (G) indicates the waveform of the voltage (the voltage VN1) at the node N1, (H) indicates the waveform of the voltage (the voltage VN2) at the node N2, (I) indicates the waveform of the voltage (the voltage V41) at one end viewed from another end in the storage element 41, (J) indicates the waveform of the voltage (the voltage V42) at one end viewed from another end in the storage element 42, (K) indicates the waveform of the voltage (the voltage V43) at one end viewed from another end in the storage element 43, and (L) indicates the waveform of the voltage (the voltage V44) at one end viewed from another end in the storage element 44.

(Normal Operation OP1)

In the normal operation OP1, the controller 11 changes the power supply control signal PSH to the low level, and changes the power supply control signal PSL to the high level ((A) and (B) of FIG. 50). This turns on the power supply switch sections 12 and 13 (FIG. 1) to supply the power supply voltage VDD as the power supply voltage VDD1 to the memory cell array 171 ((C) of FIG. 50), and supply the power supply voltage VSS to the memory cell array 171. Thereafter, the driving section 172 changes the signal SSL to the low level ((D) of FIG. 50). This turns off the transistors 91 to 94 (FIG. 47) to electrically separate the SRAM circuit 30 from the storage elements 41 to 44. In addition, the driving section 172 changes the signal SPL to the low level and changes the signal SPLB to the high level ((E) and (F) of FIG. 50).

In the normal operation OP1, the semiconductor circuit 4 writes data to the SRAM circuit 30 of the memory cell 180 or read data from the SRAM circuit 30. This operation is similar to that in the third embodiment described above.

(Store Operation OP2)

In the store operation OP2, the driving section 172 changes the signal SSL to the high level ((D) of FIG. 50). This turns on the transistors 91 to 94 (FIG. 47) to electrically couple the SRAM circuit 30 to the storage elements 41 to 44.

In the store operation OP2, the memory cell 180 causes the data stored in the SRAM circuit 30 to be stored in the storage circuits 90 and 190 with use of two steps. First, the driving section 172 changes the signal SPL to the high level and changes the signal SPLB to the low level in a first step, and changes the signal SPL to the low level and changes the signal SPLB to the high level in a second step ((E) and (F) of FIG. 50). This causes the capacitance states of the storage elements 41 to 44 of the storage circuits 90 and 190 to be set in accordance with the data stored in the SRAM circuit 30. This operation is similar to that in the third embodiment described above.

(Standby Operation OP3)

In the standby operation OP3, the controller 11 changes the power supply control signal PSH to the high level, and changes the power supply control signal PSL to the low level ((A) and (B) of FIG. 50). This turns off the power supply switch sections 12 and 13 to stop supply of the power supply voltages VDD and VSS to the memory cell array 171 ((C) of FIG. 50). At this time, the capacitance states of the storage elements 41 to 44 are maintained.

(Restore Operation OP4)

In the restore operation OP4, the driving section 172 changes the signal SSL to the high level ((D) of FIG. 50). This turns on the transistors 91 to 94 (FIG. 47) to electrically couple the SRAM circuit 30 to the storage elements 41 to 44.

Thereafter, the controller 11 changes the power supply control signal PSH to the low level, and changes the power supply control signal PSL to the high level ((A) and (B) of FIG. 50). This turns on the power supply switch sections 12 and 13 to supply the power supply voltage VDD as the power supply voltage VDD1 to the memory cell array 171 ((C) of FIG. 50), and supply the power supply voltage VSS to the memory cell array 171. Thereafter, the driving section 172 changes the signal SPL to the low level and changes the signal SPLB to the high level ((E) of FIG. 50). Accordingly, the voltage state in the SRAM circuit 30 is determined in accordance with the capacitance states of the storage elements 41 to 44. This operation is similar to that in the third embodiment described above.

Thereafter, the driving section 172 changes the signal SSL to the low level ((D) of FIG. 50). This turns off the transistors 91 to 94 (FIG. 47) to electrically separate the SRAM circuit 30 from the storage elements 41 to 44.

(About Initialization Operation)

FIG. 51 illustrates an example of the initialization operation on the memory cell 180 of interest in the semiconductor circuit 4, where (A) indicates the waveform of the power supply control signal PSH, (B) indicates the waveform of the power supply control signal PSL, (C) indicates the waveform of the signal SWL, (D) indicates the waveform of the signal SSL, (E) indicates the waveform of the signal SBL on the bit line BL, (F) indicates the waveform of the signal SBLB on the bit line BLB, (G) indicates the waveform of the signal SPL, (H) indicates the waveform of the signal SPLB, (I) indicates the waveforms of the voltages V41 and V42 on the storage elements 41 and 42, and (J) indicates the waveforms of the voltages V43 and V44 on the storage elements 43 and 44.

First, at a timing t41, the controller 11 changes the power supply control signal PSH to the high level, and changes the power supply control signal PSL to the low level ((A) and (B) of FIG. 51). This turns off the power supply switch sections 12 and 13 to stop supply of the power supply voltages VDD and VSS to the memory cell array 171.

Next, at a timing t42, as with the third embodiment described above (FIG. 40), the driving section 172 changes the signal SWL on all the word lines WL from the low level to the high level ((C) of FIG. 51).

In addition, at the timing t42, the driving section 172 changes the signal SSL on all the control lines SL from the low level to the high level ((D) of FIG. 51). Specifically, in FIG. 49, a driving controller 173 changes the control signal SLON to the high level. This causes the driving section 172 to apply the signal SSL that is at the high level to all the control lines SL.

Next, in a period from a timing t43, as with the third embodiment described above (FIG. 40), the driving section 26 changes the signals SBL and SBLB on all the bit lines BL and BLB between the high level and the low level. In this example, the driving section 26 changes the signals SBL and SBLB from the low level to the high level at the timing t43, and changes the signals SBL and SBLB from the high level to the low level at a timing t44.

In addition, in the period from the timing t43, as with the third embodiment described above (FIG. 40), the driving section 172 changes the signal SPL on all the control lines PL and the signal SPLB on all the control lines PLB between the high level and the low level. The signal SPL and the signal SPLB are in phase with each other. In this example, the driving section 172 changes the signals SPL and SPLB from the low level to the high level at the timing t44, and changes the signal SPL and SPLB from the high level to the low level at a timing t45.

Thus, in the initialization operation OPinit, as with the third embodiment described above (FIGS. 40, 41A, and 41B), for example, in each of two steps in a period from the timing t43 to the timing t45, all the voltages V41 to V44 on the storage elements 41 to 44 become "+V" or "−V".

In the initialization operation OPinit, the operation in the period from the timing t43 to the timing t45 is repeated, for example, about hundreds to thousands of times. In each of the memory cells 180, the alternating-current signals are applied to the storage elements 41 to 44 in such a manner. This consequently makes it possible to improve the ferroelectric characteristics of the storage elements 41 to 44.

In the semiconductor circuit 4, the transistors 91 and 92 are provided in the storage circuit 90, and the transistors 93 and 94 are provided in the storage circuit 190 in such a manner. Accordingly, in the semiconductor circuit 4, for example, it is possible to electrically separate the SRAM circuit 30 from the storage elements 41 to 44 in the normal operation OP1. Thus, in the semiconductor circuit 4, it is possible to reduce power consumption and improve endurance, for example, in the normal operation OP1, as compared with a case where the SRAM circuit 30 is always coupled to storage elements 41 to 44

As described above, in the present embodiment, transistors are provided in the storage circuits, which makes it possible to reduce power consumption and improve endurance. Other effects are similar to those in the third embodiment described above.

Modification Example 4-1

In the embodiment described above, as illustrated in FIG. 49, the driving section 172 applies the same signal SPL to all the control lines PL, applies the same signal SPLB to all the control lines PLB, and applies the same signal SSL to all the control lines SL, but the embodiment is not limited thereto. Instead of this, for example, as with a driving section 172A illustrated in FIG. 52, the control lines PL may be selectively driven, the control lines PLB may be selectively driven, and the control lines SL may be selectively driven on the basis of the address decode signal ADD generated by the address decoder 24. The driving section 172A includes a plurality of drive circuits 175A. The drive circuits 175A each include the AND circuit 53A, the EXNOR circuit 153A, and the AND circuit 58A. The AND circuit 53A is configured to find AND of the control signal PLON and the output signal of the OR circuit 51 and drive the control line PL on the basis of the AND. The EXNOR circuit 153A is configured to find EXNOR of the output signal of the AND circuit 53A and the control signal WLEN and drive the control line PLB on the basis of the EXNOR. The AND circuit 58A is configured to find AND of the control signal SLON and the output signal of the OR circuit 51 and drive the control line SL on the basis of the AND.

With this configuration, the semiconductor circuit according to the present modification example is configured to perform the store operation and the restore operation in row units. Specifically, the driving controller 73 changes the control signal WLEN to the low level, changes the control signal WLON to the low level, generates the control signal PLON, and changes the control signal SLON to the high level. Thereafter, the address decoder 24 generates the address decode signal ADD. This causes the driving section 172A to apply the signal SPL corresponding to the control signal PLON to one control line PL corresponding to the address decode signal ADD of the plurality of control lines PL, and apply the signal SPL that is at the low level to the plurality of control lines PL other than the one control line PL. In addition, the driving section 172A applies, as the signal SPLB, inverted signals of the signals SPL on corresponding control lines PL to all the control lines PLB. In addition, the driving section 172A applies the signal SSL that is at the high level to one control line SL corresponding to the address decode signal ADD of the plurality of control lines SL, and applies the signal SSL that is at the low level to the plurality of control lines SL other than the one control line SL. This makes it possible for the semiconductor circuit according to the present modification example to perform the store operation and the restore operation in row units.

Modification Example 4-2

In the embodiment described above, as illustrated in FIGS. 47 and 48, the plurality of control lines PL and the plurality of control lines PLB extending in the horizontal direction are provided, but the embodiment is not limited thereto. Instead of this, the plurality of control lines PL and the plurality of control lines PLB extending in the vertical direction may be provided. A semiconductor circuit according to the present modification example is described in detail below. As with the semiconductor circuit 1 (FIG. 1) according to the embodiment described above, the semiconductor circuit includes a memory cell array 171D, a driving section 172D, and the driving section 126D.

FIG. 53 illustrates a configuration example of the memory cell 180 in the memory cell array 171D. FIG. 54 illustrates a configuration example of the memory cell array 171D. In the memory cell array 171D, the word lines WL extend in the horizontal direction in FIGS. 53 and 54. Each of the word lines WL has one end coupled to the driving section 172D, and the driving section 172D applies the signal SWL to the word line WL. The control lines PL extend in the vertical direction in FIGS. 53 and 54. Each of the control lines PL has one end coupled to the driving section 126D, and the driving section 126D applies the signal SPL to the control line PL. The control lines PLB extend in the vertical direction in FIGS. 53 and 54. Each of the control lines PLB has one end coupled to the driving section 126D, and the driving section 126D applies the signal SPLB to the control line PLB.

The driving section 172D is configured to apply the signal SWL to the word lines WL and apply the signal SSL to the control lines SL on the basis of a control signal supplied from the controller 11.

FIG. 55 illustrates a configuration example of the driving section 172D. The driving section 172D includes a driving controller 173D, the address decoder 24, and a plurality of drive circuits 175D.

The driving controller 173D is configured to control an operation of the driving section 172D on the basis of an instruction from the controller 11. Specifically, the driving controller 173D controls an operation of the address decoder 24, and controls operations of the plurality of drive circuits 75D with use of control signals WLEN, WLON, and SLON. In addition, the driving controller 173D supplies this control signal to the driving section 126D The drive circuit 175D includes the OR circuit 51, the AND circuit 52, and the buffer 58. The drive circuit 175D is the drive circuit 175 (FIG. 49) according to the fourth embodiment described above from which the buffer 53 and the EXNOR circuit 153 are omitted.

It is possible for the driving section 126D to use a circuit configuration illustrated in FIG. 46.

It is to be noted that in this example, the driving section 172D is provided, but the embodiment is not limited thereto. For example, a driving section 172E illustrated in FIG. 56 may be provided. The driving section 172E includes a plurality of drive circuits 175E. The drive circuit 175E includes the AND circuit 58A. The AND circuit 58A is configured to find AND of the control signal SLON and the output signal of the OR circuit 51 and drive the control line SL on the basis of the AND. As with the driving section 172A described in the modification example 4-1 (FIG. 52), the driving section 172E is configured to selectively drive the control lines SL on the basis of the address decode signal ADD generated by the address decoder 24.

Other Modification Examples

For example, the technology of the embodiment described above may be combined with two or more of these modification examples. In addition, for example, the technology of the embodiment described above may be combined with one or more of the modification examples 1-2 and 1-3 of the first embodiment described above and the modification example 2-2 of the second embodiment described above.

5. Fifth Embodiment

Next, description is given of a semiconductor circuit 5 according to a fifth embodiment. In the present embodiment, three storage circuits are provided in each memory cell, transistors are provided in these storage circuits, and one of the three storage circuits is selectively used. It is to be noted that components substantially the same as those of the semiconductor circuit 2 according to the second embodiment described above are denoted by the same reference numerals, and description thereof is omitted as appropriate.

As with the semiconductor circuit 1 (FIG. 1) according to the first embodiment described above, the semiconductor circuit 5 includes a memory cell array 221, a driving section 222, and the driving section 26.

FIG. 57 illustrates a configuration example of a memory cell 210 in the memory cell array 221. FIG. 58 illustrates a configuration example of the memory cell array 221. The memory cell array 221 includes the plurality of word lines WL, the plurality of bit lines BL, the plurality of bit lines BLB, a plurality of control lines PLA, a plurality of control lines PLB, a plurality of control lines PLC, a plurality of control lines SLA, a plurality of control lines SLB, and a plurality of control lines SLC. The control lines PLA extend in the horizontal direction in FIGS. 57 and 58. Each of the control lines PLA has one end coupled to the driving section 222, and the driving section 222 applies a signal SPLA to the control line PLA. The control lines PLB extend in the horizontal direction in FIGS. 57 and 58. Each of the control lines PLB has one end coupled to the driving section 222, and the driving section 222 applies a signal SPLB to the control line PLA. The control lines PLC extend in the horizontal direction in FIGS. 57 and 58. Each of the control lines PLC has one end coupled to the driving section 222, and the driving section 222 applies a signal SPLC to the control line PLC. The control lines SLA extend in the horizontal direction in FIGS. 57 and 58. Each of the control lines SLA has one end coupled to the driving section 222, and the driving section 222 applies a signal SSLA to the control line SLA. The control lines SLB extend in the horizontal direction in FIGS. 57 and 58. Each of the control lines SLB has one end coupled to the driving section 222, and the driving section 222 applies a signal SSLB to the control line SLB. The control lines SLC extend in the horizontal direction in FIGS. 57 and 58. Each of the control lines SLC has one end coupled to the driving section 222, and the driving section 222 applies a signal SSLC to the control line SLC.

The memory cell 210 includes the SRAM circuit 30, the storage circuit 90, a storage circuit 290, and a storage circuit 390. The storage circuit 290 and the storage circuit 390 each include the transistors 91 and 92 and the storage elements 41 and 42, as with the storage circuit 90.

The driving section 222 is configured to apply the signal SWL to the word lines WL, respectively apply the signals SPLA, SPLB, and SPLC to the control lines PLA, PLB, and PLC, and respectively apply the signals SSLA, SSLB, and SSLC to the control lines SLA, SLB, and SLC on the basis of a control signal supplied from the controller 11.

FIG. 59 illustrates a configuration example of the driving section 222. The driving section 222 includes a driving controller 223, the address decoder 24, and a plurality of drive circuits 225.

The driving controller 223 is configured to control an operation of the driving section 222 on the basis of an instruction from the controller 11. Specifically, the driving controller 223 controls an operation of the address decoder 24, and controls operations of the plurality of drive circuits 225 with use of the control signals SELA, SELB, SELC, WLEN, WLON, PLON, and SLON.

The plurality of drive circuits 225 each includes the OR circuit 51, the AND circuit 52, an OR circuit 251, AND circuits 252 and 253, an OR circuit 261, AND circuits 262 and 263, an OR circuit 271, and AND circuits 272 and 273. The OR circuit 251 is configured to find OR of the control signal WLEN and the control signal SELA. The AND circuit 252 is configured to find AND of an output signal of the OR circuit 251 and the control signal PLON and drive the control line PLA on the basis of the AND. The AND circuit 253 is configured to find AND of the output signal of the OR circuit 251 and the control signal SLON and drive the control line SLA on the basis of the AND. The OR circuit 261 is configured to find OR of the control signal WLEN and the control signal SELB. The AND circuit 262 is configured to find AND of an output signal of the OR circuit 261 and the control signal PLON and drive the control line PLB on the basis of the AND. The AND circuit 263 is configured to find AND of the output signal of the OR circuit 261 and the control signal SLON and drive the control line SLB on the basis of the AND. The OR circuit 271 is configured to find OR of the control signal WLEN and the control signal SELC. The AND circuit 272 is configured to find AND of an output signal of the OR circuit 271 and the control signal PLON and drive the control line PLC on the basis of the AND. The AND circuit 273 is configured to find AND of the output signal of the OR circuit 271 and the control signal SLON and drive the control line SLC on the basis of the AND.

With this configuration, for example, in a case of writing data to the memory cell array 221 or reading data from the memory cell array 221, the driving controller 223 changes the control signal WLEN to the low level, changes the control signal WLON to the high level, changes the control signal PLON to the low level, and changes the control signal SLON to the low level. In addition, the driving controller 223 changes all the control signals SELA to SELC to the low level. Thereafter, the address decoder 24 generates the address decode signal ADD. This causes the driving section 222 to apply the signal SWL that is at the high level to one word line WL corresponding to the address decode signal ADD of the plurality of word lines WL, and apply the signal SWL that is at the low level to the plurality of word lines WL other than the one word line WL. In addition, the driving section 222 applies the signal SPLA that is at the low level to all the control lines PLA, applies the signal SPLB that is at the low level to all the control lines PLB, and applies the signal SPLC that is at the low level to all the control lines PLC. In addition, the driving section 222 applies the signal SSLA that is at the low level to all the control lines SLA, applies the signal SSLB that is at the low level to all the control lines SLB, and applies the signal SSLC that is at the low level to all the control lines SLC.

In addition, for example, in a case of storing data in the storage elements 41 and 42 in the storage circuit 90 or reading data from the storage elements 41 and 42 in the storage circuit 90, the driving controller 223 changes the control signal WLEN to the low level, changes the control signal WLON to the low level, generates the control signal PLON, and changes the control signal SLON to the high level. In addition, the driving controller 223 changes the control signal SELA to the high level, and changes the control signals SELB and SELC to the low level. This causes the driving section 222 to apply the signal SWL that is at the low level to all the word lines WL. In addition, the driving section 222 applies the signal SPLA corresponding to the control signal PLON to all the control lines PLA, applies the signal SPLB that is at the low level to all the control lines PLB, and applies the signal SPLC that is at the low level to all the control lines PLC. In addition, the driving section 222 applies the signal SSLA that is at the high level to all the control lines SLA, applies the signal SSLB that is at the low level to all the control lines SLB, and applies the signal SSLC that is at the low level to all the control lines SLC.

In addition, for example, in a case of performing the initialization operation on the storage elements 41 and 42 in the plurality of memory cells 210, the driving controller 223 changes the control signal WLEN to the high level, changes the control signal WLON to the high level, changes the control signal PLON between the high level and the low level, and changes the control signal SLON to the high level. This causes the driving section 222 to apply the signal SWL that is at the high level to all the word lines WL. In addition, the driving section 222 applies, as the signal SPLA, an alternating-current signal corresponding to the control signal PLON to all the control lines PLA, applies, as the signal SPLB, an alternating-current signal corresponding to the control signal PLON to all the control lines PLB, and applies, as the signal SPLC, an alternating-current signal corresponding to the control signal PLON to all the control lines PLC. In addition, the driving section 222 applies the signal SSLA that is at the high level to all the control lines SLA, applies the signal SSLB that is at the high level to all the control lines SLB, and applies the signal SSLC that is at the high level to all the control lines SLC.

Here, the storage circuit 90 corresponds to a specific example of a "first storage circuit" in the present disclosure. The control line PLA corresponds to a specific example of a "first control line" in the present disclosure. The storage circuit 290 corresponds to a specific example of a "second storage circuit" in the present disclosure. The control line PLB corresponds to a specific example of a "second control line" in the present disclosure.

FIG. 60 illustrates an operation example of the memory cell 210 of interest in the semiconductor circuit 5, where (A) indicates the waveform of the power supply control signal PSH, (B) indicates the waveform of the power supply control signal PSL, (C) indicates the waveform of the voltage (the power supply voltage VDD1) at the power supply node NVDD, (D) indicates a waveform of the signal SSLA, (E) indicates a waveform of the signal SPLA, (F) indicates the waveform of the voltage (the voltage VN1) at the node N1, (G) indicates the waveform of the voltage (the voltage VN2) at the node N2, (H) indicates the waveform of the voltage (the voltage V41) at one end viewed from another end in the storage element 41, and (I) indicates the waveform of the voltage (the voltage V42) at one end viewed from another end in the storage element 42. In this example, the store operation and the restore operation are performed on the storage circuit 90 of the three storage circuits 90, 290, and 390.

(Normal Operation OP1)

In the normal operation OP1, the controller 11 changes the power supply control signal PSH to the low level, and changes the power supply control signal PSL to the high level ((A) and (B) of FIG. 60). This turns on the power supply switch sections 12 and 13 (FIG. 1) to supply the power supply voltage VDD as the power supply voltage VDD1 to the memory cell array 221 ((C) of FIG. 60), and supply the power supply voltage VSS to the memory cell array 221. Thereafter, the driving section 222 changes the signal SSLA to the low level ((D) of FIG. 60). This turns off the transistors 91 and 92 (FIG. 57) in the storage circuit 90 to electrically separate the SRAM circuit 30 from the storage elements 41 and 42. In addition, the driving section 222 changes the signal SPLA to the low level ((E) of FIG. 60). Likewise, the driving section 222 changes the signals SSLB and SSLC to the low level and changes the signals SPLB and the SPLC to the low level.

In the normal operation OP1, the semiconductor circuit 5 writes data to the SRAM circuit 30 of the memory cell 210 or read data from the SRAM circuit 30. This operation is similar to that in the first embodiment described above.

(Store Operation OP2)

In the store operation OP2, the driving section 222 changes the signal SSLA to the high level ((D) of FIG. 60). It is to be noted that the driving section 222 maintains the signals SSLB and SSLC at the low level. This turns on the transistors 91 and 92 (FIG. 57) in the storage circuit 90 to electrically couple the SRAM circuit 30 to the storage elements 41 and 42 in the storage circuit 90.

In the store operation OP2, the memory cell 210 causes the data stored in the SRAM circuit 30 to be stored in the storage circuit 90 with use of two steps. First, the driving section 222 changes the signal SPLA to the high level in a first step, and changes the signal SPLA to the low level in a second step ((E) of FIG. 60). This causes the capacitance states of the storage elements 41 and 42 of the storage circuit 90 to be set in accordance with the data stored in the SRAM circuit 30. This operation is similar to that in the first embodiment described above.

(Standby Operation OP3)

In the standby operation OP3, the controller 11 changes the power supply control signal PSH to the high level, and changes the power supply control signal PSL to the low level ((A) and (B) of FIG. 60). This turns off the power supply switch sections 12 and 13 to stop supply of the power supply voltages VDD and VSS to the memory cell array 221 ((C) of FIG. 60). At this time, the capacitance states of the storage elements 41 and 42 are maintained.

(Restore Operation OP4)

In the restore operation OP4, the driving section 222 changes the signal SSLA to the high level ((D) of FIG. 60). It is to be noted that the driving section 222 maintains the signals SSLB and SSLC at the low level. This turns on the transistors 91 and 92 (FIG. 24) in the storage circuit 90 to electrically couple the SRAM circuit 30 to the storage elements 41 and 42 in the storage circuit 90.

Thereafter, the controller 11 changes the power supply control signal PSH to the low level, and changes the power supply control signal PSL to the high level ((A) and (B) of FIG. 60). This turns on the power supply switch sections 12 and 13 to supply the power supply voltage VDD as the power supply voltage VDD1 to the memory cell array 221 ((C) of FIG. 60), and supply the power supply voltage VSS to the memory cell array 221. Thereafter, the driving section 222 changes the signal SPLA to the low level ((E) of FIG. 60). Accordingly, the voltage state in the SRAM circuit 30 is determined in accordance with the capacitance states of the storage elements 41 and 42 of the storage circuit 90. This operation is similar to that in the first embodiment described above.

Thereafter, the driving section 222 changes the signal SSLA to the low level ((D) of FIG. 60). This turns off the transistors 91 and 92 (FIG. 57) in the storage circuit 90 to electrically separate the SRAM circuit 30 from the storage elements 41 and 42 in the storage circuit 90.

(About Initialization Operation)

FIG. 61 illustrates an example of the initialization operation on the memory cell 210 of interest in the semiconductor circuit 5, where (A) indicates the waveform of the power supply control signal PSH, (B) indicates the waveform of the power supply control signal PSL, (C) indicates the waveform of the signal SWL, (D) indicates waveforms of the signals SSLA, SSLB, and SSLC, (E) indicates the waveform of the signal SBL on the bit line BL, (F) indicates the waveform of the signal SBLB on the bit line BLB, (G) indicates waveforms of the signals SPLA, SPLB, and SPLC, and (H) indicates the waveforms of voltages V41 and V42 on the storage elements 41 and 42 in the storage circuits 90, 290, and 390.

First, at a timing t51, the controller 11 changes the power supply control signal PSH to the high level, and changes the power supply control signal PSL to the low level ((A) and (B) of FIG. 51). This turns off the power supply switch sections 12 and 13 to stop supply of the power supply voltages VDD and VSS to the memory cell array 221.

Next, at a timing t52, as with the first embodiment described above (FIG. 13), the driving section 222 changes the signal SWL on all the word lines WL from the low level to the high level ((C) of FIG. 61).

In addition, at the timing t52, the driving section 222 changes the signal SSLA on all the control lines SLA, the signals SSLB on all the control lines SLB, and the signal SSLC on all the control lines SLC from the low level to the high level ((D) of FIG. 61). Specifically, in FIG. 59, the driving controller 223 changes the control signal WLEN to the high level, and changes the control signal SLON to the high level. This causes the driving section 222 to apply the signal SSLA that is at the high level to all the control lines SLA, apply the signal SSLB that is at the high level to all the control lines SLB, and apply the signal SSLC that is at the high level to all the control lines SLC.

Next, in a period from a timing t53, as with the first embodiment described above (FIG. 13), the driving section 26 changes the signals SBL and SBLB on all the bit lines BL and BLB between the high level and the low level. In this example, the driving section 26 changes the signals SBL and SBLB from the low level to the high level at the timing t53, and changes the signals SBL and SBLB from the high level to the low level at a timing t54.

In addition, in the period from the timing t53, the driving section 222 changes the signal SPLA on all the control lines PLA, the signal SPLB on all the control lines PLB, and the signal SPLC on all the control lines PLC between the high level and the low level. Specifically, in FIG. 59, the driving controller 223 changes the control signal WLEN to the high level, and changes the control signal PLON between the high level and the low level. This causes the driving section 222 to apply, as the signal SPLA, an alternating-current signal corresponding to the control signal PLON to all the control lines PLA, apply, as the signal SPLB, an alternating-current signal corresponding to the control signal PLON to all the control lines PLB, and apply, as the signal SPLC, an alternating-current signal corresponding to the control signal PLON to all the control lines PLC. In this example, the driving section 222 changes the signal SPL from the low level to the high level at the timing t54, and changes the signal SPL from the high level to the low level at a timing t55.

Thus, in the initialization operation OPinit, as with the first embodiment described above (FIGS. 13, 14A, and 14B), in each of two steps in a period from the timing t53 to the timing t55, both the voltages V41 and V42 on the storage elements 41 and 42 become "+V" or "−V".

In the initialization operation OPinit, the operation in the period from the timing t53 to the timing t55 is repeated, for example, about hundreds to thousands of times. In each of the memory cells 210, the alternating-current signals are applied to the storage elements 41 and 42 in such a manner. This consequently makes it possible to improve the ferroelectric characteristics of the storage elements 41 and 42.

As described above, in the semiconductor circuit 5, it is possible to select one of the three storage circuits 90, 290, and 390 and store data in the storage elements 41 and 42 in the selected storage circuit or read data from the storage elements 41 and 42 in the selected storage circuit. This makes it possible to enhance a degree of freedom in operation in the semiconductor circuit 5.

In addition, in the semiconductor circuit 5, in a case of performing the initialization operation OPinit, it is possible to simultaneously preform the initialization operation OPinit on all the storage elements 41 and 42 in the three storage circuits 90, 290, and 390. This makes it possible to shorten time for the initialization operation OPinit. Other effects are similar to those in the first embodiment described above.

Modification Example 5-1

In the embodiment described above, as illustrated in FIG. 59, the driving section 222 applies the same signal SPLA to all the control lines PLA, applies the same signal SPLB to all the control lines PLB, applies the same signal SPLC to all the control lines PLC, applies the same signal SSLA to all the control lines SLA, applies the same signal SSLB to all the control lines SLB, and applies the same signal SSLC to all the control lines SLC, but the embodiment is not limited thereto. Instead of this, for example, as with a driving section 222A illustrated in FIG. 62, the control lines PLA and the control lines SLA may be selectively driven, the control lines PLB and the control lines SLB may be selectively driven, and the control lines PLC and the control lines SLC may be selectively driven on the basis of the address decode signal ADD generated by the address decoder 24. The driving section 222A includes a plurality of drive circuits 225A. The drive circuits 225A each include AND circuits 252A and 253A, AND circuits 262A and 263A, and AND circuits 272A and 273A. The AND circuit 252A is configured to find AND of the output signal of the OR circuit 251, the output signal of the OR circuit 51, and the control signal PLON and drive the control line PLA on the basis of the AND. The AND circuit 253A is configured to find AND of the output signal of the OR circuit 251, the output signal of the OR circuit 51, and the control signal SLON and drive the control line SLA on the basis of the AND. The AND circuit 262A is configured to find AND of the output signal of the OR circuit 261, the output signal of the OR circuit 51, and the control signal PLON and drive the control line PLB on the basis of the AND. The AND circuit 263A is configured to find AND of the output signal of the OR circuit 261, the output signal of the OR circuit 51, and the control signal SLON and drive the control line SLB on the basis of the AND. The AND circuit 272A is configured to find AND of the output signal of the OR circuit 271, the output signal of the OR circuit 51, and the control signal PLON and drive the control line PLC on the basis of the AND. The AND circuit 273A is configured to find AND of the output signal of the OR circuit 271, the output signal of the OR circuit 51, and the control signal SLON and drive the control line SLC on the basis of the AND.

With this configuration, the semiconductor circuit according to the present modification example is configured to perform the store operation and the restore operation in row units. Specifically, the driving controller 223 changes the control signal WLEN to the low level, changes the control signal WLON to the low level, generates the control signal PLON, and changes the control signal SLON to the high level. In addition, for example, the driving controller 223 changes the control signal SELA to the high level and changes the control signals SELB and SELC to the low level. Thereafter, the address decoder 24 generates the address decode signal ADD. This causes the driving section 222A to apply the signal SPLA corresponding to the control signal PLON to one control line PLA corresponding to the address decode signal ADD of the plurality of control lines PLA, and apply the signal SPLA that is at the low level to the plurality of control lines PLA other than the one control line PLA. In addition, the driving section 222A applies the signal SPLB that is at the low level to all the control lines PLB, and applies the signal SPLC that is at the low level to all the control lines PLC. In addition, the driving section 222A applies the signal SSLA that is at the high level to one control line SLA corresponding to the address decode signal ADD of the plurality of control lines SLA, and applies the signal SSLA that is at the low level to the plurality of control lines SLA other than the one control line SLA. In addition, the driving section 222A applies the signal SSLB that is at the low level to all the control lines SLB, and applies the signal SSLC that is at the low level to all the control lines SLC. This makes it possible for the semiconductor circuit according to the present modification example to perform the store operation and the restore operation in row units.

In addition, the semiconductor circuit according to the present modification example is configured to perform, for example, the initialization operation in row units. Specifically, the driving controller 223 changes the control signal WLEN to the low level, changes the control signal WLON to the high level, changes the control signal PLON between the high level and the low level, and changes the control signal SLON to the high level. In addition, for example, the driving controller 223 changes the control signal SELA to the high level and changes the control signals SELB and SELC to the low level. Thereafter, the address decoder 24 generates the address decode signal ADD. This causes the driving section 222A to apply the signal SWL that is at the high level to one word line WL corresponding to the address decode signal ADD of the plurality of word lines WL, and apply the signal SWL that is at the low level to the plurality of word lines WL other than the one word line WL. In addition, the driving section 222A applies the signal SPLA corresponding to the control signal PLON to one control line PLA corresponding to the address decode signal ADD of the plurality of control lines PLA, and applies the signal SPLA that is at the low level to the plurality of control lines PLA other than the one control line PLA. In addition, the driving section 222A applies the signal SPLB that is at the low level to all the control lines PLB, and applies the signal SPLC that is at the low level to all the control lines PLC. In addition, the driving section 222A applies the signal SSLA that is at the high level to one control line SLA corresponding to the address decode signal ADD of the plurality of control lines SLA, and applies the signal SSLA that is at the low level to the plurality of control lines SLA other than the one control line SLA. In addition, the driving section 222A applies the signal SSLB that is at the low level to all the control lines SLB, and applies the signal SSLC that is at the low level to all the control lines SLC. This makes it possible for the semiconductor circuit according to the present modification example to perform the initialization operation in row units.

Modification Example 5-2

In the embodiment described above, as illustrated in FIG. 57, three storage circuits 90, 290, and 390 are provided, but the embodiment is not limited thereto. Instead of this, for example, two storage circuits may be provided, or four or more storage circuits may be provided.

Other Modification Examples

For example, the technology of the embodiment described above may be combined with two or more of these modification examples. In addition, for example, the technology of the embodiment described above may be combined with one or more of the modification examples 1-2 and 1-3 of the first embodiment described above and the modification example 2-2 of the second embodiment described above.

6. Sixth Embodiment

Next, description is given of a semiconductor circuit 6 according to a sixth embodiment. In the present embodiment, a storage element is configured with use of a ferroelectric transistor instead of a ferroelectric capacitor. It is to be noted that components substantially the same as those of the semiconductor circuit 1 according to the first embodiment described above are denoted by the same reference numerals, and description thereof is omitted as appropriate.

As with the semiconductor circuit 1 (FIG. 1) according to the first embodiment described above, the semiconductor circuit 6 includes a memory cell array 421, a driving section 422, and the driving section 26.

FIG. 63 illustrates a configuration example of a memory cell 410 in the memory cell array 421. FIG. 64 illustrates a configuration example of the memory cell array 421. The memory cell array 421 includes the plurality of word lines WL, the plurality of bit lines BL, the plurality of bit lines BLB, the plurality of control lines PL, and the plurality of control lines SL. The control lines SL extend in the horizontal direction in FIGS. 63 and 64. Each of the control lines SL has one end coupled to the driving section 422, and the driving section 422 applies the signal SSL to the control line PL.

The memory cell 410 includes the SRAM circuit 30 and a storage circuit 440. The storage circuit 440 includes transistors 441 and 442. The transistors 441 and 442 are N-type ferroelectric transistors, specifically a ferroelectric-gate field effect transistors (EeFETs). In each of the transistors 441 and 442, for example, a gate insulating film includes a ferroelectric material. Each of the transistor 441 and 442 is configured to store information by using reversible change in capacitance state of the gate insulating film in accordance with polarity of a voltage difference between a gate, and a drain and a source. It is to be noted that in this example, the gate insulating film includes a ferroelectric material, but this is not limitative. For example, a gate of a normal N-type MOS transistor may be coupled to a ferroelectric capacitor as another element.

The transistor 441 has a gate coupled to the control line SL, a drain coupled to the node N1, and a source coupled to the control line PL. The transistor 442 has a gate coupled to the control line SL, a drain coupled to the node N2, and a source coupled to the control line PL.

Each of the transistors 441 and 442 is configured to set the capacitance state of the gate insulating film to the large capacitance state CH or the small capacitance state CL. Specifically, for example, the transistors 441 and 442 each set the capacitance state to the small capacitance state CS in a case where a voltage at the gate is higher than voltages at the drain and the source by a predetermined amount or more, and set the capacitance state to the large capacitance state CL in a case where the voltage at the gate is lower than the voltages at the drain and the source by a predetermined amount or more.

The driving section 422 is configured to apply the signal SWL to the word lines WL, apply the signal SPL to the control lines PL, and apply the signal SSL to the control lines SL on the basis of a control signal supplied from the controller 11.

FIG. 65 illustrates a configuration example of the driving section 422. The driving section 422 includes a driving controller 423, the address decoder 24, and the plurality of drive circuits 75.

The driving controller 423 is configured to control an operation of the driving section 422 on the basis of an instruction from the controller 11. Specifically, the driving controller 423 controls an operation of the address decoder 24, and controls operations of the plurality of drive circuits 75 with use of the control signals WLEN, WLON, PLON, and SLON.

The plurality of drive circuits 75 each includes the OR circuit 51, the AND circuit 52, the buffer 53, and the buffer 58.

With this configuration, for example, in a case of writing data to the memory cell array 421 or reading data from the memory cell array 421, the driving controller 423 changes the control signal WLEN to the low level, changes the control signal WLON to the high level, changes the control signal PLON to the low level, and changes the control signal SLON to the low level. Thereafter, the address decoder 24 generates the address decode signal ADD. This causes the driving section 422 to apply the signal SWL that is at the high level to one word line WL corresponding to the address decode signal ADD of the plurality of word lines WL, and apply the signal SWL that is at the low level to the plurality of word lines WL other than the one word line WL. In addition, the driving section 422 applies the signal SPL that is at the low level to all the control lines PL and applies the signal SSL that is at the low level to all the control lines SL.

In addition, for example, in a case of storing data in the transistors 441 and 442 or reading data from the transistors 441 and 442, the driving controller 423 changes the control signal WLEN to the low level, changes the control signal WLON to the low level, generates the control signal PLON, and generates the control signal SLON. This causes the driving section 422 to apply the signal SWL that is at the low level to all the word lines WL, apply the signal SPL corresponding to the control signal PLON to all the control lines PL, and apply the signal SSL corresponding to the control signal SLON to all the control lines SL.

In addition, for example, in a case of performing the initialization operation on the transistors 441 and 442 in the plurality of memory cells 410, the driving controller 423 changes the control signal WLEN to the high level, changes the control signal WLON to the high level, changes the control signal PLON between the high level and the low level, and changes the control signal SLON between the high level and the low level. This causes the driving section 422 to apply the signal SWL that is at the high level to all the word lines WL, apply, as the signal SPL, an alternating-current signal corresponding to the control signal PLON to all the control lines PL, and apply, as the signal SSL, an alternating-current signal corresponding to the control signal SLON to all the control lines SL.

Here, the transistor 441 corresponds to a specific example of a "first storage element" in the present disclosure. The transistor 442 corresponds to a specific example of a "second storage element" in the present disclosure. The control line SL corresponds to a specific example of a "first selection control line" in the present disclosure. The transistor 94 corresponds to a specific example of a "sixth transistor" in the present disclosure.

FIG. 66 illustrates an operation example of the memory cell 410 of interest in the semiconductor circuit 6, where (A) indicates the waveform of the power supply control signal PSH, (B) indicates the waveform of the power supply control signal PSL, (C) indicates the waveform of the voltage (the power supply voltage VDD1) at the power supply node NVDD, (D) indicates the waveform of the signal SSL, (E) indicates the waveform of the signal SPL, (F) indicates the waveform of the voltage (the voltage VN1) at the node N1, (G) indicates the waveform of the voltage (the voltage VN2) at the node N2, (H) indicates a waveform of a voltage (a voltage V441) at the gate viewed from the drain and the source in the transistor 441, and (I) indicates a waveform of a voltage (a voltage V442) at the gate viewed from the drain and the source in the transistor 442. FIGS. 67A to 67E each illustrate an operation state of the memory cell 410. FIG. 67A illustrates a state in the normal operation OP1. FIGS. 67B and 67C each illustrate a state in the store operation OP2. FIG. 67D illustrates a state in the standby operation OP3. FIG. 67E illustrates a state in the restore operation OP4.

(Normal Operation OP1)

In the normal operation OP1, the controller 11 changes the power supply control signal PSH to the low level, and changes the power supply control signal PSL to the high level ((A) and (B) of FIG. 66). This turns on the power supply switch sections 12 and 13 (FIG. 1) to supply the power supply voltage VDD as the power supply voltage VDD1 to the memory cell array 421 ((C) of FIG. 66), and supply the power supply voltage VSS to the memory cell array 421. Thereafter, the driving section 422 changes the signal SSL to the low level (the low level voltage VL) and changes the signal SPL to the low level (the low level voltage VL) ((D) and (E) of FIG. 66 and FIG. 67A).

In the normal operation OP1, the semiconductor circuit 6 writes data to the SRAM circuit 30 of the memory cell 410 or read data from the SRAM circuit 30. This operation is similar to that in the first embodiment described above.

(Store Operation OP2)

In the store operation OP2, the memory cell 410 causes the data stored in the SRAM circuit 30 to be stored in the storage circuit 440 with use of two steps. First, the driving section 422 changes the signal SSL to the high level and changes the signal SPL to the low level in a first step, and changes the signal SSL to the low level and changes the signal SPL to the high level in a second step ((E) of FIG. 66). This causes the capacitance states of the transistor 441 and 442 of the storage circuit 440 to be set in accordance with the data stored in the SRAM circuit 30.

Specifically, in the first step, as illustrated in FIG. 67B, the driving section 422 changes the signal SPL to the low level (the low level voltage VL), and changes the signal SSL to the high level (the high level voltage VH). This causes a voltage difference of "+ΔV" in one of the transistor 441 and 442. In this example, the voltage VN1 at the node N1 is the high level voltage VH, and the voltage VN2 at the node N2 is the low level voltage VL. The drain and the source of the transistor 442 are at the low level, and the gate is at the high level; therefore, the voltage V442 on the transistor 442 is "+ΔV". Thus, the capacitance state of the transistor 442 changes to the small capacitance state CS. In contrast, the drain of the transistor V441 is at the high level, and the source is at the low level; therefore, the voltage V441 on the transistor 441 is about "+ΔV/2", and does not reach a voltage that makes the capacitance state changeable. Thus, the capacitance state of the transistor 441 does not change.

Next, in the second step, as illustrated in FIG. 67C, the driving section 422 changes the signal SPL to the high level (the high level voltage VH), and changes the signal SSL to the low level (the low level voltage VL). This causes a voltage difference of "−ΔV" in the other one of the transistors 441 and 442. In this example, the drain and the source of the transistor 441 are at the high level, and the gate is at the high level; therefore, the voltage V441 on the transistor 441 is "−ΔV". Thus, the capacitance state of the transistor 441 changes to the large capacitance state CL. In contrast, the drain of the transistor V442 is at the low level, and the source is at the high level; therefore, the voltage V442 on the transistor 442 is about "−ΔV/2", and does not reach a voltage that makes the capacitance state changeable. Thus, the capacitance state of the transistor 442 does not change.
(Standby Operation OP3)

In the standby operation OP3, the controller 11 changes the power supply control signal PSH to the high level, and changes the power supply control signal PSL to the low level ((A) and (B) of FIG. 66). This turns off the power supply switch sections 12 and 13 to stop supply of the power supply voltages VDD and VSS to the memory cell array 421 ((C) of FIG. 66). At this time, as illustrated in (D) of FIG. 67, the capacitance states of the transistor 441 to 442 are maintained.
(Restore Operation OP4)

In the restore operation OP4, the driving section 422 changes the signal SSL to the high level ((D) of FIG. 66).

Thereafter, the controller 11 changes the power supply control signal PSH to the low level, and changes the power supply control signal PSL to the high level ((A) and (B) of FIG. 66). This turns on the power supply switch sections 12 and 13 to supply the power supply voltage VDD as the power supply voltage VDD1 to the memory cell array 421 ((C) of FIG. 66), and supply the power supply voltage VSS to the memory cell array 421. Thereafter, the driving section 422 changes the signal SPL to the low level ((E) of FIG. 66). Accordingly, the voltage state in the SRAM circuit 30 is determined in accordance with the capacitance states of the transistors 441 and 442. In this example, the capacitance state of the transistor 441 is the large capacitance state CL, and the capacitance state of the transistor 442 is the small capacitance state CS. In other words, a capacitance value between the control line SL and the node N1 is large, and a capacitance value between the control line SL and the node N2 is small. Accordingly, in a case where the voltage VN1 at the node N1 and the voltage VN2 at the node N2 change in accordance with change in the voltage on the signal SSL from the low level to the high level, the voltage VN1 easily becomes high, as compared with the voltage VN2. As a result, the voltage VN1 at the node N1 becomes the high level voltage VH, and the voltage VN2 at the node N2 becomes the low level voltage VL. Thus, in the memory cell 410, the SRAM circuit 30 stores data in accordance with data stored in the transistors 441 and 442.

Thereafter, the driving section 422 changes the signal SSL to the low level ((D) of FIG. 66).
(About Initialization Operation)

FIG. 68 illustrates an example of the initialization operation on the memory cell 410 of interest in the semiconductor circuit 6, where (A) indicates the waveform of the power supply control signal PSH, (B) indicates the waveform of the power supply control signal PSL, (C) indicates the waveform of the signal SWL, (D) indicates the waveform of the signal SBL on the bit line BL, (E) indicates the waveform of the signal SBLB on the bit line BLB, (F) indicates the waveform of the signal SPL, (G) indicates the waveform of the signal SSL, and (H) indicates waveforms of voltages V441 and V442 on the transistors 441 and 442.

First, at a timing t61, the controller 11 changes the power supply control signal PSH to the high level, and changes the power supply control signal PSL to the low level ((A) and (B) of FIG. 68). This turns off the power supply switch sections 12 and 13 to stop supply of the power supply voltages VDD and VSS to the memory cell array 421.

Next, at a timing t62, the driving section 422 changes the signal SWL on all the word lines WL from the low level to the high level ((C) of FIG. 68). Specifically, in FIG. 65, the driving controller 423 changes the control signal WLEN to the high level, and changes the control signal WLON to the high level. Accordingly, the driving section 422 applies the signal SWL that is at the high level to all the word lines WL to set all the word lines WL active.

Next, in a period from a timing t63, as with the first embodiment described above (FIG. 13), the driving section 26 changes the signals SBL and SBLB on all the bit lines BL and BLB between the high level and the low level. In this example, the driving section 26 changes the signals SBL and SBLB from the low level to the high level at the timing t63, and changes the signals SBL and SBLB from the high level to the low level at a timing t64.

In addition, in the period from the timing t63, the driving section 422 changes the signal SPL on all the control lines PL between the high level and the low level. Specifically, in FIG. 65, the driving controller 423 changes the control signal PLON between the high level and the low level. This causes the driving section 422 to apply, as the signal SPL, an alternating-current signal corresponding to the control signal PLON to all the control lines PL. In this example, the driving section 422 changes the signal SPL from the low level to the high level at the timing t63, and changes the signal SPL from the high level to the low level at a timing t64.

In addition, in the period from the timing t63, the driving section 422 changes the signal SSL on all the control lines SL between the high level and the low level. Specifically, in FIG. 65, the driving controller 423 changes the control signal SLON between the high level and the low level. Accordingly, the driving section 422 applies, as the signal SSL, an alternating-current signal corresponding to the control signal SLON to all the control lines SL. In this example, the driving section 422 changes the signal SSL from the low level to the high level at the timing t64, and changes the signal SSL from the high level to the low level at a timing t65.

FIG. 69A illustrates the operation state of the memory cell 410 in a period from the timing t63 to the timing t64, and FIG. 69B illustrates the operation state of the memory cell 410 in a period from the timing t64 to the timing t65. In the period from the timing t63 to the timing t64, as illustrated in FIG. 69A, the signals SBL and SBLB and the signal SPL are at the high level (the high level voltage VH), and the signal SBL is at the low level (the low level voltage VL). Accordingly, the voltages V441 and V442 on the transistor 441 and 442 become "−ΔV". In the period from the timing t64 to the timing t65, as illustrated in FIG. 69B, the signals SBL and SBLB and the signal SPL are at the low level, and the signal BPL is at the high level. Accordingly, the voltages V441 and V442 on the transistor 441 and 442 become "+ΔV". Thus, in the initialization operation OPinit, in each of two steps in a period from the timing t63 to the timing t65, both the voltages V441 and V442 on the transistors 441 and 442 become "+V" or "−V".

In the initialization operation OPinit, the operation in the period from the timing t63 to the timing t65 is repeated, for example, about hundreds to thousands of times. In each of the memory cells 410, the alternating-current signals are applied to the transistors 441 and 442 in such a manner. This consequently makes it possible to improve ferroelectric characteristics of the transistors 441 and 442.

In the semiconductor circuit 6, a storage circuit is configured with use of ferroelectric transistors in such a manner. Even in this case, the driving section 26 applies the alternating-current signals in phase with each other to the bit lines BL and BLB, which makes it possible to apply the alternating-current signals in phase with each other to two transistors 441 and 442. Accordingly, in the semiconductor circuit 6, it is possible to simultaneously apply "+V" or "−V" to the two transistors 441 and 442, which makes it possible to shorten time for the initialization operation OPinit. Other effects are similar to those in the first embodiment described above.

Modification Example 6-1

In the embodiment described above, one storage circuit 440 is provided in each memory cell 410, but the embodiment is not limited thereto. Instead of this, as with a memory cell 410A illustrated in FIG. 70, a plurality of storage circuits (three storage circuits 440, 540, and 640 in this example) may be provided. Even in this example, it is possible to perform an operation similar to that in the fifth embodiment described above. The control line PLA corresponds to a specific example of a "first control line" in the present disclosure. The control line SLA corresponds to a specific example of a "first selection control line" in the present disclosure. The control line PLB corresponds to a specific example of a "second control line" in the present disclosure. The control line SLB corresponds to a specific example of a "second selection control line" in the present disclosure.

Other Modification Examples

For example, the technology of the embodiment described above may be combined with one or more of the modification examples 1-2 and 1-3 of the first embodiment described above.

7. Application Examples

FIG. 71 illustrates an appearance of a smartphone 900 to which the semiconductor circuit according to any of the embodiments described above is applied. The smartphone 900 includes the semiconductor circuit according to any of the embodiments described above.

The semiconductor circuit according to any of the embodiments and the like described above is applicable to electronic apparatuses of any field such as a digital camera, a notebook personal computer, a portable gaming console, or a video camera in addition to such a smartphone. In particular, the present technology is effective when being applied to a portable electronic apparatus having a battery.

The present technology has been described above with reference to some embodiments and the modification examples, specific application examples thereof, and the application examples to electronic apparatuses, but the present technology is not limited to the embodiments and the like, and may be modified in a variety of ways.

For example, in each of the embodiments described above, the ferroelectric capacitor and the ferroelectric transistor are used as storage elements, but each of the embodiments is not limited thereto. Instead of this, for example, a RRAM storage element, a PCM storage element, or the like may be used as a storage element that stores data in accordance with a resistance state. Hereinafter, description is given with reference to some examples.

FIG. 72 illustrates a configuration example of a memory cell 10F that is the memory cell 10 (FIG. 2) according to the first embodiment to which the present modification example is applied. The memory cell 10F includes a storage circuit 40F. The storage circuit 40F includes storage elements 101 and 102. Each of the storage elements 101 and 102 is configured to store information by using reversible change in resistance state in accordance with polarity of a current flowing between both ends. Each of the storage elements 101 and 102 is configured to set the resistance state to a high resistance state or a low resistance state. The high resistance state is a state in which a resistance value between both end is high, and the low resistance state is a state in which the resistance value between both ends is low. Specifically, for example, the storage element 101 sets the resistance state to the high resistance state in a case where a predetermined amount or more of current flows from the node N1 to the control line PL, and sets the resistance state to the low resistance state in a case where a predetermined amount or more of current flows from the control line PL to the node N1. Likewise, for example, the storage element 102 sets the resistance state to the high resistance state in a case where a predetermined amount or more of current flows from the node N2 to the control line PL, and sets the resistance state to the low resistance state in a case where a predetermined amount or more of current flows from the control line PL to the node N2.

Likewise, FIG. 73 illustrates a configuration example of a memory cell 80F that is the memory cell 80 (FIG. 24) according to the second embodiment to which the present modification example is applied. The memory cell 80F includes a storage circuit 90F. FIG. 74 illustrates a configuration example of a memory cell 110F that is the memory cell 110 (FIG. 35) according to the third embodiment to which the present modification example is applied. The memory cell 110F includes storage circuits 40F and 140F. The storage circuit 140F includes storage elements 103 and 104. FIG. 75 illustrates a configuration example of a memory cell 180F that is the memory cell 180 (FIG. 47) according to the fourth embodiment to which the present modification example is applied. The memory cell 180F includes storage circuits 90F and 190F. FIG. 76 illustrates a configuration example of a memory cell 210F that is the memory cell 210 (FIG. 57) according to the fifth embodiment to which the present modification example is applied. The memory cell 210F includes storage circuits 90F, 290F, and 390F. Even in these cases, it is possible to achieve effects similar to those in each of the embodiments described above.

It is to be noted that the effects described herein are merely illustrative and non-limiting, and other effects may be provided.

It is to be noted that the present technology may have the following configurations. According to the present technology having the following configurations, it is possible to perform an initialization operation in a short time.

(1)
  A semiconductor circuit including:
    a first inverter that is coupled to a first power supply node and a second power supply node, is configured to generate an inverted voltage of a voltage at a first node, and is configured to apply the inverted voltage to a second node;
    a second inverter that is coupled to the first power supply node and the second power supply node, is configured to generate an inverted voltage of a voltage at the second node, and is configured to apply the inverted voltage to the first node;
    a first control line;
    a first storage circuit including a first storage element and a second storage element, the first storage element provided on a first path coupling the first node and the first control line, and the second storage element provided on a second path coupling the second node and the first control line;

a first power supply switch that is configured to supply a first power supply voltage to the first power supply node by being turned on;

a second power supply switch that is configured to supply a second power supply voltage to the second power supply node by being turned on;

a first bit line and a second bit line;

a first word line;

a first transistor that has a gate coupled to the first word line, and is configured to couple the first bit line and the first node by being turned on;

a second transistor that has a gate coupled to the first word line, and is configured to couple the second bit line and the second node by being turned on; and a driving section that is configured to perform a first driving operation and a second driving operation, the first driving operation in which, in a period in which the first power supply switch and the second power supply switch are turned on, the first word line is set active, and signals having logic levels different from each other are applied to the respective first bit line and second bit line, the second driving operation in which, in a period in which the first power supply switch and the second power supply switch are turned off, the first word line is set active, and a first alternating-current signal and a second alternating-current signal are respectively applied to the first bit line and the second bit line, and the first alternating-current signal and the second alternating-current signal being signals in phase with each other.

(2)

The semiconductor circuit according to (1), in which the driving section includes a first switch that is coupled to the first bit line, and is configured to apply a first signal to the first bit line by being turned on, a second switch that is coupled to the second bit line, and is configured to apply a second signal to the second bit line by being turned on, the second signal being an inverted signal of the first signal, and a third switch that is coupled to the first bit line, and is configured to apply the first signal to the second bit line by being turned on, in the first driving operation, the driving section is configured to apply the first signal to the first bit line through the first switch and configured to apply the second signal to the second bit line through the second switch by turning on the first switch and the second switch and turning off the third switch, and in the second driving operation, the driving section is configured to apply the first signal as the first alternating-current signal to the first bit line through the first switch and configured to apply the first signal as the second alternating-current signal to the second bit line through the third switch by turning on the first switch and the third switch and turning off the second switch.

(3)

The semiconductor circuit according to (1), in which the driving section includes a fourth switch that is coupled to the first bit line, and is configured to apply a first voltage to the first bit line by being turned on, a fifth switch that is coupled to the second bit line, and is configured to apply the first voltage to the second bit line by being turned on, a sixth switch that is coupled to the first bit line, and is configured to apply a second voltage to the first bit line by being turned on, and a seventh switch that is coupled to the second bit line, and is configured to apply the second voltage to the second bit line by being turned on, in the second driving operation, the driving section is configured to apply the first alternating-current signal to the first bit line and configured to apply the second alternating-current signal to the second bit line by alternately repeating an operation of turning on the fourth switch and the fifth switch and turning off the sixth switch and the seventh switch, and an operation of turning on the sixth switch and the seventh switch and turning off the fourth switch and the fifth switch.

(4)

The semiconductor circuit according to any one of (1) to (3), in which the second driving operation further includes applying a third alternating-current signal to the first control line, the third alternating-current signal being a signal in opposite phase to the first alternating-current signal and the second alternating-current signal.

(5)

The semiconductor circuit according to (4), in which
the first storage element has a first terminal coupled to the first node, and a second terminal coupled to the first control line, and
the second storage element has a first terminal coupled to the second node, and a second terminal coupled to the first control line.

(6)

The semiconductor circuit according to (4), in which
the first storage element and the second storage element each have a first terminal and
a second terminal, and
the first storage circuit includes a third transistor that is provided on the first path, and is configured to couple the first node and the first control line through the first storage element by being turned on, and
a fourth transistor that is provided on the second path, and is configured to couple the second node and the first control line through the second storage element by being turned on.

(7)

The semiconductor circuit according to (5) or (6), in which the first storage element and the second storage element are configured to store information by using reversible change in capacitance state in accordance with polarity of a voltage difference between a voltage at the first terminal and a voltage at the second terminal.

(8)

The semiconductor circuit according to (5) or (6), in which the first storage element and the second storage element are configured to store information by using reversible change in resistance state in accordance with a direction of a current flowing between the first terminal and the second terminal.

(9)

The semiconductor circuit according to (4), further including:
a second control line; and
a second storage circuit including a third storage element and a fourth storage element, the third storage element provided on a third path coupling the first node and the second control line, and the fourth storage element provided on a fourth path coupling the second node and the second control line, in which the second driving operation further includes applying the third alternating-current signal to the second control line.

(10)

The semiconductor circuit according to (9), in which the first storage element has a first terminal coupled to the first node, and a second terminal coupled to the first control line, the second storage element has a first terminal coupled to the second node, and a second terminal coupled to the first control line, the third storage element has a first terminal coupled to the second control line, and a second terminal coupled to the first node, and the fourth storage element has a first terminal coupled to the second control line, and a second terminal coupled to the second node.

(11)

The semiconductor circuit according to (9), in which the first storage element, the second storage element, the third storage element, and the fourth storage element each have a first terminal and a second terminal, the first storage circuit includes a third transistor that is provided on the first path, and is configured to couple the first node and the first control line through the first storage element by being turned on, and a fourth transistor that is provided on the second path, and is configured to couple the second node and the first control line through the second storage element by being turned on, and the second storage circuit includes a fifth transistor that is provided on the third path, and is configured to couple the first node and the second control line through the third storage element by being turned on, and a sixth transistor that is provided on the fourth path, and is configured to couple the second node and the second control line through the fourth storage element by being turned on.

(12)

The semiconductor circuit according to any one of (1) to (3), further including a first selection control line, in which the first storage element has a gate coupled to the first selection control line, a first terminal coupled to the first node, and a second terminal coupled to the first control line, the second storage element has a gate coupled to the first selection control line, a first terminal coupled to the second node, and a second terminal coupled to the first control line, and the second driving operation further includes applying a third alternating-current signal to the first control line, and applying a fourth alternating-current signal to the first selection control line, the third alternating-current signal being a signal in phase with the first alternating-current signal and the second alternating-current signal, and the fourth alternating-current signal being a signal in opposite phase to the first alternating-current signal and the second alternating-current signal.

(13)

The semiconductor circuit according to (12), further including:

a second control line;

a second selection control line; and a second storage circuit including a third storage element and a fourth storage element, the third storage element having a gate coupled to the second selection control line, a first terminal coupled to the first node, and a second terminal coupled to the second control line, and the fourth storage element having a gate coupled to the second selection control line, a first terminal coupled to the second node, and a second terminal coupled to the second control line, in which the second driving operation further includes applying the third alternating-current signal to the second control line, and applying the fourth alternating-current signal to the second selection control line.

(14)

The semiconductor circuit according to any one of (1) to (13), further including:

a third inverter that is coupled to the first power supply node and the second power supply node, is configured to generate an inverted voltage of a voltage at a third node, and is configured to apply the inverted voltage to a fourth node;

a fourth inverter that is coupled to the first power supply node and the second power supply node, is configured to generate an inverted voltage of a voltage at the fourth node, and is configured to apply the inverted voltage to the third node;

a third control line;

a third storage circuit including a fifth storage element and a sixth storage element, the fifth storage element provided on a fifth path coupling the third node and the third control line, and the sixth storage element provided on a sixth path coupling the fourth node and the third control line;

a second word line;

a seventh transistor that has a gate coupled to the second word line, and is configured to couple the first bit line and the third node by being turned on; and an eighth transistor that has a gate coupled to the second word line, and is configured to couple the second bit line and the fourth node by being turned on, in which the first driving operation includes setting the first word line of the first word line and the second word line active, and the second driving operation includes setting both the first word line and the second word line active.

(15)

The semiconductor circuit according to any one of (1) to (13), further including:

a third inverter that is coupled to the first power supply node and the second power supply node, is configured to generate an inverted voltage of a voltage at a third node, and is configured to apply the inverted voltage to a fourth node;

a fourth inverter that is coupled to the first power supply node and the second power supply node, is configured to generate an inverted voltage of a voltage at the fourth node, and is configured to apply the inverted voltage to the third node;

a third storage circuit including a fifth storage element and a sixth storage element, the fifth storage element provided on a fifth path coupling the third node and the first control line, and the sixth storage element provided on a sixth path coupling the fourth node and the first control line;

a second word line;

a seventh transistor that has a gate coupled to the second word line, and is configured to couple the first bit line and the third node by being turned on; and an eighth transistor that has a gate coupled to the second word line, and is configured to couple the second bit line and the fourth node by being turned on, in which the first driving operation includes setting the first word line of the first word line and the second word line active, and the second driving operation includes setting both the first word line and the second word line active.

(16)

The semiconductor circuit according to any one of (1) to (15), further including:

a fifth inverter that is coupled to the first power supply node and the second power supply node, is configured to generate an inverted voltage of a voltage at a fifth node, and is configured to apply the inverted voltage to a sixth node;

a sixth inverter that is coupled to the first power supply node and the second power supply node, is configured to generate an inverted voltage of a voltage at the sixth node, and is configured to apply the inverted voltage to the fifth node;

a fourth storage circuit including a fifth storage element and a sixth storage element, the fifth storage element provided on a fifth path coupling the fifth node and the first control line, and the sixth storage element provided on a sixth path coupling the sixth node and the first control line;

a third bit line and a fourth bit line;

a ninth transistor that has a gate coupled to the first word line, and is configured to couple the third bit line and the fifth node by being turned on; and a tenth transistor that has a gate coupled to the first word line, and is configured to couple the fourth bit line and the sixth node by being turned on, in which the first driving operation further includes applying signals having logic levels different from each other to the respective third bit line and fourth bit line, and the second driving operation further includes respectively applying the first alternating-current signal and the second alternating-current signal to the third bit line and the fourth bit line.

(17)

The semiconductor circuit according to any one of (1) to (15), further including:

a fifth circuit that is coupled to the first power supply node and the second power supply node, is configured to generate an inverted voltage of a voltage at a fifth node, and is configured to apply the inverted voltage to a sixth node;

a sixth circuit that is coupled to the first power supply node and the second power supply node, is configured to generate an inverted voltage of a voltage at the sixth node, and is configured to apply the inverted voltage to the fifth node;

a fourth control line;

a fourth storage circuit including a fifth storage element and a sixth storage element, the fifth storage element provided on a fifth path coupling the fifth node and the fourth control line, and the sixth storage element provided on a sixth path coupling the sixth node and the fourth control line;

a third bit line and a fourth bit line;

a ninth transistor that has a gate coupled to the first word line, and is configured to couple the third bit line and the fifth node by being turned on; and a tenth transistor that has a gate coupled to the first word line, and is configured to couple the fourth bit line and the sixth node by being turned on, in which the first driving operation further includes applying signals having logic levels different from each other to the respective third bit line and fourth bit line, and the second driving operation further includes respectively applying the first alternating-current signal and the second alternating-current signal to the third bit line and the fourth bit line.

(18)

The semiconductor circuit according to any one of (1) to (17), further including:

a seventh inverter that is coupled to the first power supply node and the second power supply node, is configured to generate an inverted voltage of a voltage at a seventh node, and is configured to apply the inverted voltage to an eighth node;

an eighth inverter that is coupled to the first power supply node and the second power supply node, is configured to generate an inverted voltage of a voltage at the eighth node, and is configured to apply the inverted voltage to the seventh node;

a fifth control line;

a fifth storage circuit including a seventh storage element and an eighth storage element, the seventh storage element provided on a seventh path coupling the seventh node and the fifth control line, and the eighth storage element provided on an eighth path coupling the eighth node and the fifth control line;

a fifth bit line and a sixth bit line;

an eleventh transistor that is configured to couple the fifth bit line and the seventh node by being turned on; and a twelfth transistor that is configured to couple the sixth bit line and the eighth node by being turned on, in which the first driving operation further includes applying signals having logic levels different from each other to the respective fifth bit line and sixth bit line, and the second driving operation further includes respectively applying a fifth alternating-current signal and a sixth alternating-current signal to the fifth bit line and the sixth bit line, the fifth alternating-current signal and the sixth alternating-current signal being signals in opposite phase to the first alternating-current signal.

(19)

A driving method including:

performing a first driving operation on a semiconductor circuit, the semiconductor circuit including a first inverter, a second inverter, a first control line, a first storage circuit, a first power supply switch, a second power supply switch, a first bit line and a second bit line, a first word line, a first transistor, and a second transistor, the first inverter that is coupled to a first power supply node and a second power supply node, is configured to generate an inverted voltage of a voltage at a first node, and is configured to apply the inverted voltage to a second node, the second inverter that is coupled to the first power supply node and the second power supply node, is configured to generate an inverted voltage of a voltage at the second node, and is configured to apply the inverted voltage to the first node, the first storage circuit including a first storage element provided on a first path coupling the first node and the first control line, and a second storage element provided on a second path coupling the second node and the first control line, the first power supply switch that is configured to supply a first power supply voltage to the first power supply node by being turned on, the second power supply switch that is configured to supply a second power supply voltage to the second power supply node by being turned on, the first transistor that has a gate coupled to the first word line, and is configured to couple the first bit line and the first node by being turned on, the second transistor that has a gate coupled to the first word line, and is configured to couple the second bit line and the second node by being turned on, the first driving operation in which, in a period in which the first power supply switch and the second power supply switch are turned on, the first word line is set active, and signals having logic levels different from each other are applied to the respective first bit line and second bit line; and performing a second driving operation in which, in a period in which the first power supply switch and the second power supply switch are turned off, the first word line is set active, and a first alternating-current signal and a second alternating-current signal are respectively applied to the first bit line and the second bit line, and the first alternating-current signal and the second alternating-current signal being signals in phase with each other.

(20)

An electronic apparatus provided with a semiconductor circuit, the semiconductor circuit including:

a first inverter that is coupled to a first power supply node and a second power supply node, is configured to generate an inverted voltage of a voltage at a first node, and is configured to apply the inverted voltage to a second node;

a second inverter that is coupled to the first power supply node and the second power supply node, is configured to generate an inverted voltage of a voltage at the second node, and is configured to apply the inverted voltage to the first node;

a first control line;

a first storage circuit including a first storage element and a second storage element, the first storage element provided on a first path coupling the first node and the first control line, and the second storage element provided on a second path coupling the second node and the first control line;

a first power supply switch that is configured to supply a first power supply voltage to the first power supply node by being turned on;

a second power supply switch that is configured to supply a second power supply voltage to the second power supply node by being turned on;

a first bit line and a second bit line;

a first word line;

a first transistor that has a gate coupled to the first word line, and is configured to couple the first bit line and the first node by being turned on;

a second transistor that has a gate coupled to the first word line, and is configured to couple the second bit line and the second node by being turned on; and a driving section that is configured to perform a first driving operation and a second driving operation, the first driving operation in which, in a period in which the first power supply switch and the second power supply switch are turned on, the first word line is set active, and signals having logic levels different from each other are applied to the respective first bit line and second bit line, the second driving operation in which, in a period in which the first power supply switch and the second power supply switch are turned off, the first word line is set active, and a first alternating-current signal and a second alternating-current signal are respectively applied to the first bit line and the second bit line, and the first alternating-current signal and the second alternating-current signal being signals in phase with each other.

This application claims the priority on the basis of Japanese Patent Application No. 2021-185013 filed on Nov. 12, 2021 with Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A semiconductor circuit comprising:

a first inverter that is coupled to a first power supply node and a second power supply node, is configured to generate an inverted voltage of a voltage at a first node, and is configured to apply the inverted voltage of the voltage at the first node to a second node;

a second inverter that is coupled to the first power supply node and the second power supply node, is configured to generate an inverted voltage of a voltage at the second node, and is configured to apply the inverted voltage of the voltage at the second node to the first node;

a first control line;

a first storage circuit including a first storage element and a second storage element, the first storage element provided on a first path coupling the first node and the first control line, and the second storage element provided on a second path coupling the second node and the first control line;

a first power supply switch that is configured to supply a first power supply voltage to the first power supply node by being turned on;

a second power supply switch that is configured to supply a second power supply voltage to the second power supply node by being turned on;

a first bit line and a second bit line;

a first word line;

a first transistor that has a gate coupled to the first word line, and is configured to couple the first bit line and the first node by being turned on;

a second transistor that has a gate coupled to the first word line, and is configured to couple the second bit line and the second node by being turned on; and a driving section that is configured to perform a first driving operation and a second driving operation, the first driving operation in which, in a period in which the first power supply switch and the second power supply switch are turned on, the first word line is set active, and signals having logic levels different from each other are applied to the respective first bit line and second bit line, the second driving operation in which, in a period in which the first power supply switch and the second power supply switch are turned off, the first word line is set active, and a first alternating-current signal and a second alternating-current signal are respectively applied to the first bit line and the second bit line, and the first alternating-current signal and the second alternating-current signal being signals in phase with each other.

2. The semiconductor circuit according to claim 1, wherein
the driving section includes
a first switch that is coupled to the first bit line, and is configured to apply a first signal to the first bit line by being turned on,
a second switch that is coupled to the second bit line, and is configured to apply a second signal to the second bit line by being turned on, the second signal being an inverted signal of the first signal, and
a third switch that is coupled to the first bit line, and is configured to apply the first signal to the second bit line by being turned on,
in the first driving operation, the driving section is configured to apply the first signal to the first bit line through the first switch and configured to apply the second signal to the second bit line through the second switch by turning on the first switch and the second switch and turning off the third switch, and
in the second driving operation, the driving section is configured to apply the first signal as the first alternating-current signal to the first bit line through the first switch and configured to apply the first signal as the second alternating-current signal to the second bit line through the third switch by turning on the first switch and the third switch and turning off the second switch.

3. The semiconductor circuit according to claim 1, wherein
the driving section includes
a fourth switch that is coupled to the first bit line, and is configured to apply a first voltage to the first bit line by being turned on,
a fifth switch that is coupled to the second bit line, and is configured to apply the first voltage to the second bit line by being turned on,
a sixth switch that is coupled to the first bit line, and is configured to apply a second voltage to the first bit line by being turned on, and
a seventh switch that is coupled to the second bit line, and is configured to apply the second voltage to the second bit line by being turned on,
in the second driving operation, the driving section is configured to apply the first alternating-current signal to the first bit line and configured to apply the second alternating-current signal to the second bit line by alternately repeating an operation of turning on the fourth switch and the fifth switch and turning off the sixth switch and the seventh switch, and an operation of turning on the sixth switch and the seventh switch and turning off the fourth switch and the fifth switch.

4. The semiconductor circuit according to claim 1, wherein the second driving operation further includes applying a third alternating-current signal to the first control line, the third alternating-current signal being a signal in opposite phase to the first alternating-current signal and the second alternating-current signal.

5. The semiconductor circuit according to claim 4, wherein
the first storage element has a first terminal coupled to the first node, and a second terminal coupled to the first control line, and
the second storage element has a first terminal coupled to the second node, and a second terminal coupled to the first control line.

6. The semiconductor circuit according to claim 4, wherein
the first storage element and the second storage element each have a first terminal and a second terminal, and
the first storage circuit includes
a third transistor that is provided on the first path, and is configured to couple the first node and the first control line through the first storage element by being turned on, and
a fourth transistor that is provided on the second path, and is configured to couple the second node and the first control line through the second storage element by being turned on.

7. The semiconductor circuit according to claim 5, wherein the first storage element and the second storage element are configured to store information by using reversible change in capacitance state in accordance with polarity of a voltage difference between a voltage at the first terminal and a voltage at the second terminal.

8. The semiconductor circuit according to claim 5, wherein the first storage element and the second storage element are configured to store information by using reversible change in resistance state in accordance with a direction of a current flowing between the first terminal and the second terminal.

9. The semiconductor circuit according to claim 4, further comprising:
a second control line; and
a second storage circuit including a third storage element and a fourth storage element, the third storage element provided on a third path coupling the first node and the second control line, and the fourth storage element provided on a fourth path coupling the second node and the second control line, wherein
the second driving operation further includes applying the third alternating-current signal to the second control line.

10. The semiconductor circuit according to claim 9, wherein
the first storage element has a first terminal coupled to the first node, and a second terminal coupled to the first control line,
the second storage element has a first terminal coupled to the second node, and a second terminal coupled to the first control line,
the third storage element has a first terminal coupled to the second control line, and a second terminal coupled to the first node, and
the fourth storage element has a first terminal coupled to the second control line, and a second terminal coupled to the second node.

11. The semiconductor circuit according to claim 9, wherein
the first storage element, the second storage element, the third storage element, and the fourth storage element each have a first terminal and a second terminal,
the first storage circuit includes
a third transistor that is provided on the first path, and is configured to couple the first node and the first control line through the first storage element by being turned on, and
a fourth transistor that is provided on the second path, and is configured to couple the second node and the first control line through the second storage element by being turned on, and
the second storage circuit includes a fifth transistor that is provided on the third path, and is configured to couple the first node and the second control line through the third storage element by being turned on, and a sixth transistor that is provided on the fourth path, and is configured to couple the second node and the second control line through the fourth storage element by being turned on.

12. The semiconductor circuit according to claim 1, further comprising a first selection control line, wherein the first storage element has a gate coupled to the first selection control line, a first terminal coupled to the first node, and a second terminal coupled to the first control line, the second storage element has a gate coupled to the first selection control line, a first terminal coupled to the second node, and a second terminal coupled to the first control line, and the second driving operation further includes applying a third alternating-current signal to the first control line, and applying a fourth alternating-current signal to the first selection control line, the third alternating-current signal being a signal in phase with the first alternating-current signal and the second alternating-current signal, and the fourth alternating-current signal being a signal in opposite phase to the first alternating-current signal and the second alternating-current signal.

13. The semiconductor circuit according to claim 12, further comprising:

a second control line;

a second selection control line; and a second storage circuit including a third storage element and a fourth storage element, the third storage element having a gate coupled to the second selection control line, a first terminal coupled to the first node, and a second terminal coupled to the second control line, and the fourth storage element having a gate coupled to the second selection control line, a first terminal coupled to the second node, and a second terminal coupled to the second control line, wherein the second driving operation further includes applying the third alternating-current signal to the second control line, and applying the fourth alternating-current signal to the second selection control line.

14. The semiconductor circuit according to claim 1 further comprising:

a third inverter that is coupled to the first power supply node and the second power supply node, is configured to generate an inverted voltage of a voltage at a third node, and is configured to apply the inverted voltage of the voltage at the third node to a fourth node;

a fourth inverter that is coupled to the first power supply node and the second power supply node, is configured to generate an inverted voltage of a voltage at the fourth node, and is configured to apply the inverted voltage of the voltage at the fourth node to the third node;

a third control line;

a third storage circuit including a fifth storage element and a sixth storage element, the fifth storage element provided on a fifth path coupling the third node and the third control line, and the sixth storage element provided on a sixth path coupling the fourth node and the third control line;

a second word line;

a seventh transistor that has a gate coupled to the second word line, and is configured to couple the first bit line and the third node by being turned on; and an eighth transistor that has a gate coupled to the second word line, and is configured to couple the second bit line and the fourth node by being turned on, wherein the first driving operation includes setting the first word line of the first word line and the second word line active, and the second driving operation includes setting both the first word line and the second word line active.

15. The semiconductor circuit according to claim 1 further comprising:

a third inverter that is coupled to the first power supply node and the second power supply node, is configured to generate an inverted voltage of a voltage at a third node, and is configured to apply the inverted voltage of the voltage at the third node to a fourth node;

a fourth inverter that is coupled to the first power supply node and the second power supply node, is configured to generate an inverted voltage of a voltage at the fourth node, and is configured to apply the inverted voltage of the voltage at the fourth node to the third node;

a third storage circuit including a fifth storage element and a sixth storage element, the fifth storage element provided on a fifth path coupling the third node and the first control line, and the sixth storage element provided on a sixth path coupling the fourth node and the first control line;

a second word line;

a seventh transistor that has a gate coupled to the second word line, and is configured to couple the first bit line and the third node by being turned on; and an eighth transistor that has a gate coupled to the second word line, and is configured to couple the second bit line and the fourth node by being turned on, wherein the first driving operation includes setting the first word line of the first word line and the second word line active, and the second driving operation includes setting both the first word line and the second word line active.

16. The semiconductor circuit according to claim 1, further comprising:

a fifth inverter that is coupled to the first power supply node and the second power supply node, is configured to generate an inverted voltage of a voltage at a fifth node, and is configured to apply the inverted voltage of the voltage at the fifth node to a sixth node;

a sixth inverter that is coupled to the first power supply node and the second power supply node, is configured to generate an inverted voltage of a voltage at the sixth node, and is configured to apply the inverted voltage of the voltage at the sixth node to the fifth node;

a fourth storage circuit including a fifth storage element and a sixth storage element, the fifth storage element provided on a fifth path coupling the fifth node and the first control line, and the sixth storage element provided on a sixth path coupling the sixth node and the first control line;

a third bit line and a fourth bit line;

a ninth transistor that has a gate coupled to the first word line, and is configured to couple the third bit line and the fifth node by being turned on; and a tenth transistor that has a gate coupled to the first word line, and is configured to couple the fourth bit line and the sixth node by being turned on, wherein the first driving operation further includes applying signals having logic levels different from each other to the respective third bit line and fourth bit line, and the second driving operation further includes respectively applying the first alternating-current signal and the second alternating-current signal to the third bit line and the fourth bit line.

17. The semiconductor circuit according to claim 1, further comprising:
a fifth circuit that is coupled to the first power supply node and the second power supply node, is configured to generate an inverted voltage of a voltage at a fifth node, and is configured to apply the inverted voltage of the voltage at the fifth node to a sixth node;
a sixth circuit that is coupled to the first power supply node and the second power supply node, is configured to generate an inverted voltage of a voltage at the sixth node, and is configured to apply the inverted voltage of the voltage at the sixth node to the fifth node;
a fourth control line;
a fourth storage circuit including a fifth storage element and a sixth storage element, the fifth storage element provided on a fifth path coupling the fifth node and the fourth control line, and the sixth storage element provided on a sixth path coupling the sixth node and the fourth control line;
a third bit line and a fourth bit line;
a ninth transistor that has a gate coupled to the first word line, and is configured to couple the third bit line and the fifth node by being turned on; and
a tenth transistor that has a gate coupled to the first word line, and is configured to couple the fourth bit line and the sixth node by being turned on, wherein
the first driving operation further includes applying signals having logic levels different from each other to the respective third bit line and fourth bit line, and
the second driving operation further includes respectively applying the first alternating-current signal and the second alternating-current signal to the third bit line and the fourth bit line.

18. The semiconductor circuit according to claim 1, further comprising:
a seventh inverter that is coupled to the first power supply node and the second power supply node, is configured to generate an inverted voltage of a voltage at a seventh node, and is configured to apply the inverted voltage of the voltage at the seventh node to an eighth node;
an eighth inverter that is coupled to the first power supply node and the second power supply node, is configured to generate an inverted voltage of a voltage at the eighth node, and is configured to apply the inverted voltage of the voltage at the eighth node to the seventh node;
a fifth control line;
a fifth storage circuit including a seventh storage element and an eighth storage element, the seventh storage element provided on a seventh path coupling the seventh node and the fifth control line, and the eighth storage element provided on an eighth path coupling the eighth node and the fifth control line;
a fifth bit line and a sixth bit line;
an eleventh transistor that is configured to couple the fifth bit line and the seventh node by being turned on; and
a twelfth transistor that is configured to couple the sixth bit line and the eighth node by being turned on, wherein
the first driving operation further includes applying signals having logic levels different from each other to the respective fifth bit line and sixth bit line, and
the second driving operation further includes respectively applying a fifth alternating-current signal and a sixth alternating-current signal to the fifth bit line and the sixth bit line, the fifth alternating-current signal and the sixth alternating-current signal being signals in opposite phase to the first alternating-current signal.

19. A driving method comprising:
performing a first driving operation on a semiconductor circuit, the semiconductor circuit including a first inverter, a second inverter, a first control line, a first storage circuit, a first power supply switch, a second power supply switch, a first bit line and a second bit line, a first word line, a first transistor, and a second transistor, the first inverter that is coupled to a first power supply node and a second power supply node, is configured to generate an inverted voltage of a voltage at a first node, and is configured to apply the inverted voltage of the voltage at the first node to a second node, the second inverter that is coupled to the first power supply node and the second power supply node, is configured to generate an inverted voltage of a voltage at the second node, and is configured to apply the inverted voltage of the voltage at the second node to the first node, the first storage circuit including a first storage element provided on a first path coupling the first node and the first control line, and a second storage element provided on a second path coupling the second node and the first control line, the first power supply switch that is configured to supply a first power supply voltage to the first power supply node by being turned on, the second power supply switch that is configured to supply a second power supply voltage to the second power supply node by being turned on, the first transistor that has a gate coupled to the first word line, and is configured to couple the first bit line and the first node by being turned on, the second transistor that has a gate coupled to the first word line, and is configured to couple the second bit line and the second node by being turned on, the first driving operation in which, in a period in which the first power supply switch and the second power supply switch are turned on, the first word line is set active, and signals having logic levels different from each other are applied to the respective first bit line and second bit line; and
performing a second driving operation in which, in a period in which the first power supply switch and the second power supply switch are turned off, the first word line is set active, and a first alternating-current signal and a second alternating-current signal are respectively applied to the first bit line and the second bit line, and the first alternating-current signal and the second alternating-current signal being signals in phase with each other.

20. An electronic apparatus provided with a semiconductor circuit, the semiconductor circuit comprising:
a first inverter that is coupled to a first power supply node and a second power supply node, is configured to generate an inverted voltage of a voltage at a first node, and is configured to apply the inverted voltage of the voltage at the first node to a second node;
a second inverter that is coupled to the first power supply node and the second power supply node, is configured to generate an inverted voltage of a voltage at the second node, and is configured to apply the inverted voltage of the voltage at the second node to the first node;
a first control line;
a first storage circuit including a first storage element and a second storage element, the first storage element provided on a first path coupling the first node and the first control line, and the second storage element provided on a second path coupling the second node and the first control line;
a first power supply switch that is configured to supply a first power supply voltage to the first power supply node by being turned on;
a second power supply switch that is configured to supply a second power supply voltage to the second power supply node by being turned on;
a first bit line and a second bit line;
a first word line;
a first transistor that has a gate coupled to the first word line, and is configured to couple the first bit line and the first node by being turned on;
a second transistor that has a gate coupled to the first word line, and is configured to couple the second bit line and the second node by being turned on; and
a driving section that is configured to perform a first driving operation and a second driving operation, the first driving operation in which, in a period in which the first power supply switch and the second power supply switch are turned on, the first word line is set active, and signals having logic levels different from each other are applied to the respective first bit line and second bit line, the second driving operation in which, in a period in which the first power supply switch and the second power supply switch are turned off, the first word line is set active, and a first alternating-current signal and a second alternating-current signal are respectively applied to the first bit line and the second bit line, and the first alternating-current signal and the second alternating-current signal being signals in phase with each other.

* * * * *